US012615567B2

(12) United States Patent　　(10) Patent No.:　US 12,615,567 B2
Kim et al.　　　　　　　　　　(45) Date of Patent:　　Apr. 28, 2026

(54) CONFIGURATION FOR LAYER 1 OR LAYER 2 TRIGGERED MOBILITY (LTM) FOR CELL SWITCHING

(71) Applicant: Comcast Cable Communications, LLC, Philadelphia, PA (US)

(72) Inventors: Taehun Kim, Fairfax, VA (US); Hyoungsuk Jeon, Centreville, VA (US); Esmael Hejazi Dinan, McLean, VA (US); Jian Xu, McLean, VA (US); Kyungmin Park, Vienna, VA (US); Fasil Abdul Latheef, Dresden (DE)

(73) Assignee: Comcast Cable Communications, LLC, Philadelphia, PA (US)

( * ) Notice: Subject to any disclaimer, the term of this patent is extended or adjusted under 35 U.S.C. 154(b) by 275 days.

(21) Appl. No.: 18/500,828

(22) Filed: Nov. 2, 2023

(65) Prior Publication Data

US 2024/0147328 A1　May 2, 2024

Related U.S. Application Data

(60) Provisional application No. 63/421,978, filed on Nov. 2, 2022.

(51) Int. Cl.
H04W 36/08　　(2009.01)
H04W 36/02　　(2009.01)
H04W 36/30　　(2009.01)
(52) U.S. Cl.
CPC ........... H04W 36/08 (2013.01); H04W 36/02 (2013.01); H04W 36/30 (2013.01)

(58) Field of Classification Search
CPC ............. H04W 36/08; H04W 36/0072; H04W 36/0061; H04W 36/0055; H04W 36/02; H04W 36/30; H04W 36/0064; H04W 36/00837
See application file for complete search history.

(56) References Cited

U.S. PATENT DOCUMENTS

| | | | |
|---|---|---|---|
| 2022/0078670 A1 | 3/2022 | Kung et al. | |
| 2023/0362986 A1* | 11/2023 | Leng ................. | H04W 74/0838 |
| 2023/0388871 A1* | 11/2023 | Guo .................. | H04W 36/0069 |
| 2024/0147334 A1* | 5/2024 | Abraham .......... | H04W 36/0058 |
| 2025/0071647 A1* | 2/2025 | Hong ................. | H04W 36/249 |

FOREIGN PATENT DOCUMENTS

KR　　20230105312 A　　7/2023

OTHER PUBLICATIONS

R2-2207655 3GPP TSG-RAN WG2 Meeting #119e, Electronic Meeting, Aug. 17-29, 2022, Source: OPPO, Title: Analysis of HO latency and possible enhancements for L1/L2 mobility.

(Continued)

*Primary Examiner* — Allahyar Kasraian
(74) *Attorney, Agent, or Firm* — Banner & Witcoff, Ltd.

(57)　　　ABSTRACT

A wireless device may switch from a source cell to a target cell after receiving a cell switch command. The wireless device may determine whether to perform a reset and/or recovery procedure based on whether the source cell and the target cell are in a same cell group. One or more configuration parameters may be used to indicate whether to perform a reset and/or recovery procedure.

20 Claims, 40 Drawing Sheets

(56)　　　　References Cited

OTHER PUBLICATIONS

R2-2004896 3GPP TSG-RAN WG2 Meeting #110e, Electronic Meeting, Jun. 1-12, 2020, Source: OPPO, Title: Discussion on old stored RRC message handling upon DAPS HO failure.

R2-2210329 3GPP TSG-RAN WG2 Meeting #119-bis-e, Electronic Meeting, Oct. 10-19, 2022, Source: Ericsson, Title: Candidate target configurations for L1/L2 mobility.

R2-2209601 3GPP TSG-RAN WG2 Meeting #119-bis-e, Electronic Meeting, Oct. 10-19, 2022, Source: Intel Corporation, Title: Discussion on configurations for multiple candidate cells of L1/L2 mobility.

R2-2208559 3GPP TSG-RAN WG2 Meeting #119e, Electronic Meeting, Aug. 17-29, 2022, Source: ZTE Corporation, Sanechips, Title: Initial Considerations on L1/L2 Signaling Based Mobility.

R2-2208409 3GPP TSG-RAN WG2 Meeting #119e, Electronic Meeting, Aug. 17-29, 2022, Source: ZTE Corporation, Sanechips, Title: Candidate solutions for L1/L2 mobility.

Mar. 18, 2024—International Search Report—App. No. PCT/US2023/036703.

R3-225743 3GPP TSG-RAN WG3 Meeting #117bis-e, Electronic meeting, Oct. 10-18, 2022, Source: vivo, Title: Discussion on collision between L1/L2 based mobility and L3 mobility.

R3-225744 3GPP TSG-RAN WG3 Meeting #117bis-e, Electronic meeting, Oct. 10-18, 2022, Source: vivo, Title: Discussion on L1/L2 based mobility procedures.

R3-225762 3GPP TSG-RAN WG3 Meeting #117bis-e, Electronic meeting, Oct. 10-18, 2022, Source: Samsung, Title: Discussion on L1/L2 based Inter-cell Mobility.

R3-225783 3GPP TSG-RAN WG3 Meeting #117bis-e, Electronic meeting, Oct. 10-18, 2022, Source: Intel Corporation, Title: High-level principles for L1/L2 based inter-cell mobility.

R3-225784 3GPP TSG-RAN WG3 Meeting #117bis-e, Electronic meeting, Oct. 10-18, 2022, Source: Intel Corporation, Title: Considerations for L1/L2 based "intra-DU" mobility (including TPs for L1/L2 Mob for TS 38.401 and TS 38.473).

R3-225785 3GPP TSG-RAN WG3 Meeting #117bis-e, Electronic meeting, Oct. 10-18, 2022, Source: Intel Corporation, Title: Considerations on L1/L2 based "intra-CU inter-DU" mobility (including TPs for L1/L2 Mob for TS 38.401 and TS 38.473).

R3-225796 3GPP TSG-RAN WG3 Meeting #117bis-e, Electronic meeting, Oct. 10-18, 2022, Source: CMCC, Title: Dicussion on L1/L2 based Inter-Cell Mobility.

R3-225815 3GPP TSG-RAN WG3 Meeting #117bis-e, Electronic meeting, Oct. 10-18, 2022, Source: ZTE, Title: Discussion on L1/L2 based mobility.

R3-225816 3GPP TSG-RAN WG3 Meeting #117bis-e, Electronic meeting, Oct. 10-18, 2022, Source: ZTE, Title: TP for L1L2Mob BL CR to TS 38.473.

R3-225885 3GPP TSG-RAN WG3 Meeting #117bis-e, Electronic meeting, Oct. 10-18, 2022, Source: MediaTek Inc., Apple, Huawei, Title: RAN3 Work Plan for Rel-18 Further NR Mobility Enhancements WI.

R3-225924 3GPP TSG-RAN WG3 Meeting #117bis-e, Electronic meeting, Oct. 10-18, 2022, Source: Huawei (moderator), Title: CB: # MobilityEnh1_L1L2Mo.

R3-225926 3GPP TSG-RAN WG3 Meeting #117bis-e, Electronic meeting, Oct. 10-18, 2022, Source: Huawei (moderator), Title: Summary of Offline Discussion on Selective Activation (CB #MobilityEnh3_Others).

R3-225957 3GPP TSG-RAN WG3 Meeting #117bis-e, Electronic meeting, Oct. 10-18, 2022, Source: Huawei (moderator), Title: CB: # MobilityEnh1_L1L2Mo.

R3-225959 3GPP TSG-RAN WG3 Meeting #117bis-e, Electronic meeting, Oct. 10-18, 2022, Source: Nokia (moderator), Title: Summary of Offline Discussion on Selective Activation (CB #MobilityEnh3_Others).

R3-226024 3GPP TSG-RAN WG3 Meeting #117bis-e, Electronic meeting, Oct. 10-18, 2022, Source: Huawei, Ericsson, Title: Introduction of L1/L2 inter-cell mobility.

R3-226025 3GPP TSG-RAN WG3 Meeting #117bis-e, Electronic meeting, Oct. 10-18, 2022, Source: Huawei, Title: (TP for L1L2Mob BLCR for TS 38.401): Inter-DU L1/L2 Mobility procedure.

R3-226044 3GPP TSG-RAN WG3 Meeting #117bis-e, Electronic meeting, Oct. 10-18, 2022, Source: Huawei (moderator), Title: CB: # MobilityEnh1_L1L2Mo.

R3-226046 3GPP TSG-RAN WG3 Meeting #117bis-e, Electronic meeting, Oct. 10-18, 2022, Source: Huawei, Ericsson, Title: Introduction of L1/L2 inter-cell mobility.

R3-226050 3GPP TSG-RAN WG3 Meeting #117bis-e, Electronic meeting, Oct. 10-18, 2022, Source: Huawei, Ericsson, Nokia, Nokia Shanghai Bell, Title: Introduction of L1/L2 inter-cell mobility.

3GPP TS 38.306 V17.2.0 (Sep. 2022), 3rd Generation Partnership Project; Technical Specification Group Radio Access Network; NR; User Equipment (UE) radio access capabilities (Release 17).

3GPP TS 38.331 V17.2.0 (Sep. 2022), 3rd Generation Partnership Project; Technical Specification Group Radio Access Network; NR; Radio Resource Control (RRC) protocol specification (Release 17).

3GPP TS 38.401 V17.2.0 (Sep. 2022), Technical Specification, 3rd Generation Partnership Project; Technical Specification Group Radio Access Network; NG-RAN; Architecture description (Release 15).

3GPP TS 38.473 V17.2.0 (Sep. 2022), Technical Specification, 3rd Generation Partnership Project; Technical Specification Group Radio Access Network; NG-RAN; F1 application protocol (F1AP) (Release 17).

R2-2209394 3GPP TSG-RAN WG2 Meeting #119bis-e, Online, Oct. 10-Oct. 19, 2022, Source: CATT, Title: Open issues on Target Performance Enhancements.

R2-2209395 3GPP TSG-RAN WG2 Meeting #119bis-e, Online, Oct. 10-Oct. 19, 2022, Source: CATT, Title: Discussion on RRC Configuration for L1L2 Mobility.

R2-2209396 3GPP TSG-RAN WG2 Meeting #119bis-e, Online, Oct. 10-Oct. 19, 2022, Source: CATT, Title: Discussion on Dynamic Switch Mechanism.

R2-2209397 3GPP TSG-RAN WG2 Meeting #119bis-e, Online, Oct. 10-Oct. 19, 2022, Source: CATT, Title: Discussion on L1 inter-cell beam measurement and indication.

R2-2209480 3GPP TSG-RAN WG2 Meeting #119bis-e, Online, Oct. 10-Oct. 19, 2022, Source: vivo, Title: Enhancements to improve performance for L1 L2 mobility.

R2-2209481 3GPP TSG-RAN WG2 Meeting #119bis-e, Online, Oct. 10-Oct. 19, 2022, Source: vivo, Title: RRC configurations of candidate target cell for L1/L2 mobility.

R2-2209482 3GPP TSG-RAN WG2 Meeting #119bis-e, Online, Oct. 10-Oct. 19, 2022, Source: vivo, Title: Discussion on dynamic switch for L1 L2 mobility.

R2-2209483 3GPP TSG-RAN WG2 Meeting #119bis-e, Online, Oct. 10-Oct. 19, 2022, Source: vivo, Title: Discussion on L1 measurements and beam indication.

R2-2209524 3GPP TSG-RAN WG2 Meeting #119bis-e, Online, Oct. 10-Oct. 19, 2022, Source: Huawei, HiSilicon, Title: RRC configuration and modelling for L1/L2 mobility.

R2-2209525 3GPP TSG-RAN WG2 Meeting #119bis-e, Online, Oct. 10-Oct. 19, 2022, Source: Huawei, HiSilicon, Title: Solutions for dynamic cell switch in L1/L2 mobility.

R2-2209546 3GPP TSG-RAN WG2 Meeting #119bis-e, Online, Oct. 10-Oct. 19, 2022, Source: Sharp, Title: Discussion on scenarios for dynamic switch.

R2-2209590 3GPP TSG-RAN WG2 Meeting #119bis-e, Oct. 10-Oct. 26, 2022, GTW, Source: NTT Docomo, Inc., Title: Discussion on some issues in L1L2 mobility.

R2-2209600 3GPP TSG-RAN WG2 Meeting #119bis-e, E-Meeting, Oct. 10-19, 2022, Source: Intel Corporation, Title: Discussion on latency model of L1 L2 mobility.

R2-2209602 3GPP TSG-RAN WG2 Meeting #119bis-e, E-Meeting, Oct. 10-19, 2022, Source: Intel Corporation, Title: Discussion on synchronization enhancements for dynamic switch.

R2-2209603 3GPP TSG-RAN WG2 Meeting #119bis-e, E-Meeting, Oct. 10-19, 2022, Source: Intel Corporation, Title: Discussion on enhancements to L1 measurements.

R2-2209625 3GPP TSG-RAN WG2 Meeting #119bis-e, Online, Oct. 2022, Source: OPPO, Title: Discussion on the enhancements of synchronization procedure for L1/L2 mobility.

(56) References Cited

OTHER PUBLICATIONS

R2-2209626 3GPP TSG-RAN WG2 Meeting #119bis-e, Online, Oct. 2022, Source: OPPO, Title: Discussion on measurement related issues of L1/L2 mobility.

R2-2209627 3GPP TSG-RAN WG2 Meeting #119bis-e, Online, Oct. 2022, Source: OPPO, Title: Open issues on dynamic switching for L1/L2 mobility.

R2-2209628 3GPP TSG-RAN WG2 Meeting #119bis-e, Online, Oct. 2022, Source: OPPO, Title: Discussion on configuration related issues for L1/L2 mobility.

R2-2209701 3GPP TSG-RAN WG2 Meeting #119bis-e, Electronic, Oct. 10-Oct. 19, 2022, Source: Qualcomm Incorporated, Title: L1/L2 Mobility Considerations.

R2-2209722 3GPP TSG-RAN WG2 Meeting #119bis-e, Electronic, Oct. 10-Oct. 19, 2022, Source: Futurewei, Title: Discussion of the major delay components and possible solutions.

R2-2209723 3GPP TSG-RAN WG2 Meeting #119bis-e, Electronic, Oct. 10-Oct. 19, 2022, Source: Futurewei, Title: Dynamic RRC pre-configuration for L1/L2 mobility.

R2-2209724 3GPP TSG-RAN WG2 Meeting #119bis-e, Electronic, Oct. 10-Oct. 19, 2022, Source: Futurewei, Title: Discussion on L1/L2 Mobility operations.

R2-2209786 3GPP TSG-RAN WG2 Meeting #119bis-e, Electronic, Oct. 10-Oct. 19, 2022, Source: Apple Inc, Title: Viewing SpCell/SCell dynamic switch as an intra-DU L2/L1 handover.

R2-2209787 3GPP TSG-RAN WG2 Meeting #119bis-e, Electronic, Oct. 10-Oct. 19, 2022, Source: Apple Inc, Title: Conditional handover and other critical aspects in L2/L1 mobility.

R2-2209854 3GPP TSG-RAN WG2 Meeting #119bis-e, Electronic, Oct. 10-Oct. 19, 2022, Source: ASUSTek, Title: Discussion on L1 L2 mobility procedure.

R2-2209869 3GPP TSG-RAN WG2 Meeting #119bis-e, Electronic, Oct. 10-Oct. 19, 2022, Source: Samsung, Title: RRC Modeling for Candidate Cells in L1/L2 Inter-cell Mobility.

R2-2209870 3GPP TSG-RAN WG2 Meeting #119bis-e, Electronic, Oct. 10-Oct. 19, 2022, Source: Samsung, Title: L1/L2 signalling for inter-cell mobility.

R2-2209871 3GPP TSG-RAN WG2 Meeting #119bis-e, Electronic, Oct. 10-Oct. 19, 2022, Source: Samsung, Title: Considerations on the L1 Measurement and Report.

R2-2209929 3GPP TSG-RAN WG2 Meeting #119bis-e, Electronic, Oct. 10-Oct. 19, 2022, Source: MediaTek Inc., Title: Target Performance Enhancements for L1/L2-based Inter-cell Mobility.

R2-2209930 3GPP TSG-RAN WG2 Meeting #119bis-e, Electronic, Oct. 10-Oct. 19, 2022, Source: MediaTek Inc., Title:RRC Configurations for L1/L2-based Inter-cell Mobility.

R2-2209931 3GPP TSG-RAN WG2 Meeting #119bis-e, Electronic, Oct. 10-Oct. 19, 2022, Source: MediaTek Inc., Title: Cell Switch for L1/L2-based Inter-cell Mobility.

R2-2209932 3GPP TSG-RAN WG2 Meeting #119bis-e, Electronic, Oct. 10-Oct. 19, 2022, Source: MediaTek Inc., Title: RAN2 Aspects of L1 Enhancements for L1/L2-based Inter-cell Mobility.

R2-2209941 3GPP TSG-RAN WG2 Meeting #119bis-e, Electronic, Online, Oct. 2022, Source: Lenovo, Title: RRC configuration for lower layer based mobility.

R2-2209942 3GPP TSG-RAN WG2 Meeting #119bis-e, Electronic, Online, Oct. 2022, Source: Lenovo, Title: Lower layer based dynamic mobility.

R2-2209977 3GPP TSG-RAN WG2 Meeting #119bis-e, Electronic, Online, Oct. 10-19, 2022, Source: Spreadtrum Communications, Title: Discussion on L1/L2 based inter-cell mobility.

R2-2209992 3GPP TSG-RAN WG2 Meeting #119bis-e, Electronic, Online, Oct. 10-19, 2022, Source: Spreadtrum Communications, Title: Discussion on the issue of L1 enhancements for ICBM.

R2-2210055 3GPP TSG-RAN WG2 Meeting #119bis-e, Electronic, Online, Oct. 10-19, 2022, Source: Xiaomi, Title: Latency reduction required for high performance beam.

R2-2210056 3GPP TSG-RAN WG2 Meeting #119bis-e, Electronic, Online, Oct. 10-19, 2022, Source: Xiaomi, Title: Selection between Model 1 and Model 2 for candidate cell configuration.

R2-2210057 3GPP TSG-RAN WG2 Meeting #119bis-e, Electronic, Online, Oct. 10-19, 2022, Source: Xiaomi, Title: Discussion on inter-cell beam management.

R2-2210058 3GPP TSG-RAN WG2 Meeting #119bis-e, Electronic, Online, Oct. 10-19, 2022, Source: Xiaomi, Title: Discussion on the dynamic switching procedure.

R2-2210065 3GPP TSG-RAN WG2 Meeting #119bis-e, Electronic, Online, Oct. 10-19, 2022, Source: Samsung, Title: Considerations on reducing HO interruption time.

R2-2210106 3GPP TSG-RAN WG2 Meeting #119bis-e, Electronic, Online, Oct. 10-19, 2022, Source: Fujitsu, Title: Consideration on L1/L2 based inter-cell mobility.

R2-2210107 3GPP TSG-RAN WG2 Meeting #119bis-e, Electronic, Online, Oct. 10-19, 2022, Source: Fujitsu, Title: Configuration and maintenance for multiple candidate target cells.

R2-2210163 3GPP TSG-RAN WG2 Meeting #119bis-e, Electronic, Online, Oct. 10-19, 2022, Source: CMCC, Title: Considerations on target performance enhancements.

R2-2210164 3GPP TSG-RAN WG2 Meeting #119bis-e, Electronic, Online, Oct. 10-19, 2022, Source: CMCC, Title: Considerations on RRC related issues.

R2-2210165 3GPP TSG-RAN WG2 Meeting #119bis-e, Electronic, Online, Oct. 10-19, 2022, Source: CMCC, Title: Considerations on dynamic switch.

R2-2210166 3GPP TSG-RAN WG2 Meeting #119bis-e, Electronic, Online, Oct. 10-19, 2022, Source: CMCC, Title: Potential solutions for L1 measurements.

R2-2210171 3GPP TSG-RAN WG2 Meeting #119bis-e, Electronic, Online, Oct. 10-19, 2022, Source: ZTE Corporation, Sanechips, Title: Discussion on candidate cell configuration and maintenance.

R2-2210172 3GPP TSG RAN WG1 Meeting #110bis-e, Online, Oct. 10-19, 2022, Source: ZTE Corporation, Sanechips, Title: Discussion on dynamic switch for L1/L2 mobility.

R2-2210173 3GPP TSG-RAN WG2 Meeting #119bis-e, Electronic, Online, Oct. 10-19, 2022, Source: ZTE Corporation, Sanechips, Title: Discussion on inter-cell L1 measurements.

R2-2210192 3GPP TSG-RAN WG2 Meeting #119bis-e, Electronic, Online, Oct. 10-19, 2022, Source: InterDigital, Inc., Title: Target enhancements and latency model for L1/2 triggered handover.

R2-2210193 3GPP TSG-RAN WG2 Meeting #119bis-e, Electronic, Online, Oct. 10-19, 2022, Source: InterDigital, Inc., Title: RRC Support for L1/2 Triggered Handover.

R2-2210194 3GPP TSG-RAN WG2 Meeting #119bis-e, Electronic, Online, Oct. 10-19, 2022, Source: InterDigital, Inc., Title: L1/2 handover trigger.

R2-2210230 3GPP TSG-RAN #119bis-e, Online, Oct. 2022, Source: Lenovo, Title: Framework fulfilling WID Objectives.

R2-2210231 3GPP TSG-RAN #119bis-e, Online, Oct. 2022, Source: Lenovo, Title: Mobility procedural delegation to lower layers.

R2-2210330 3GPP TSG-RAN WG2 Meeting #119-bis-e, Electronic Meeting, Oct. 10-19, 2022, Source: Ericsson, Title: Enhancements on delay components for L1/L2 inter-cell mobility.

R2-2210331 3GPP TSG-RAN WG2 Meeting #119-bis-e, Electronic Meeting, Oct. 10-19, 2022, Source: Ericsson, Title: Execution procedure for L1/L2 based inter-cell mobility.

R2-2210332 3GPP TSG RAN WG2 Meeting #110-bis-e, Electronic meeting, Oct. 10-19, 2022, Source: Ericsson, Title: L1 measurements and beam indication for L1/L2 based inter-cell mobility.

R2-2210333 3GPP TSG RAN WG2 Meeting #110-bis-e, Electronic meeting, Oct. 10-19, 2022, Source: Ericsson, Title: RRC aspects of L1/L2 based inter-cell mobility.

R2-2210349 3GPP TSG-RAN WG2 Meeting #119-bis-e, Electronic Meeting, Oct. 10-19, 2022, Source: Nokia, Nokia Shanghai Bell, Title: On Interruption Time Reduction in LLM.

R2-2210350 3GPP TSG-RAN WG2 Meeting #119-bis-e, Electronic, Elbonia, Oct. 10-19, 2022, Source: Nokia, Nokia Shanghai Bell, Title: Discussion on RRC Configuration Options for LLM.

R2-2210351 3GPP TSG-RAN WG2 Meeting #119-bis-e, Electronic, Elbonia, Oct. 10-19, 2022, Source: Nokia, Nokia Shanghai Bell, Title: Discussion on Dynamic Switching in LLM.

R2-2210352 3GPP TSG-RAN WG2 Meeting #119-bis-e, Electronic, Elbonia, Oct. 10-19, 2022, Source: Nokia, Nokia Shanghai Bell, Title: Discussion on Configuration of Inter-Cell LLM.

(56) References Cited

OTHER PUBLICATIONS

R2-2210398 3GPP TSG-RAN WG2 Meeting #119-bis-e, Electronic meeting, Oct. 10-19, 2022, Source: NEC, Title: Considerations on possible restrictions in RRC configuration.
R2-2210399 3GPP TSG-RAN WG2 Meeting #119-bis-e, Electronic meeting, Oct. 10-19, 2022, Source: NEC, Title: Basic considerations on dynamic switch.
R2-2210444 3GPP TSG-RAN WG2 Meeting #119-bis-e, Electronic meeting, Oct. 10-19, 2022, Source: LG Electronics Inc., Title: Discussion on RRC model for L1L2 mobility.
R2-2210445 3GPP TSG-RAN WG2 Meeting #119-bis-e, Electronic meeting, Oct. 10-19, 2022, Source: LG Electronics Inc., Title: Discussion on dynamic switch for L1L2 mobility.
R2-2210451 3GPP TSG-RAN WG2 Meeting #119-bis-e, Electronic meeting, Oct. 10-19, 2022, Source: InterDigital, Inc., Title: Measurements for L1/L2 mobility.
R2-2210470 3GPP TSG-RAN WG2 Meeting #119-bis-e, Electronic meeting, Oct. 10-19, 2022, Source: Sharp, Title: Consideration for Target Performance Enhancements of L1/L2 mobility.
R2-2210471 3GPP TSG-RAN WG2 Meeting #119-bis-e, Electronic meeting, Oct. 10-19, 2022, Source: Sharp, Title: RRC Configurations of L1/L2 mobility.
R2-2210472 3GPP TSG-RAN WG2 Meeting #119-bis-e, Electronic meeting, Oct. 10-19, 2022, Source: Sharp, Title: Inter-cell beam management enhancements for L1/L2 mobility.
R2-2210500 3GPP TSG-RAN WG2 Meeting #119-bis-e, Electronic meeting, Oct. 10-19, 2022, Source: MediaTek Inc., Apple, Title: RAN2 Work Plan for Rel-18 Further NR Mobility Enhancements WI.
R2-2210561 3GPP TSG-RAN WG2 Meeting #119-bis-e, Electronic meeting, Oct. 2022, Source: LG Electronics Inc., Title: Signaling structure with flexibility and efficiency.
R2-2210590 3GPP TSG-RAN WG2 Meeting #119-bis-e, Electronic meeting, Oct. 10-19, 2022, Source: LG Electronics Inc., Title: Discussion on TA for candidate cell for L1L2 mobility.
R2-2210616 3GPP TSG-RAN WG2 Meeting #119-bis-e, Electronic meeting, Oct. 10-19, 2022, Source: ZTE Corporation, Sanechips, Title: Further Considerations on L1/L2 Signaling Based Mobility.
R2-2210722 3GPP TSG-RAN WG2 Meeting #119-bis-e, Electronic meeting, Oct. 10-19, 2022, Source: Huawei, HiSilicon, Title: Target Performance Enhancements and supported scenarios.
R2-2210723 3GPP TSG-RAN WG2 Meeting #119-bis-e, Electronic meeting, Oct. 10-19, 2022, Source: Huawei, HiSilicon, Title: L1 measurement and beam indication for L1L2 mobility.
R2-2311595 3GPP TSG-RAN WG2 Meeting #123bis, Xiamen, China, Oct. 9-13, 2023, Source: Huawei, HiSilicon, Title: 38.321 running CR for introduction of NR further mobility enhancements.
R2-2311610 3GPP TSG-RAN WG2 Meeting #123bis, Xiamen, China, Oct. 9-13, 2023, Source: MediaTek Inc., vivo, Title: 38.300 running CR for introduction of NR further mobility enhancements.

R2-2210762 3GPP TSG-RAN WG2 Meeting #119-bis-e, Online, Oct 10-Oct. 19, 2022, Source: KDDI Corporation, Title: Discussion on L1L2 mobility.
R3-225315 3GPP TSG-RAN3 Meeting #117bis-e, Electronic meeting, Oct. 10-18, 2022, Source: RAN2, Title: LS on L1/L2-based inter-cell mobility.
R3-225350 3GPP TSG-RAN3 Meeting #117bis-e, Electronic meeting, Oct. 10-18, 2022, Source: Ericsson, Title: Solutions for L1/L2 based inter-cell mobility.
R3-225351 3GPP TSG-RAN3 Meeting #117bis-e, Electronic meeting, Oct. 10-18, 2022, Source: Ericsson, Title: Additions for L1/L2 based inter-cell mobility.
R3-225404 3GPP TSG-RAN3 Meeting #117bis-e, Electronic meeting, Oct. 10-18, 2022, Source: Qualcomm Incorporated, Title: Signalling Support for L1/L2 based Inter-Cell Mobility.
R3-225420 3GPP TSG-RAN3 Meeting #117bis-e, Electronic meeting, Oct. 10-18, 2022, Source: China Telecom, Title: Consideration on support of intra-DU L1/L2 based Inter-Cell Mobility.
R3-225421 3GPP TSG-RAN3 Meeting #117bis-e, Electronic meeting, Oct. 10-18, 2022, Source: China Telecom, Title: Consideration on support of Intra-CU inter-DU L1/L2 based Inter-Cell Mobility.
R3-225493 3GPP TSG-RAN3 Meeting #117bis-e, Electronic meeting, Oct. 10-18, 2022, Source: Lenovo, Title: Discussion on L1/L2 based inter-cell mobility.
R3-225494 3GPP TSG-RAN3 Meeting #117bis-e, Electronic meeting, Oct. 10-18, 2022, Source: Lenovo, Title: (TP to TS 38.401 & TS 38.470) Support of L1/L2 based inter-cell mobility.
R3-225573 3GPP TSG-RAN3 Meeting #117bis-e, Electronic meeting, Oct. 10-18, 2022, Source: Nokia, Nokia Shanghai Bell, Title: Discussion on Intra-gNB-DU L1/L2 Inter-Cell Mobility Procedure.
R3-225574 3GPP TSG-RAN3 Meeting #117bis-e, Electronic meeting, Oct. 10-18, 2022, Source: Nokia, Nokia Shanghai Bell, Title: Discussion on Additional Considerations for L1/L2 Inter-Cell Mobility.
R3-225617 3GPP TSG-RAN WG3 Meeting #117bis-e, Electronic meeting, Oct. 10-18, 2022, Source: CATT, Title: Further discussion on L1/L2 mobility.
R3-225645 3GPP TSG-RAN WG3 Meeting #117bis-e, Electronic meeting, Oct. 10-18, 2022, Source: Huawei, Title: Introduction of L1/L2 handover.
R3-225646 3GPP TSG-RAN WG3 Meeting #117bis-e, Electronic meeting, Oct. 10-18, 2022, Source: Huawei, Title: (TP for L1L2Mob BLCR for TS 38.401): Discussion on L1/L2 Mobility procedure.
R3-225648 3GPP TSG-RAN WG3 Meeting #117bis-e, Electronic meeting, Oct. 10-18, 2022, Source: NTT Docomo Inc., Title: Discussion of L1/L2 based Inter-Cell Mobility.
R3-225735 3GPP TSG-RAN WG3 Meeting #117bis-e, Electronic meeting, Oct. 10-18, 2022, Source: LG Electronics Inc., Title: Open issues for L1/L2 based inter-cell mobility.

* cited by examiner

IP Packets

QoS
Flows

SDAP
215/225

QoS Flow Handling

Radio
Bearers

| Header Comp., Ciphering | Header Comp., Ciphering |

PDCP
214/224

| Reordering, Retransmission | Reordering, Retransmission |

RLC
Channels

RLC
213/223

| Segmentation, ARQ | Segmentation, ARQ |

Logical
Channels

Multiplexing

MAC
212/222

HARQ

Transport
Channel

PHY
211/221

Coding, Resource Mapping

FIG. 5B

Uplink

FIG. 5A

Downlink

Logical Channels

Transport Channels

Physical Channels

Physical Signals

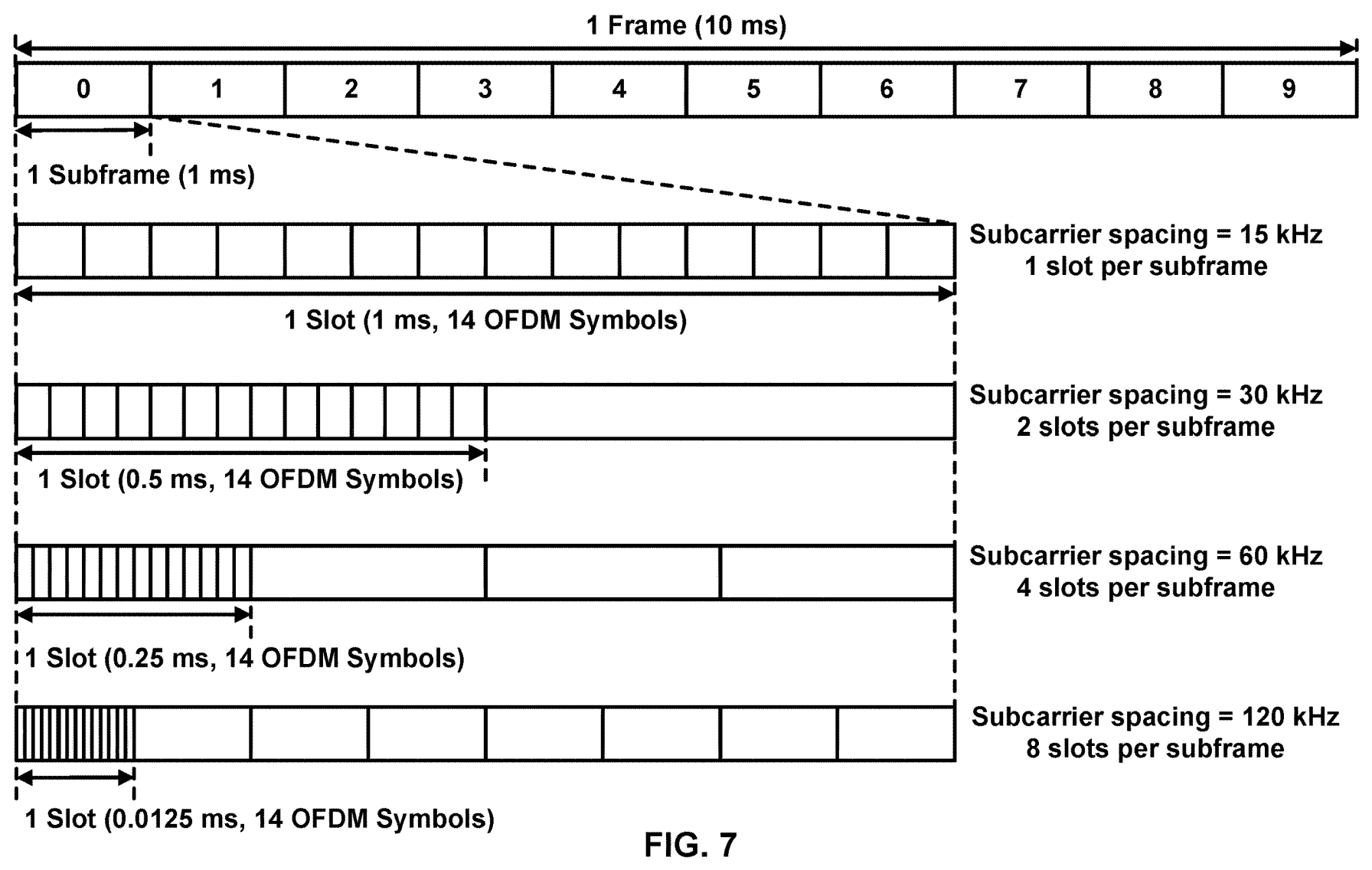

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

Beam #1    Beam #2    Beam #3

1101

1102

1103

1101

CSI-RS #1    CSI-RS #2    CSI-RS #3

```
RRCReconfiguration-IEs ::=          SEQUENCE {
    radioBearerConfig               RadioBearerConfig
    secondaryCellGroup                OCTET STRING (CONTAINING CellGroupConfig)
    measConfig                      MeasConfig
    nonCriticalExtension              RRCReconfiguration-v1530-IEs
}

RRCReconfiguration-v1530-IEs ::=          SEQUENCE {
    masterCellGroup          OCTET STRING (CONTAINING CellGroupConfig)
    fullConfig               ENUMERATED {true}        OPTIONAL, -- Cond FullConfig
    ...}

CellGroupConfig ::=                    SEQUENCE {
    cellGroupId                       CellGroupId,
    rlc-BearerToAddModList          SEQUENCE (SIZE(1..maxLC-ID)) OF RLC-BearerConfig
    mac-CellGroupConfig             MAC-CellGroupConfig
    physicalCellGroupConfig         PhysicalCellGroupConfig
    spCellConfig                    SpCellConfig
    sCellToAddModList               SEQUENCE (SIZE (1..maxNrofSCells)) OF SCellConfig
...,}

SpCellConfig ::=                    SEQUENCE {
    servCellIndex                  ServCellIndex
    reconfigurationWithSync          ReconfigurationWithSync
    spCellConfigDedicated            ServingCellConfig
    ...,}

ServingCellConfig ::=          SEQUENCE {
    initialDownlinkBWP                 BWP-DownlinkDedicated
    downlinkBWP-ToAddModList  SEQUENCE (SIZE (1..maxNrofBWPs)) OF BWP-Downlink
    firstActiveDownlinkBWP-Id          BWP-Id
    defaultDownlinkBWP-Id              BWP-Id
    uplinkConfig                    UplinkConfig
    ...}

UplinkConfig ::=                SEQUENCE {
    initialUplinkBWP                BWP-UplinkDedicated
    uplinkBWP-ToAddModList     SEQUENCE (SIZE (1..maxNrofBWPs)) OF BWP-Uplink
    firstActiveUplinkBWP-Id            BWP-Id
    carrierSwitching                SetupRelease { SRS-CarrierSwitching }
    ...}

ReconfigurationWithSync ::=          SEQUENCE {
    spCellConfigCommon                 ServingCellConfigCommon
    newUE-Identity                  RNTI-Value,
    t304                      ENUMERATED {ms50, ms100, ms150, ...},
    rach-ConfigDedicated              CHOICE {
        uplink                  RACH-ConfigDedicated,
        supplementaryUplink          RACH-ConfigDedicated
    }...,}
```

FIG. 21

```
RACH-ConfigDedicated ::=        SEQUENCE {
    cfra                        CFRA
    ra-Prioritization           RA-Prioritization
...}

CFRA ::=                    SEQUENCE {
    occasions                   SEQUENCE {
        rach-ConfigGeneric      RACH-ConfigGeneric,
        ssb-perRACH-Occasion  ENUMERATED {oneEighth, oneFourth, oneHalf, one, two, ...}
    }
    resources                   CHOICE {
        ssb                     SEQUENCE {
            ssb-ResourceList  SEQUENCE (SIZE(1..maxRA-SSB-Resources)) OF CFRA-SSB-
Resource,
            ra-ssb-OccasionMaskIndex     INTEGER (0..15)
        },
        csirs                   SEQUENCE {
            csirs-ResourceList          SEQUENCE (SIZE(1..maxRA-CSIRS-Resources)) OF
CFRA-CSIRS-Resource,
            rsrp-ThresholdCSI-RS        RSRP-Range
        }
    },
    ...,}

CFRA-SSB-Resource ::=           SEQUENCE {
    ssb                     SSB-Index,
    ra-PreambleIndex            INTEGER (0..63),
    ...,}

CFRA-CSIRS-Resource ::=         SEQUENCE {
    csi-RS                  CSI-RS-Index,
    ra-OccasionList             SEQUENCE (SIZE(1..maxRA-OccasionsPerCSIRS)) OF
INTEGER (0..maxRA-Occasions-1),
    ra-PreambleIndex            INTEGER (0..63),
    ...}

RACH-ConfigGeneric ::=          SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig       INTEGER(0..15),
    preambleReceivedTargetPower     INTEGER (-202..-60),
    preambleTransMax                ENUMERATED {n3, n4, n5, n6, n7, n8, n10, ...},
    powerRampingStep                ENUMERATED {dB0, dB2, dB4, dB6},
    ra-ResponseWindow               ENUMERATED {sl1, sl2, sl4, sl8, sl10, sl20, sl40, sl80},
    ...,}
```

FIG. 22

```
RRCReconfiguration-v1610-IEs ::=        SEQUENCE {
    otherConfig-v1610                   OtherConfig-v1610
    bap-Config-r16                      SetupRelease { BAP-Config-r16 }
    iab-IP-AddressConfigurationList-r16    IAB-IP-AddressConfigurationList-r16
    conditionalReconfiguration-r16      ConditionalReconfiguration-r16
    daps-SourceRelease-r16              ENUMERATED{true}
    t316-r16                            SetupRelease {T316-r16}

...
    targetCellSMTC-SCG-r16              SSB-MTC
}

ConditionalReconfiguration-r16 ::=  SEQUENCE {
    attemptCondReconfig-r16             ENUMERATED {true}
    condReconfigToRemoveList-r16        CondReconfigToRemoveList-r16
    condReconfigToAddModList-r16        CondReconfigToAddModList-r16

...
}

CondReconfigToAddModList-r16 ::= SEQUENCE (SIZE (1.. maxNrofCondCells-r16)) OF
CondReconfigToAddMod-r16

CondReconfigToAddMod-r16 ::=    SEQUENCE {
    condReconfigId-r16              CondReconfigId-r16,
    condExecutionCond-r16          SEQUENCE (SIZE (1..2)) OF MeasId
    condRRCReconfig-r16            OCTET STRING (CONTAINING RRCReconfiguration)

...,
}

CondReconfigId-r16 ::=       INTEGER (1.. maxNrofCondCells-r16)
``` condExecutionCond

The execution condition that needs to be fulfilled in order to trigger the execution of a conditional reconfiguration for CHO, CPA, intra-SN CPC without MN involvement or MN initiated inter-SN CPC. When configuring 2 triggering events (Meas Ids) for a candidate cell, network ensures that both refer to the same *measObject*. For CHO, if network configures *condEventD1* or *condEventT1* for a candidate cell network configures a second triggering event *condEventA3, condEventA4* or *condEventA5* for the same candidate cell. Network does not configure both *condEventD1* and *condEventT1* for the same candidate cell.

CondEvent A3: Conditional reconfiguration candidate becomes amount of offset better than PCell/PSCell;
CondEvent A4: Conditional reconfiguration candidate becomes better than absolute threshold;
CondEvent A5: PCell/PSCell becomes worse than absolute threshold1 AND Conditional reconfiguration candidate becomes better than another absolute threshold2;

FIG. 24

CONFIGURATION FOR LAYER 1 OR LAYER 2 TRIGGERED MOBILITY (LTM) FOR CELL SWITCHING

CROSS-REFERENCE TO RELATED APPLICATIONS

This application claims the benefit of U.S. Provisional Application No. 63/421,978 filed on Nov. 2, 2022. The above-referenced application is hereby incorporated by reference in its entirety.

BACKGROUND

A wireless device communicates with a source base station. A cell switch command is used to switch the wireless device from a source cell to a target cell for a mobility procedure.

SUMMARY

The following summary presents a simplified summary of certain features. The summary is not an extensive overview and is not intended to identify key or critical elements.

A wireless device may communicate with a base station. The wireless device may switch from a first cell to a second cell for communicating with the base station. One or more configuration parameters may indicate cell grouping that be used to determine whether the wireless device is to perform a reset and/or recovery procedure after the cell switch. For example, the first cell and the second cell may be in different cell groups, such as for switching from a first portion of a base station (e.g., a first distributed unit) to a second portion of the base station (e.g., a second distributed unit), which may require a reset and/or recovery procedure after the cell switch. Alternatively, the first cell and the second cell may be in a same cell group that is served by a same portion of a base station (e.g., a same distributed unit), which may not require a reset and/or recovery procedure after the cell switch. After configuration parameter(s) is/are provided, a cell switch command may indicate one or more target/candidate cells to which the wireless device is to be switched. Based on whether the target/candidate cell(s) is/are in a same cell group as a source cell of the wireless device, the wireless device may perform a reset and/or recovery procedure. For example, if the source cell and the target/candidate cell(s) are in different cell groups (e.g., as indicated by the configuration parameter(s)), the wireless device may perform a reset procedure (e.g., a layer 2 reset for a layer 1/layer 2 triggered mobility procedure), and/or a recovery procedure (e.g., a packet data convergence protocol data recovery), after the cell switch; and if the source cell and the target/candidate cell(s) are in a same cell group, the wireless device may not perform a reset procedure, and/or may not perform a recovery procedure, after the cell switch. One or more configuration parameters may comprise a first indication/parameter associated with a source cell of a first cell group and a second indication/parameter associated with a target/candidate cell of a second cell group. Based on the first indication/parameter and the second indication/parameter, the wireless device may determine whether to perform a reset and/or recovery procedure. By using cell group identification and/or comparing a parameter associated with a serving/source cell with another parameter associated with a candidate/target cell as described herein, a wireless device may be better informed for determining whether a reset and/or recovery procedure may be required after a cell switch.

These and other features and advantages are described in greater detail below.

BRIEF DESCRIPTION OF THE DRAWINGS

Examples of several of the various embodiments of the present disclosure are described herein with reference to the drawings.

FIG. 5A shows an example mapping for downlink channels.

FIG. 5B shows an example mapping for uplink channels.

FIG. 7 shows an example configuration of a frame.

FIG. 21 shows an example of an RRC message for a handover (HO).

FIG. 22 shows an example of RRC messages for a RACH resource configuration for a HO procedure.

FIG. 24 shows an example of an RRC message for a CHO.

DETAILED DESCRIPTION

Figures 1A, 1B:
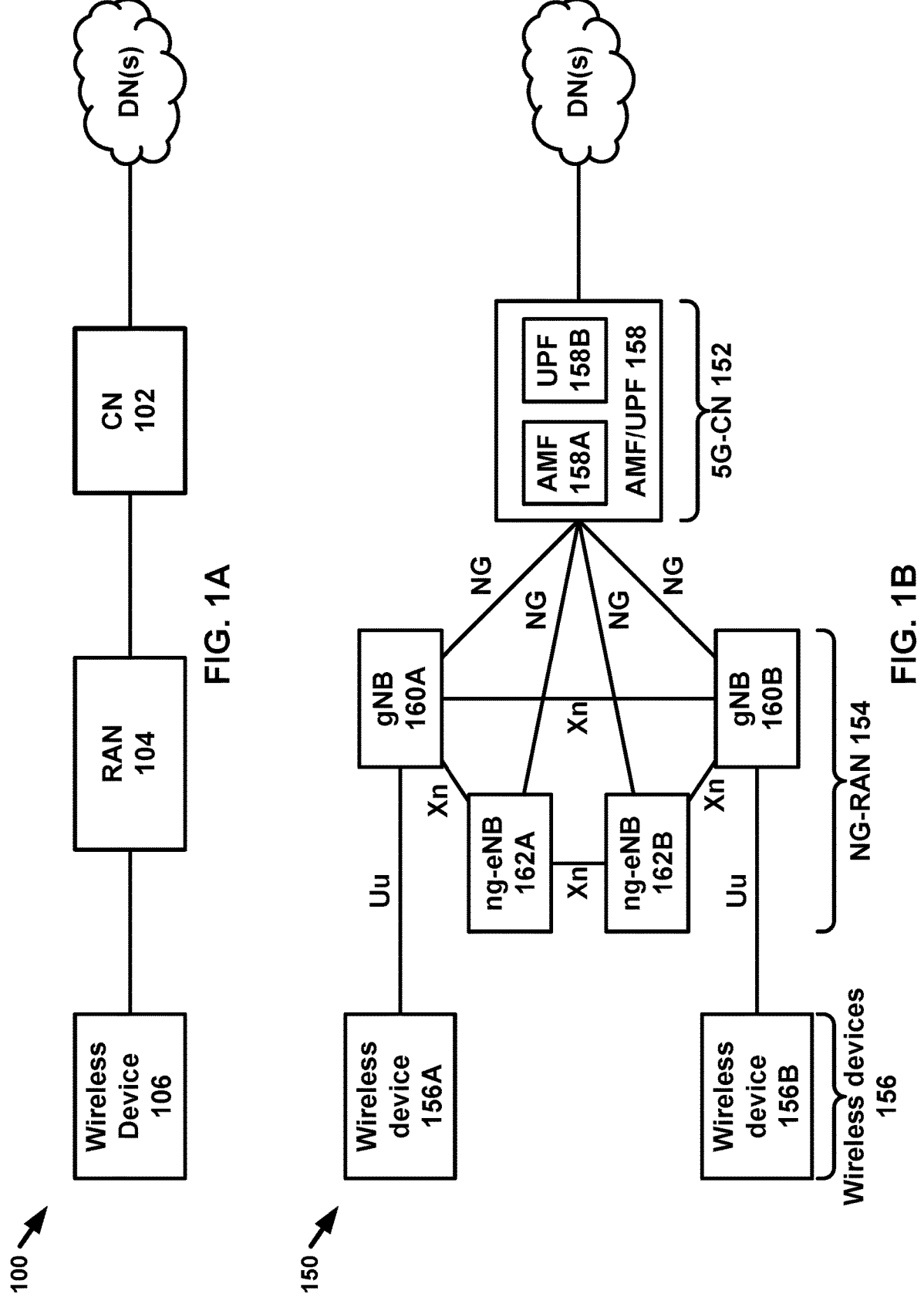
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems.

FIG. 1A shows an example communication network 100. The communication network 100 may comprise a mobile communication network. The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with the one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over/via an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a Generation Node B (gNB), an Next Generation Evolved Node B (ng-eNB), a relay node (e.g., an integrated access and backhaul (IAB) node), a donor node (e.g., a donor eNB, a donor gNB, etc.), an access point (AP) (e.g., a Wi-Fi access point), a transmission and reception point (TRP), a computing device, a device capable of wirelessly communicating, or any other device capable of sending and/or receiving signals. A base station may comprise one or more of the elements listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an eNB (e.g., associated with Evolved-Universal Terrestrial Radio Access (E-UTRA) and/or fourth-generation (4G) standards), a remote radio head (RRH), a baseband processing unit coupled to one or more RRHs, a repeater node or relay node used to extend the coverage area of a donor node, a ng-eNB, a gNB (e.g., associated with New Radio (NR) and/or fifth-generation (5G) standards), an AP (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an AP, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system.

3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to the one or more DNs 170. The wireless device(s) 156 may communicate with the one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs 170, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G-CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between the RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support muting of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs 170, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng-eNBs comprising an ng-eNB 162A and an ng-eNB 162B (collectively ng-eNBs 162)). The RAN 154 may comprise one or more of any quantity of types of base station. The gNBs 160 and/or ng-eNBs 162 may be referred to as base stations. The base stations (e.g., the gNBs 160 and/or ng-eNBs 162) may comprise one or more sets of antennas for communicating with the wireless device(s) 156 wirelessly (e.g., an over an air interface). One or more base stations (e.g., the gNBs 160 and/or the ng-eNBs 162) may comprise multiple sets of antennas to respectively control multiple cells (or sectors). The cells of the base stations (e.g., the gNBs 160 and/or the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G-CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack.

The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide E-UTRA user plane and control plane protocol terminations towards the wireless device(s) 156 via a Uu interface (e.g., where E-UTRA may refer to the 3GPP 4G radio-access technology). A base station (e.g., the ng-eNB 162B) may provide E-UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, IoT devices, hotspots, cellular repeaters, computing devices, and/or, more generally, UE. Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
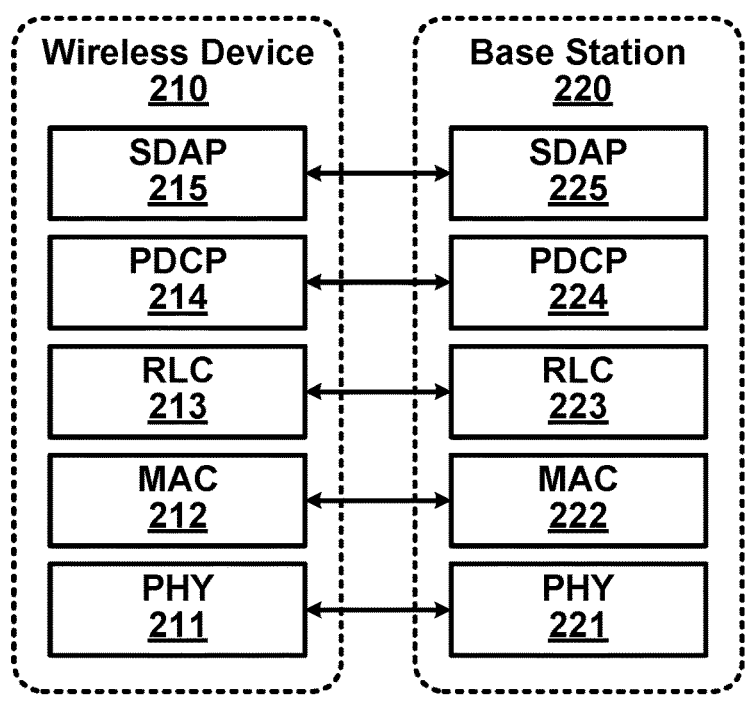
FIG. 2A shows an example user plane.
Figure 2B:
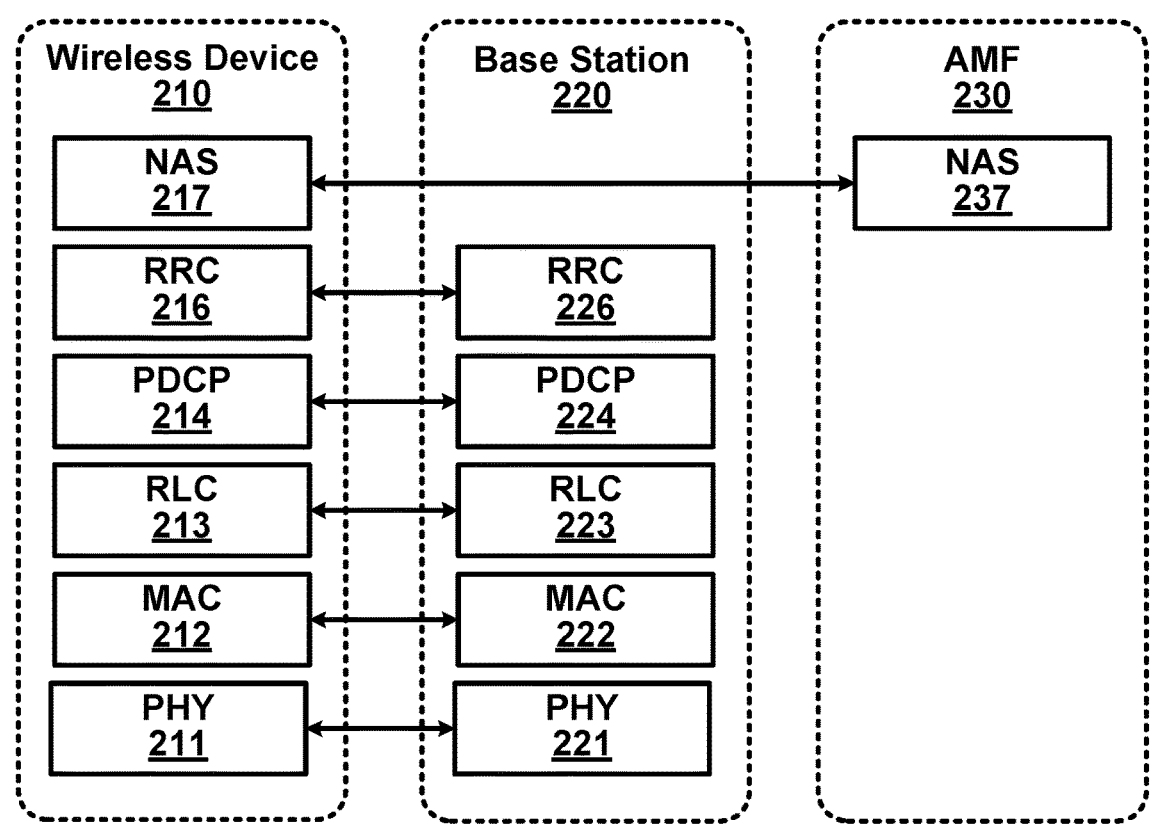
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configurations and/or the control plane configurations may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform QoS flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows 310 of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers (e.g., RLCs 213 and 223) may perform one or more of the noted functions, for example, based on the transmission mode the RLC layer (e.g., RLCs 213 and 223) is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels 330 as a service to the PDCP layers (e.g., PDCPs 214 and 224, respectively), such as shown in FIG. 3.

The MAC layers (e.g., MACs 212 and 222) may perform multiplexing/demultiplexing of logical channels 340 and/or mapping between logical channels 340 and transport channels 350. The multiplexing/demultiplexing may comprise multiplexing/demultiplexing of data units/data portions, belonging to the one or more logical channels 340, into/from Transport Blocks (TBs) delivered to/from PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels 340 of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels 350 to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
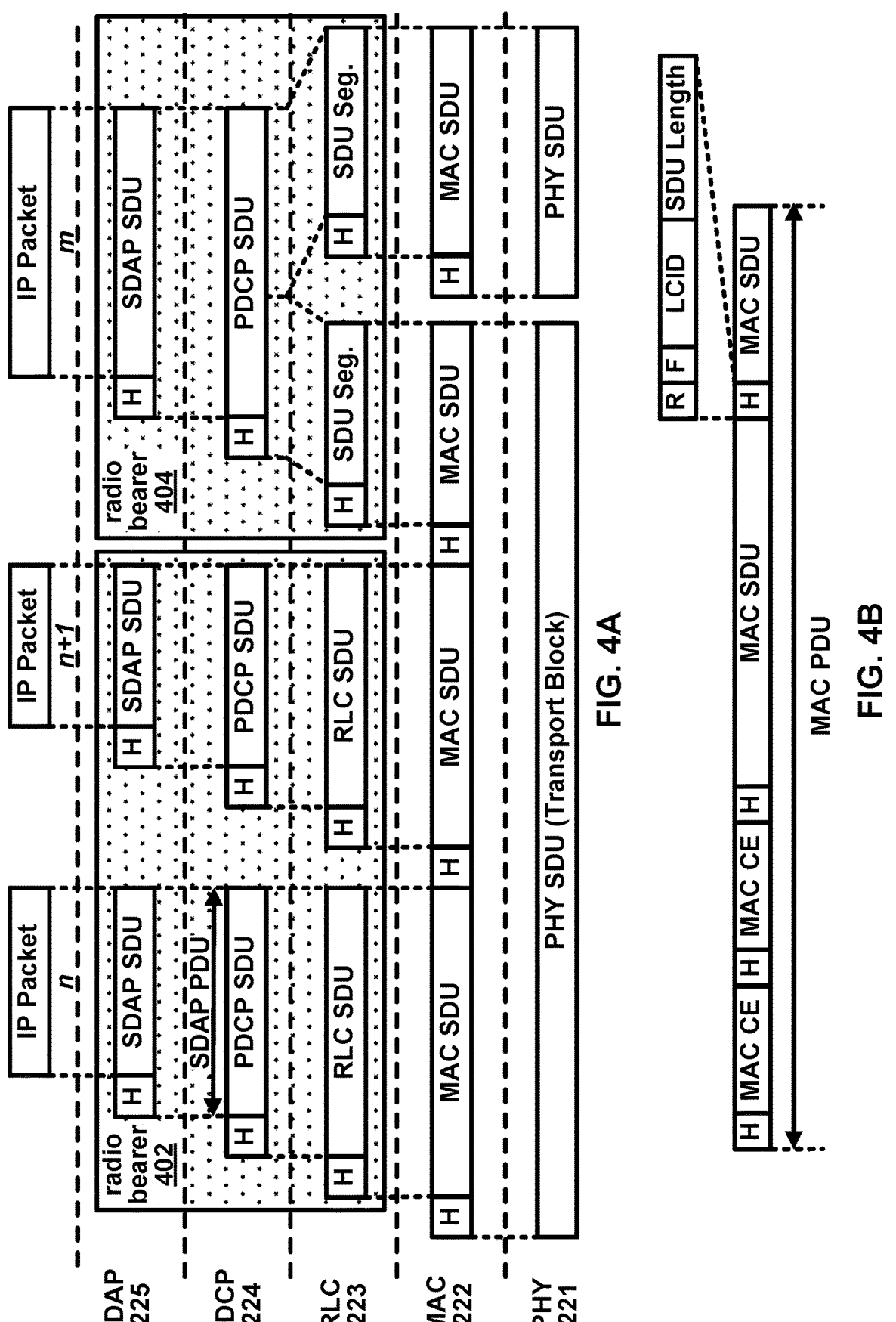
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG.

4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 212 or MAC 222. As shown in FIG. 4B, two MAC CEs may be inserted into/added to the MAC PDU. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
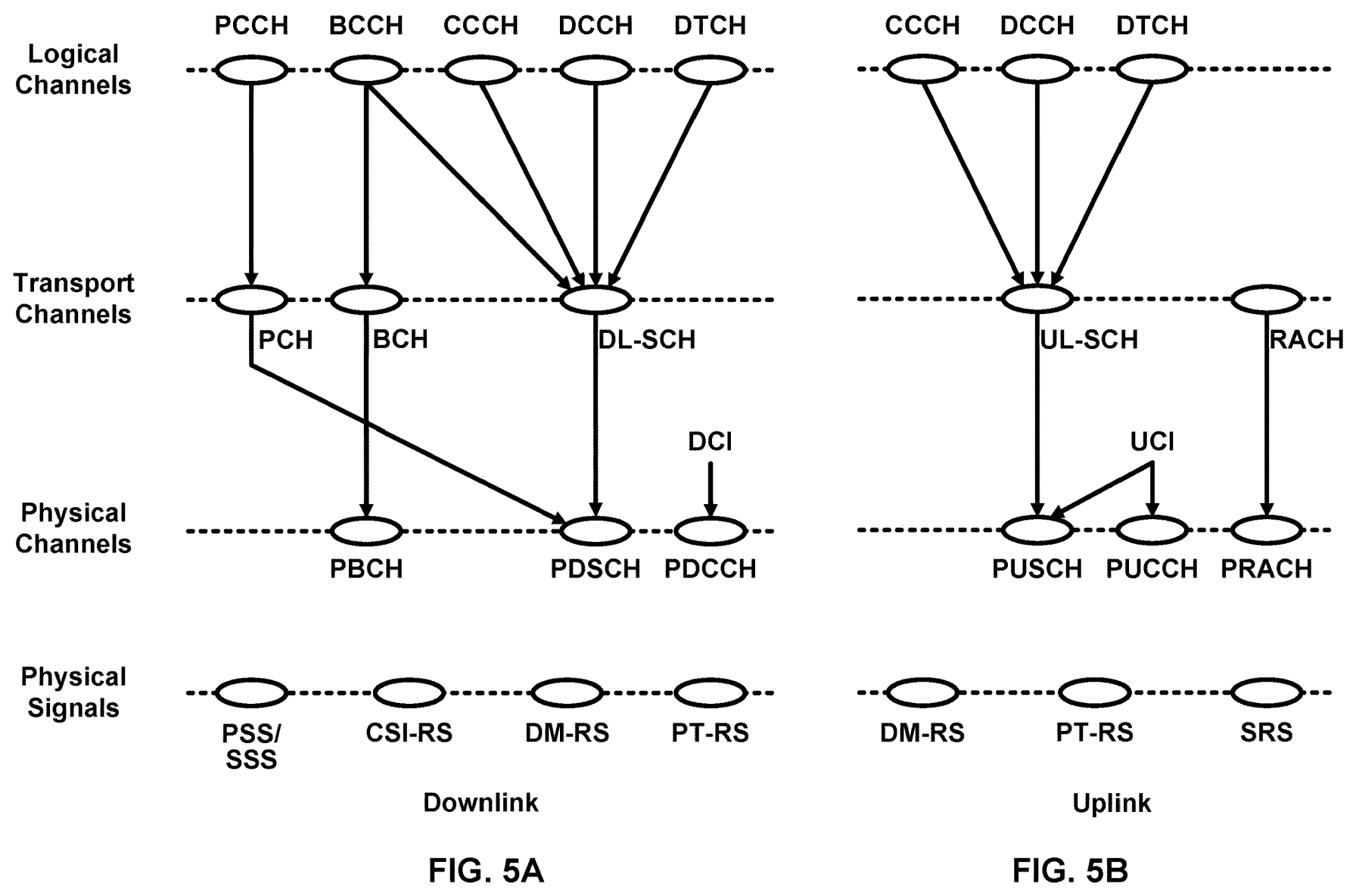

FIG. 5A shows an example mapping for downlink channels. The mapping for downlink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may comprise an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The PHY layer may generate physical signals to support the low-level operation of the PHY layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), SRS, phase-tracking reference signals (PT RS), and/or any other signals.

One or more of the channels (e.g., logical channels, transport channels, physical channels, etc.) may be used to carry out functions associated with the control plane protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHYs 211 and 221, MACs 212 and 222, RLCs 213 and 223, and PDCPs 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane protocol stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and substantially the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting and control of the reporting; detection of and recovery from radio link failure (RLF); and/or NAS message transfer. As part of establishing an RRC connection, the RRC layers 216 and 226 may establish an RRC context, which may involve configuring parameters for communication between the wireless device 210 and the RAN (e.g., the base station 220).

Figure 6:
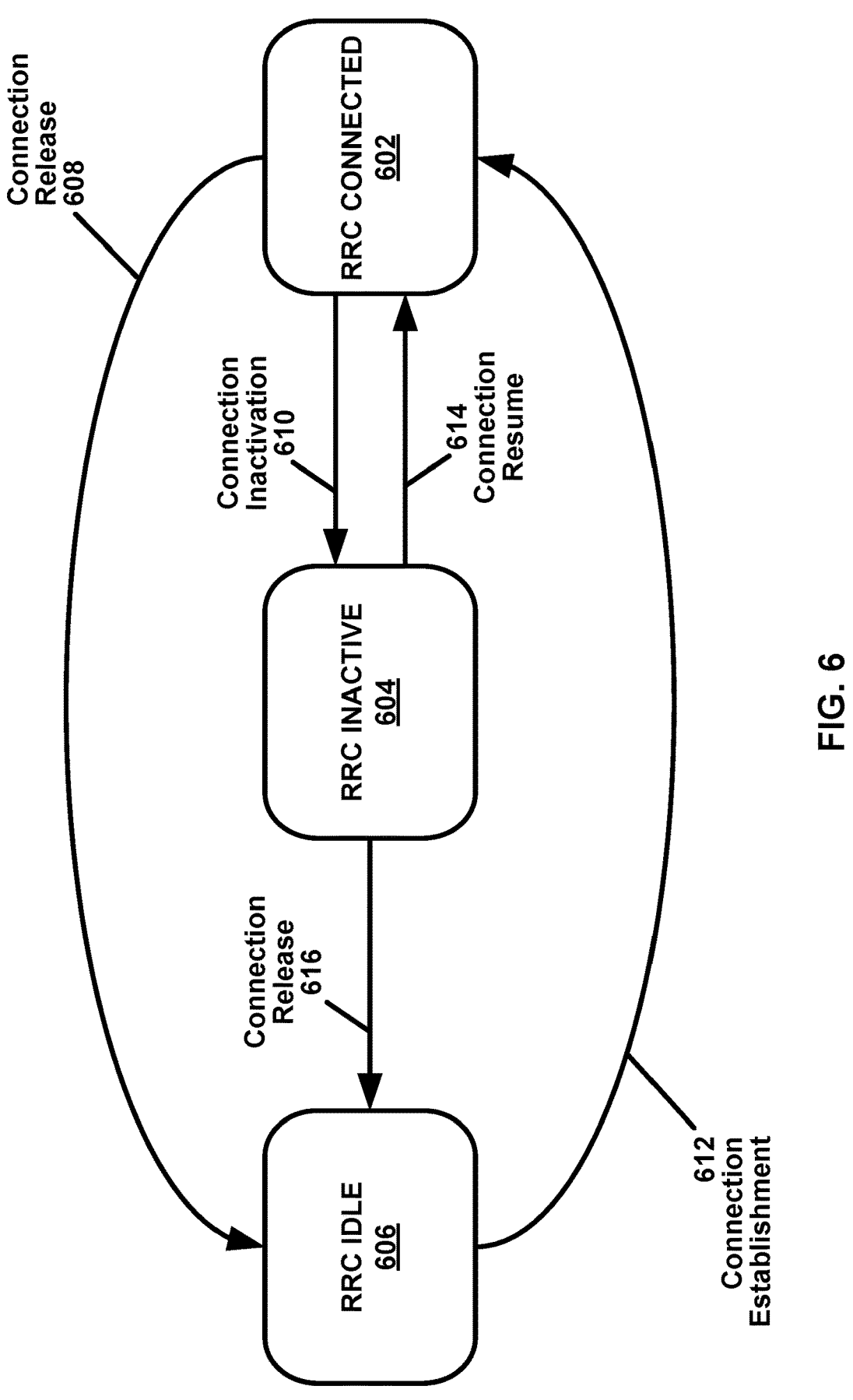
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_I-NACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104, the RAN 154, or any other RAN). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., the RRC connected 602) to an RRC idle state (e.g., the RRC idle 606) via a connection release procedure 608. The RRC state may transition from the RRC connected state (e.g., the RRC connected 602) to the RRC inactive state (e.g., the RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every DRX cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be substantially the same as or similar to connection release procedure 608.

An RRC state may be associated with a mobility management mechanism. During the RRC idle state (e.g., the RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC inactive state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., the RRC inactive 604).

A base station (e.g., the gNBs 160 in FIG. 1B or any other base station) may be split in two parts: a central unit (e.g., a base station central unit, such as a gNB-CU) and one or more distributed units (e.g., a base station distributed unit, such as a gNB-DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM may be a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbol streams may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR radio frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
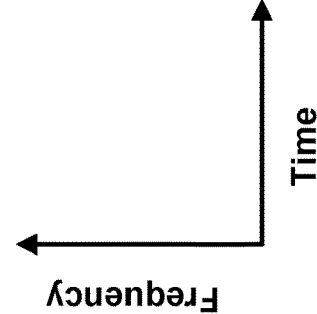
FIG. 8 shows an example resource configuration of one or more carriers.

FIG. 8 shows an example resource configuration of one or more carriers. The resource configuration may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR carrier such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in DCI. A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
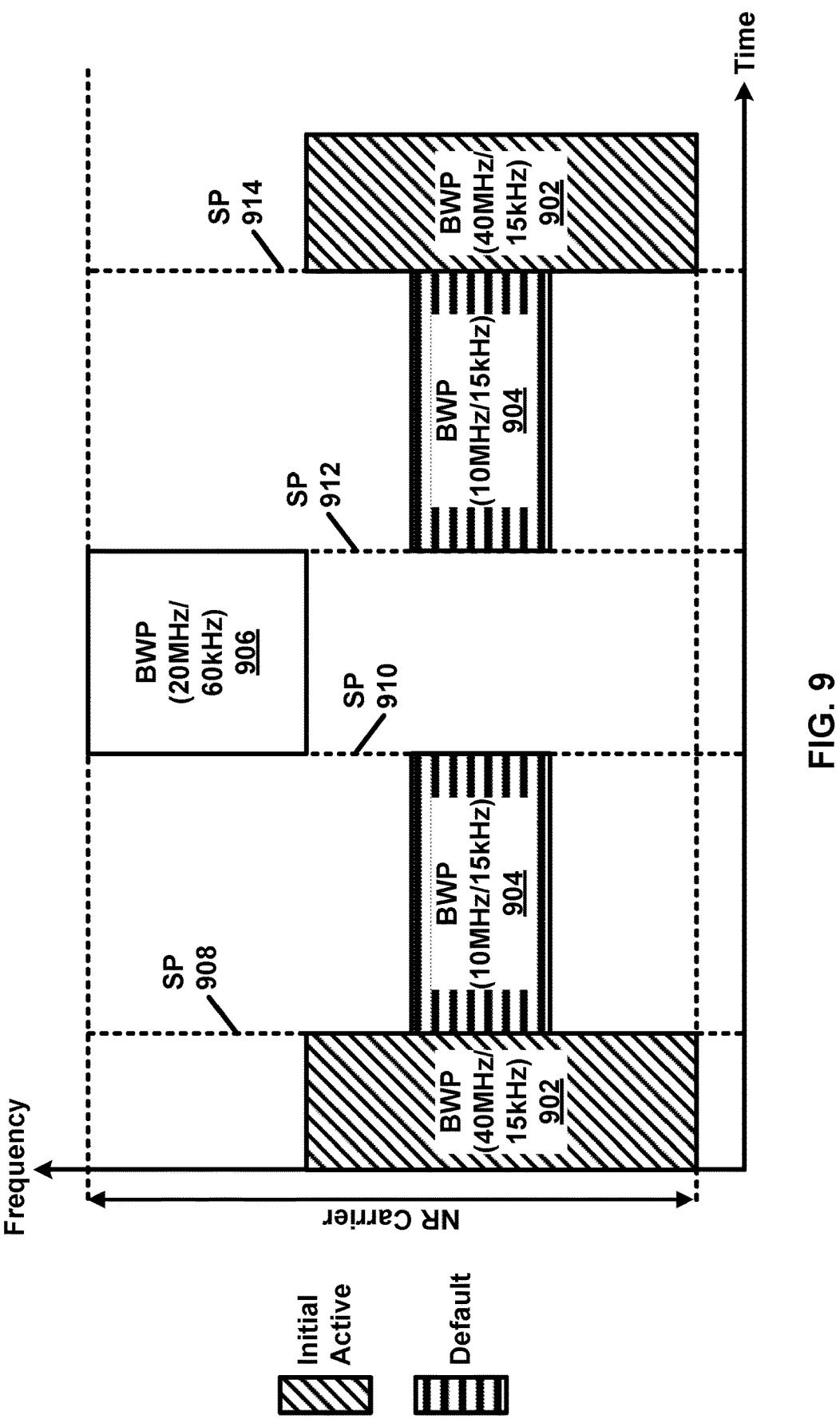
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at the switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating the BWP 904 as the active BWP. The wireless device may switch at a switching point 910 from the active BWP (e.g., the BWP 904) to the BWP 906, for example, after or in response receiving DCI indicating the BWP 906 as a new active BWP. The wireless device may switch at a switching point 912 from the active BWP (e.g., the BWP 906) to the BWP 904, for example, a based on (e.g., after or in response to) an expiry of a BWP inactivity timer. The wireless device may switch at the switching point 912 from the active BWP (e.g., the BWP 906) to the BWP 904, for example, after or in response to receiving DCI indicating the BWP 904 as a new active BWP. The wireless device may switch at a switching point 914 from the active BWP (e.g., the BWP 904) to the BWP 902, for example, after or in response receiving DCI indicating the BWP 902 as a new active BWP.

Wireless device procedures for switching BWPs on a secondary cell may be substantially the same/similar as those on a primary cell, for example, if the wireless device is configured for a secondary cell with a default downlink BWP in a set of configured downlink BWPs and a timer value. The wireless device may use the timer value and the default downlink BWP for the secondary cell in substantially the same/similar manner as the wireless device uses the timer value and/or default downlink BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
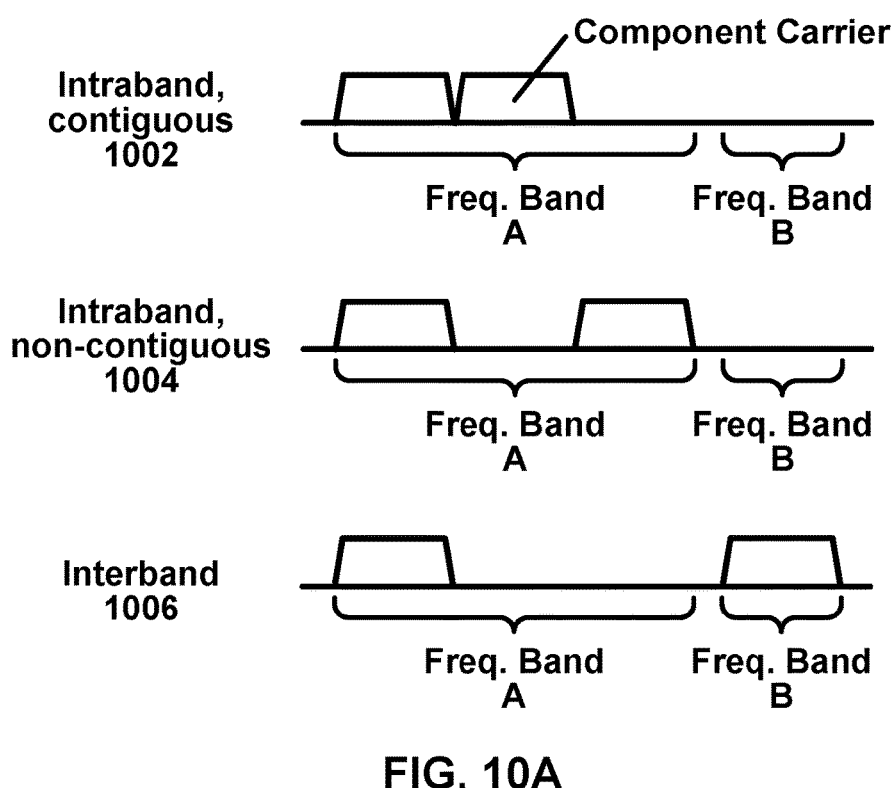
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless devices may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information for the downlink, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. UCI may comprise control information for the uplink, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
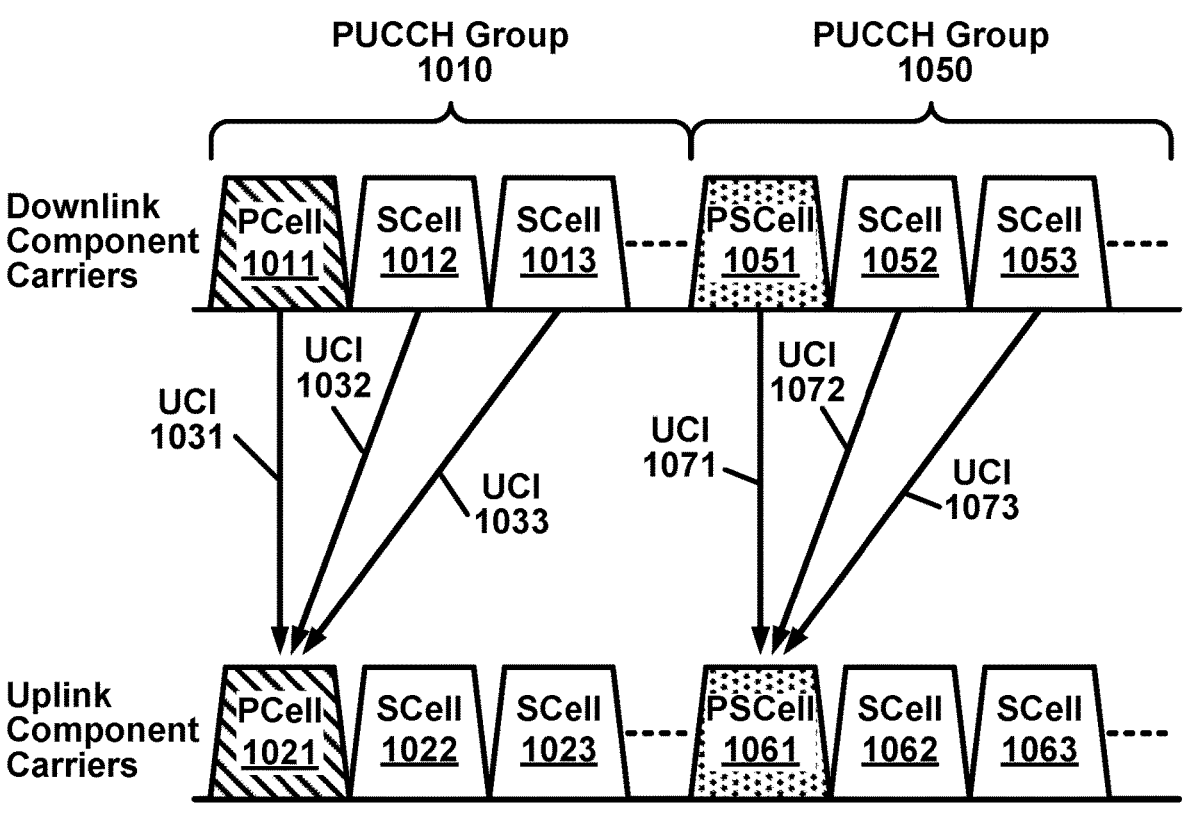
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may use/apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figures 11A, 11B:
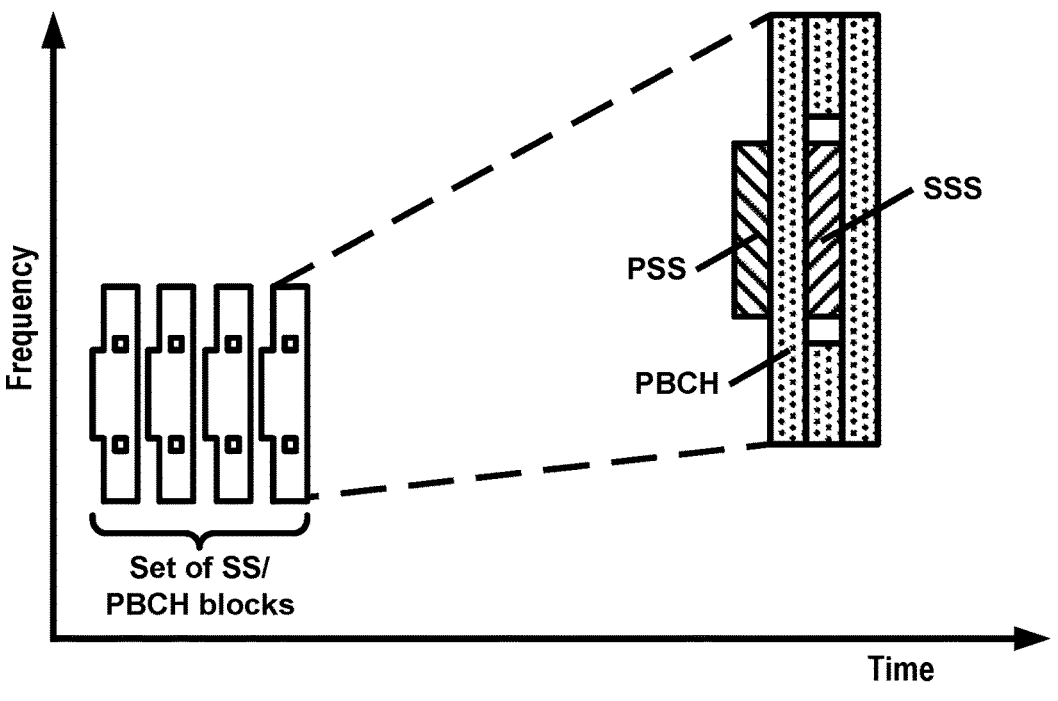
FIG. 11A shows an example mapping of one or more synchronization signal/physical broadcast channel (SS/PBCH) blocks.
FIG. 11B shows an example mapping of one or more channel state information reference signals (CSI-RSs).

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial receiving (Rx) parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine CSI. The base station may configure the wireless device with one or more CSI-RSs for channel estimation or any other suitable purpose. The base station may configure a wireless device with one or more of substantially the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports (or any other quantity of orthogonal downlink DM-RS ports) per wireless device (e.g., for single user-MIMO). A DM-RS configuration may support up to 4 orthogonal downlink DM-RS ports (or any other quantity of orthogonal downlink DM-RS ports) per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be substantially the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with substantially the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier, a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as QCLed, for example, if one or more large-scale properties of the channel over which a first symbol on the first antenna port is conveyed may be inferred/determined from the channel over which a second symbol on a second antenna port is conveyed. The one or more large-scale properties may comprise at least one of: a delay spread;

a Doppler spread; a Doppler shift; an average gain; an average delay; and/or spatial Rx parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

FIG. 11B shows an example mapping of one or more CSI-RSs. The CSI-RSs may be mapped in the time and frequency domains. Each rectangular block shown in FIG. 11B may correspond to a RB within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and RE locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, QCL parameters (e.g., QCL-scramblingidentity, crs-ports-count, mbsfn-subframeconfiglist, csi-rs-configZPid, qcl-csi-rs-configNZPid), and/or other radio resource parameters.

One or more beams may be configured for a wireless device in a wireless device-specific configuration. Three beams may be shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure a reference signal received power (RSRP) of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more SRS resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a PMI, a CQI, and/or a RI.

Figures 12A, 12B:
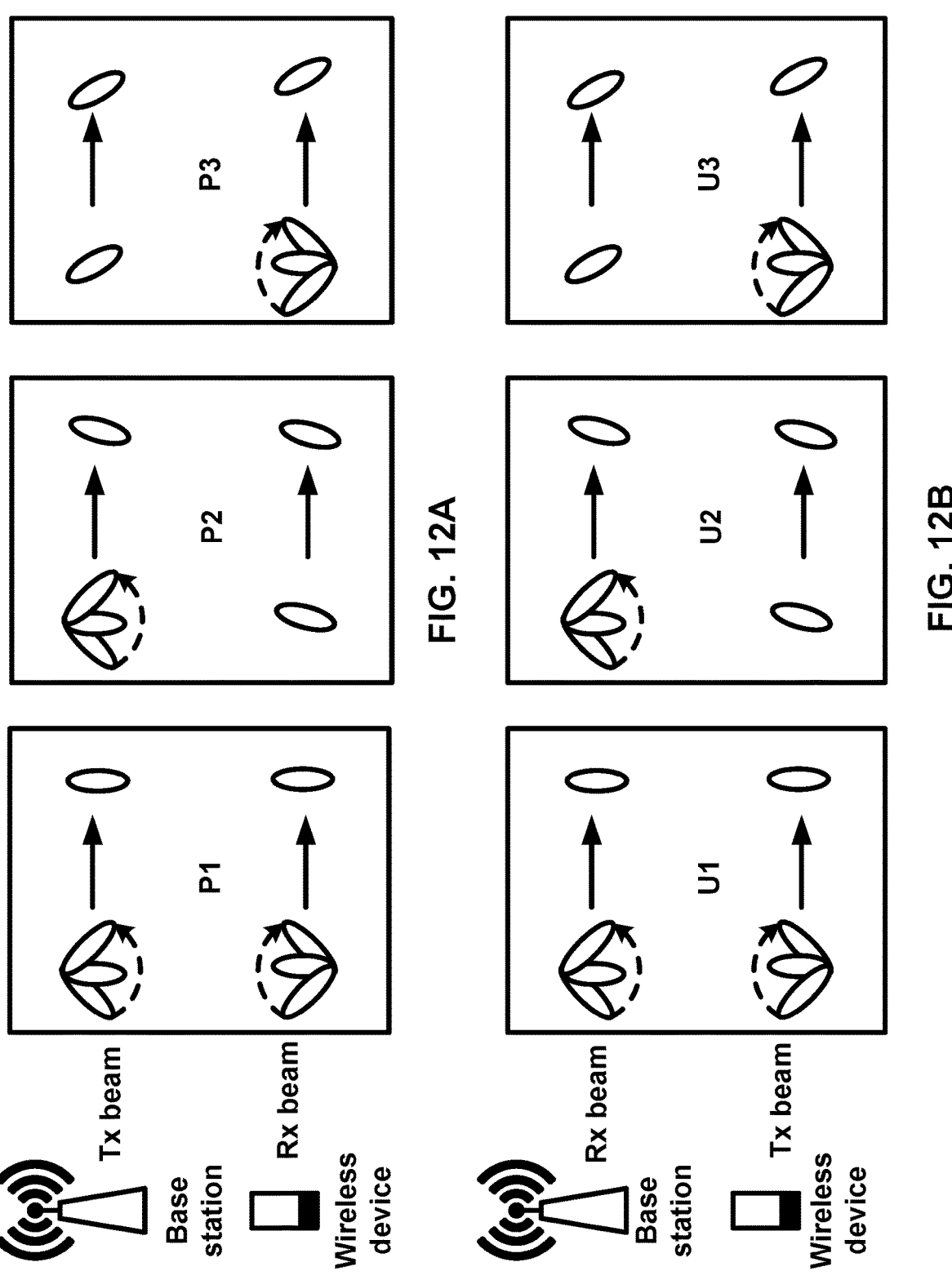
FIG. 12A shows examples of downlink beam management procedures.
FIG. 12B shows examples of uplink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the bottom row of U1 and top row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more RSs comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are substantially the same or similar as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more SIBs (e.g., or any other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
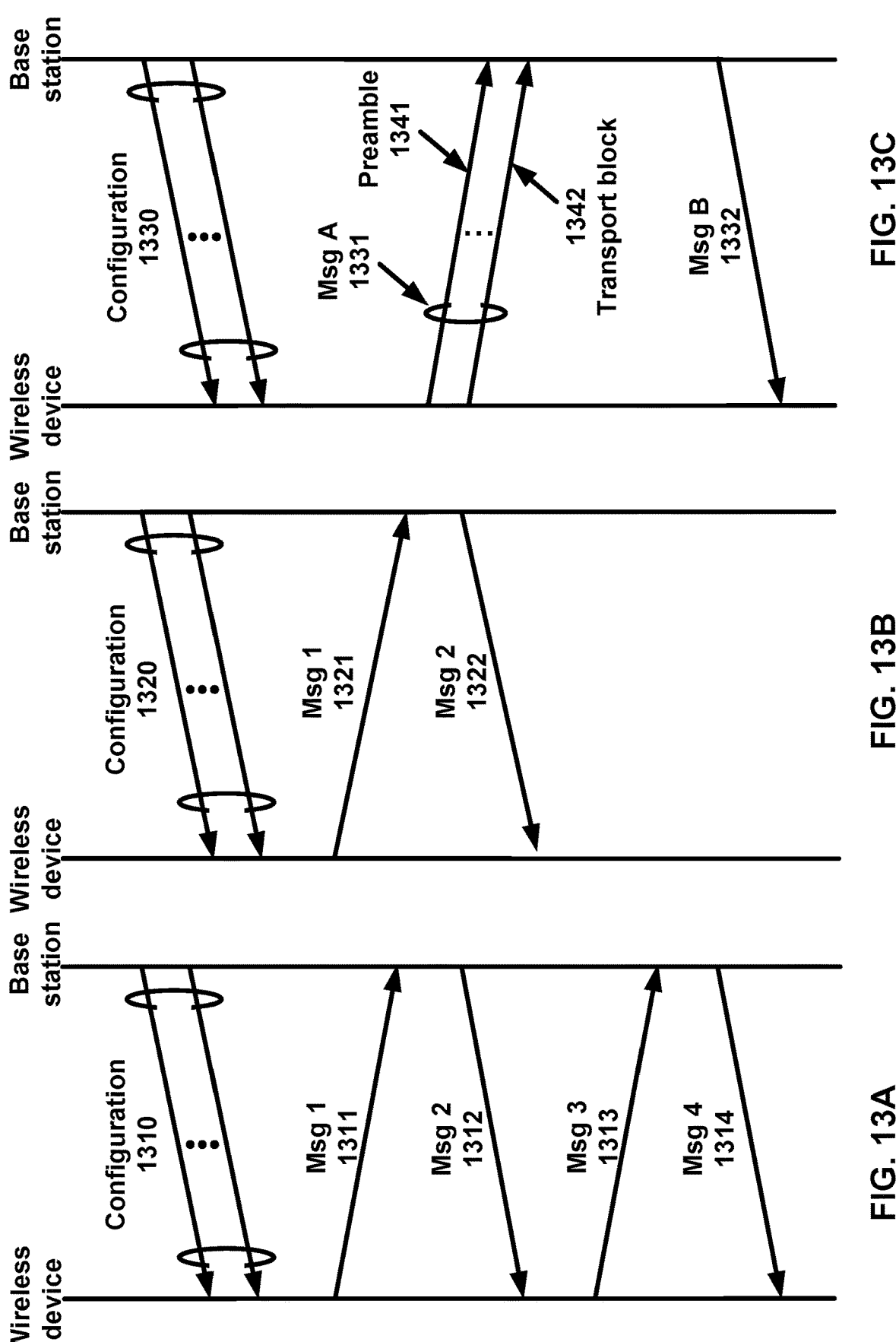
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more RACH parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more PRACH occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate at least one of: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMaskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE-_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. RNTIs may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI=1+s\_id+14 \times t\_id+14 \times 80 \times f\_id+14 \times 80 \times 8 \times ul\_carrier\_id,$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless device on the PDCCH (e.g., the base station may send the PDCCH to the wireless device) using a C-RNTI, for example, if the C-RNTI was included in the third message (e.g., Msg 3 1313). The random access procedure may be determined to be successfully completed, for example, if the unique C-RNTI of the wireless device is detected on the PDCCH (e.g., the PDCCH is scrambled by the C-RNTI). The fourth message (e.g., Msg 4 1314) may be received using a DL-SCH associated with a TC-RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., for the first message (e.g., Msg 1 1311) and/or the third message (e.g., Msg 3 1313)). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

The first message (e.g., Msg A 1331) may be sent/transmitted in an uplink transmission by the wireless device. The first message (e.g., Msg A 1331) may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as DCI. The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
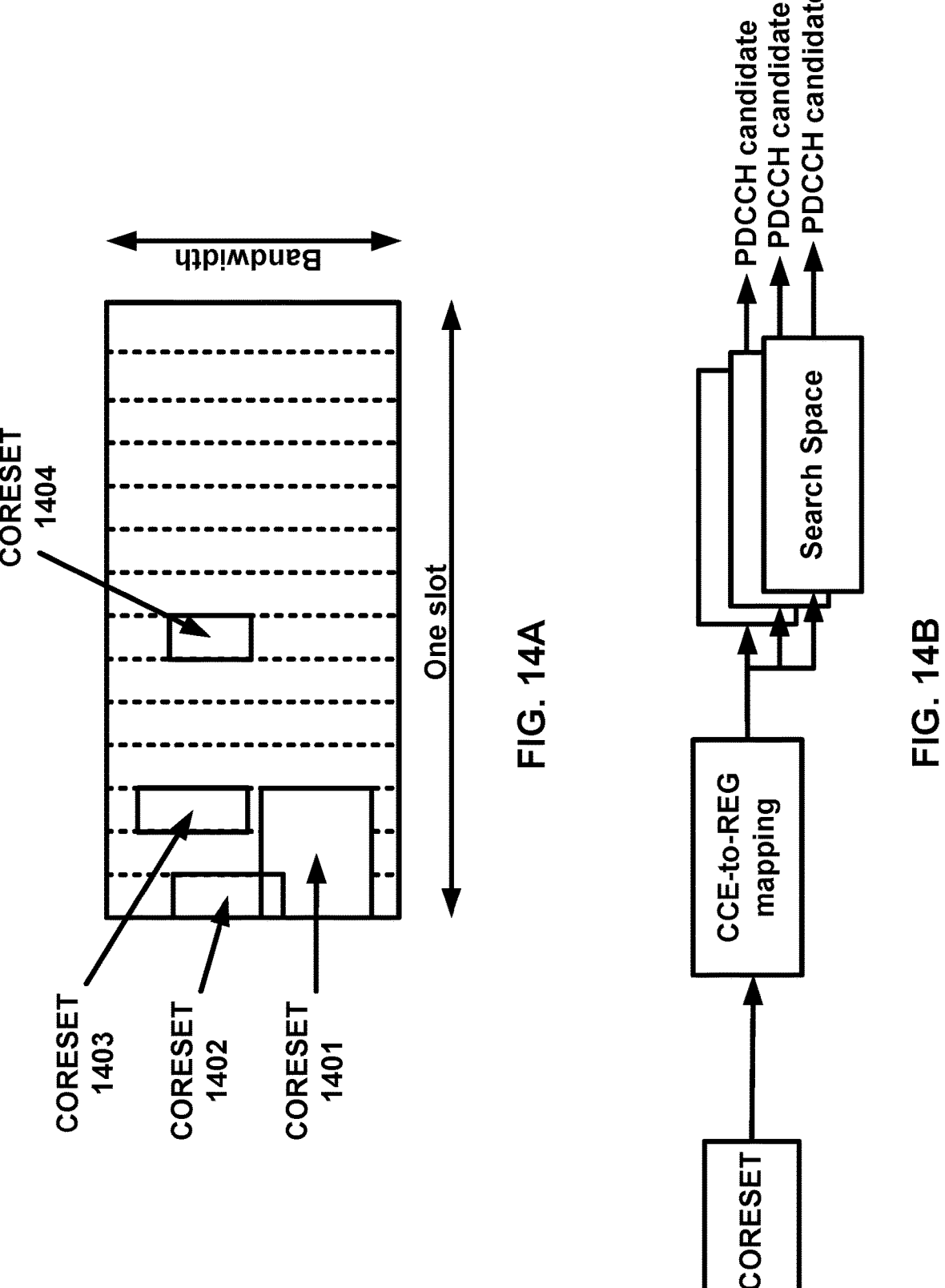
FIG. 14A shows an example of control resource set (CORESET) configurations.
FIG. 14B shows an example of a control channel element to resource element group (CCE-to-REG) mapping.

FIG. 14A shows an example of CORESET configurations. The CORESET configurations may be for a bandwidth part or any other frequency bands. The base station may send/transmit DCI via a PDCCH on one or more CORESETs. A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a quantity/number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the quantity/number of CCEs, the quantity/number of PDCCH candidates in common search spaces, and/or the quantity/number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise SR. The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a quantity/number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a quantity/number of OFDM symbols (e.g., between four and fourteen OFDM symbols) and may comprise two or fewer bits. The wireless device may use PUCCH format 1, for example, if the transmission is over/via four or more symbols and the quantity/number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a quantity/number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a quantity/number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a quantity/number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from a PUCCH resource set for UCI (HARQ-ACK, CSI, and/or SR) transmission, for example, after determining the PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
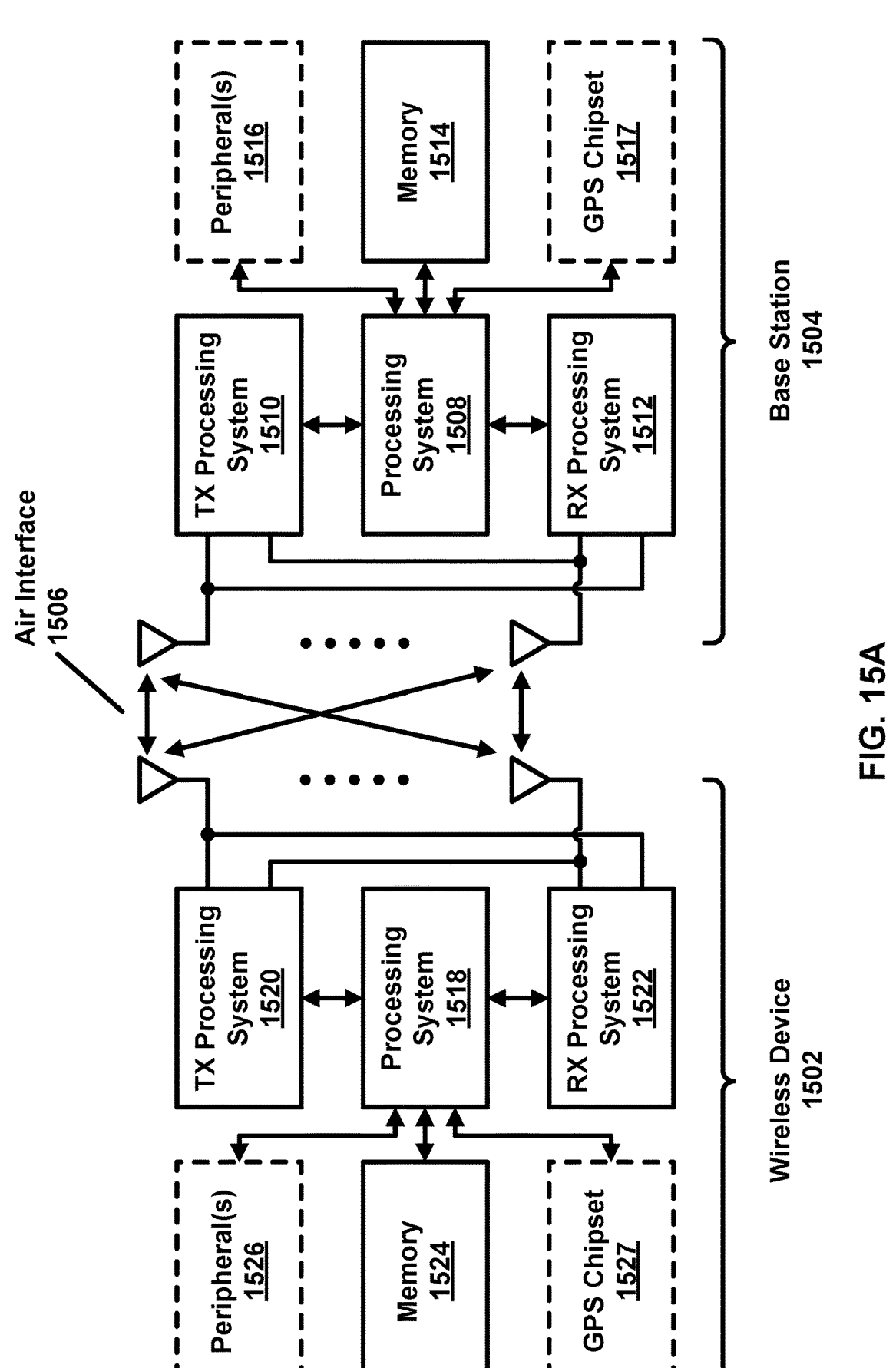
FIG. 15A shows an example of communications between a wireless device and a base station.

FIG. 15A shows an example of communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other pro-grammable logic device, discrete gate and/or transistor logic, discrete hardware components, an on-board unit, or any combination thereof. The processing system 1508 and/ or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respec-tively.

Figure 15B:
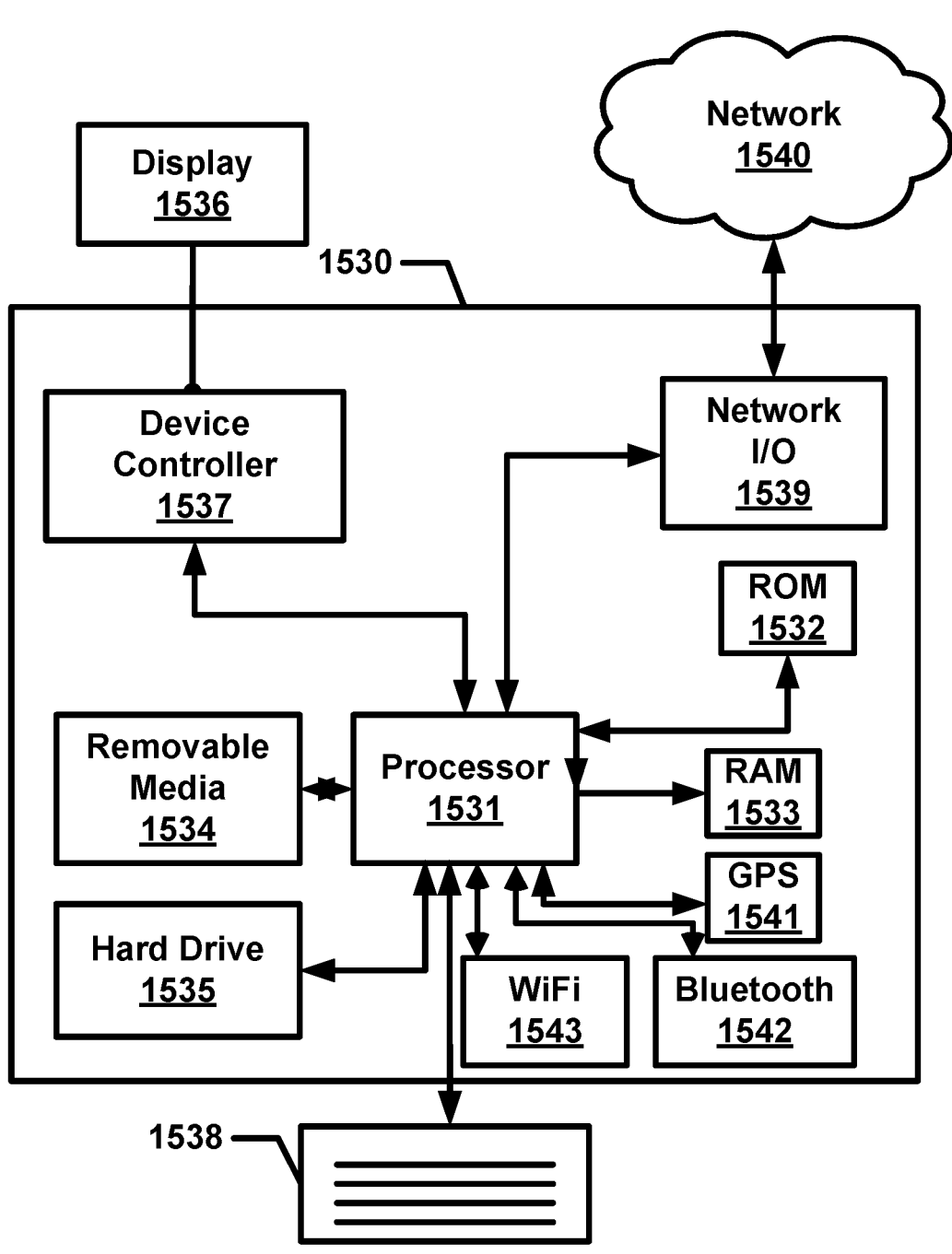
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a USB drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network inter-faces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include com-munication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a GPS microprocessor 1541, which may be configured to receive and process global positioning signals and determine, with possible assistance from an external server and antenna, a geographic position of the computing device 1530.

The example in FIG. 15B may be a hardware configura-tion, although the components shown may be implemented as software as well. Modifications may be made to add, remove, combine, divide, etc. components of the computing device 1530 as desired. Additionally, the components may be implemented using basic computing devices and com-ponents, and the same components (e.g., processor 1531, ROM storage 1532, display 1536, etc.) may be used to implement any of the other computing devices and compo-nents described herein. For example, the various compo-nents described herein may be implemented using comput-ing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figures 16A, 16B, 16C, 16D:
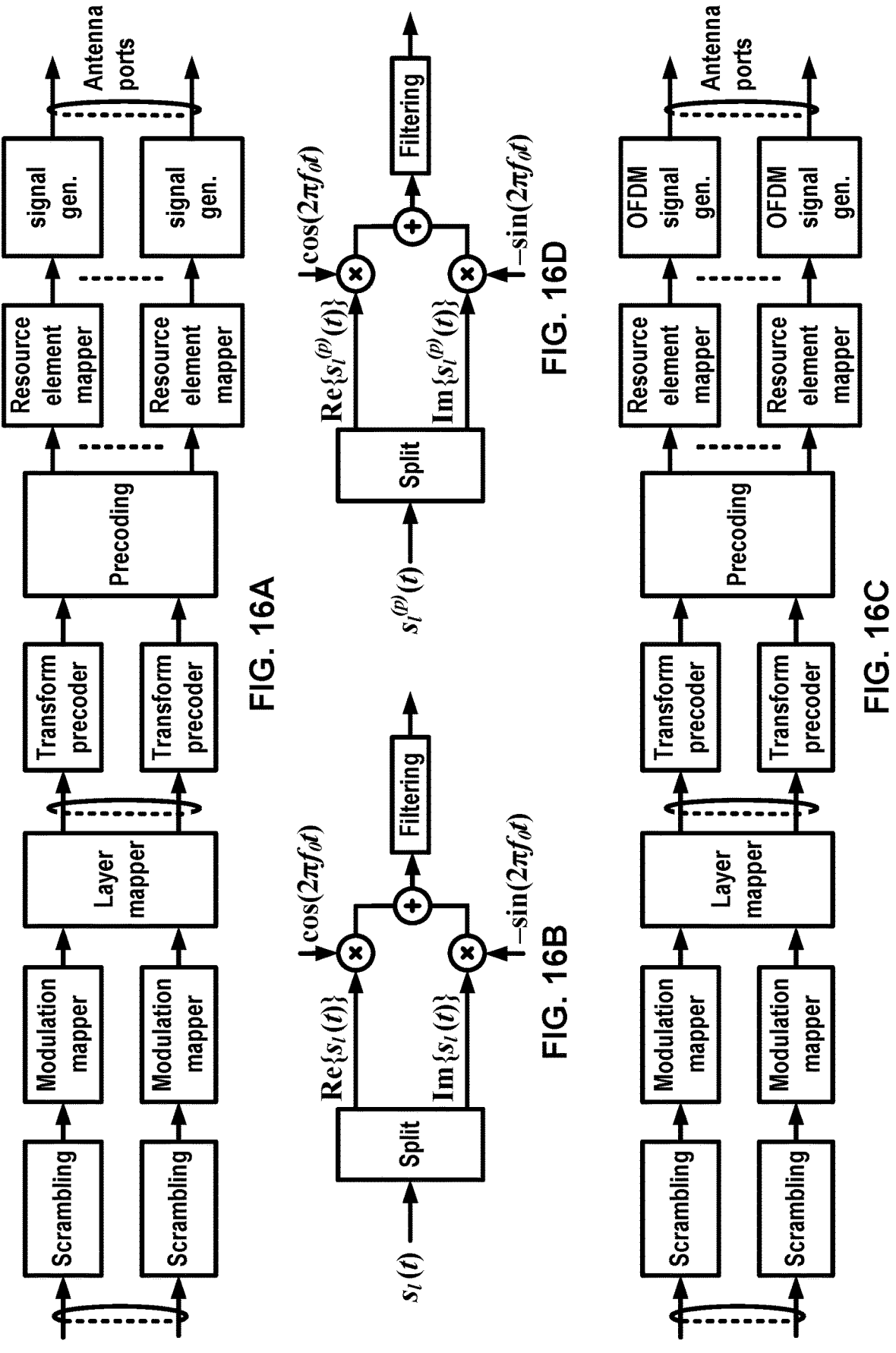
FIG. 16A, FIG. 16B, FIG. 16C, and FIG. 16D show examples of uplink and downlink signal transmission.

FIG. 16A shows an example structure for uplink trans-mission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; map-ping of precoded complex-valued symbols to resource ele-ments; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A wireless device may be either in an RRC connected state or in an RRC inactive state, for example, if/when an RRC connection has been established. If/when no RRC connection is established, the wireless device may be in an RRC idle state.

If/when a wireless device is in an RRC idle state, (an RRC layer of) the wireless device and/or a base station may support PLMN selection; broadcast of system information; cell re-selection mobility; paging for mobile terminated data is initiated by 5GC; DRX for core network (CN) paging configured by non-access stratum (NAS). If/when a wireless device is in an RRC idle state, a wireless device specific DRX may be configured by upper layers; and/or wireless device controlled mobility based on network configuration. If/when a wireless device is in an RRC idle state, (an RRC layer of) the wireless device may: monitor short messages transmitted with P-RNTI over DCI; monitor a paging channel for core network (CN) paging using serving temporary mobile subscriber identity (S-TMSI) (e.g., 5G-S-TMSI); perform neighboring cell measurements and cell (re-)selection; acquire system information; send SI request; perform logging of available measurements together with location and time for logged measurement configured wireless devices.

If/when a wireless device is in an RRC inactive state, (an RRC layer of) the wireless device or a base station may support PLMN selection; broadcast of system information; cell re-selection mobility; paging is initiated by NG-RAN (RAN paging); RAN-based notification area (RNA) is managed by NG-RAN; DRX for RAN paging configured by NG-RAN; core network (e.g., 5G core, 5GC)-RAN (e.g., a base station) connection (both control and/or user planes) is established for wireless device; an wireless device AS context is stored in RAN and the wireless device; RAN knows the RNA which the wireless device belongs to. For example, when (the RRC layer) of a wireless device is in an RRC inactive state, a wireless device specific DRX may be configured by upper layers or by RRC layer, the wireless device may perform/support wireless device controlled mobility based on network configuration; the wireless device may store the wireless device inactive AS context; a RAN-based notification area (RNA) may be configured by the RRC layer. When a wireless device is in an RRC inactive state, (an RRC layer of) the wireless device may: monitor short messages transmitted with P-RNTI over DCI; monitor a paging channel for CN paging using S-TMSI and RAN paging using full inactive-RNTI (I-RNTI) (or full resume identity); perform neighboring cell measurements and cell (re-)selection; perform RAN-based notification area (RNA) updates periodically and when moving outside the configured RAN-based notification area; acquire system information; send SI request; perform logging of available measurements together with location and time for logged measurement configured wireless devices.

If/when a wireless device is in an RRC connected state, (an RRC layer of) the wireless device or a base station may support that: 5GC-NG-RAN connection (both C/U-planes) is established for wireless device; an wireless device AS context is stored in RAN (e.g., a base station) and the wireless device; RAN knows the cell which the wireless device belongs to; transfer of unicast data to/from the wireless device; network controlled mobility including measurements. For example, if/when a wireless device is in an RRC connected state, (an RRC layer of) the wireless device may: store the AS context; transfer/receive unicast data; at lower layers, be configured with a wireless device specific DRX; for wireless devices supporting CA, use of one or more SCells, aggregated with the SpCell, for increased bandwidth; for wireless devices supporting DC, use of one SCG, aggregated with the MCG, for increased bandwidth; perform/support Network controlled mobility within NR and to/from E-UTRA; if/when a wireless device is in an RRC connected state, the wireless device may: monitor short messages transmitted with P-RNTI over DCI; monitor control channels associated with the shared data channel to determine if data is scheduled for it; provide channel quality and feedback information; perform neighboring cell measurements and measurement reporting; acquire system information; perform immediate minimization of drive tests (MDT) measurement together with available location reporting.

Radio bearers may be categorized into two groups: data radio bearers (DRB) for user plane data and signalling radio bearers (SRB) for control plane data. Signalling radio bearers" (SRBs) may be defined as radio bearers (RBs) that are used only for a transmission of RRC and NAS messages. Following SRBs may be defined: SRB0 may be for RRC messages using the common control channel (CCCH) logical channel; SRB1 may be for RRC messages (which may include a piggybacked NAS message) as well as for NAS messages prior to an establishment of SRB2, all using dedicated control channel (DCCH) logical channel; SRB2 may be for NAS messages and for RRC messages which may include logged measurement information, all using DCCH logical channel. SRB2 may have a lower priority than SRB1 and may be configured by the network after access stratum (AS) security activation; SRB3 may be for specific RRC messages when wireless device is in dual connectivity (e.g., (NG)EN-DC or NR-DC), all using DCCH logical channel. In downlink, piggybacking of NAS messages may be used for one dependent (e.g., with joint success/failure) procedure: bearer establishment/modification/release. In uplink piggybacking of NAS message may be used for transferring the initial NAS message during (RRC) connection setup and (RRC) connection resume. NAS messages transferred via SRB2 may be contained in RRC messages, which may not include any RRC protocol control information. Once AS security is activated, all RRC messages on SRB1, SRB2 and SRB3, including those containing NAS messages, may be integrity protected and ciphered by PDCP. NAS independently may apply integrity protection and ciphering to the NAS messages. Split SRB may is supported for dual connectivity (e.g., multi radio (MR)-DC options) in both SRB1 and SRB2. The split SRB may be not supported for SRB0 and SRB3. For operation with shared spectrum channel access, SRB0, SRB1 and SRB3 may be assigned with the highest priority channel access priority class (CAPC), (e.g., CAPC=1) while CAPC for SRB2 may be configurable.

A MAC layer of a wireless device and/or a base station may offer different kinds of data transfer service. Each logical channel type may be defined by what type of information is transferred. Logical channels may be classified into two groups: control channels and traffic channels. control channels may be used for the transfer of control plane information: broadcast control channel (BCCH) which is a downlink channel for broadcasting system control information; paging control channel (PCCH) which is a downlink channel that carries paging messages; common control channel (CCCH) which is a channel for transmitting control information between wireless devices and network. This channel may be used for wireless devices having no RRC connection with the network; and dedicated control channel (DCCH) which is a point-to-point bi-directional channel that transmits dedicated control information between a wireless device and the network. Used by wireless devices having an RRC connection. Traffic channels may be used for the transfer of user plane information: dedicated traffic channel (DTCH) which is point-to-point channel, dedicated to one wireless device, for the transfer of user information. A DTCH may exist in both uplink and downlink.

A wireless device may transition to an RRC connected state if/when an RRC connection is established and/or resumed. The wireless device may transition to an RRC idle state when RRC connection is released or suspended. The wireless device may transition to an RRC inactive state when RRC connection is suspended. If/when the wireless device is in an RRC idle state, the wireless device may have a suspended RRC connection. Based on the suspended RRC connection in the RRC idle state, the wireless device may be in an RRC idle state with a suspended RRC connection.

An RRC connection establishment may comprise the establishment of SRB1. A base station may complete the RRC connection establishment prior to completing the establishment of a connection (e.g., N2/N3 connection) with a core network, (e.g., prior to receiving the wireless device context information from core network entity (e.g., AMF)). Access stratum (AS) security may be not activated during the initial phase of the RRC connection. During the initial phase of the RRC connection, the base station may configure the wireless device to perform measurement reporting. The wireless device may send the corresponding measurement reports after successful AS security activation. The wireless device may receive or accept a handover message (e.g., a handover command) when AS security has been activated.

Upon receiving the wireless device context from the core network (e.g., AMF), an RAN (a base station) may activate AS security (both ciphering and integrity protection) using the initial AS security activation procedure. RRC messages to activate AS security (command and successful response) may be integrity protected and ciphering may be started after completion of the procedure. The response to the RRC messages used to activate AS security may be not ciphered, and the subsequent messages (e.g., used to establish SRB2 and DRBs) may be both integrity protected and ciphered. After having initiated the initial AS security activation procedure, the network (e.g., the base station) may initiate the establishment of SRB2 and DRBs (e.g., the network may do this prior to receiving the confirmation of the initial AS security activation from the wireless device). The network may apply both ciphering and integrity protection for RRC reconfiguration messages used to establish SRB2 and DRBs. The network should release the RRC connection if the initial AS security activation and/or the radio bearer establishment fails. A configuration with SRB2 without DRB or with DRB without SRB2 may be not supported (e.g., SRB2 and at least one DRB must be configured in the same RRC Reconfiguration message, and it may be not allowed to release all the DRBs without releasing the RRC Connection). For integrated access and backhaul mobile termination (IAB-MT), a configuration with SRB2 without DRB may be supported.

The release of the RRC connection may be initiated by the network. The procedure of the release may be used to re-direct the wireless device to a frequency (e.g., an NR frequency or an E-UTRA carrier frequency).

The suspension of the RRC connection may be initiated by the network. When the RRC connection is suspended, the wireless device may store the wireless device Inactive AS context and any configuration received from the network, and transition to RRC inactive state. The RRC message to suspend the RRC connection may be integrity protected and ciphered.

The resumption of a suspended RRC connection may be initiated by upper layers if/when the wireless device needs to transition from RRC inactive state to RRC connected state or by RRC layer to perform a RNA update or by RAN paging from RAN (e.g., a base station). If/when the RRC connection is resumed, a network may configure the wireless device according to the RRC connection resume procedure based on the stored wireless device inactive AS context and any RRC configuration received from the network. The RRC connection resume procedure may re-activate AS security and re-establish SRB(s) and DRB(s).

In response to a request to resume the RRC connection, the network may resume the suspended RRC connection and send/transition wireless device to RRC connected state, or reject the request to resume and send wireless device to RRC inactive state (with a wait timer), or directly re-suspend the RRC connection and send wireless device to RRC_INAC-TIVE, or directly release the RRC connection and send/transition wireless device to RRC idle state, or instruct the wireless device to initiate NAS level recovery (in this case the network sends an RRC setup message). For user data (DRBs), ciphering may provide user data confidentiality and integrity protection provides user data integrity. For RRC signalling (SRBs), ciphering may provide signalling data confidentiality and integrity protection signalling data integrity. Ciphering and integrity protections may be optionally configured except for RRC signalling for which integrity protection may be always configured. Ciphering and integrity protection may be configured per DRB.

For key management and data handling, network entities or a wireless device processing cleartext may be protected from physical attacks and located in a secure environment. Base station (e.g., gNB or eNB) (AS) keys may be cryptographically separated from the (NAS) keys. Separate AS and NAS level security mode command (SMC) procedures may be used. A sequence number (e.g., COUNT) may be used as input to the ciphering and integrity protection and a given sequence number may be used once for a given key (except for identical re-transmission) on the same radio bearer in the same direction.

Keys for security may be organized and derived as follows. A key for a core network entity (e.g., AMF or a key for mobility management entity (MME)) may comprise KAMF (or KMME). The key for a core network entity may be a key derived by mobile equipment (ME) of a wireless device and a security anchor function (SEAF) from a key for the SEAF (KSEAF). Keys for NAS signalling may comprise: KNASint (e.g., a key derived by mobile equipment (ME) of a wireless device and the core network from a key for the core network entity, which may be used for the protection of NAS signalling with a particular integrity algorithm); and KNASenc (e.g., a key derived by ME and the core network entity from a key for the core network entity (e.g., KAMF/KMME), which may be used for the protection of NAS signalling with a particular encryption algorithm). A key for a base station (e.g., gNB or eNB) may comprise KgNB (or KeNB), for example, a key derived by ME and a core network entity (e.g., AMF/MME) from a key for the core network entity (e.g., KAMF/KMME). A key for a base station may be further derived by ME and source base station if/when performing horizontal or vertical key derivation. Keys for UP traffic may comprise: KUPenc which may be a key derived by ME and a base station from key for a base station, which may be used for the protection of UP traffic between ME and a base station with a particular encryption algorithm; KUPint which may be a key derived by ME and a base station from a key for a base station, which may be used for the protection of UP traffic between ME and a base station with a particular integrity algorithm. Keys for RRC signalling may comprise: KRRCint which may be a key derived by ME and a base station from a key for a base station, which may be used for the protection of RRC signalling with a particular integrity algorithm; KRRCenc which may be a key derived by ME and a base station from a key for a base station, which may be used for the protection of RRC signalling with a particular encryption algorithm. Intermediate keys may comprise: next hop parameters (NH) which may be a key derived by ME and a core network entity (e.g., AMF/MME) to provide forward security; KgNB* (or KeNB*) which may be a key derived by ME and a base station if/when performing a horizontal or vertical key derivation.

A primary authentication may enable mutual authentication between the wireless device and the network and provide an anchor key called KSEAF. From KSEAF, a key for a core network entity (e.g., KAMF/KMME) may be created during primary authentication, NAS key re-keying, and/or key refresh events. Based on the key for the core network entity, KNASint and KNASenc may be derived if/when running a successful NAS SMC procedure.

Whenever an initial AS security context needs to be established between a wireless device and a base station, a core network entity (e.g., AMF/MME) and the wireless device may derive a key for a base station (e.g., KgNB/KeNB) and a next hop parameter (NH). The key for a base station and the NH may be derived from the key for a core network entity. A next hop chaining counter (NCC) may be associated with each key for a base station and NH parameter. A key for a base station may be associated with the NCC corresponding to the NH value from which it was derived. At initial setup, the key for a base station may be derived directly from a key for a core network entity, and be then considered to be associated with a virtual NH parameter with NCC value equal to zero. At initial setup, the derived NH value may be associated with the NCC value one. On handovers, the basis for the key for a base station that will be used between the wireless device and the target base station, which may be called KgNB*(or KeNB*), may be derived from either the currently active key for a base station or from the NH parameter. If KgNB*(or KeNB*) may be derived from the currently active key for a base station, this may be referred to as a horizontal key derivation and is indicated to wireless device with an NCC that does not increase. If the KgNB*(or KeNB*) is derived from the NH parameter, the derivation is referred to as a vertical key derivation and is indicated to wireless device with an NCC increase. KRRCint, KRRCenc, KUPint and KUPenc may be derived based on a key for a base station after a new key for a base station is derived.

Based on key derivation, a base station with knowledge of a key for a base station (e.g., a KgNB/KeNB), shared with a wireless device, may be unable to determine/compute any previous KgNB that has been used between the same wireless device and a previous base station, therefore providing backward security. A base station with knowledge of a key for a base station shared with a wireless device, may be unable to predict any future key for a base station that will be used between the same wireless device and another base station after n or more handovers (since NH parameters are only computable by the wireless device and the core network entity (e.g., AMF/MME)).

An AS SMC procedure may be for RRC and UP security algorithms negotiation and RRC security activation. If/when AS security context is to be established in a base station, the AMF (or MME) may send security capabilities of a wireless device to the base station. The base station may choose a ciphering algorithm. The chosen ciphering algorithm may have the highest priority from its configured list and be also present in the security capabilities. The base station may choose an integrity algorithm. The chosen integrity algorithm may have the highest priority from its configured list and be also present in the security capabilities. The chosen algorithms may be indicated to the wireless device in the AS SMC and this message may be integrity protected. RRC downlink ciphering (e.g., encryption) at the base station may start after sending the AS SMC message. RRC uplink deciphering (e.g., decryption) at the base station may start after receiving and successful verification of the integrity protected AS security mode complete message from the wireless device. The wireless device may verify the validity of the AS SMC message from the base station by verifying the integrity of the received message. RRC uplink ciphering (encryption) at the wireless device may start after sending the AS security mode complete message. RRC downlink deciphering (decryption) at the wireless device may start after receiving and successful verification of the AS SMC message. The RRC connection reconfiguration procedure used to add DRBs may be performed only after RRC security has been activated as part of the AS SMC procedure.

A wireless device may support integrity protected DRBs. In case of a failed integrity check (e.g., faulty or missing message authentication code for integrity (MAC-I)), the concerned packet data unit (PDU) may be discarded by a receiving PDCP entity. Key refresh may be possible for a key for a base station (KgNB/KeNB), KRRC-enc, KRRC-int, KUP-enc, and KUP-int and may be initiated by the base station when a PDCP COUNTs are about to be re-used with the same Radio Bearer identity and with the same KgNB. Key re-keying may be possible for the key for a base station (KgNB/KeNB), KRRC-enc, KRRC-int, KUP-enc, and KUP-int and may be initiated by a core network entity (e.g., AMF/MME) when a AS security context different from the currently active one may be activated.

If/when a wireless device transition from an RRC idle state to an RRC connected state, RRC protection keys and UP protection keys may be generated and keys for NAS protection as well as higher layer keys may be assumed to be already available. These higher layer keys may have been established as a result of an authentication and key agreement (AKA) run, or as a result of a transfer from another AMF during handover or idle mode mobility. If/when a wireless device transitions from an RRC connected state to an RRC idle state, a base station may delete the keys it stores for that wireless device such that state information for idle mode wireless devices only has to be maintained in a core network entity (e.g., AMF/MME). A base station may no longer store state information about the corresponding wireless device and delete the current keys from its memory (e.g., when transitioning an RRC connected state to an RRC idle state): the base station and wireless device may delete NH, a key for a base station, KgNB, KRRCint, KRRCenc, KUPint and KUPenc and/or related NCC; the core network entity (e.g., AMF/MME) and wireless device may keep key for a core network entity (e.g., KAMF/KMME), KNASint and KNASenc stored.

On mobility with vertical key derivation, the NH may be bound to the target physical cell identifier (PCI) and its frequency absolute radio frequency channel number-downlink link (ARFCN-DL) before it is taken into use as the key for a base station in the target base station. On mobility with horizontal key derivation, the currently active key for a base station may be bound to the target PCI (PCI of the target cell) and its frequency ARFCN-DL before it is taken into use as the key for a base station in the target base station. In one or both cases, ARFCN-DL may be the absolute frequency of SSB of the target primary cell (PCell). It may be not required to change the AS security algorithms during intra-base station-central unit (CU) handover. If the wireless device does not receive an indication of new AS security algorithms during an intra-base station-CU handover, the wireless device may continue to use the same algorithms as before the handover.

AS security may comprise of the integrity protection and ciphering of RRC signalling (SRBs) and user data (DRBs). The AS may apply four different security keys: one for the integrity protection of RRC signalling (KRRCint), one for the ciphering of RRC signalling (KRRCenc), one for integrity protection of user data (KUPint) and one for the ciphering of user data (KUPenc). The four AS keys may be derived from a key for a base station (e.g., KgNB/KgNB). The key for a base station may be based on a key for a core network entity (KAMF/KMME), which may be handled by upper layers (e.g., NAS layer). The integrity protection and ciphering algorithms may be changed with reconfiguration with sync (e.g., handover command). The AS keys (KgNB, KRRCint, KRRCenc, KUPint and KUPenc) may change upon reconfiguration with sync and upon connection re-establishment and connection resume. For each radio bearer an independent counter (count) may be maintained for each direction. For each radio bearer, the count may be used as input for ciphering and integrity protection.

Paging may allow a base station to reach wireless devices in an RRC idle state and in an RRC inactive state through paging messages, and to notify wireless devices in an RRC idle state, in an RRC inactive state and an RRC connected state of system information change, and earthquake and tsunami warning system (ETWS) or commercial mobile alert service (CMAS) indications through short messages. One or both of paging messages and short messages may be addressed with P-RNTI on PDCCH. The paging messages may be sent via a PCCH. The short message may be sent via a PDCCH directly.

If a wireless device is in an RRC idle state, the wireless device may monitor a paging channels for core network (CN)-initiated paging. If a wireless device is in an RRC inactive state, the wireless device may monitor paging channels for RAN-initiated paging. A wireless device may need not monitor paging channels continuously though. Paging DRX may be defined where the wireless device in an RRC idle state or an RRC inactive state may be only required to monitor paging channels during one paging occasion (PO) per DRX cycle. The Paging DRX cycles may be configured by the network (e.g., a base station or a core network entity (e.g., AMF/MME)): for CN-initiated paging, a default cycle may be broadcast in system information; For CN-initiated paging, a wireless device specific cycle may be configured via an NAS signalling; For RAN-initiated paging, a wireless device-specific cycle may be configured via an RRC signalling; The wireless device may use the shortest of the DRX cycles applicable. For example, a wireless device in an RRC idle state may use the shortest of the first two cycles above. A wireless device in RRC_INACTIVE may use the shortest of the three cycles above.

The POs of a wireless device for CN-initiated and RAN-initiated paging may be based on the same wireless device identity (ID), resulting in overlapping POs for both. The quantity/number of different POs in a DRX cycle may be configurable via system information and a network may distribute wireless devices to those Pos, for example, based on their IDs.

If/when in RRC_CONNECTED, the wireless device may monitor the paging channels in any PO signaled in system information for SI change indication and PWS notification. A wireless device in RRC connected state may only monitor paging channels on the active BWP with common search space configured. For operation with shared spectrum channel access, a wireless device may be configured for an additional quantity/number of PDCCH monitoring occasions in its PO to monitor for paging. If/when the wireless device detects a PDCCH transmission within the wireless device's PO addressed with P-RNTI, the wireless device may not be required to monitor the subsequent PDCCH monitoring occasions within this PO.

A network (e.g., a base station) may initiate a paging procedure by transmitting the paging message during the wireless device's paging occasion. The network may address multiple wireless devices within a paging message by including one paging record for each wireless device. The paging message may comprise a paging record list. The paging record list may comprise one or more paging records. Each paging record may comprise at least one of: a wireless device identity (ID) and access type. The wireless device identity may comprise S-TMSI or I-RNTI (resume identity). The access type may indicate whether the paging message originated due to a PDU sessions from non-3GPP access.

Cell selection may be required on transition from registration management (RM)-DEREGISTERED to RM-REGISTERED, from CM-IDLE to CM-CONNECTED and from CM-CONNECTED to CM-IDLE. the RM DEREGISTERED state, the wireless device may be not registered with the network. The wireless device context in a core network entity (e.g., AMF/MME) may hold no valid location or routing information for the wireless device. The wireless device may be not reachable by the AMF. In the RM REGISTERED state, the wireless device is registered with the network. In the RM-REGISTERED state, the wireless device can receive services that require registration with the network. A wireless device in CM-IDLE state may have no NAS signalling connection established with the core network entity (e.g., AMF/MME) (e.g., over N1/S1 interface). The wireless device may perform cell selection/cell reselection and PLMN selection. A wireless device in CM-CONNECTED state may have a NAS signalling connection with the core network entity (e.g., over N1/S1 interface). A NAS signalling connection may use an RRC connection between the wireless device and a base station (e.g., RAN) and a next generation application protocol (NGAP)/S1AP wireless device association between access network (AN) (e.g., AN of the base station) and the core network entity (e.g., AMF/MME).

Cell selection may be based on following principles. The wireless device NAS layer may identify a selected PLMN and equivalent PLMNs. Cell selection may be based on cell defining SSB (CD-SSBs) located on synchronization raster: A wireless device may search the frequency (NR) bands and for each carrier frequency may identify the strongest cell as per the CD-SSB. The wireless device may then read cell system information broadcast to identify its PLMN(s): The wireless device may search each carrier in turn ("initial cell selection") or make use of stored information to shorten the search ("stored information cell selection"). The wireless device may seek to identify a suitable cell; if the wireless device is not able to identify a suitable cell it seeks to identify an acceptable cell. When a suitable cell is found or if only an acceptable cell is found, the wireless device may camp on that cell and commence the cell reselection procedure: A suitable cell may be one for which the measured cell attributes satisfy the cell selection criteria; the cell PLMN is the selected PLMN, registered or an equivalent PLMN; the cell is not barred or reserved and the cell is not part of a tracking area which is in the list of forbidden tracking areas for roaming; An acceptable cell may be one for which the measured cell attributes satisfy the cell selection criteria and the cell is not barred.

If transitioning (e.g., upon transition) from an RRC connected state or RRC inactive state to an RRC idle state, a wireless device may camp on a cell as result of cell selection according to the frequency be assigned by RRC in the state transition message. The wireless device may attempt to find a suitable cell in the manner described for stored information or initial cell selection above. If no suitable cell is found on any frequency or RAT, the wireless device may attempt to find an acceptable cell. In multi-beam operations, the cell quality may be derived amongst the beams corresponding to the same cell.

A wireless device in an RRC idle may perform cell reselection. Principles of the reselection procedure may comprise the following. Cell reselection may be based on CD-SSBs located on the synchronization raster. The wireless device may make measurements of attributes of the serving and neighbor cells to enable the reselection process: For the search and measurement of inter-frequency neighboring cells, the carrier frequencies may need to be indicated. Cell reselection may identify/indicate the cell that the wireless device should camp on. The cell reselection may be based on cell reselection criteria which involves measurements of the serving and neighbor cells: intra-frequency reselection may be based on ranking of cells; inter-frequency reselection may be based on absolute priorities where a wireless device tries to camp on the highest priority frequency available; an neighbor cell list (NCL) may be provided by a serving cell to handle specific cases for intra- and inter-frequency neighboring cells; black lists may be provided to prevent the wireless device from reselecting to specific intra- and inter-frequency neighboring cells; white lists may be provided to request the wireless device to reselect to only specific intra- and inter-frequency neighboring cells; cell reselection may be speed dependent; service specific prioritization. In multi-beam operations, the cell quality may be derived amongst the beams corresponding to the same cell.

A wireless device may perform one of two procedures such as initial cell selection and cell selection by leveraging stored information. The wireless device may perform the initial cell selection when the wireless device does not have stored cell information for the selected PLMN. Otherwise, the wireless device may perform the cell selection by leveraging stored information. For initial cell selection, a wireless device may scan all RF channels in the (NR) frequency bands according to its capabilities to find a suitable cell. Based on results of the scan, the wireless device may search for the strongest cell on each frequency. The wireless device may select a cell which is a suitable cell.

For the cell selection by leveraging stored information, the wireless device may require stored information of frequencies and optionally also information on cell parameters from previously received measurement control information elements or from previously detected cells. Based on the stored information, the wireless device may search a suitable cell and select the suitable cell if the wireless device found the suitable cell. If the wireless device does not find the suitable cell, the wireless device may perform the initial cell selection.

A base station may configure cell selection criteria for cell selection. A wireless device may seek to identify a suitable cell for the cell selection. The suitable cell may be one for which satisfies following conditions: (1) the measured cell attributes satisfy the cell selection criteria, (2) the cell PLMN is the selected PLMN, registered or an equivalent PLMN, (3) the cell is not barred or reserved, and (4) the cell is not part of tracking area which is in the list of forbidden tracking areas for roaming. An RRC layer in a wireless device may inform a NAS layer in the wireless device of cell selection and reselection result based on changes in received system information relevant for NAS. For example, the cell selection and reselection result may be a cell identity, tracking area code and a PLMN identity.

A wireless device-RRC layer may initiate an RRC connection establishment procedure, an RRC connection resume procedure, or an RRC connection re-establishment procedure. Based on initiating the RRC connection establishment procedure or the RRC connection resume procedure, the wireless device may perform one or more procedures where the one or more procedures comprise at least one of: performing a unified access control procedure (e.g., access barring check) for access attempt of the RRC establishment/resume procedure on a serving cell; applying default configurations parameters and configurations/parameters provided by SIB1, (e.g., based on the access attempt being allowed, applying default configurations and configurations/parameters provided by SIB1); performing sending a random access preamble to the serving cell, for example, based on the access attempt being allowed; sending an RRC request message to the serving cell (e.g., based on determining a reception of a random access response being successful, sending an RRC request message to the serving cell0; starting a timer based on sending the RRC request message; receiving an RRC response message or an RRC reject message from the serving cell (e.g., in response to the RRC request message); and/or sending an RRC complete message (e.g., in response to receiving the RRC response message, sending an RRC complete message). For the RRC connection re-establishment procedure, the wireless device may not perform the unified access procedure (e.g., access barring check) for access attempt of the RRC reestablishment procedure.

A base station (e.g., NG-RAN) may support overload and access control functionality such as RACH back off, RRC Connection Reject, RRC Connection Release and wireless device based access barring mechanisms. Unified access control framework applies to all wireless device states (e.g., an RRC idle, inactive and connected state). The base station may broadcast barring control information associated with access categories and access identities (in case of network sharing, the barring control information may be set individually for each PLMN). The wireless device may determine whether an access attempt is authorized based on the barring information broadcast for the selected PLMN, the selected access category and access identities for the access attempt. For NAS triggered requests, the wireless device- NAS layer may determine the access category and access identities. For AS triggered requests, the wireless device-RRC layer may determine the access category and NAS may determine the access identities. The base station may handle access attempts with establishment causes such as "emergency", "mps-priority access" and "mcs priority access" (e.g., emergency calls, MPS, MCS subscribers) with high priority and respond with RRC Reject to these access attempts only in extreme network load conditions that may threaten the base station stability.

Based on initiating the RRC connection establishment procedure or the RRC connection resume procedure, the wireless device in an RRC inactive or idle state may perform or initiate access barring check (or a unified access control procedure) for access attempt of the RRC connection establishment procedure or the RRC connection resume procedure. Based on the performing or initiating the access barring check, the wireless device may determine the access category and access identities for access attempt. The wireless device may determine the access attempt being barred based on at least one of: timer T309 is running for the access category for the access attempt; and timer T302 is running, and the Access Category is neither '2' nor '0'. The wireless device may determine the access attempt being allowed based on at least one of: the access Category is '0'; and system information block (system information block type 25) comprising unified access control (UAC) barring parameters is not broadcasted by a serving cell. The wireless device may determine the access attempt being barred based on at least one of: an establishment cause (e.g., for the access attempt) being other than emergency; access barring per RSRP parameter of the system information block comprising (or being set to) threshold 0 and the wireless device being in enhanced coverage; access barring per RSRP parameter of the system information block comprising (or being set to) threshold 1 and measured RSRP being less than a first entry in RSRP thresholds PRACH info list; the access barring per RSRP parameter of the system information block comprising (or being set to) threshold 2 and measured RSRP being less than a second entry in the RSRP thresholds PRACH info list; and the access barring per RSRP parameter of the system information block comprising (or being set to) threshold 3 and measured RSRP being less than a third entry in the RSRP thresholds PRACH info list.

The wireless device may determine the access attempt being allowed based on that system information block not comprising the UAC barring parameters for the access attempt. For example, the wireless device may determine the access attempt being allowed based on that system information block not comprising the UAC barring parameters for PLMN the wireless device selected and UAC barring parameters for common. The wireless device may determine the access attempt being allowed based on the UAC barring parameters for common not comprising the access category of the access attempt. The UAC barring parameters may comprise at least one of: UAC barring parameters per PLMN; and UAC barring parameters for common. The wireless device may perform access barring check for the access category of the access attempt based on the UAC barring parameters in the system information block. The wireless device may determine the access attempt being allowed based on corresponding bit of at least one of the access identities in the UAC barring parameters being zero. The wireless device may draw a first random number uniformly distributed in a range where the range is greater than equal to 0 and lower than 1.

The wireless device may determine the access attempt being allowed based on the first random number being lower than UAC barring factor in the UAC barring parameters. The wireless device may determine the access attempt being barred based on the first random number being greater than the UAC barring factor in the UAC barring parameters. In response to the determining the access attempt being barred, the wireless device may draw a second random number uniformly distributed in a range where the range is greater than equal to 0 and lower than 1. The wireless device may start barring timer T309 for the access category based on the second random number. When the barring timer T309 is running, the access attempt associated to the access category is barred (e.g., not allowed to transmit). Based on the barring timer T309 expiry, the wireless device may consider barring for the access category being alleviated. Based on the barring for the access category being alleviated, the wireless device may perform access barring check for the access category if the wireless device has access attempt for the access category.

Based on initiating the RRC connection reestablishment procedure, the wireless device may stop one or more barring timer T309 for all access categories if the one or more barring timer T309 is running. Based on stopping the one or more barring timer T309, the wireless device may determine barring for all access categories being alleviated. The wireless device may perform the RRC connection reestablishment procedure based on the barring for all access categories being alleviated. For example, the wireless device may send an RRC establishment request without barring based on the barring for all access categories being alleviated.

For initiating RRC connection establishment/resume/reestablishment procedure, the wireless device-RRC layer may use parameters in a received SIB1. The wireless device-RRC layer may use L1 parameter values and a time alignment timer in the SIB1. The wireless device-RRC layer may use UAC barring information in the SIB1 to perform the unified access control procedure. Based on the unified access control procedure, the wireless device-RRC layer may determine whether the access attempt of those RRC procedures is barred or allowed. Based on the determining the access attempt is allowed, the wireless device-RRC layer may determine send an RRC request message to a base station where the RRC request message may be an RRC setup request message, an RRC resume request message, or an RRC re-establishment message. The wireless device-NAS layer may or may not provide S-TMSI as a wireless device identity. The wireless device-RRC layer may set a wireless device identity in the RRC request message.

For the RRC setup request message, the wireless device in an RRC idle state may initiate an RRC connection establishment procedure. Based on initiating the RRC connection establishment procedure, the wireless device-RRC layer in an RRC idle state may set the wireless device identity to S-TMSI if the wireless device-NAS layer provides the S-TMSI. Otherwise, the wireless device-RRC layer in an RRC idle state may draw a 39-bit random value and set the wireless device identity to the random value. For the RRC resume request message, the wireless device-RRC layer in an RRC inactive or idle state may set the wireless device identity to resume identity stored. For the RRC reestablishment request message, the wireless device-RRC layer in an RRC connected state may set the wireless device identity to C-RNTI used in the source PCell. The wireless device-NAS layer may provide an establishment cause (e.g., wireless device-NAS layer). The wireless device-RRC layer may set the establishment cause for the RRC request message.

For the RRC resume request message, the wireless device in an RRC inactive may initiate an RRC connection resume procedure. the wireless device in an RRC idle state with a suspended RRC connection may initiate the RRC connection resume procedure. The wireless device may in an RRC inactive state or an RRC idle state may initiate the RRC connection procedure based on at least one of: resuming a (suspend) RRC connection; and performing/initiating UP small data transmission. Based on initiating the RRC connection resume procedure, the wireless device-RRC layer may restore stored configuration parameters and stored security keys from the stored wireless device inactive AS context. Based on the security keys, the wireless device-RRC layer in an RRC inactive or idle state may set a resume MAC-I value to the 16 least significant bits of the MAC-I calculated based on variable resume MAC input, security key of integrity protection for RRC layer in a wireless device inactive AS context, the previous configured integrity protection algorithm, and other security parameters (e.g., count, bearer, and direction). The variable resume MAC input may comprise at least one of: physical cell identity of a source cell; C-RNTI of the source cell; and cell identity of a target cell (e.g., a selected cell) where the cell identity is a cell identity in system information block (e.g., SIB1) of the target cell (e.g., the selected cell). Based on the security keys and next hop chaining count (NCC) value, the wireless device-RRC layer in an RRC inactive or idle state derive new security keys for integrity protection and ciphering, and configure lower layers (e.g., wireless device-PDCP layer) to apply them. The wireless device may have a stored NCC value and resume identity. The wireless device may receive an RRC release message with suspend indication (or suspend configuration parameters) where the RRC release message comprises at least one of: the resume identity; and the NCC value. The wireless device-RRC layer in an RRC inactive or idle state may re-establish PDCP entities for one or more bearers. The wireless device-RRC layer may resume one or more bearer. For example, based on resuming the RRC connection, the wireless device-RRC layer may resume SRB1. Based on performing the UP small data transmission, the wireless device-RRC layer may resume one or more SRB(s) and DRB(s). The wireless device-RRC layer in the RRC inactive or idle state may send an RRC resume request message to the base station where the RRC resume request message may comprise at least one of: the resume identity; the resume MAC-I; and resume cause.

For the RRC reestablishment request message, the wireless device in an RRC connected state may initiate an RRC connection reestablishment procedure. Based on initiating the RRC connection reestablishment procedure, the wireless device-RRC layer in an RRC connected state may contain the physical cell identity of the source PCell and a short MAC-I in the RRC reestablishment message. The wireless device-RRC layer in an RRC connected state may set the short MAC-I to the 16 east significant bits of the MAC-I calculated based on variable short MAC input, security key of integrity protection for RRC layer and the integrity protection algorithm, which was used in a source PCell or the PCell in which the trigger for the reestablishment occurred, and other security parameters (e.g., count, bearer and direction). The variable short MAC input may comprise at least one of: physical cell identity of the source cell; C-RNTI of a source cell; and cell identity of a target cell (e.g., a selected cell) where the cell identity is a cell identity in system information block (e.g., SIB1) of the target cell (e.g., the selected cell). The wireless device-RRC layer in an RRC connected state may re-establish PDCP entities and RLC entities for SRB1 and apply default SRB1 configuration parameters for SRB1. The wireless device-RRC layer in an RRC connected state may configure lower layers (e.g., PDCP layer) to suspend integrity protection and ciphering for SRB1 and resume SRB1.

A wireless device-RRC layer may send an RRC request message to lower layers (e.g., PDCP layer, RLC layer, MAC layer and/or PHY layer) for transmission where the RRC request message may be an RRC setup request message, an RRC resume request message, or an RRC re-establishment message.

A wireless device-RRC layer may receive an RRC setup message in response to an RRC resume request message or an RRC reestablishment request message. Based on the RRC setup message, the wireless device-RRC layer may discard any stored AS context, suspend configuration parameters and current AS security context. The wireless device-RRC layer may release radio resources for all established RBs except SRB0, including release of the RLC entities, of the associated PDCP entities and of SDAP. The wireless device-RRC layer may release the RRC configuration except for default L1 parameter values, default MAC cell group configuration and CCCH configuration. The wireless device-RRC layer may indicate to upper layers (e.g., NAS layer) fallback of the RRC connection. The wireless device-RRC layer may stop timer T380 if running where the timer T380 is periodic RAN-based Notification Area (RNA) update timer.

A wireless device-RRC layer may receive an RRC setup message in response to an RRC setup request message, an RRC resume request message or an RRC reestablishment request message. The RRC setup message may comprise a cell group configurations parameters and a radio bearer configuration parameter. The radio bearer configuration parameters may comprise at least one of signaling bearer configuration parameters, data radio bearer configuration parameters and/or security configuration parameters. The security configuration parameters may comprise security algorithm configuration parameters and key to use indication indicating whether the radio bearer configuration parameters are using master key or secondary key. The signaling radio bearer configuration parameters may comprise one or more signaling radio bearer configuration parameters. Each signaling radio configuration parameters may comprise at least one of SRB identity, PDCP configuration parameters, reestablish PDCP indication and/or discard PDCP indication. The data radio bearer configuration parameters may comprise one or more data radio bearer configuration parameters. Each data radio configuration parameters may comprise at least one of DRB identity, PDCP configuration parameters, SDAP configuration parameters, reestablish PDCP indication and/or recover PDCP indication. The radio bearer configuration in the RRC setup message may comprise signaling radio configuration parameters for SIB1. Based on the RRC setup message, the wireless device-RRC layer may establish SRB1. Based on the RRC setup message, the wireless device-RRC layer may perform a cell group configuration or radio bearer configuration. The wireless device-RRC layer may stop a barring timer and wait timer for the cell sending the RRC setup message. Based on receiving the RRC setup message, the wireless device-RRC layer may perform one or more of the following: transitioning to RRC connected state; stopping a cell re-selection procedure; considering the current cell sending the RRC setup message to be the PCell; or/and sending an RRC setup complete message by setting the content of the RRC setup complete message.

A wireless device-RRC layer may receive an RRC resume message in response to an RRC resume request message. Based on the RRC resume message, the wireless device-RRC layer may discard a wireless device inactive AS context and release a suspend configuration parameters except RNA notification area information. The RRC resume message may comprise at least one of: radio bearer configuration parameters; cell group configuration parameters; measurement configuration parameters; sk counter for AS security; an first indication to request idle/inactive measurement results; an second indication to restore secondary cells (SCells) of master cell group (MCG); a third indication to restore secondary cell group (SCG); and SCG configuration parameters; Based on the RRC resume message, the wireless device-RRC layer may perform a procedure to configure or restore configuration parameters (e.g., a cell group configuration, a radio bearer configuration and/or SCG configuration); security key update procedure; and/or measurement (configuration) procedure. Based on receiving the RRC resume message, the wireless device-RRC layer may perform one or more of the following: indicating upper layers (e.g., NAS layer) that the suspended RRC connection has been resumed; resuming SRB2, all DRBs and measurements; entering RRC connected state; stopping a cell re-selection procedure; considering the current cell sending the RRC resume message to be the PCell; or/and sending an RRC resume complete message by setting the content of the RRC resume complete message.

Cell group configuration parameters may be used to configure a master cell group (MCG) or secondary cell group (SCG). If the cell group configuration parameters are used to configure the MCG, the cell group configuration parameters are master cell group configuration parameters. If the cell group configuration parameters are used to configure the SCG, the cell group configuration parameters are secondary cell group configuration parameters. A cell group comprises of one MAC entity, a set of logical channels with associated RLC entities and of a primary cell (SpCell) and one or more secondary cells (SCells). The cell group configuration parameters (e.g., master cell group configuration parameters or secondary cell group configuration parameters) may comprise at least one of RLC bearer configuration parameters for the cell group, MAC cell group configuration parameters for the cell group, physical cell group configuration parameters for the cell group, SpCell configuration parameters for the cell group or SCell configuration parameters for the cell group. The MAC cell group configuration parameters may comprise MAC parameters for a cell group where the MAC parameters may comprise at least DRX parameters. The physical cell group configuration parameters may comprise cell group specific L1 (layer 1) parameters.

The special cell (SpCell) may comprise a primary cell (PCell) of an MCG or a primary SCG cell (PSCell) of a SCG. The SpCell configuration parameters may comprise serving cell specific MAC and PHY parameters for a SpCell. The MR-DC configuration parameters may comprise at least one of SRB3 configuration parameters, measurement configuration parameter for SCG, SCG configuration parameters.

Cell group configuration parameters may comprise at least one of RLC bearer configuration parameters, MAC cell group configuration parameters, physical cell group configuration parameters, SpCell configuration parameters for the first cell group or SCell configuration parameters for other cells of the second base station. The SpCell configuration parameter may comprise at least one of radio link failure timer and constraints, radio link monitoring in sync out of sync threshold, and/or serving cell configuration parameters of the first cell. The serving cell configuration parameters may comprise at least one of: downlink BWP configuration parameters; uplink configuration parameters; uplink configuration parameters for supplement uplink carrier (SUL); PDCCH parameters applicable across for all BWPs of a serving cell; PDSCH parameters applicable across for all BWPs of a serving cell; CSI measurement configuration parameters; SCell deactivation timer; cross carrier scheduling configuration parameters for a serving cell; timing advance group (TAG) identity (ID) of a serving cell; path loss reference linking indicating whether the wireless device shall apply as pathloss reference either the downlink of SpCell or SCell for this uplink; serving cell measurement configuration parameters; and/or channel access configuration parameters for access procedures of operation with shared spectrum channel access. The CSI measurement configuration parameters may be to configure CSI-RS (reference signals) belonging to the serving cell, channel state information report to configure CSI-RS (reference signals) belonging to the serving cell and channel state information reports on PUSCH triggered by DCI received on the serving cell.

Downlink BWP configuration parameters may be used to configure dedicated (wireless device specific) parameters of one or more downlink BWPs. The one or more downlink BWPs may comprise at least one of an initial downlink BWP, a default downlink BWP and a first active downlink BWP. The downlink BWP configuration parameters may comprise at least one of: configuration parameters for the one or more downlink BWPs; one or more downlink BWP IDs for the one or more downlink BWPs; and BWP inactivity timer. The configuration parameters for a downlink BWP may comprise at least one of: PDCCH configuration parameters for the downlink BWP; PDSCH configuration parameters for the downlink BWP; semi-persistent scheduling (SPS) configuration parameters for the downlink BWP; beam failure recovery SCell configuration parameters of candidate RS; and/or radio link monitoring configuration parameters for detecting cell- and beam radio link failure occasions for the downlink BWP. The one or more downlink BWP IDs may comprise at least one of an initial downlink BWP ID, a default downlink BWP identity (ID) and a first active downlink BWP ID.

Uplink configuration parameters may be uplink configuration parameters for normal uplink carrier (not supplementary uplink carrier). The uplink configuration parameters (or the uplink configuration parameters for SUL) may be used to configure dedicated (wireless device specific) parameters of one or more uplink BWPs. The one or more uplink BWPs may comprise at least one of an initial uplink BWP and a first active uplink BWP. The uplink BWP configuration parameters may comprise at least one of: configuration parameters for the one or more uplink BWPs; one or more uplink BWP IDs for the one or more uplink BWPs; PUSCH parameters common across the wireless device's BWPs of a serving cell; SRS carrier switching information; and power control configuration parameters. The configuration parameters for a uplink BWP may comprise at least one of: one or more PUCCH configuration parameters for the uplink BWP; PUSCH configuration parameters for the uplink BWP; one or more configured uplink grant configuration parameters for the uplink BWP; SRS configuration parameters for the uplink BWP; beam failure recovery configuration parameters for the uplink BWP; and/or cyclic prefix (CP) extension parameters for the uplink BWP.

The one or more uplink BWP IDs may comprise at least one of an initial uplink BWP ID (e.g., the initial uplink BWP ID=0) and/or an first active uplink BWP ID. The SRS carrier switching information may be is used to configure for SRS carrier switching when PUSCH is not configured and independent SRS power control from that of PUSCH. The power control configuration parameters may comprise at least one of power control configuration parameters for PUSCH, power configuration control parameters for PUCCH and power control parameters for SRS.

A wireless device-RRC layer in an RRC inactive or idle state may receive an RRC reject message in response to an RRC setup request message or an RRC resume request message. The RRC reject message may contain wait timer. Based on the wait timer, the wireless device-RRC layer may start timer T302, with the timer value set to the wait timer. Based on the RRC reject message, the wireless device-RRC layer may inform upper layers (e.g., wireless device-NAS layer) about the failure to setup an RRC connection or resume an RRC connection. The wireless device-RRC layer may reset MAC and release the default MAC cell group configuration. Based on the RRC Reject received in response to a request from upper layers, the wireless device-RRC layer may inform the upper layer (e.g., NAS layer) that access barring is applicable for all access categories except categories '0' and '2'.

A wireless device-RRC layer in an RRC inactive or idle state may receive an RRC reject message in response to an RRC resume request message. Based on the RRC reject message, The wireless device-RRC layer may discard current security keys. The wireless device-RRC layer may re-suspend the RRC connection. The wireless device-RRC layer may set pending RNA update value to true if resume is triggered due to an RNA update.

A wireless device-RRC layer in an RRC inactive or idle state may perform a cell (re)selection procedure if/while performing an RRC procedure to establish an RRC connection. Based on cell selection or cell reselection, the wireless device-RRC layer may change a cell on the wireless device camped and stop the RRC procedure. The wireless device-RRC layer may inform upper layers (e.g., NAS layer) about the failure of the RRC procedure.

A wireless device in an RRC connected state may detect a failure of a connection with a base station. The wireless device in the RRC connected state may activate AS security with the base station before the detecting the failure. The failure comprises at least one of: a radio link failure (RLF); a reconfiguration with sync failure; a mobility failure from new radio (NR); an integrity check failure indication from lower layers (e.g., PDCP layer) concerning signaling radio bearer 1 (SRB1) or signaling radio bearer 2 (SRB2); or an RRC connection reconfiguration failure.

The radio link failure may be a radio link failure of a primary cell of the base station. The base station may send a reconfiguration with sync in an RRC message to the wireless device in RRC connected state. The reconfiguration with sync may comprise a reconfiguration timer (e.g., T304). Based on receiving the reconfiguration sync, the wireless device may start the reconfiguration timer and perform the reconfiguration with sync (e.g., handover). Based on expiry of the reconfiguration timer, the wireless device determine the reconfiguration sync failure. A base station may send mobility from NR command message to the wireless device in RRC connected state. Based on receiving the mobility from NR command message, the wireless device may perform to handover from NR to a cell using other RAT (e.g., E-UTRA). The wireless device may determine the mobility failure from NR based on at least one of conditions being met: if the wireless device does not succeed in establishing the connection to the target radio access technology; or if the wireless device is unable to comply with any part of the configuration included in the mobility from NR command message; or if there is a protocol error in the inter RAT information included in the mobility from NR message.

Based on detecting the failure, the wireless device in the RRC connected state may initiate an RRC connection reestablishment procedure. Based on initiating the RRC connection reestablishment procedure, the wireless device may start a timer T311, suspend all radio bearers except for SRB0, reset MAC (layer). Based on initiating the RRC connection reestablishment procedure, the wireless device in the RRC connected state may release MCG SCells, release special cell (SpCell) configuration parameters and multi-radio dual connectivity (MR-DC) related configuration parameters. For example, based on initiating the RRC connection reestablishment procedure, the wireless device may release master cell group configuration parameters.

Based on initiating the RRC connection reestablishment procedure, the wireless device in the RRC connected state may perform a cell selection procedure. Based on the cell selection procedure, the wireless device may select a cell based on a signal quality of the cell exceeding a threshold. The wireless device in the RRC connected state may select a cell based on a signal quality of the cell exceeding a threshold. The wireless device may determine, based on a cell selection procedure, the selected cell exceeding the threshold. The signal quality comprises at least one of: a reference signal received power; a received signal strength indicator; a reference signal received quality; or a signal to interference plus noise ratio.

Based on selecting a suitable cell, the wireless device in the RRC connected state may stop the timer 311 and start a timer T301. Based on selecting the suitable cell, the wireless device in the RRC connected state may stop a barring timer T390 for all access categories. Based on stopping the barring timer T390, the wireless device in the RRC connected state may consider a barring for all access category to be alleviated for the cell. Based on selecting the cell, the wireless device in the RRC connected state may apply the default L1 parameter values except for the parameters provided in SIB1, apply the default MAC cell group configuration, apply the CCCH configuration, apply a timer alignment timer in SIB1 and initiate transmission of the RRC reestablishment request message.

The wireless device in the RRC connected state may stop the timer T301 based on reception of an RRC response message in response of the RRC reestablishment request message. The RRC response message may comprise at least one of RRC reestablishment message or RRC setup message or RRC reestablishment reject message. The wireless device in the RRC connected state may stop the timer T301 when the selected cell becomes unsuitable.

Based on the cell selection procedure triggered by initiating the RRC connection reestablishment procedure, the wireless device in the RRC connected state may select an inter-RAT cell. Based on selecting an inter-RAT cell, the wireless device (wireless device-AS layer) in the RRC connected state may transition to RRC IDLE state and may provide a release cause 'RRC connection failure' to upper layers (wireless device-NAS layer) of the wireless device.

Based on initiating the transmission of the RRC reestablishment request message, the wireless device in the RRC connected state may send the RRC reestablishment request message. The RRC reestablishment request message may comprise at least one of C-RNTI used in the source PCell, a physical cell identity (PCI) of the source PCell, short MAC-I or a reestablishment cause. The reestablishment cause may comprise at least one of reconfiguration failure, handover failure or other failure.

Based on initiating the transmission of the RRC reestablishment request message, the wireless device (RRC layer) in the RRC connected state may re-establish PDCP for SRB1, re-establish RLC for SRB1, apply default SRB configurations for SRB1, configure lower layers (PDCP layer) to suspend integrity protection and ciphering for SRB1, resume SRB1 and submit the RRC reestablishment request message to lower layers (PDCP layer) for transmission. Based on submitting the RRC reestablishment request message to lower layers, the wireless device in the RRC connected state may send the RRC reestablishment request message to a target base station via the cell selected based on the cell selection procedure wherein the target base station may or may not be the source base station.

Based on expiry of the timer T311 or T301, the wireless device (wireless device-AS layer) may transition to an RRC idle state and may provide a release cause 'RRC connection failure' to upper layers (wireless device-NAS layer) of the wireless device.

Based on receiving the release cause 'RRC connection failure', the wireless device (wireless device-NAS layer) in the RRC idle state may perform a NAS signaling connection recovery procedure when the wireless device does not have signaling pending and user data pending. Based on performing the NAS signaling connection recovery procedure, the wireless device in the RRC idle state may initiate the registration procedure by sending a registration request message to the AMF.

Based on receiving the release cause 'RRC connection failure', the wireless device (wireless device-NAS layer) in the RRC idle state may perform a service request procedure by sending a service request message to the AMF when the wireless device has signaling pending or user data pending.

Based on receiving the RRC reestablishment request message, the target base station may check whether the wireless device context of the wireless device is locally available. Based on the wireless device context being not locally available, the target base station may perform a retrieve wireless device context procedure by sending a retrieve wireless device context request message to the source base station (the last serving base station) of the wireless device.

For RRC connection reestablishment procedure, the retrieve wireless device context request message may comprise at least one of: a wireless device context ID; integrity protection parameters; or a new cell identifier. The wireless device context ID may comprise at least one of: C-RNTI contained the RRC reestablishment request message; and a PCI of the source PCell (the last serving PCell). The integrity protection parameters for the RRC reestablishment procedure may be the short MAC-I. The new cell identifier may be an identifier of the target cell where the target cell is a cell where the RRC connection has been requested to be re-established. The new cell identifier is a cell identity in system information block (e.g., SIB1) of the target cell (e.g., the selected cell).

For the RRC connection reestablishment procedure, based on receiving the retrieve wireless device context request message, the source base station may check the retrieve wireless device context request message. If the source base station is able to identify the wireless device context by means of the wireless device context ID, and to successfully verify the wireless device by means of the integrity protection contained in the retrieve wireless device context request message, and decides to provide the wireless device context to the target base station, the source base station may respond to the target base station with a retrieve wireless device context response message. If the source base station is not able to identify the wireless device context by means of the wireless device context ID, or if the integrity protection contained in the retrieve wireless device context request message is not valid, the source base station may respond to the target base station with a retrieve wireless device context failure message.

For the RRC connection reestablishment procedure, the retrieve wireless device context response message may comprise at least one of Xn application protocol (XnAP) ID of the target base station, XnAP ID of the source base station, globally unique AMF identifier (GUAMI) or wireless device context information (e.g., UE context information retrieve UE context response). The wireless device context information may comprise at least one of a NG-C wireless device associated signaling reference, wireless device security capabilities, AS security information, wireless device aggregate maximum bit rate, PDU session to be setup list, RRC context, mobility restriction list or index to RAT/frequency selection priority. The NG-C wireless device associated signaling reference may be a NG application protocol ID allocated at the AMF of the wireless device on the NG-C connection with the source base station. The AS security information may comprise a security key of a base station (KgNB) and next hop chaining count (NCC) value. The PDU session to be setup list may comprise PDU session resource related information used at wireless device context in the source base station. The PDU session resource related information may comprise a PDU session ID, a PDU session resource aggregate maximum bitrate, a security indication, a PDU session type or QoS flows to be setup list. The security indication may comprise a user plane integrity protection indication and confidentiality protection indication which indicates the requirements on user plane (UP) integrity protection and ciphering for the corresponding PDU session, respectively. The security indication may comprise at least one of an indication whether UP integrity protection is applied for the PDU session, an indication whether UP ciphering is applied for the PDU session, and the maximum integrity protected data rate values (uplink and downlink) per wireless device for integrity protected DRBs. The PDU session type may indicate at least one of internet protocol version 4 (IPv4), IPv6, IPv4v6, ethernet or unstructured. The QoS flow to be setup list may comprise at least one of QoS flow identifier, QoS flow level QoS parameters (the QoS Parameters to be applied to a QoS flow) or bearer identity.

For the RRC connection reestablishment procedure, the retrieve wireless device context failure message may comprise at least XnAP ID of the target base station and a cause value. For the RRC connection reestablishment procedure, based on receiving the retrieve wireless device context response message, the target base station may send an RRC reestablishment message to the wireless device. The RRC reestablishment message may comprise at least a network hop chaining count (NCC) value.

Based on receiving the RRC reestablishment message, the wireless device may derive a new security key of a base station (KgNB) based on at least one of current KgNB or next hop (NH) parameters associated to the NCC value. Based on the new security key of the base station and a previously configured integrity protection algorithm, the wireless device may derive a security key for integrity protection of an RRC signaling (KRRCint) and a security key for integrity protection of user plane (UP) data (KUPint). Based on the new security key of the base station and a previously configured ciphering algorithm, the wireless device may derive a security key for ciphering of an RRC signaling (KRRCenc) and a security key for ciphering of user plane (UP) data (KUPenc). Based on the KRRCint, and the previously configured integrity protection algorithm, the wireless device may verify the integrity protection of the RRC reestablishment message. Based on the verifying being failed, the wireless device (wireless device-AS layer) may transition to RRC IDLE state and may provide a release cause 'RRC connection failure' to upper layers (wireless device-NAS layer) of the wireless device. Based on the verifying being successful, the wireless device may configure to resume integrity protection for SRB1 based on the previously configured integrity protection algorithm and the KRRCint and configure to resume ciphering for SRB1 based on the previously configured ciphering algorithm and KRRCenc. The wireless device may send an RRC reestablishment complete message to the target base station.

Based on receiving the retrieve wireless device context failure message, the target base station may send an RRC release message to the wireless device. For example, based on the retrieve wireless device context failure message comprising the RRC release message, the target base station may send the RRC release message to the wireless device. Based on receiving the retrieve wireless device context failure message, the target base station may send an RRC setup message or an RRC reject message. Based on receiving the retrieve wireless device context failure message, the target base station may not send any response message to the wireless device.

Figure 17:
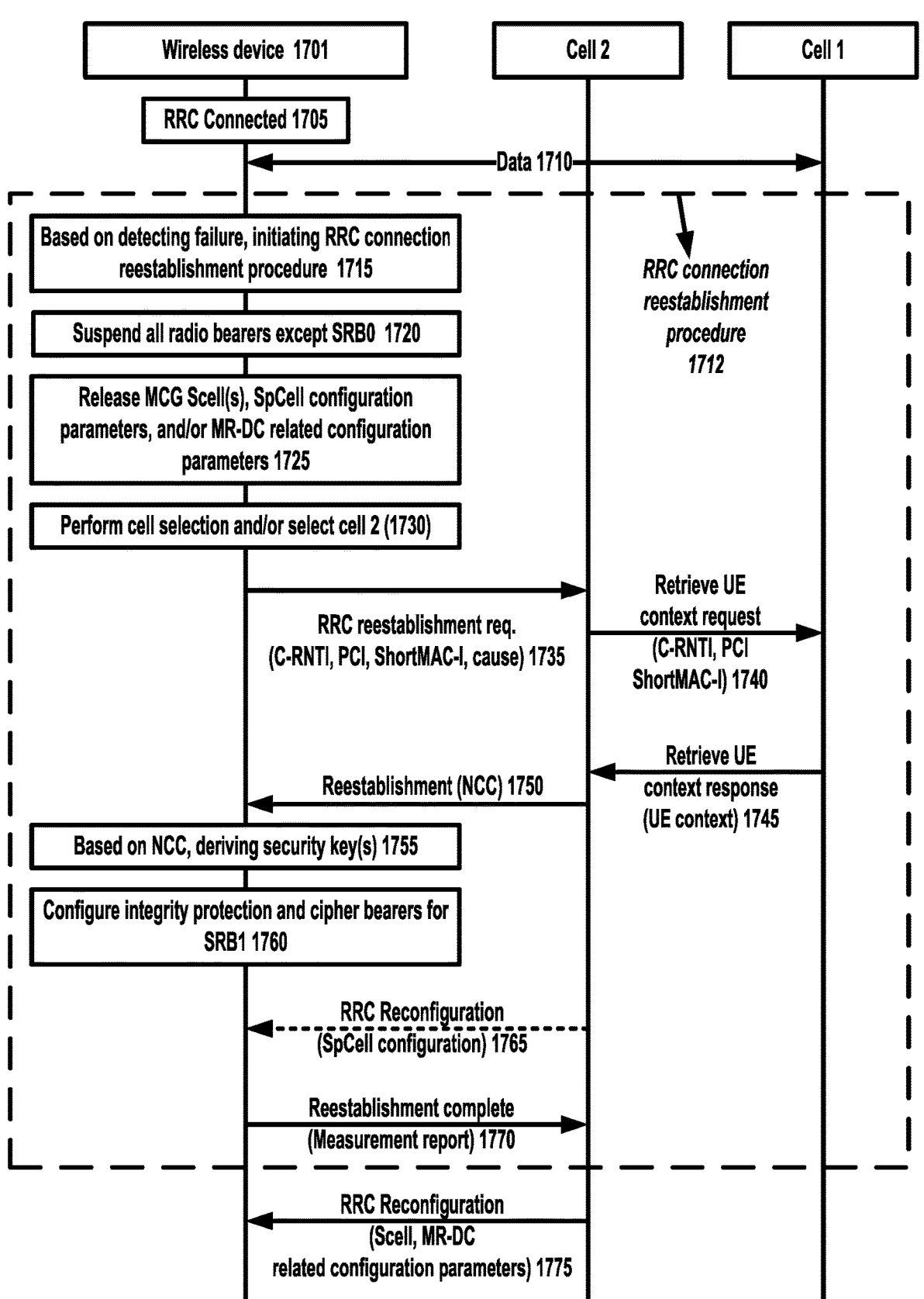
FIG. 17 shows an example of an RRC connection reestablishment procedure.

FIG. 17 shows an example of an RRC connection reestablishment procedure. The RRC connection reestablishment procedure may comprise steps shown with respect to label 1712. A wireless device 1701 in an RRC connected state (1705) may send and/or receive data (1710) to/from a first base station (for example, a source base station) via one or more cells (e.g., Cell2 and/or Cell 1) where the one or more cells may comprise a primary cell (PCell) of the first base station. The wireless device may detect a failure of a connection with the first base station. Based on the failure, the wireless device may initiate the RRC reestablishment procedure (1715).

In an example of the FIG. 17, based on initiating the RRC connection reestablishment procedure, the wireless device may start a timer T311, suspend all radio bearers except for SRB0 (1720), and/or reset a MAC (layer). Based on initiating the RRC connection reestablishment procedure, the wireless device may release MCG SCells, release the special cell (SpCell) configuration parameters and the multi-radio dual connectivity (MR-DC) related configuration parameters (1725). Based on initiating the RRC connection reestablishment procedure, the wireless device may perform a cell selection procedure (1730). Based on the cell selection procedure, the wireless device may select a cell 2 of a second base station (for example, a target base station) where the cell 2 is a suitable cell (1730). Based on selecting a suitable cell, the wireless device may stop the timer T311 and start a timer T301. Based on selecting the suitable cell, the wireless device may stop one or more barring timer T309(s) for all access categories if the one or more barring timer T309(s) is running. Based on stopping the one or more barring timer T309(s), the wireless device may consider barring for all access category to be alleviated for the cell. Based on selecting the cell, the wireless device may apply the default L1 parameter values except for the parameters provided in SIB1, apply the default MAC cell group configuration, apply the CCCH configuration, apply a timer alignment timer in SIB1 and initiate transmission of the RRC reestablishment request message.

In an example of the FIG. 17, the RRC reestablishment message may comprise at least one of C-RNTI used in the source PCell (e.g., the cell 1), a physical cell identity (PCI) of the source PCell, short MAC-I or a reestablishment cause. Based on initiating the transmission of the RRC reestablishment request message, the wireless device (RRC layer) may re-establish PDCP for SRB1, re-establish RLC for SRB1, apply default SRB configurations for SRB1, configure lower layers (PDCP layer) to suspend integrity protection and ciphering for SRB1, resume SRB1, and/or submit the RRC reestablishment request message to lower layers (PDCP layer) for transmission. Based on initiating the transmission of the RRC reestablishment request message, the wireless device may send the RRC reestablishment request message to the second base station via the cell 2 (1735).

In an example of the FIG. 17, based on receiving the RRC reestablishment request message, the second base station may check whether the wireless device context of the wireless device is locally available. Based on the wireless device context being not locally available, the second base station may perform the retrieve wireless device context procedure by sending a retrieve wireless device context request message to the source base station of the wireless device (1740). the retrieve wireless device context request message may comprise at least one of: a wireless device context ID; integrity protection parameters; or a new cell identifier. The wireless device context ID may comprise at least one of: C-RNTI contained the RRC reestablishment request message; and a PCI of the source PCell (the last serving PCell). The integrity protection parameters for the RRC reestablishment procedure may be the short MAC-I. The new cell identifier may be an identifier of the target cell where the target cell is a cell where the RRC connection has been requested to be re-established. The new cell identifier is a cell identity in system information block (e.g., SIB1) of the target cell (e.g., the selected cell).

In an example of the FIG. 17, based on receiving the retrieve wireless device context request message, the source base station may check the retrieve wireless device context request message. If the source base station successfully identifies the wireless device context by means of the C-RNTI, and to successfully verify the wireless device by means of the short MAC-I, and decides to provide the wireless device context to the second base station, the source base station may respond to the second base station with a retrieve wireless device context response message (1745). The retrieve wireless device context response message may comprise at least of GUAMI or the wireless device context information. Based on receiving the retrieve wireless device context response message, the second base station may send an RRC reestablishment message to the wireless device (1750). The RRC reestablishment message may comprise a network hop chaining count (NCC) value.

In an example of the FIG. 17, based on receiving the RRC reestablishment message, the wireless device may derive a new security key of a base station (KgNB) based on at least one of current KgNB or next hop (NH) parameters associated to the NCC value (1755). Based on the new security key of a base station (KgNB) and the previously configured security algorithms, the wireless device may derive security keys for integrity protection and ciphering of RRC signaling (e.g., KRRCint and KRRCenc respectively) and user plane (UP) data (e.g., KUPint and KUPenc respectively). Based on the security key for integrity protection of the RRC signaling (KRRCint), the wireless device may verify the integrity protection of the RRC reestablishment message. Based on the verifying being successful, the wireless device may configure to resume integrity protection for one or more bearers (e.g., signalling radio bearer or an RRC message) based on the previously configured integrity protection algorithm and the KRRCint and/or configure to resume ciphering for one or more bearers based on the previously configured ciphering algorithm and the KRRCenc (1760).

In an example of the FIG. 17, the second base station may send a first RRC reconfiguration message (1765). The RRC first reconfiguration message may comprise the SpCell configuration parameters. Based on receiving the SpCell configuration parameters, the wireless device may initiate transmission and reception of data to/from the second base station. The wireless device may send an RRC reestablishment complete message to the second base station (1770). The RRC reestablishment complete message may comprise measurement report. Based on receiving the measurement report, the second base station may determine to configure SCells and/or secondary cell groups (e.g., SCG or PSCells). Based on the determining, the second base station may send a second RRC reconfiguration message comprising SCell configuration parameters and/or MR-DC related configuration parameters (1775). Based receiving the second RRC reconfiguration message, the wireless device may transmit and receive data via the SCells and/or SCGs. In an example of the FIG. 17, the RRC reconfiguration message may comprise at least one of cell group configuration parameters of MCG and/or SCG, radio bearer configuration parameters or AS security key parameters.

A base station may initiate an RRC connection release procedure to transition an RRC state of a wireless device from RRC connected state to RRC idle state, from an RRC connected state to RRC inactive state, from RRC inactive state back to RRC inactive state when the wireless device tries to resume, or from RRC inactive state to RRC idle state when the wireless device tries to resume. The RRC connection procedure may be used to release an RRC connection of the wireless device and redirect a wireless device to another frequency. The base station may send to a wireless device the RRC release message comprising suspend configuration parameters. Based on the RRC release message, the wireless device may suspend an RRC connection. The wireless device may transition an RRC state of the wireless device to and RRC inactive state or an RRC idle state. The suspend configuration parameters may comprise at least one of a resume identity, RNA configuration, RAN paging cycle, or network hop chaining count (NCC) value where the RNA configuration may comprise RNA notification area information, or periodic RNA update timer value (e.g., T380 value). The base station may use the resume identity (e.g., inactive-RNTI (I-RNTI)) to identify the wireless device context when the wireless device is in RRC inactive state.

If the base station has a fresh and unused pair of {NCC, next hop (NH)}, the base station may include the NCC in the suspend configuration parameters. Otherwise, the base station may include the same NCC associated with the current KgNB in the suspend configuration parameters. The NCC is used for AS security. The base station may delete the current AS keys (e.g., KRRCenc, KUPenc), and KUPint after sending the RRC release message comprising the suspend configuration parameters to the wireless device but may keep the current AS key KRRCint. If the sent NCC value is fresh and belongs to an unused pair of {NCC, NH}, the base station may save the pair of {NCC, NH} in the current wireless device AS security context and may delete the current AS key KgNB. If the sent NCC value is equal to the NCC value associated with the current KgNB, the base station may keep the current AS key KgNB and NCC. The base station may store the sent resume identity together with the current wireless device context including the remainder of the AS security context.

After receiving (e.g., /upon receiving) the RRC release message comprising the suspend configuration parameters from the base station, the wireless device may verify that the integrity of the received RRC release message comprising the suspend configuration parameters is correct by checking PDCP MAC-I. If this verification is successful, then the wireless device may take the received NCC value and save it as stored NCC with the current wireless device context. The wireless device may delete the current AS keys KRRCenc, KUPenc, and KUPint, but keep the current AS key KRRCint key. If the stored NCC value is different from the NCC value associated with the current KgNB, the wireless device may delete the current AS key KgNB. If the stored NCC is equal to the NCC value associated with the current KgNB, the wireless device may keep (e.g., shall keep) the current AS key KgNB. The wireless device may store the received resume identity together with the current wireless device context including the remainder of the AS security context, for the next state transition.

Based on receiving the RRC release message comprising the suspend configuration parameters, the wireless device may reset MAC, release the default MAC cell group configuration, re-establish RLC entities for one or more bearers. Based on receiving the RRC release message comprising suspend configuration parameters, the wireless device may store in the wireless device inactive AS context current configuration parameters and current security keys. For example, the wireless device may store some of the current configuration parameters. The stored current configuration parameters may comprise a robust header compression (ROHC) state, quality of service (QoS) flow to DRB mapping rules, the C-RNTI used in the source PCell, the global cell identity and the physical cell identity of the source PCell, and all other parameters configured except for the ones within reconfiguration with sync and serving cell configuration common parameters in SIB. The stored security keys may comprise at least one of KgNB and KRRCint. The serving cell configuration common parameters in SIB may be used to configure cell specific parameters of a wireless device's serving cell in SIB1. Based on receiving the RRC release message comprising the suspend configuration parameters, the wireless device may suspend all SRB(s) and DRB(s) except for SRB0. Based on receiving the RRC release message comprising suspend configuration parameters, the wireless device may start a timer T380, enter RRC inactive state, perform cell selection procedure.

The wireless device in RRC inactive state may initiate an RRC connection resume procedure. For example, based on having data or signaling to transmit, or receiving RAN paging message, the wireless device in RRC inactive state may initiate the RRC connection resume procedure. Based on initiating the RRC connection resume procedure, the wireless device may select access category based on triggering condition of the RRC connection resume procedure and perform unified access control procedure based on the access category. Based on the unified access control procedure, the wireless device may consider access attempt for the RRC connection resume procedure as allowed. Based on considering the access attempt as allowed, the wireless device may apply the default L1 parameter values as specified in corresponding physical layer specifications, except for the parameters for which values are provided in SIB1, apply the default SRB1 configuration, apply the CCCH configuration, apply the time alignment timer common included in SIB1, apply the default MAC cell group configuration, start a timer T319 and initiate transmission of an RRC resume request message.

Based on initiating the transmission of the RRC resume request message, the wireless device may set the contents of the RRC resume request message. The RRC resume request message may comprise at least one of resume identity, resume MAC-I or resume cause. The resume cause may comprise at least one of emergency, high priority access, mt access, mo signalling, mo data, mo voice call, mo sms, ran update, mps priority access, mcs priority access.

Based on initiating the transmission of the RRC resume request message, the wireless device may restore the stored configuration parameters and the stored security keys from the (stored) wireless device inactive AS context except for the master cell group configuration parameters, MR-DC related configuration parameters (e.g., secondary cell group configuration parameters) and PDCP configuration parameters. The configuration parameter may comprise at least one of the C-RNTI used in the source PCell, the global cell identity and the physical cell identity of the source PCell, and all other parameters configured except for the ones within reconfiguration with sync and serving cell configuration common parameters in SIB. Based on current (re-stored) KgNB or next hop (NH) parameters associated to the stored NCC value, the wireless device may derive a new key of a base station (KgNB). Based on the new key of the base station, the wireless device may derive security keys for integrity protection and ciphering of RRC signalling (e.g., KRRCenc and KRRCint respectively) and security keys for integrity protection and ciphering of user plane data (e.g., KUPint and the KUPenc respectively). Based on configured algorithm and the KRRCint and KUPint, the wireless device may configure lower layers (e.g., PDCP layer) to apply integrity protection for all radio bearers except SRB0. Based on configured algorithm and the KRRCenc and the KUPenc, the wireless device may configure lower layers (e.g., PDCP layer) to apply ciphering for all radio bearers except SRB0. Based on initiating the transmission of the RRC resume request message, the wireless device may re-establish PDCP entities for one or more bearers, resume the one or more bearers and submit the RRC resume request message to lower layers where the lower layers may comprise at least one of PDCP layer, RLC layer, MAC layer or physical (PHY) layer.

A target base station may receive the RRC resume request message. Based on receiving the RRC resume request message, the target base station may check whether the wireless device context of the wireless device is locally available. Based on the wireless device context being not locally available, the target base station may perform the retrieve wireless device context procedure by sending the retrieve wireless device context request message to the source base station (the last serving base station) of the wireless device. The retrieve wireless device context request message may comprise at least one of a wireless device context ID, integrity protection parameters, a new cell identifier or the resume cause where the resume cause is in the RRC resume request message.

For the RRC connection resume procedure, based on receiving the retrieve wireless device context request message, the source base station may check the retrieve wireless device context request message. If the source base station is able to identify the wireless device context by means of the wireless device context ID, and to successfully verify the wireless device by means of the integrity protection contained in the retrieve wireless device context request message and decides to provide the wireless device context to the target base station, the source base station may respond to the target base station with the retrieve wireless device context response message. If the source base station is not able to identify the wireless device context by means of the wireless device context ID, or if the integrity protection contained in the retrieve wireless device context request message is not valid, or, if the source base station decides not to provide the wireless device context to the target base station, the source base station may respond to the target base station with a retrieve wireless device context failure message.

For the RRC connection resume procedure, the retrieve wireless device context failure message may comprise at least XnAP ID of the target base station, an RRC release message or a cause value. For the RRC connection resume procedure, based on receiving the retrieve wireless device context response message, the target base station may send an RRC resume message to the wireless device. The RRC resume message may comprise at least one of radio bearer configuration parameters, cell group configuration parameters for MCG and/or SCG, measurement configuration parameters or sk counter where the sk counter is used to derive a security key of secondary base station based on KgNB.

Based on receiving the retrieve wireless device context failure message, the target base station may send an RRC release message to the wireless device. For example, based on the retrieve wireless device context failure message comprising the RRC release message, the target base station may send the RRC release message to the wireless device. Based on receiving the retrieve wireless device context failure message, the target base station may send an RRC setup message or an RRC reject message. Based on receiving the retrieve wireless device context failure message, the target base station may not send any response message to the wireless device.

Based on receiving the RRC resume message, the wireless device may stop the timer T319 and T380. Based on receiving the RRC resume message, the wireless device may restore mater cell group configuration parameters, secondary cell group configuration parameters and PDCP configuration parameters in the wireless device inactive AS context. Based on restoring the master cell group configuration parameter and/or the secondary cell group configuration parameters, the wireless device may configure SCells of MCG and/or SCG by configuring lower layers to consider the restored MCG and/or SCG SCells to be in deactivated state, discard the wireless device inactive AS context and release the suspend configuration parameters.

Based on receiving the cell group configuration parameters in the RRC resume message, the wireless device may perform cell group configuration of MCG and/or SCG. Based on receiving the radio bearer configuration parameters in the RRC resume message, the wireless device may perform radio bearer configuration. Based on the sk counter in the RRC resume message, the wireless device may perform to update the security key of secondary base station.

A wireless device may remain in CM-CONNECTED and move within an area configured by the base station without notifying the base station when the wireless device is in RRC inactive state where the area is an RNA. In RRC inactive state, a last serving base station may keep the wireless device context and the wireless device-associated NG connection with the serving AMF and UPF. Based on received downlink data from the UPF or downlink wireless device-associated signaling from the AMF during a time that the wireless device is in RRC inactive state, the last serving base station may page in the cells corresponding to the RNA and may send RAN Paging via an Xn interface to neighbor base station(s) if the RNA includes cells of neighbor base station(s).

Figure 18:
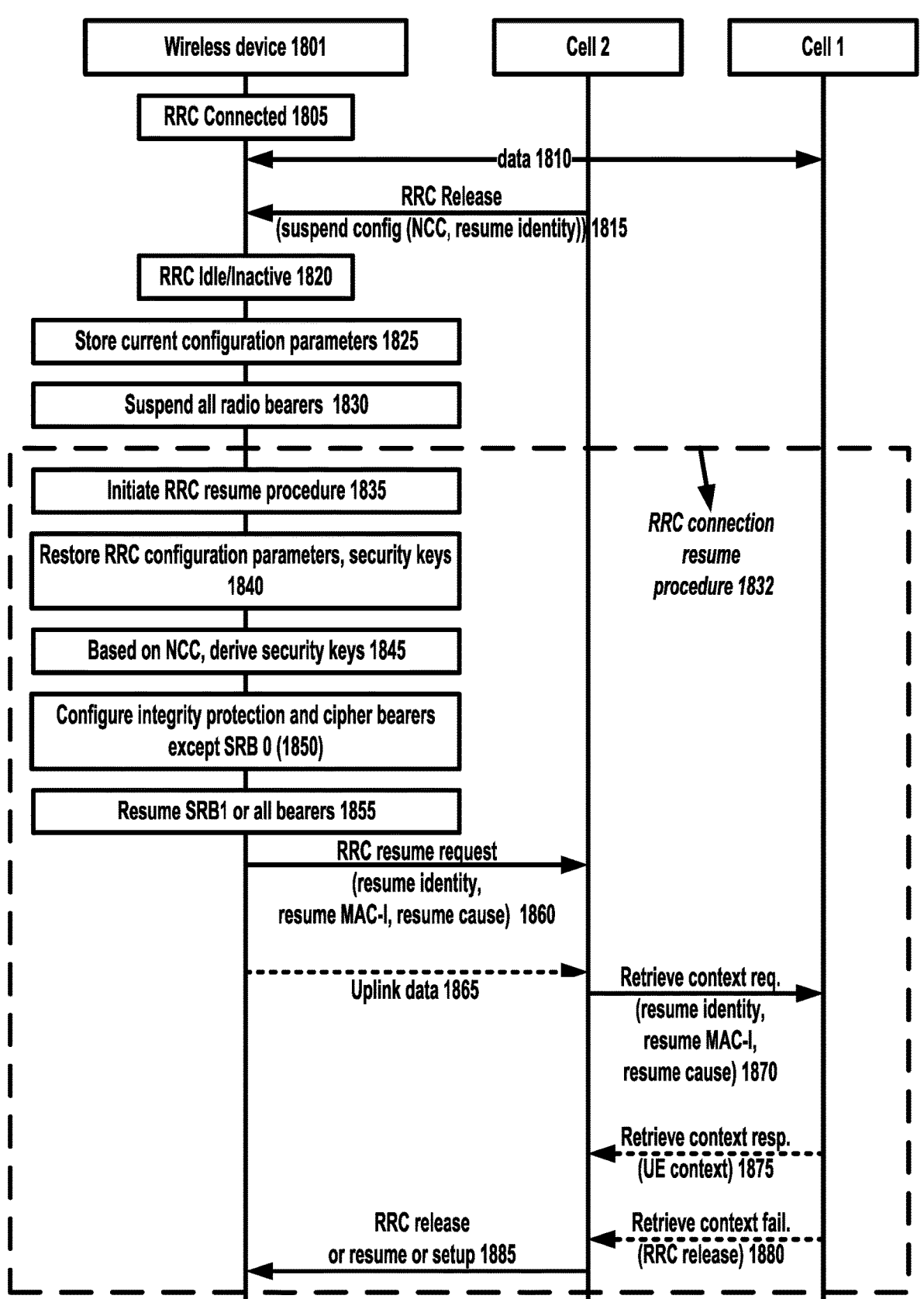
FIG. 18 shows an example of an RRC connection resume procedure.

An AMF may provide to the base station a core network assistance information to assist the base station's decision whether a wireless device can be sent to RRC inactive state. The core network assistance information may include the registration area configured for the wireless device, the periodic registration update timer, a wireless device identity index value, the wireless device specific DRX, an indication if the wireless device is configured with mobile initiated connection only (MICO) mode by the AMF, or the expected wireless device behavior. The base station may use the wireless device specific DRX and the wireless device identity index value to determine a paging occasion for RAN paging. The base station may use periodic registration update timer to configure periodic RNA update timer (e.g., a timer T380). The base station may use an expected wireless device behavior to assist the wireless device RRC state transition decision FIG. 18 shows an example of an RRC connection resume procedure. A wireless device (1801) in RRC connected state (1805) may transmit and/or receive data to/from a first base station (a source base station) via a cell 1 (1810). The first base station may determine to transition a wireless device in RRC connected state to RRC inactive state. Based on the determining, the base station may send an RRC release message comprising the suspend configuration parameters (1815). The wireless device 1801 may transition to an RRC idle and/or RRC inactive state, for example, based on receiving the RRC release message (1820).

In an example of the FIG. 18, based on receiving the RRC release message comprising suspend configuration parameters, the wireless device may store in the wireless device inactive AS Context the current security keys (e.g., KgNB and KRRCint keys) and current configuration parameters (1825). For example, the wireless device may store some of the current configuration parameters. The stored (current) configuration parameters may be at least one of: robust header compression (ROHC) state; QoS flow to DRB mapping rules; C-RNTI used in source PCell; global cell identity and physical cell identity of the source PCell; and/or any/all other parameters configured except for ones within reconfiguration with sync and serving cell configuration common parameters in SIB. The robust header compression (ROHC) state may comprise ROHC states for all PDCP entity (or all bearers) where each PDCP entity per bearer (or each bearer) may have one ROHC state. The QoS flow to DRB mapping rules may be QoS flow to DRB mapping rules for all data radio bearer (DRB) where each DRB may have one QoS follow to DRB mapping rule.

In an example of the FIG. 18, based on receiving the RRC release message comprising suspend configuration parameters, the wireless device may suspend all SRB(s) and DRB(s) except for SRB0 (1830). Based on receiving the RRC release message comprising suspend configuration parameters, the wireless device may start a timer T380, enter RRC inactive state, perform cell selection procedure. Based on the cell selection procedure, the wireless device may select a cell 2 of a second base station (a target base station). The wireless device in RRC inactive state may initiate (1835) an RRC connection resume procedure (1832). The wireless device may perform the unified access control procedure. Based on the unified access control procedure, the wireless device may consider access attempt for the RRC connection resume procedure as allowed. The wireless device may apply the default L1 parameter values as specified in corresponding physical layer specifications, except for the parameters for which values are provided in SIB1, apply the default SRB1 configuration, apply the CCCH configuration, apply the time alignment timer common included in SIB1, apply the default MAC cell group configuration, start a timer T319 and initiate transmission of an RRC resume request message (1860).

In an example of the FIG. 18, based on initiating (1835) the transmission of the RRC resume request message (1860), the wireless device may restore the stored configuration parameters and the stored security keys from the (stored) wireless device inactive AS context (1840). For example, the wireless device may restore the stored configuration parameters and the stored security keys (e.g., KgNB and KRRCint) from the stored wireless device Inactive AS context except for the master cell group configuration parameters, MR-DC related configuration parameters (e.g., secondary cell group configuration parameters) and PDCP configuration parameters. Based on current (restored) KgNB or next hop (NH) parameters associated to the stored NCC value, the wireless device may derive a new key of a base station (KgNB) (1845). Based on the new key of the base station, the wireless device may derive security keys for integrity protection and ciphering of RRC signalling (e.g., KRRCenc and KRRCint respectively) and/or security keys for integrity protection and ciphering of user plane data (e.g., KUPint and the KUPenc respectively). Based on configured algorithm and the KRRCint and KUPint, the wireless device (RRC layer) may configure lower layers (e.g., PDCP layer) to apply integrity protection for all radio bearers except SRB0 (1850). Based on configured algorithm and the KRR-Cenc and the KUPenc, the wireless device may configure lower layers (e.g., PDCP layer) to apply ciphering for all radio bearers except SRB0 (1855). For communication between the wireless device and the base station, the integrity protection and/or the ciphering may be required. Based on the integrity protection and/or the ciphering, the wireless device may be able to transmit and/or receive data to/from the second base station (1865). The wireless device may use the restored configuration parameters to transmit and receive the data to/from the second base station (1865).

In an example of the FIG. 18, based on initiating (1835) the transmission of the RRC resume request message (1860), the wireless device may re-establish PDCP entities for one or more bearers, resume one or more bearers and/or submit the RRC resume request message to lower layers. Based on receiving the RRC resume request message, the second base station may check whether the wireless device context of the wireless device is locally available. Based on the wireless device context being not locally available, the second base station may perform the retrieve wireless device context procedure by sending the retrieve wireless device context request message to the first base station (the last serving base station) of the wireless device (1870). The retrieve wireless device context request message may comprise at least one of: resume identity; resume MAC-I; or the resume cause.

In an example of the FIG. 18, based on receiving the retrieve wireless device context request message, the first base station may check the retrieve wireless device context request message. If the first base station is able to identify the wireless device context by means of the wireless device context ID, and to successfully verify the wireless device by means of the resume MAC-I and decides to provide the wireless device context to the second base station, the first base station may respond to the second base station with the retrieve wireless device context response message (1875). If the first base station is not able to identify the wireless device context by means of the wireless device context ID, and/or is not able to successfully verify the wireless device by means of the resume MAC-I and/or decides not to provide the wireless device context to the second base station, the first base station may respond to the second base station with a retrieve wireless device context failure message (1880). Based on receiving the retrieve wireless device context response message, the second base station may send an RRC resume message to the wireless device and/or the second base station may send an RRC release message to the wireless device (1885). Based on receiving the RRC resume message, the wireless device may restore mater cell group configuration parameters, secondary cell group configuration parameters, and/or PDCP configuration parameters in the wireless device inactive AS context. Based on restoring the master cell group configuration parameter and/or the secondary cell group configuration parameters, the wireless device may configure SCells of MCG and/or SCG by configuring lower layers to consider the restored MCG and/or SCG SCells to be in deactivated state, discard the wireless device inactive AS context and release the suspend configuration parameters. The wireless device may transmit and/or receive data via the SCells and/or SCGs.

A base station may send an RRC release message to a wireless device to release an RRC connection of the wireless device. Based on the RRC release message, the wireless device may release established radio bearers as well as all radio resources.

A base station may send an RRC release message to a wireless device to suspend the RRC connection (1885). Based on the RRC release message, the wireless device may suspend all radio bearers except for signaling radio bearer 0 (SRB0). The RRC release message may comprise suspend configuration parameters. The suspend configuration parameters may comprise next hop chaining count (NCC) and/or resume identity (e.g., ID or identifier).

The base station may send an RRC release message to transition a wireless device in an RRC connected state to an RRC idle state; or to transition a wireless device in an RRC connected state to an RRC inactive state; or to transition a wireless device in an RRC inactive state back to an RRC inactive state if/when the wireless device tries to resume; or to transition a wireless device in an RRC inactive state to an RRC idle state when the wireless device tries to resume. The base station may send an RRC release message to redirect a wireless device to another frequency.

A wireless device may receive an RRC release message from the base station of serving cell (or PCell). Based on the RRC release message, the wireless device may perform wireless device actions for the RRC release message from the base station. The wireless device may delay the wireless device actions for the RRC release message a period of time (e.g., 60 ms) from the moment the RRC release message was received or when the receipt of the RRC release message was successfully acknowledged. The wireless device may send HARQ acknowledgments to the base station for acknowledgments of the RRC release message. Based on a RLC protocol data unit (PDU) comprising the RRC release message and the RLC PDU comprising poll bit, the wireless device may send a RLC message (e.g., a status report) to the base station for acknowledgments of the RRC release message.

The wireless device actions for the RRC release message from the base station may comprise at least one of: suspending an RRC connection; releasing an RRC connection; cell (re)selection procedure; and/or idle/inactive measurements.

The RRC release message from the base station may comprise the suspend configuration parameters. Based on the suspend configuration parameters, the wireless device may perform the suspending an RRC connection. The suspending an RRC connection may comprise at least one of: medium access control (MAC) reset (or resetting MAC); releasing default MAC cell group configuration; re-establishing RLC entities for one or more radio bearers; storing current configuration parameters and current security keys; suspending one or more bearers where the bearers comprise signaling radio bearer and data radio bearer; and/or transitioning an RRC idle state or an RRC inactive state.

The suspend configuration parameters may comprise RNA configuration parameters. Based on the RNA configuration parameters, the wireless device may transition to an RRC inactive state. For example, based on the suspend configuration parameters not comprising the RNA configuration parameters, the wireless device may transition to an RRC idle state. For example, the RRC release message comprising the suspend configuration parameters may comprise an indication transitioning to an RRC inactive state. Based on the indication, the wireless device may transition to an RRC inactive state. For example, based on the RRC release message not comprising the indication, the wireless device may transition to an RRC idle state.

Based on the MAC reset, the wireless device may perform to at least one of: stop all timers running in the wireless device-MAC layer, consider all time alignment timers as expired; set new data indicators (NDIs) for all uplink HARQ processes to the value 0; stop, ongoing RACH procedure; discard explicitly signaled contention-free Random Access Resources, if any; flush Msg 3 buffer, cancel, triggered scheduling request procedure; cancel, triggered buffer status reporting procedure; cancel, triggered power headroom reporting procedure; flush the soft buffers for all DL HARQ processes; for each DL HARQ process, consider the next received transmission for a TB as the very first transmission; and/or release, temporary C-RNTI.

Based on the considering the time alignment timers as expired, the wireless device may perform at least one of: flush all HARQ buffers for all serving cells; notify RRC to release PUCCH for all Serving cells, if configured; notify RRC to release SRS for all Serving Cells, if configured; clear any configured downlink assignments and configured uplink grants; clear any PUSCH resource for semi-persistent CSI reporting; and/or consider all running time alignment timers as expired.

Default MAC cell group configuration parameters may comprise buffer status report (BSR) configuration parameters (e.g., BSR timers) for a cell group of the base station and power headroom reporting (PHR) configuration parameters (e.g., PHR timers or PHR transmission power factor change parameter) for the cell group of the base station. The re-establishing RLC entities may comprise at least one of: discarding all RLC SDUs, RLC SDU segments, and RLC PDUs, if any; stopping and resetting all timers of the RLC entities; and resetting all state variables of the RLC entities to their initial values.

The RRC release message from the base station may not comprise the suspend configuration parameters. Based on the RRC message not comprising the suspend configuration parameters, the wireless device may perform the releasing an RRC connection. The releasing an RRC connection may comprise at least one of: MAC reset (or resetting MAC); discarding the stored configuration parameters and stored security keys (or discarding the stored wireless device inactive AS context); releasing the suspend configuration parameters; releasing all radio resources, including release of RLC entity, MAC configuration and associated PDCP entity and SDAP for all established radio bearers; and/or transitioning to an RRC idle state. The RRC release message may comprises an RRC early data complete message.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

The user plane protocol stack shown in FIG. 2 may be a new radio (NR) protocol stack for a Uu interface between a wireless device and a gNB. In layer 1 of the UP protocol stack, the wireless device may implement PHY and the gNB may implement PHY. In layer 2 of the UP protocol stack, the wireless device may implement MAC, RLC, PDCP, and SDAP. The gNB may implement MAC, RLC, PDCP, and SDAP.

The control plane protocol stack shown in FIG. 2 may be an NR protocol stack for the Uu interface between the wireless device and the gNB and/or an N1 interface between the wireless device and an AMF. In layer 1 of the CP protocol stack, the wireless device 1901 may implement PHY and the gNB may implement PHY. In layer 2 of the CP protocol stack, the wireless device may implement MAC, RLC, PDCP, RRC, and NAS. The gNB may implement MAC, RLC, PDCP, and RRC. The AMF may implement NAS.

The NAS shown in FIG. 2 may be concerned with the non-access stratum, in particular, communication between the wireless device and the core network (e.g., the AMF). Lower layers may be concerned with the access stratum, for example, communication between the wireless device and the gNB. Messages sent between the wireless device and the core network may be referred to as NAS messages. In an example, a NAS message may be relayed by the gNB, but the content of the NAS message (e.g., information elements of the NAS message) may not be visible to the gNB.

In FIG. 3, the wireless device may receive services through a PDU session, which may be a logical connection between the wireless device and a data network (DN). The wireless device and the DN may exchange data packets associated with the PDU session. The PDU session may comprise one or more quality of service (QoS) flows. SDAP may perform mapping and/or demapping between the one or more QoS flows of the PDU session and one or more radio bearers (e.g., data radio bearers). The mapping between the QoS flows and the data radio bearers may be determined in the SDAP by the gNB, and the wireless device may be notified of the mapping (e.g., based on control signaling and/or reflective mapping). For reflective mapping, the SDAP of the gNB may mark downlink packets with a QoS flow indicator (QFI) and deliver the downlink packets to the wireless device. The wireless device may determine the mapping based on the QFI of the downlink packets.

In FIG. 3, PDCP may perform header compression and/or decompression. Header compression may reduce the amount of data transmitted over the physical layer. The PDCP and PDCP may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP may perform retransmissions of undelivered packets, in-sequence delivery and reordering of packets, duplication of packets, and/or identification and removal of duplicate packets. In a dual connectivity scenario, PDCP may perform mapping between a split radio bearer and RLC channels.

In FIG. 3, RLC may perform segmentation, retransmission through Automatic Repeat Request (ARQ). The RLC may perform removal of duplicate data units received from MAC and MAC, respectively. The RLCs may provide RLC channels as a service to PDCPs, respectively.

In FIG. 3, MAC may perform multiplexing and/or demultiplexing of logical channels. MAC and MAC may map logical channels to transport channels. In an example, wireless device may, in MAC, multiplex data units of one or more logical channels into a transport block. The wireless device may transmit the transport block to the gNB using PHY. The gNB may receive the transport block using PHY and demultiplex data units of the transport blocks back into logical channels. MAC may perform error correction through Hybrid Automatic Repeat Request (HARQ), logical channel prioritization, and/or padding.

In FIG. 3, PHY may perform mapping of transport channels to physical channels. PHY and PHY may perform digital and analog signal processing functions (e.g., coding/decoding and modulation/demodulation) for sending and receiving information (e.g., transmission via an air interface). PHY may perform multi-antenna mapping.

One or more of the base stations of the NG-RAN may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The central unit may be referred to as and/or interchangeable with a base station central unit or a central unit of a base station or a CU or a gNB-CU. The distributed unit may be referred to as and/or interchangeable with a base station distributed unit or a distributed unit of a base station or a DU or a gNB-DU.

In an RRC connected state, a wireless device may measure multiple beams (at least one) of a cell and the measurements results (power values) may be averaged to derive the cell quality. In doing so, the wireless device may be configured to consider a subset of the detected beams. Filtering takes may place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the wireless device is configured to do so by a base station (e.g., gNB).

Layer 1 filtering may be internal layer 1 filtering of the inputs measured at point A. Exact filtering is implementation dependent. How the measurements may be executed in the physical layer by an implementation (inputs A and Layer 1 filtering). The A is measurements (beam specific samples) internal to the physical layer. A1 is measurements (e.g., beam specific measurements) reported by layer 1 to layer 3 after layer 1 filtering.

Layer 1 filtering may introduce a certain level of measurement averaging. How and when the wireless device exactly performs the required measurements may be implementation specific to the point that the output at B fulfils the performance requirements set. The B is a measurement (e.g., cell quality) derived from beam-specific measurements reported to layer 3 after beam consolidation/selection. The beam consolidation/selection is beam specific measurements which are consolidated to derive cell quality. The configuration of this module is provided by RRC signalling. Reporting period at B may equal one measurement period at A1.

Layer 3 filtering for cell quality may be filtering performed on the measurements provided at point B. The configuration of the layer 3 filters may be provided by an RRC signalling. Filtering reporting period at C may equal one measurement period at B. Layer 3 filtering for cell quality and related parameters used may not introduce any delay in the sample availability between B and C. Measurement at point C, C1 is the input used in the event evaluation. The C is a measurement after processing in the layer 3 filter. The reporting rate is identical to the reporting rate at point B. This measurement is used as input for one or more evaluation of reporting criteria. Evaluation of reporting criteria may check whether actual measurement reporting is necessary at point D. The D is measurement report information (message) sent on the radio interface. The evaluation may be based on more than one flow of measurements at reference point C e.g., to compare between different measurements. This may be by input C and C1. The wireless device may evaluate the reporting criteria at least every time a new measurement result is reported at point C, C1. The configuration may be provided by RRC signalling (wireless device measurements).

L3 Beam filtering and related parameters used may not introduce any delay in the sample availability between E and F. L3 Beam filtering is filtering performed on the measurements (e.g., beam specific measurements) provided at point A1. The configuration of the beam filters may be provided by RRC signalling. The L3 beam filtering may provide K beams. The K beams may correspond to the measurements on SSB, or CSI-RS resources configured for L3 mobility by a base station (e.g., gNB) and detected by wireless device at L1. Filtering reporting period at E may equal one measurement period at A1. E is a measurement (e.g., beam-specific measurement) after processing in the beam filter. The reporting rate may be identical to the reporting rate at point A1. This measurement is used as input for selecting the X measurements to be reported. Beam Selection for beam reporting may select the X measurements from the measurements provided at point E. The configuration of this module may be provided by RRC signalling. The point F may correspond to beam measurement information included in measurement report (sent) on the radio interface.

Measurement reports may be characterized by the following: Measurement reports may comprise the measurement identity of the associated measurement configuration that triggered the reporting; cell and beam measurement quantities to be included in measurement reports are configured by the network; the number of non-serving cells to be reported can be limited through configuration by the network; cells belonging to a blacklist configured by the network are not used in event evaluation and reporting, and conversely when a whitelist is configured by the network, only the cells belonging to the whitelist are used in event evaluation and reporting; and/or beam measurements to be included in measurement reports are configured by the network (beam identifier only, measurement result and beam identifier, or no beam reporting).

Intra-frequency neighbor (cell) measurements and inter-frequency neighbor (cell) measurements may be defined as follows: SSB based intra-frequency measurement where a measurement is defined as an SSB based intra-frequency measurement provided the center frequency of the SSB of the serving cell and the center frequency of the SSB of the neighbor cell are the same, and the subcarrier spacing of the two SSBs is also the same; SSB based inter-frequency measurement where a measurement is defined as an SSB based inter-frequency measurement provided the center frequency of the SSB of the serving cell and the center frequency of the SSB of the neighbor cell are different, or the subcarrier spacing of the two SSBs is different; CSI-RS based intra-frequency measurement; and/or CSI-RS based inter-frequency measurement where a measurement is defined as a CSI-RS based inter-frequency measurement if it is not a CSI-RS based intra-frequency measurement.

The CSI-RS based intra-frequency measurement may be a measurement defined as a CSI-RS based intra-frequency measurement provided that: the subcarrier spacing of CSI- RS resources on the neighbor cell configured for measurement is the same as the SCS of CSI-RS resources on the serving cell indicated for measurement; For 60 kHz subcarrier spacing, the CP type of CSI-RS resources on the neighbor cell configured for measurement is the same as the CP type of CSI-RS resources on the serving cell indicated for measurement; and the center frequency of CSI-RS resources on the neighbor cell configured for measurement is the same as the center frequency of CSI-RS resource on the serving cell indicated for measurement.

For SSB based measurements, a measurement object may correspond to one SSB and the wireless device considers different SSBs as different cells. Whether a measurement is non-gap-assisted or gap-assisted may depend upon the capability of a wireless device, the active BWP of the wireless device and the current operating frequency. For SSB based inter-frequency measurement, if the measurement gap requirement information is reported by the wireless device, a measurement gap configuration may be provided according to the information. Otherwise, a measurement gap configuration is provided in the following cases: if the wireless device only supports per-wireless device measurement gaps; and/or if the wireless device supports per-FR measurement gaps and any of the serving cells are in the same frequency range of the measurement object. For SSB based intra-frequency measurement, if the measurement gap requirement information is reported by the wireless device, a measurement gap configuration may be provided according to the information. Otherwise, a measurement gap configuration may always be provided in the following case: other than the initial BWP, if any of the wireless device configured BWPs do not contain the frequency domain resources of the SSB associated to the initial DL BWP.

In non-gap-assisted scenarios, a wireless device may carry out such measurements without measurement gaps. In gap-assisted scenarios, a wireless device may not be assumed to be able to carry out such measurements without measurement gaps. In an example, a measurement timing configuration (e.g., measurementtimingconfiguration) may be used to convey assistance information for measurement timing (e.g., meastiming). The measurement timing configuration may comprise at least one of: a measurement timing (e.g., meastiming); camp on first SSB (e.g., camponfirstSSB); PSCell only on first SSB (e.g., PScellonlyonfirstSSB); and CSI-RS configuration (e.g., CSI-RS-config). The measurement timing (e.g., meastiming) may comprise a frequency and timing (e.g., frequencyandtiming); SSB to measure (e.g., ssb-tomeasure); and a physical cell identifier (e.g., physcellid). The frequency and timing (e.g., frequencyandtiming) may comprise at least one of: a carrier frequency (e.g., carrierfreq); SSB subcarrier spacing (e.g., ssbSubcarrierSpacing); SSB measurement timing configuration (e.g., ssb-measurementtimingconfiguration); SS-RSSI measurement (e.g., ss-RSSI-Measurement).

In an example, the CSI-RS configuration may comprise at least one of: CSI-RS subcarrier spacing (e.g., csi-RS-subcarrierspacing); CSI-RS cell mobility (e.g., csi-RS-cellmobility); and reference SSB frequency (e.g., refSSBfreq). The csi-RS-cellmobility may indicate the CSI-RS configuration of the cell for which this message is included. The timing of the CSI-RS resources may be based on the SSB indicated by the refSSBfreq. The csi-RS-subcarrierspacing may indicate the subcarrier spacing of the CSI-RS resources included in csi-RS-cellmobility.

In an example, the meastiming may be a list of SMTC information, SSB RSSI measurement information and associated frequency (e.g., NR frequency) exchanged via X2 interface (e.g., for X2 setup/update or DC configuration Setup/update or Xn setup/update or node (e.g., a base station) configuration update or F1 messages between a base station central unit and a base station distributed unit). physcellid may be physical cell identity of the SSB on the ARFCN indicated by the carrierfreq (carrier frequency). The camponfirstSSB (e.g., indicating be a value true) may indicates that the SSB indicated in the first instance of meastiming in the meastiming list can be used for camping and for a PCell configuration. The meastiming list may comprise one or more meastimings. The ssb-tomeasure may be the set of SS blocks to be measured within the SMTC measurement duration.

In an example, the carrierfreq (e.g., carrier frequency) and the SSB subcarrier spacing (e.g., ssbSubcarrierSpacing) may indicate the frequency and subcarrier spacing of the SS block of the cell for which this message is included, or of other SS blocks within the same carrier. The SSB measurement timing configuration (e.g., ssb-measurementtiming-configuration) may indicate the SMTC which can be used to search for SSB of the cell for which the message is included. The SS-RSSI measurement (e.g., ss-RSSI-measurement) may provide the configuration which can be used for RSSI measurements of the cell for which the message is included.

A transmitter (e.g., a radio transmitter) of the wireless device may be an electronic device which produces radio waves with an antenna. The transmitter may generate a radio frequency alternating current, which is applied to the antenna. For example, the antenna may radiate radio waves. The term transmitter may be limited to equipment that generates radio waves for communication purposes; or radiolocation, such as radar and navigational transmitters. A transmitter may be a separate piece of electronic equipment, or an electrical circuit within another electronic device. A transmitter and a receiver combined in one unit may be called a transceiver. The term transmitter may be abbreviated "XMTR" or "TX" in technical documents. The purpose of most transmitters may be radio communication of information over a distance. The information may be provided to the transmitter in the form of an electronic signal, such as an audio (sound) signal from a microphone, a video (TV) signal from a video camera, or in wireless (networking) devices, a digital signal from a computer. The transmitter may combine the information signal to be carried with the radio frequency signal which generates the radio waves, which is called the carrier signal. This process may be called modulation. The radio signal from the transmitter may be applied to the antenna, which radiates the energy as radio waves. The antenna may be enclosed inside the case or attached to the outside of the transmitter, as in portable devices such as cell phones. The transmitter may be (group of) antenna or (group of) antenna panel or (group of) MIMO layer or (group of) emitter. Each antenna panel may have one or more antenna elements. For example, a first one or more antennas (or a first one or more antenna panels, or a first one or more MIMO layers) may be a first transmitter. A second one or more antennas (or a second one or more antenna panels, or a first one or more MIMO layers) may be a second transmitter. For example, a base station and/or a wireless device may have multiple antennas. a number of antenna elements may be assembled into multiple antennas. Multi-panel MIMO (layer) may be used for communication between the wireless and the base station.

In an example, a wireless device may receive, from a base station, a measurement configuration. The measurement configuration may indicate one or more frequencies and/or one or more cells on which the wireless device performs measurements. Based on the measurement configuration, the wireless device may perform the measurements on a frequency and/or a cell which is indicated by the measurement configuration.

A wireless device may perform measurements using the measurement configuration during a measurement gap (e.g., indicated by the measurement configuration). The measurement gap may be referred to as and/or interchangeable with a gap, a gap (period and/or interval), a measurement gap (period and/or interval), and/or the like. The measurement gap may be a time duration in which a wireless device may measure wireless channel condition associated with a cell, of a particular base station (e.g., network), and/or configured in a particular frequency using a particular RAT. For example, the particular base station (e.g., network) may be the same base station (e.g., the same network) that the wireless device maintains a connection (e.g., RRC connection). For example, the particular base station (e.g., network) may be different from a base station (e.g., a network) that the wireless device maintains a connection (e.g., RRC connection). For example, the particular RAT may be Wifi, LTE, NR, 6G, and/or the like. For example, the particular RAT may be the same RAT that the wireless device uses to maintain a connection (e.g., RRC connection) with a first base station e.g., a network). For example, the particular RAT may be different from an RAT that the wireless device uses to maintain a connection (e.g., RRC connection) with a first base station e.g., a network).

For example, a wireless device may maintain a connection (e.g., RRC connection) with a current base station (e.g., network) during the measurement gap. The wireless device may not communicate with the current base station during the measurement gap. For example, the wireless device may not, during the measurement gap, transmit to and/or receive from the current base station data (e.g., message, packet, SDU, PDU, and/or transport block) and/or a reference signal (e.g., SRS, and/or CSI-RS). The wireless device may not, during the measurement gap, monitor a downlink control channel configured by the current base station. A current base station may not communicate with the wireless device during the measurement gap. For example, the current base station may not, during the measurement gap, transmit to and/or receive from the wireless device, data (e.g., message, packet, SDU, PDU, and/or transport block) and/or a reference signal (e.g., SRS, and/or CSI-RS). The current base station may not, during the measurement gap, monitor an uplink control channel configured for the wireless device.

A wireless device may communicate with a second device (e.g., a second wireless device, a second base station, a second network, and/or the like) during the measurement gap while maintaining a connection (e.g., RRC connection) with a current base station (e.g., network). For example, the communicating with the second device may comprise monitoring a downlink channel (e.g., paging channel, PDCCH, PDSCH, SSB, CSI-RS, and/or the like) of the second device during the measurement gap. The communicating with the second device may comprise receiving a signal and/or data via a downlink channel (e.g., PDCCH, PDSCH, SSB, CSI-RS, and/or the like) from the second device during the measurement gap. The communicating with the second device may comprise receiving a signal (e.g., reference signal such as SSB, CSI-RS) and/or data (e.g., message, packet, SDU, PDU, and/or transport block) via a downlink channel (e.g., PDCCH, PDSCH, SSB, CSI-RS, and/or the like) from the second device during the measurement gap. The communicating with the second device may comprise transmitting a signal (e.g., reference signal such as SRS, preamble, and/or the like) and/or data (e.g., message, packet, SDU, PDU, Msg3, MsgB, and/or transport block) via an uplink channel (e.g., PRACH, PUSCH, PUCCH, and/or SRS, and/or the like) to the second device during the measurement gap.

A wireless device may not communicate with the current base station during the measurement gap. For example, the wireless device may not, during the measurement gap, transmit to and/or receive from the current base station data (e.g., packet, SDU, PDU, and/or transport block) and/or a reference signal (e.g., SRS, and/or CSI-RS). The wireless device may not, during the measurement gap, monitor a downlink control channel configured by the current base station. The current base station may not communicate with the wireless device during the measurement gap. The current base station may not, during the measurement gap, transmit to and/or receive from the wireless device, data (e.g., packet, SDU, PDU, and/or transport block) and/or a reference signal (e.g., SRS, and/or CSI-RS). The current base station may not, during the measurement gap, monitor an uplink control channel configured for the wireless device.

A wireless device may receive, from a base station, a measurement configuration. The measurement configuration may comprise measurement gap configuration. The measurement gap configuration may comprise one or more configuration parameters. The one or more configuration parameters of the measurement gap may indicate periods that the wireless device may use to perform measurements. The one or more configuration parameters may indicate one or more measurement gaps. Each measurement gap of the one or more measurement gaps may be associated with one or more frequency range that the wireless device performs one or more measurements using the one or more configuration parameters. For example, each measurement gap of the one or more measurement gaps may be per a frequency or a frequency range (e.g., FR1, FR2, and/or FR3) and/or per a wireless device/UE. The measurement gap per a frequency range (e.g., FR1, FR2, and/or FR3) may be applied to measurement(s) that the wireless device performs in the respective frequency range. The measurement gap per the wireless device/UE may be applied to measurement(s) that the wireless device performs one or more (e.g., all) frequencies (e.g., FR1, FR2, and/or FR3). A measurement gap may comprise at least one of: measurement gap repetition period (e.g., mgrp) value, measurement gap length (e.g., mgl) value, gap offset value and a serving cell identifier. The mgrp value may indicate measurement gap repetition period in time (e.g., in ms) of the measurement gap. The mgl value may indicate the measurement gap length in ms of the measurement gap. The gap offset value may indicate the gap offset of the gap pattern with mgrp indicated in the field mgrp.

During the measurement gap period/time, the wireless device may not transmit data to the base station. For example, the data may comprise at least one of: HARQ feedback, SR, and CSI, SRS report and UL-SCH. During the measurement gap, the wireless device may not monitor downlink channel (e.g., PDCCH) of a serving cell of the base station. The wireless device may not receive (downlink data) on DL-SCH. During the measurement gap period/time, the base station may not transmit downlink data to the base station. For example, the downlink data may comprise at least one of: DCI, MAC CE, and a data on DL-SCH. During the measurement gap, (a serving cell of) the base station may not monitor uplink channel (e.g., PUCCH/PUSCH) of the wireless device. The base station may not receive (uplink data) on UL-SCH.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

In an RRC connected state, a wireless device may measure multiple beams (at least one) of a cell and the measurements results (power values) may be averaged to derive the cell quality. In doing so, the wireless device may be configured to consider a subset of the detected beams. Filtering takes may place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the wireless device is configured to do so by a base station (e.g., gNB).

Figure 19:
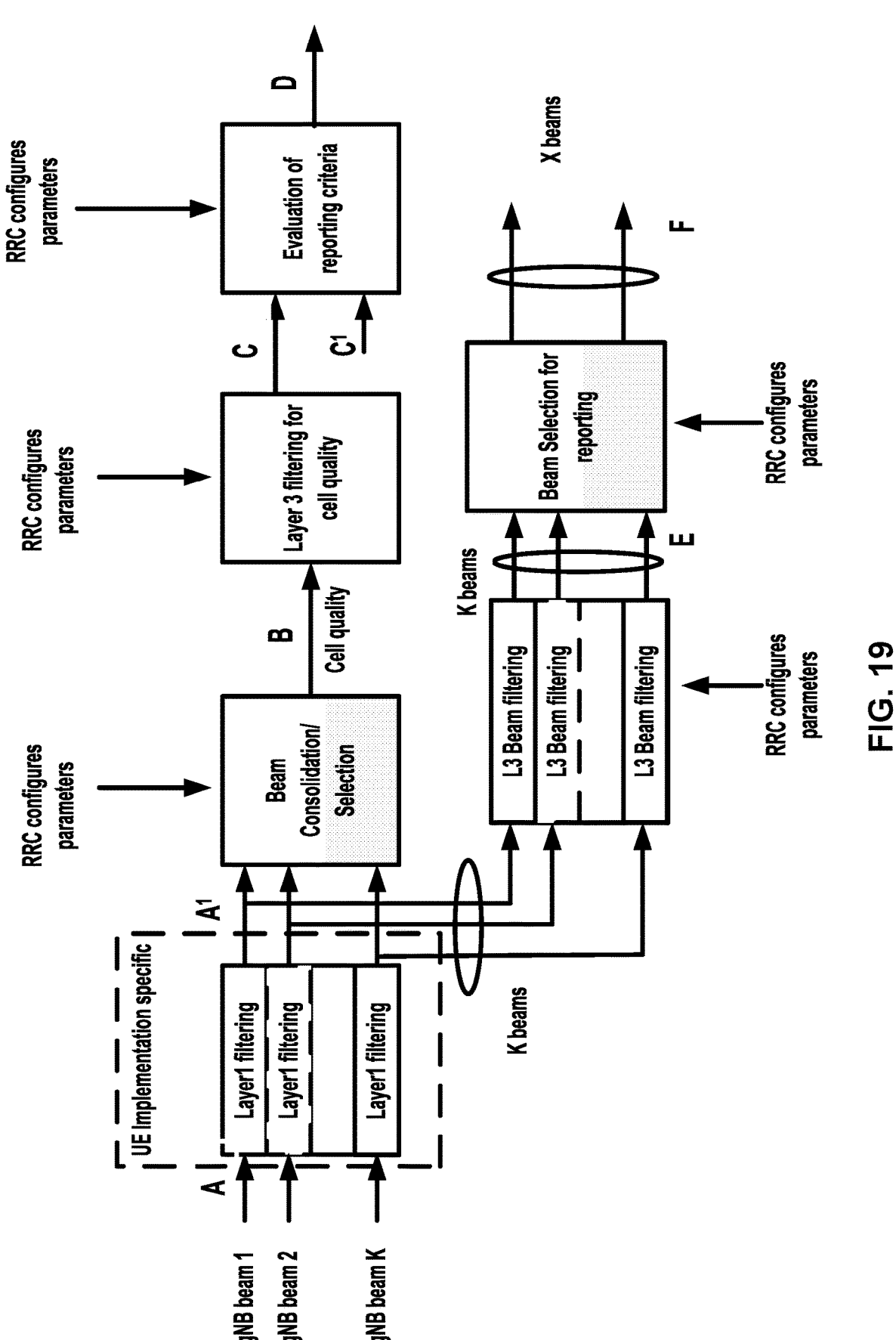
FIG. 19 shows an example of a measurement model for a wireless device.

FIG. 19 shows an example of a measurement model for a wireless device. The measurement model may be for a wireless device in RRC connected state. Layer 1 filtering may be internal layer 1 filtering of the inputs measured at point A. Exact filtering is left to wireless device implementation i.e. how the measurements may be executed in the physical layer by an implementation (inputs A and Layer 1 filtering). The A point may correspond to measurements (e.g., beam specific samples) internal to the physical layer. A1 may correspond to measurements (e.g., beam specific measurements) reported by layer 1 to layer 3 after layer 1 filtering. Layer 1 filtering may introduce a certain level of measurement averaging. How and when the wireless device exactly performs the required measurements may be implementation specific to the point that the output at B fulfils the defined minimum performance requirements.

In an example of FIG. 19, The B point may correspond to a measurement (e.g., cell quality) derived from beam-specific measurements reported to layer 3 after beam consolidation/selection. The beam consolidation/selection is beam specific measurements which are consolidated to derive cell quality. The configuration of this module is provided by RRC signalling. Reporting period at B may equal one measurement period at A1.

In an example of FIG. 19, Layer 3 filtering for cell quality may be filtering performed on the measurements provided at point B. The configuration of the layer 3 filters may be provided by an RRC signalling. Filtering reporting period at C in may equal one measurement period at B. Layer 3 filtering for cell quality and related parameters used may not introduce any delay in the sample availability between B and C. Measurement at point C, C1 is the input used in the event evaluation. The C is a measurement after processing in the layer 3 filter. The reporting rate is identical to the reporting rate at point B. This measurement may be used as input for one or more evaluation of reporting criteria. Evaluation of reporting criteria may check whether actual measurement reporting is necessary at point D. The D point may correspond to measurement report information (e.g., a message) sent on the radio interface. The evaluation may be based on more than one flow of measurements at reference point C (e.g., to compare between different measurements). This may be by input C and C1. The wireless device may evaluate the reporting criteria at least every time a new measurement result is reported at point C, C1. The configuration may be provided by RRC signalling (e.g., wireless device measurements).

In an example of FIG. 19, L3 Beam filtering and related parameters used may not introduce any delay in the sample availability between E and F. L3 Beam filtering may be filtering performed on the measurements (e.g., beam specific measurements) provided at point A1. The configuration of the beam filters may be provided by RRC signalling. The L3 beam filtering may provide K beams. The K beams may correspond to the measurements on SSB, or CSI-RS resources configured for L3 mobility by a base station (e.g., gNB) and detected by wireless device at L1. Filtering reporting period at E may equal one measurement period at A1. E point may correspond to a measurement (e.g., beam-specific measurement) after processing in the beam filter. The reporting rate may be identical to the reporting rate at point A1. This measurement may be used as input for selecting the X measurements to be reported. Beam Selection for beam reporting may select the X measurements from the measurements provided at point E. The configuration of this module may be provided by RRC signalling. The F point may correspond to beam measurement information included in measurement report (e.g., sent) on the radio interface.

Measurement reports may be characterized by the following: Measurement reports may comprise the measurement identity of the associated measurement configuration that triggered the reporting; cell and beam measurement quantities to be included in measurement reports are configured by the network; the quantity/number of non-serving cells to be reported can be limited through configuration by the network; and/or cells belonging to a blacklist or exclude-list configured by the network are not used in event evaluation and reporting, and conversely when a whitelist is configured by the network, only the cells belonging to the whitelist or allow-list are used in event evaluation and reporting. Beam measurements to be included in measurement reports may be configured by the network (e.g., beam identifier only, measurement result and beam identifier, or no beam reporting).

Intra-frequency neighbor (cell) measurements and inter-frequency neighbor (cell) measurements may be defined as follows: SSB based intra-frequency measurement where a measurement is defined as an SSB based intra-frequency measurement provided the center frequency of the SSB of the serving cell and the center frequency of the SSB of the neighbor cell are the same, and the subcarrier spacing of the two SSBs is also the same; SSB based inter-frequency measurement where a measurement is defined as an SSB based inter-frequency measurement provided the center frequency of the SSB of the serving cell and the center frequency of the SSB of the neighbor cell are different, or the subcarrier spacing of the two SSBs is different; CSI-RS based intra-frequency measurement; and/or CSI-RS based inter-frequency measurement where a measurement is defined as a CSI-RS based inter-frequency measurement if it is not a CSI-RS based intra-frequency measurement.

The CSI-RS based intra-frequency measurement may be a measurement defined as a CSI-RS based intra-frequency measurement provided that: the subcarrier spacing of CSI-RS resources on the neighbor cell configured for measurement is the same as the SCS of CSI-RS resources on the serving cell indicated for measurement; for 60 kHz subcarrier spacing, the CP type of CSI-RS resources on the neighbor cell configured for measurement is the same as the CP type of CSI-RS resources on the serving cell indicated for measurement; and/or the center frequency of CSI-RS resources on the neighbor cell configured for measurement is the same as the center frequency of CSI-RS resource on the serving cell indicated for measurement.

For SSB based measurements, one measurement object may correspond to one SSB and the wireless device considers different SSBs as different cells. Whether a measurement is non-gap-assisted or gap-assisted depends on the capability of a wireless device, the active BWP of the wireless device and the current operating frequency. For SSB based inter-frequency measurement, if the measurement gap requirement information is reported by the wireless device, a measurement gap configuration may be provided according to the information. Otherwise, a measurement gap configuration may be provided in the following cases: if the wireless device only supports per-wireless device measurement gaps; and/or if the wireless device supports per-FR measurement gaps and any of the serving cells are in the same frequency range of the measurement object. For SSB based intra-frequency measurement, if the measurement gap requirement information is reported by the wireless device, a measurement gap configuration may be provided according to the information. Otherwise, a measurement gap configuration may be (e.g., may always be) provided in the following case: Other than the initial BWP, if any of the wireless device configured BWPs do not contain the frequency domain resources of the SSB associated to the initial DL BWP. In non-gap-assisted scenarios, a wireless device may carry out such measurements without measurement gaps. In gap-assisted scenarios, a wireless device may not be assumed to be able to carry out such measurements without measurement gaps.

Figure 20:
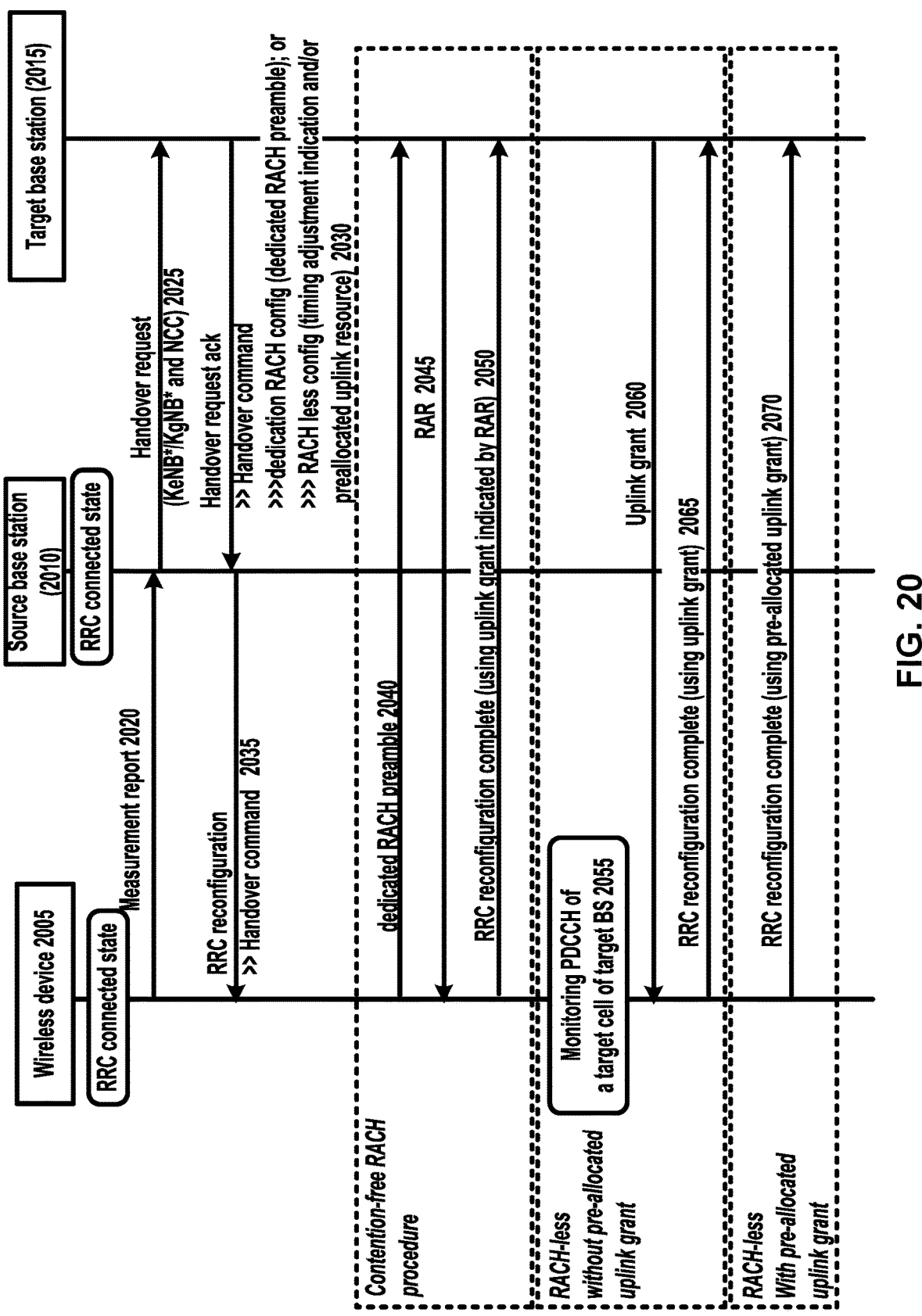
FIG. 20 shows an example of a handover procedure of a wireless device.

FIG. 20 shows an example of a handover procedure of a wireless device. The handover procedure may comprise a layer 4 (L3) handover procedure. A wireless device 2005 may send (e.g., transmit) a measurement report 2020 to the base station. A source base station 2010 may determine to hand off the wireless device 2005 to a target base station 2015. The determination may be based on the measurement report 2020, load balancing requirement, issues with the source and/or among others base station, etc. The source base station 2010 may issue a handover request 2025 message to the target base station 2015 passing necessary information to prepare the HO at the target side (wireless device/UE X2/Xn signaling context reference at, wireless device/UE S1 EPC signaling context reference, target cell ID, KeNB*/KgNB*, RRC context including the identity (e.g., Cell-radio network temporary identifier, C-RNTI)) of the wireless device 2005 in the source base station 2010, AS-configuration, radio (e.g., radio access) bearer context and physical layer ID of the source cell+short MAC-I for possible RLF recovery). The radio (e.g., radio access) bearer context may comprise necessary radio network layer (RNL) and transport network layer (TNL) addressing information, and QoS profiles of the E-RABs. The information may further comprise at least RRM-configuration including wireless device 2005 inactive time. AS-configuration may comprise antenna Info and DL carrier frequency, the current QoS flow to DRB mapping rules applied to the wireless device 2005, the SIB1 from the source base station 2010, the wireless device 2005 capabilities for different RATs and PDU session related information. The AS-configuration may further comprise the wireless device 2005 reported measurement information including beam-related information. The PDU session related information may include the slice information and QoS flow level QoS profile(s). The source base station 2010 may also request a DAPS handover for one or more DRBs Admission Control may be performed by a target base station 2015 dependent on a received radio (e.g., radio access) bearer QoS information to increase the likelihood of a successful HO, for example, if resources may be granted by target base station 2015. The target base station 2015 may configure required resources according to the received radio (e.g., radio access) bearer QoS information and reserves a C-RNTI and/or, optionally, a RACH preamble. AS-configuration that may be used in the target cell may either be specified independently (e.g., an establishment) or, alternatively, as a delta compared to the AS-configuration used in the source cell (e.g., a reconfiguration). The target base station 2015 may prepare HO with L1/L2 and send the handover request acknowledge 2030 (e.g., Handover request ack) to the source base station 2010. The handover request acknowledge 2030 (e.g., Handover request ack) message may include a transparent container, to be sent to the wireless device 2005 as an RRC message, to perform the handover. The container may include a new C-RNTI, target base station 2015 security algorithm identifiers for the selected security algorithms, may include a dedicated RACH preamble, and possibly some other parameters i.e. access parameters, SIBs, etc. For RACH-less HO (e.g., if RACH-less HO may be configured), the container includes timing adjustment indication and optionally a pre-allocated uplink grant. The handover request 2020 acknowledge message may also include RNL/TNL information for the forwarding tunnels, if necessary.

A target base station 2015 may generate a RRC message to perform a handover. The RRC message may be an RRC reconfiguration message 2035 (e.g., RRC reconfiguration) including information for HO (e.g., mobility control info and/or reconfiguration sync), to be sent by a source base station 2010 to a wireless device 2005. The source base station 2010 may perform the necessary integrity protection and/or ciphering of the message.

A source base station 2010 may trigger a handover (e.g., a Uu handover) by sending an RRC reconfiguration message 2035 (e.g., RRC reconfiguration) to a wireless device 2005. The RRC reconfiguration message 2035 (e.g., RRC reconfiguration) may comprise information required to access a target cell: the target cell ID, new C-RNTI, a target base station 2015 security algorithm identifiers for the selected security algorithms. The RRC reconfiguration message 2035 (e.g., RRC reconfiguration) may comprise a set of dedicated RACH resources, an association between RACH resources and SSB(s), an association between RACH resources and wireless device-specific CSI-RS configuration(s), common RACH resources, and/or system information of the target cell, etc.

A wireless device 2005 may receive a RRC reconfiguration message 2035 (e.g., RRC reconfiguration) with necessary parameters (e.g., new C-RNTI, target base station security algorithm identifiers, and optionally dedicated RACH preamble, target base station SIBs, etc.) and/or may be commanded by a source base station 2010 to perform a HO. The RRC reconfiguration may include a timing adjustment indication and/or, optionally, a pre-allocated uplink grant for accessing a target base station 2015, for example, if RACH-less HO may be configured. The wireless device 2005 may monitor PDCCH of the target base station 2015 (step 2055) to receive an uplink grant 2060, for example, if the pre-allocated uplink grant may not be included. The wireless device 2005 may not need to delay the handover execution for delivering the HARQ/ARQ responses to the source base station 2010.

A wireless device 2005, may perform synchronization to a target base station 2015, for example, for no RACH-less HO, (e.g., if RACH-less HO is not configured), after the wireless device receives a RRC reconfiguration message 2035 (e.g., RRC reconfiguration) including the information for HO (e.g., mobility control info or reconfiguration sync). The wireless device 2005 may perform synchronization to target base station 2015 and/or access the target cell via RACH, following a contention-free procedure, for example, if a dedicated RACH preamble was indicated in the information for HO, and/or following a contention-based procedure, if no dedicated preamble was indicated. For the contenting-free procedure, the wireless device 2005 may send the dedicated RACH preamble 2040 to the target base station 2015. The target base station 2015, based on the dedicated RACH preamble, may send RAR 2045 to the wireless device 2005. The wireless device 2005, using uplink grant indicated by RAR, may send RRC reconfiguration complete 2050 to the target base station 2015. The wireless device 2005 may derive the target base station 2015 specific keys and/or configure selected security algorithms that may be used in the target cell. The target base station 2015 may respond with a UL allocation and/or a timing advance, for example, for no RACH-less HO, (e.g., if RACH-less HO may not be configured). For no RACH-less HO, (e.g., if RACH-less HO may not be configured), if the wireless device 2005 has successfully accessed the target cell, the wireless device 2005 may send the RRC reconfiguration complete message (C-RNTI) to confirm the handover. The RRC reconfiguration complete message may also comprise an uplink buffer status report (BSR), and/or UL data, whenever possible, to the target base station 2015, which indicates that the handover procedure may be completed for the wireless device 2005. The target base station 2015 may verify the C-RNTI sent in the RRC reconfiguration complete message. The target base station 2015 may be able to now begin sending data to the wireless device 2005.

A wireless device 2005 may perform synchronization to target base station 2015, for example, if RACH-less HO is configured (e.g., RACH-less HO). The wireless device 2005 may derive a target base station 2015 specific keys and/or configure selected security algorithms that may be used in the target cell. The wireless device 2005 may receive an uplink grant 2060 via the PDCCH of the target cell, for example, if RACH-less HO is configured (e.g., RACH-less HO), and if the wireless device 2005 did not receive a periodic pre-allocated uplink grant in the RRC reconfiguration message 2035 (e.g., RRC reconfiguration) including information for a HO (e.g., mobility control info or reconfiguration sync). The wireless device 2005 may use the first available uplink grant after synchronization to the target cell. The wireless device 2005 may send the RRC reconfiguration complete message (C-RNTI) 2065 to confirm the handover, together with an uplink BSR, and/or UL data, for example, to the target base station 2015, if possible, if RACH-less HO is configured (e.g., RACH-less HO), and after the wireless device 2005 has received the uplink grant 2060. The target base station 2015 may verify the C-RNTI sent in the RRC reconfiguration complete message 2070. The target base station 2015 may be able to now begin sending data to the wireless device 2005. The handover procedure may be completed for the wireless device 2005, for example, if the wireless device 2005 receives a wireless device contention resolution identity MAC control element from the target base station 2015.

An RRM configuration may include both beam measurement information (e.g., for layer 3 mobility) associated with SSB(s) and/or CSI-RS(s) for reported cell(s), for example, if both types of measurements are available. The RRM measurement information may comprise the beam measurement for listed cells that belong to a target base station 2015. The common RACH configuration for beams in the target cell may only be associated with the SSB(s). The network may be able to have a dedicated RACH configurations associated with the SSB(s) and/or have dedicated RACH configurations associated with CSI-RS(s) within a cell. The target base station 2015 may include only one of the following RACH configurations in a handover command to enable the wireless device 2005 to access the target cell: common RACH configuration; common RACH configuration+dedicated RACH configuration associated with SSB; common RACH configuration+dedicated RACH configuration associated with CSI-RS. The dedicated RACH configuration may allocate RACH resource(s) together with a quality threshold to use them. The dedicated RACH resources may be prioritized by the wireless device 2005 and/or the wireless device 2005 may not switch to contention-based RACH resources, for example, if dedicated RACH resources are provided, and if the quality threshold of those dedicated resources is met. The order to access the dedicated RACH resources may be determined by a wireless device 2005 implementation.

A wireless device may transmit to a base station an RACH-less HO capability indication which indicates whether the wireless device supports RACH-less handover. Based on the RACH-less HO capability indication, a base station may determine to configure/transmit a configuration for RACH-less HO (RACH skip configuration).

For network-controlled mobility in RRC connected state (e.g., L3 handover), the PCell may be changed using an RRC connection reconfiguration message (e.g., RRCReconfiguration) including reconfigurationWithSync (in NR specifications) or mobilityControlInfo in LTE specifications (handover). The SCell(s) may be changed using the RRC connection reconfiguration message either with or without the reconfigurationWithSync or mobilityControlInfo. The network may trigger the HO procedure e.g., based on radio conditions, load, QoS, wireless device category, and/or the like. The RRC connection reconfiguration message may be implemented based on examples described herein.

As shown in FIG. 20, a network may configure the wireless device to perform measurement reporting (possibly including the configuration of measurement gaps). The measurement reporting is a layer 3 reporting, different from layer 1 CSI reporting. The wireless device may transmit one or more measurement reports to the source base station (or source PCell). In an example, the network may initiate HO blindly, for example without having received measurement reports from the wireless device. Before sending the HO message to the wireless device, the source base station may prepare one or more target cells. The source base station may select a target PCell.

As shown in FIG. 20, based on the one or more measurement reports from the wireless device, the source base station may provide the target base station with a list of best cells on each frequency for which measurement information is available, for example, in order of decreasing RSRP values. The source base station may also include available measurement information for the cells provided in the list. The target base station may decide which cells are configured for use after HO, which may include cells other than the ones indicated by the source base station. The source base station may transmit a HO request to the target base station. The target base station may response with a HO message. In an example, in the HO message, the target base station may indicate access stratum configuration to be used in the target cell(s) for the wireless device.

A source base station may transparently (for example, does not alter values/content) forward the HO message/information received from the target base station to the wireless device. In the HO message, RACH resource configuration may be configured for the wireless device to access a cell in the target base station. If/when appropriate, the source base station may initiate data forwarding for (a subset of) the dedicated radio bearers.

As shown in FIG. 20, after receiving the HO message, a wireless device may start a HO timer (e.g., T304) with an initial timer value. The HO timer may be configured in the HO message. Based on the HO message, the wireless device may apply the RRC parameters of a target PCell and/or a cell group (MCG/SCG) associated with the target PCell of the target base station and perform downlink synchronization to the target base station. After or in response to performing downlink synchronization (e.g., searching a suitable/detectable SSB from candidate SSBs configured on the target base station) to the target base station, the wireless device may initiate a random access (e.g., contention-free, or contention-based, based on examples of FIG. 13A, FIG. 13B and/or FIG. 13C) procedure attempting to access the target base station at the available RACH occasion according to a RACH resource selection, where the available RACH occasion may be configured in the RACH resource configuration (e.g., based on examples of FIG. 22 described herein). If/when allocating a dedicated preamble for the random access in the target base station, RAN may ensure the preamble is available from the first RACH occasion the wireless device may use.

A wireless device may activate the uplink BWP configured with firstActiveUplinkBWP-id and the downlink BWP configured with firstActiveDownlinkBWP-id on the target PCell upon performing HO to the target PCell. A wireless device, after applying the RRC parameters of a target PCell and/or completing the downlink synchronization with the target PCell, may perform UL synchronization by conducting RACH procedure, e.g., based on examples described above with respect to FIG. 13A, FIG. 13B and/or FIG. 13C. The performing UL synchronization may comprise transmitting a preamble via an active uplink BWP (e.g., a BWP configured as firstActiveUplinkBWP-id as shown in FIG. 21) of uplink BWPs of the target PCell, monitoring PDCCH on an active downlink BWP (e.g., a BWP configured as firstActiveDownlinkBWP-id as shown in FIG. 21) for receiving a RAR comprising a TA which is used for PUSCH/PUCCH transmission via the target PCell, receiving the RAR and/or obtaining the TA. After completing the UL synchronization, the wireless device obtains the TA to be used for PUSCH/PUCCH transmission via the target PCell. The wireless device, by using the TA to adjust uplink transmission timing, transmits PUSCH/PUCCH via the target PCell. The adjusting uplink transmission timing may comprise advancing or delay the transmissions by an amount indicated by a value of the TA (e.g., to help ensure the uplink signals received at the target PCell are aligned (in time domain) with uplink signals transmitted from other wireless devices).

A wireless device may release RRC configuration parameters of the source PCell and an MCG/SCG associated with the source PCell. A HO triggered by receiving a RRC reconfiguration message (e.g., RRCReconfiguration) comprising the HO command/message (e.g., by including reconfigurationWithSync (in NR specifications) or mobilityControlInfo in LTE specifications (handover)) may be referred to as a normal HO, and/or an unconditional HO, which may be contrast with a conditional HO (CHO).

As shown in FIG. 20, a wireless device may transmit a preamble to a target base station via a RACH resource. The RACH resource may be selected from a plurality of RACH resources (e.g., configured in rach-ConfigDedicated IE as shown in FIG. 21 and FIG. 22) based on SSBs/CSI-RSs measurements of the target base station. The wireless device may select a (best) SSB/CSI-RS of the configured SSBs/CSI-RSs of the target base station. The wireless device may select a SSB/CSI-RS, from the configured SSBs/CSI-RSs of the target base station, with a RSRP value greater than a RSRP threshold configured for the RA procedure. The wireless device then determines a RACH occasion (e.g., time domain resources, etc.) associated with the selected SSB/CSI-RS and determines the preamble associated with the selected SSB/CSI-RS.

A target base station may receive the preamble transmitted from the wireless device. The target base station may transmit a random access response (RAR) to the wireless device, where the RAR comprises the preamble transmitted by the wireless device. The RAR may comprise a TAC to be used for uplink transmission via the target PCell. In response to receiving the RAR comprising the preamble, the wireless device may complete the random access procedure. In response to completing the random access procedure, the wireless device may stop the HO timer (T304). A wireless device may transmit an RRC reconfiguration complete message to the target base station, after completing the random access procedure, or before completing the random access procedure. The wireless device, after completing the random access procedure towards the target base station, may apply first parts of CQI reporting configuration, SR configuration and SRS configuration that do not require the wireless device to know a system frame number (SFN) of the target base station. The wireless device, after completing the random access procedure towards the target PCell, may apply second parts of measurement and radio resource configuration that require the wireless device to know the SFN of the target base station (e.g. measurement gaps, periodic CQI reporting, SR configuration, SRS configuration), upon acquiring the SFN of the target base station. Based on an HO procedure (e.g., as shown in FIG. 20), for network energy saving purpose, a base station may instruct each wireless device in a source cell to perform a 4-step or 2-step RACH-based (contention free) HO to a neighbor cell. After the wireless devices complete the HO procedure to neighbor cells, the base station may turn off (RF parts and BBUs, etc.) for energy saving.

FIG. 21 shows an example of an RRC message for a handover (HO). In the example of FIG. 21, a base station may transmit, and/or a wireless device may receive, a RRC reconfiguration message (e.g., RRCReconfiguration-IEs) indicating an RRC connection modification. It may convey information for measurement configuration, mobility control, radio resource configuration (including RBs, MAC main configuration and physical channel configuration) and AS security configuration. The RRC reconfiguration message may comprise a configuration of a master cell group (masterCellGroup). The master cell group may be associated with a SpCell (SpCellConfig). When the SpCellConfig comprises a reconfiguration with Sync (reconfigurationWithSync), the wireless device determines that the SpCell is a target PCell for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. In an example, a dedicated RACH resource may comprise one or more RACH occasions, one or more SSBs, one or more CSI-RSs, one or more RA preamble indexes, etc.

FIG. 22 shows an example of RRC messages for a RACH resource configuration for a HO procedure. As shown in FIG. 21, the reconfigurationWithSync IE comprises a dedicated RACH resource indicated by a rach-ConfigDedicated IE. As shown in FIG. 22, a rach-ConfigDedicated IE comprises a contention free RA resource indicated by a cfra IE. The cfra IE comprises a plurality of occasions indicated by a rach-ConfigGeneric IE, a ssb-perRACH-Occasion IE, a plurality of resources associated with SSB (indicated by a ssb IE) or CSI-RS (indicated by a csirs IE). The ssb-perRACH-Occasion IE indicates a number of SSBs per RACH occasion. The rach-ConfigGeneric IE indicates configuration of CFRA occasions. The wireless device ignores preambleReceivedTargetPower, preambleTransMax, power-RampingStep, ra-ResponseWindow signaled within this field and use the corresponding values provided in RACH-ConfigCommon.

As shown in FIG. 22, if/when the plurality of resources for the CFRA configured in the reconfigurationWithSync IE are associated with SSBs, the resources (resources IE) comprise the ssb IE. The ssb IE comprises a list of CFRA SSB resources (ssb-ResourceList) and an indication of PRACH occasion mask index (ra-ssb-OccasionMaskIndex). Each of the list of CFRA SSB resources comprises a SSB index, a RA preamble index and etc. The ra-ssb-OccasionMaskIndex indicates a PRACH mask index for RA resource selection. The mask is valid for all SSB resources signaled in ssb-ResourceList.

As shown in FIG. 22, when the plurality of resources for the CFRA configured in the reconfigurationWithSync IE are associated with CSI-RSs, the resources (resources IE) comprise the csirs IE. The csirs IE comprises a list of CFRA CSI-RS resources (csirs-ResourceList) and a RSRP threshold (rsrp-ThresholdCSI-RS). Each of the list of CFRA CSI-RS resources comprises a CSI-RS index, a list of RA occasions (ra-OccasionList), a RA preamble index and etc.

Figure 23:
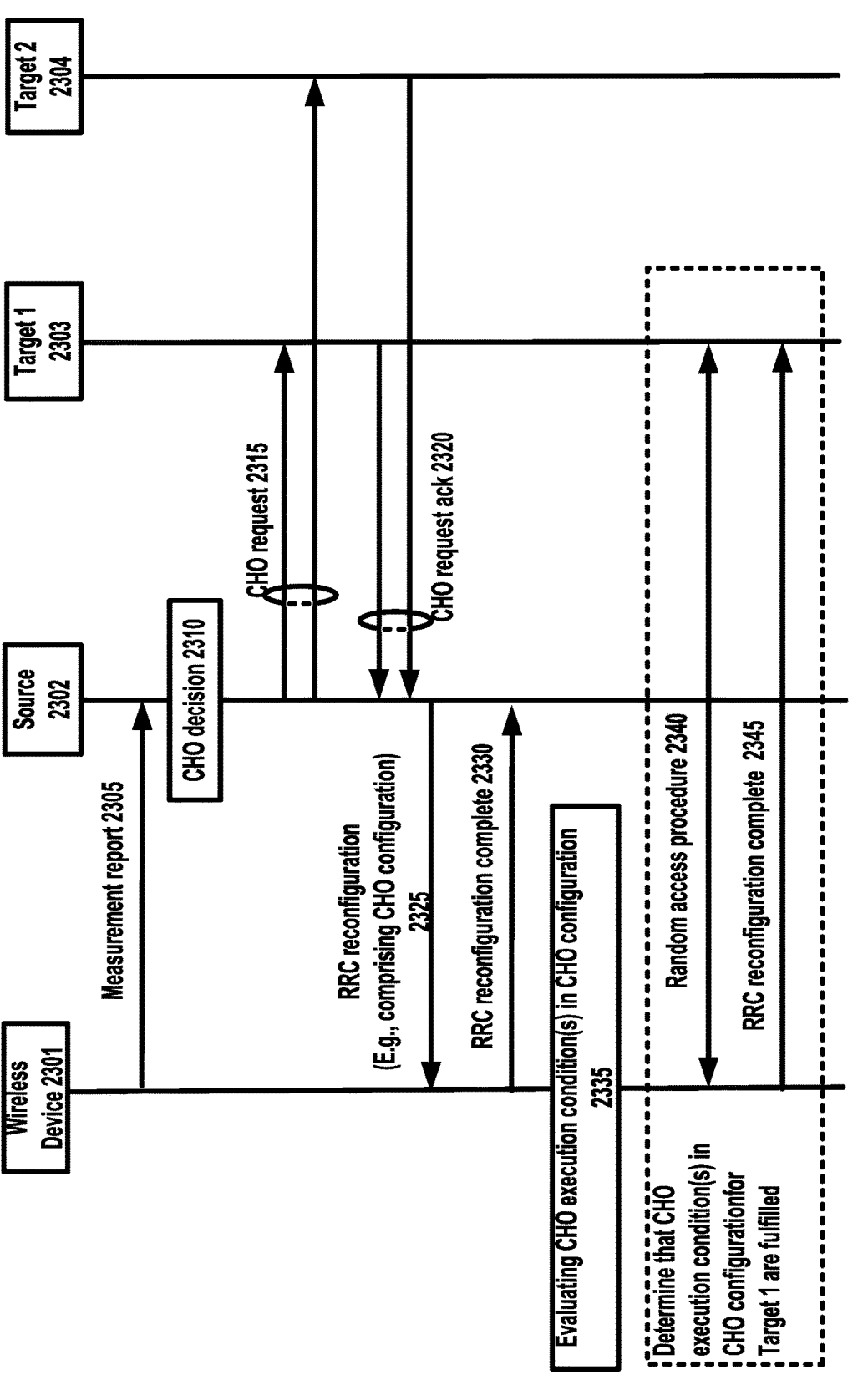
FIG. 23 shows an example of a conditional handover (CHO) procedure.

Executing the HO triggered by receiving a RRC reconfiguration message comprising a reconfigurationWithSync IE may introduce HO latency (e.g., too-late HO), for example, if/when a wireless device is moving in a network deployed with multiple small cells (e.g., with hundreds of meters of cell coverage of a cell). An improved HO mechanism, based on measurement event triggering, is proposed to reduce the HO latency, such as shown in FIG. 23.

Multi-radio dual connectivity (MR-DC or DC) may be dual connectivity between E-UTRA (e.g., eNB, LTE base station) and NR nodes (e.g., gNB, NR base station), or between two NR nodes. SpCell may be a primary cell of a master cell group (MCG) or a primary cell of secondary cell group (SCG). PCell may be SpCell of a master cell group. PSCell may be SpCell of a secondary cell group.

A MCG may be in MR-DC, a group of serving cells associated with a master node, comprising a SpCell (e.g., a PCell) and may further comprise one or more SCells. A master node (MN) may be in DC, a radio access node (e.g., base station) that provides a control plane connection to a core network. The MN may be a master eNB, a master ng-eNB, and/or a master base station. A secondary cell group (SCG) may be in MR-DC, a group of serving cells associated with a secondary node, comprising the SpCell (e.g., the PSCell) and may further comprise one or more SCells. The secondary node may be in MR-DC, a radio access node, with no control plane connection to the core network, providing additional resources to a wireless device. The secondary node may be an en-gNB, a secondary ng-eNB, and/or a secondary base station.

Conditional PSCell addition is a PSCell addition procedure that is executed only when PSCell addition condition(s) are met. Conditional PSCell change: a PSCell change procedure that is executed only when PSCell execution condition(s) are met. A conditional handover (CHO) may be defined as a handover (e.g., layer 3 handover) that may be executed by a wireless device if one or more handover execution conditions may be met. The wireless device may begin evaluating the execution condition(s) based on receiving the CHO configuration, and may stop evaluating the execution condition(s) based on a handover being executed.

The following principles may apply to a CHO: the CHO configuration may contain the configuration of CHO candidate cell(s) generated by candidate base station(s) and/or execution condition(s) generated by a source base station. An execution condition may consist of one or more trigger condition(s) (e.g., CHO events, A3/A5, etc.). Only a single reference signal (RS) type may be supported and/or at most two different trigger quantities (e.g. RSRP and RSRQ, RSRP and SINR, etc.) may be configured simultaneously for an evaluation of the CHO execution condition of a single candidate cell. A wireless device may execute a HO procedure, (e.g., regardless of any previously received CHO configuration), for example, based on receiving a HO command (e.g., without CHO configuration), and before any CHO execution condition may be satisfied. The wireless device may not monitor a source cell, for example, if executing a CHO (e.g., from the time a wireless device begins synchronization with a target cell).

A CHO procedure (e.g., intra-AMF/UPF CHO procedure) may be as follows. A wireless device context within a source base station may contain information comprising roaming and/or access restrictions that may have been provided either at connection establishment and/or at a last tracking area (TA) update. The source base station may configure the wireless device for a measurement procedure and the wireless device may report according to a measurement configuration. The source base station may determine to use a CHO. The source base station may request a CHO for one or more candidate cells belonging to one or more candidate base stations. A CHO request message may be sent for each candidate cell. Admission control may be performed by a target base station. Slice-aware admission control may be performed, if the slice information may be sent to the target base station. The target base station may reject such PDU sessions, if the PDU sessions are associated with non-supported slices.

A candidate base station(s) may send a CHO response (e.g., HO request acknowledge) including configuration of a CHO candidate cell(s) to a source base station, for example, as a CHO procedure. The CHO response message may be sent to each candidate cell. The source base station may send a RRC reconfiguration message, to the wireless device, containing the configuration of CHO candidate cell(s) and/or the CHO execution condition(s). The CHO configuration of candidate cells may be followed by other reconfiguration from the source base station.

A wireless device may send a RRC reconfiguration complete message to a source base station for a CHO procedure. The source base station may send an early status transfer message to a target base station(s) of a candidate cell(s), for example, if early data forwarding is applied. The wireless device may maintain connection with the source base station after receiving CHO configuration, and may begin evaluating the CHO execution conditions for the candidate cell(s). The wireless device may detach from the source base station, may apply the stored corresponding configuration for that selected candidate cell, may synchronize to the candidate cell, and may complete the RRC handover procedure by sending a RRC reconfiguration complete message to the target base station, for example, if at least one CHO candidate cell satisfies the corresponding CHO execution condition. The wireless device may remove/release stored CHO configurations, for example, based on (e.g. after) a successful completion of a RRC handover procedure. The target base station may send the handover success message to the source base station to inform the source base station that the wireless device has successfully accessed the target cell. The source base station may send the SN (e.g., PDCP sequence number) status transfer message. Late data forwarding may be initiated as soon as the source base station receives the handover success message. The source base station may send a handover cancel message to other signaling connections and/or any other candidate target base stations, to cancel a CHO for the wireless device.

A CHO may be characterized by a configured execution condition that may determine if a corresponding HO command may be executed. A base station may send a CHO configuration. A wireless device may begin evaluating the execution condition(s) for CHO candidate cells based on receiving the CHO configuration. The wireless device may execute the HO command based on condition(s) being met for a CHO candidate cell. The wireless device may stop evaluating execution condition(s) for other candidate cells during the CHO execution. The CHO configuration may contain the configuration of CHO candidate cell(s) generated by candidate target base stations and execution condition(s) generated by a source base station. The execution condition may consist of measurement event, for example, like A3 and/or A5. At most two different trigger/execution quantities (e.g., RSRP and RSRQ, RSRP and SINR, etc.) may be configured simultaneously for the evaluation of CHO execution condition of a single candidate cell. The wireless device may maintain connection with source base station at least until the wireless device satisfies the CHO execution condition for CHO candidate cell(s). A reception of a normal HO command (e.g., without a conditional component) may override any configured CHO configuration. After source base station sending CHO command to wireless device, the network may be allowed to change a source base station configuration. The network may add, modify, and/or remove/release a configured CHO configuration using a RRC message (e.g., until the wireless device begins executing CHO to a candidate cell). The wireless device may not monitor source cell during a time that the wireless device is executing CHO.

FIG. 23 shows an example of a conditional handover (CHO) of a wireless device. A source base station 2302 (e.g., source) may determine a conditional handover (e.g., a CHO decision 2310) based on a measurement report 2305 from a wireless device 2301. The source base station 2302 (e.g., source) may send a CHO request message 2315 to CHO target base station candidates (e.g., target 1 2303 and/or target 2 2304). The target base station (e.g., target 1 2303 and/or target 2 2304) may send a CHO response message (e.g., CHO request ack 2320) including a CHO configuration, for example, based on receiving the CHO request message 2315. The source base station 2302 (e.g., source) may send a RRC reconfiguration message 2325 containing the CHO configuration of candidate cell(s) to the wireless device 2323, for example, based on receiving the CHO response message (e.g., CHO request ack 2320). The wireless device 2301 may send a RRC reconfiguration complete message 2330 to the source base station 2302 (e.g., source), for example, based on receiving the RRC reconfiguration message 2325. The wireless device 2301 may begin evaluating CHO execution conditions for candidate cells in the CHO configuration 2335 and may maintain a connection with the source base station 2302 (e.g., source). The wireless device 2301 performing random access procedure 2340 may detach from the source base station 2302 (e.g., source), may apply the stored configuration of the selected candidate cell, and may synchronize to the candidate cell, for example, based on at least one CHO candidate cell satisfying the corresponding CHO execution condition. Based on a synchronization (e.g., based on a successful synchronization), the wireless device 2301 may complete the handover procedure by sending a RRC reconfiguration complete message 2345 to the target base station (e.g., target 1 2303) via the candidate cell.

Figure 25:
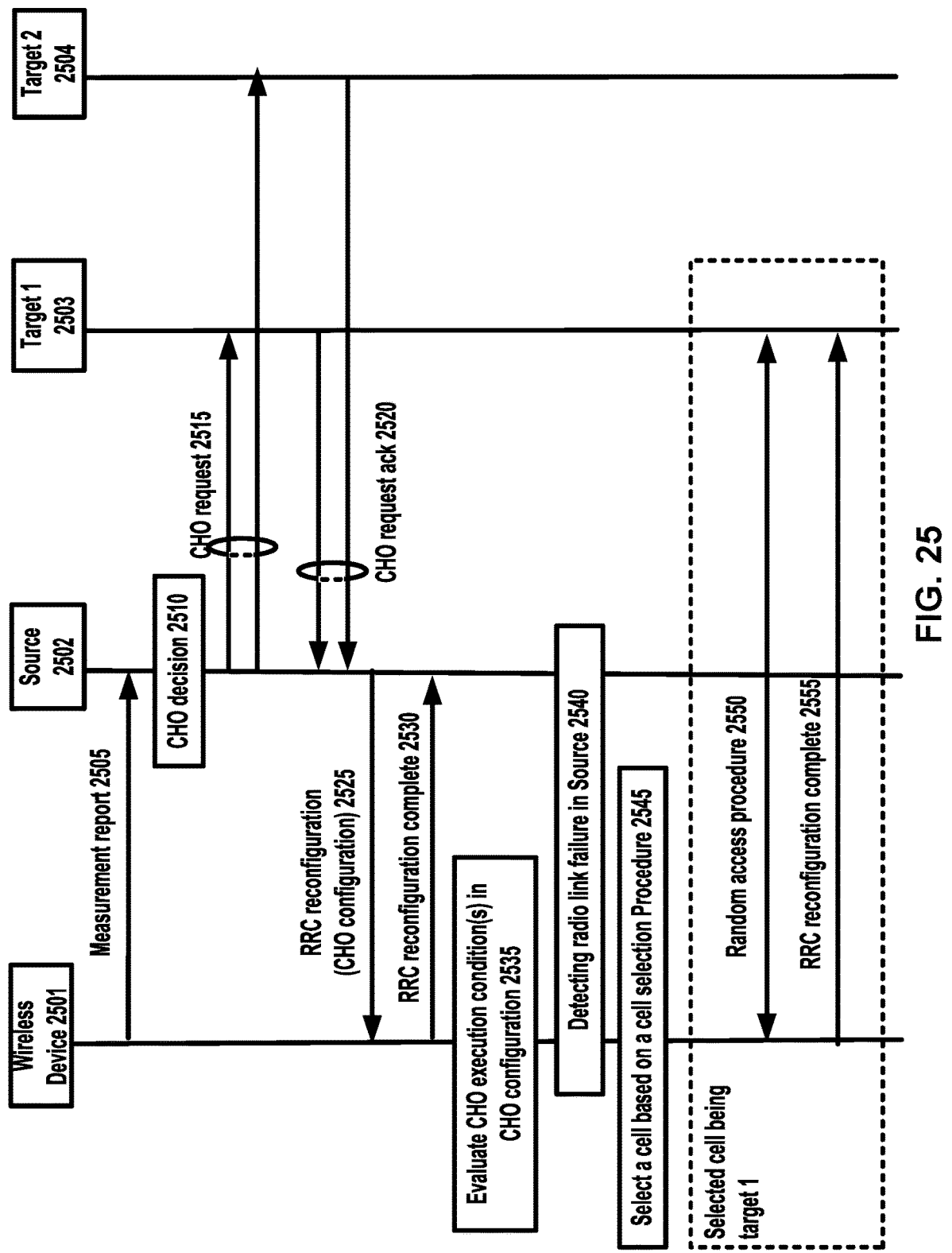
FIG. 25 shows an example of a connection recovery procedure with a conditional handover configuration.

FIG. 25 shows an example of a handover failure. Following similar steps as shown and described with respect to FIG. 23, a base station (e.g. source base station 2502) may receive a measurement report 2505 (e.g., from a wireless device 2501), determine a CHO decision 2510, send a CHO request 2515, receive a CHO request response (e.g., CHO request acknowledgement 2520), send a RRC reconfiguration message (e.g., CHO configuration) 2525, and/or receive an RRC reconfiguration complete message 2530. A wireless device 2501 may evaluate CHO execution conditions in a CHO configuration 2535. The wireless device 2501 may execute a HO command if/after condition(s) may be met for a CHO candidate cell, for example, based on receiving a CHO configuration (2425). The wireless device 2501 may detect a radio link failure (RLF) 2540 in a source base station (e.g., a PCell). The wireless device 2501 may perform a cell selection procedure 2545, for example, based on detecting the RLF. The wireless device 2501 may select a cell, for example, based on the cell selection procedure. The wireless device 2501 may perform CHO execution to the selected cell, for example, based on the selected cell being a CHO candidate. Alternatively, a wireless device 2501 may perform an RRC connection reestablishment procedure via random access procedure. The wireless device 2501 may perform a cell selection procedure, for example, based on a legacy handover failure and/or a failure to access a CHO candidate cell. The wireless device 2501 may perform CHO execution, for example, based on the selected cell being a CHO candidate cell. Alternatively, the wireless device 251 may perform a RRC connection reestablishment procedure via random access procedure 2550. The wireless device 2505 may send, based on the random access procedure 2540, a RRC reconfiguration complete message 2555.

As shown in FIG. 23, a network (e.g., a base station, a source base station) may configure the wireless device to perform measurement reporting (possibly including the configuration of measurement gaps) for a plurality of neighbor cells (e.g., cells from a candidate target base station 1, a candidate target base station 2, etc.). The measurement reporting is a layer 3 reporting, different from layer 1 CSI reporting. The wireless device may transmit one or more measurement reports to the source base station (or source PCell).

As shown in FIG. 23, based on the one or more measurement reports from the wireless device, the source base station may provide the target base station with a list of best cells on each frequency for which measurement information is available. The list may be in a particular order such as, for example, in order of decreasing RSRP. The source base station may include available measurement information for the cells provided in the list. The target base station may decide which cells are configured for use after the CHO, which may include cells other than the ones indicated by the source base station. As shown in FIG. 23, a source base station may transmit a HO request to a target base station. The target base station may response with a HO message. In the HO message, the target base station may indicate access stratum configuration (e.g., RRC configurations of the target cells) to be used in the target cell(s) for the wireless device. A source base station may transparently (for example, does not alter values/content) forward a handover (e.g., contained in RRC reconfiguration messages of the target base station) message/information received from the target base station to the wireless device.

A source base station may configure a CHO procedure different from a normal HO procedure (e.g., such as shown in FIG. 20, FIG. 21 and/or FIG. 22), by comprising a conditional reconfiguration message (e.g., conditionalReconfiguration IE in RRC reconfiguration message, described with respect to FIG. 24). The conditional reconfiguration message may comprise a list of candidate target PCells, each candidate target PCell being associated with dedicated RACH resources for the RA procedure in case a CHO is executed to the candidate target PCell. A CHO execution condition (or RRC reconfiguration condition) is also configured for each of the candidate target PCells, etc. A CHO execution condition may comprise a measurement event A3 where a candidate target PCell becomes amount of offset better than the current PCell (e.g., the PCell of the source base station), a measurement event A4 where a candidate target PCell becomes better than absolute threshold configured in the RRC reconfiguration message, a measurement event A5 where the current PCell becomes worse than a first absolute threshold and a candidate target PCell becomes better than a second absolute threshold, etc.

A wireless device, according to the received RRC reconfiguration messages comprising parameters of a CHO procedure, may evaluate the (RRC) reconfiguration conditions for the list of candidate target PCells and/or the current/source PCell, such as described with respect to FIG. 23. The wireless device may measure RSRP/RSRQ of SSBs/CSI-RSs of each candidate target PCell of the list of candidate target PCells. Different from the normal HO procedure, the wireless device may not execute the HO to the target PCell based on (e.g., in response to) receiving the RRC reconfiguration messages comprising the parameters of the CHO procedure. The wireless device may execute the HO to a target PCell for the CHO if (e.g., only if/when) the (RRC) reconfiguration condition(s) of the target PCell are met (or satisfied). Otherwise, the wireless device may keep evaluating the reconfiguration conditions for the list of the candidate target PCells (e.g., at least until an expiry of a HO timer, and/or after receiving a RRC reconfiguration indicating an abort of the CHO procedure).

A wireless device may execute the CHO procedure towards the first candidate target PCell, for example, based on (e.g., in response to) a reconfiguration condition of a first candidate target PCell (e.g., PCell 1) being met or satisfied, such as described with respect to FIG. 23. The wireless device may select on of multiple candidate target PCells by its implementation when the multiple candidate target PCells have reconfiguration conditions satisfied or met.

Executing a CHO procedure towards a first candidate target PCell may be the same as or similar to executing a HO procedure. By executing the CHO procedure, a wireless device may release RRC configuration parameters of the source PCell and the MCG associated with the source PCell, apply the RRC configuration parameters of the PCell 1, reset MAC, perform cell group configuration for the received MCG comprised in the RRC reconfiguration message of the PCell 1, and/or perform RA procedure to the PCell 1, etc.

A MCG of the RRC reconfiguration message of the PCell 1 may be associated with a SpCell (SpCellConfig) on the target base station 1. If/when the sPCellConfig comprises a reconfiguration with Sync (reconfigurationWithSync), the wireless device determines that the SpCell is a target PCell (PCell 1) for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. A dedicated RACH resource may comprise one or more RACH occasions, one or more SSBs, one or more CSI-RSs, one or more RA preamble indexes, etc. A wireless device may perform cell group configuration for the received master cell group comprised in the RRC reconfiguration message of the PCell 1 on the target base station 1 according to the example described with respect to FIG. 20.

FIG. 24 shows an example of an RRC message for a CHO. A base station may transmit, and/or a wireless device may receive, a RRC reconfiguration message (e.g., RRCReconfiguration-V1610-IEs) indicating an RRC connection modification. The RRC reconfiguration message may be comprised in a (parent) RRC reconfiguration message (e.g., RRCReconfiguration-IEs) as shown in FIG. 21, where the (parent) RRC reconfiguration message may comprise (L3 beam/cell) measurement configuration (e.g., measConfig IE).

In the example of FIG. 24, the RRC reconfiguration message (e.g., RRCReconfiguration-V1610-IEs) may comprise a conditional reconfiguration IE (conditionalReconfiguration IE). The conditional reconfiguration IE may comprise a list of conditional reconfigurations (condReconfigToAddModList). Each conditional reconfiguration corresponds to a respective candidate target cell (PCell) of a list of candidate target cells. For each conditional reconfiguration of the list of conditional reconfigurations, the base station may indicate one or more measurement events (condExecutionCond) for triggering the CHO on the candidate target PCell, a RRC reconfiguration message (condRRCReconfig) of a candidate target cell (PCell) which is received by the source base station from the target base station via X2/Xn interface. The RRC reconfiguration message of the candidate target cell may be implemented based on examples described above with respect to FIG. 21 and/or FIG. 22. The RRC reconfiguration message may comprise a configuration of a master cell group (masterCellGroup) for the target base station. The master cell group may be associated with a SpCell (SpCellConfig). When the sPCellConfig comprises a reconfiguration with Sync (reconfigurationWithSync), the SpCell is a target PCell for executing the CHO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. A dedicated RACH resource may comprise one or more RACH occasions, one or more SSBs, one or more CSI-RSs, one or more RA preamble indexes, etc.

In the example of FIG. 24, a measurement event (condExecutionCond) for triggering the CHO on the candidate target PCell may be an execution condition that needs to be fulfilled (e.g., at the wireless device) in order to trigger the execution of a conditional reconfiguration for CHO. The indication of the measurement event may point to a measurement ID (MeasId) which identifies a measurement configuration of a plurality of measurement configurations (e.g., comprised in measConfig IE) configured by the source base station. The measurement configuration may be associated with a measurement event (or a conditional event) of a plurality of measurements. A conditional event may comprise a conditional event A3, conditional event A4, and/or conditional event A5, etc. A conditional event A3 is that a candidate target PCell becomes amount of offset better than the current PCell (e.g., the PCell of the source base station). A conditional event A4 is that a candidate target PCell becomes better than an absolute threshold configured in the RRC reconfiguration message. A conditional event A5 is that the current PCell becomes worse than a first absolute threshold and a candidate target PCell becomes better than a second absolute threshold, etc.

Executing a CHO by a wireless device's decision based on evaluating reconfiguration conditions (long-term and/or layer 3 beam/cell measurements against one or more configured thresholds) on a plurality of candidate target cells may cause load unbalanced on cells, and/or may lead to CHO failure in case that the target cell changes its configuration (e.g., for network energy saving) during the CHO condition evaluation, etc. A layer 1 signaling may comprise a DCI transmitted via a PDCCH. A layer 2 signaling may comprise a MAC CE scheduled by a DCI. Layer 1/2 signaling is different from Layer 3 signaling, for HO/CHO, which may comprise a RRC reconfiguration message.

FIG. 25 shows an example of a connection recovery procedure with a conditional handover configuration. A wireless device 2501 may send a measurement report to a source base station 2502 (e.g., step 2505). The source base station 2502 may make a CHO decision (e.g., step 2510). The source base station 2502 may decide a conditional handover based on measurement report from the wireless device 2501. The source base station may send a CHO request message to CHO target base station candidates (e.g., step 2515), such as target base station 2503 and/or target base station 2504. Based on receiving the CHO request message, the target base station may send a CHO response message including a CHO configuration (e.g., step 2520). Based on receiving the CHO response message, the source base station may send an RRC reconfiguration message containing the CHO configuration of candidate cells to the wireless device (e.g., step 2525). Based on receiving the RRC reconfiguration message, the wireless device may send an RRC reconfiguration complete message to the source base station (e.g., step 2530). The wireless device may start evaluating CHO execution conditions for candidate cells in the CHO configuration while maintaining connection with source base station (e.g., step 2535). The wireless device may detect a radio link failure in the source base station (e.g., PCell) or a conditional handover failure (e.g., step 2540). The wireless device may perform a cell selection procedure (e.g., step 2545). Based on a selected cell being a conditional handover candidate cell (e.g., target 1 in FIG. 26), the wireless device may perform a CHO execution. The CHO execution may comprise a random access procedure to the selected cell (e.g., step 2550) and based one successful completion of the random access procedure, sending an RRC reconfiguration message to the selected cell (e.g., step 2555).

Based on at least one CHO candidate cell satisfying the corresponding CHO execution condition, a wireless device may detach from the source base station, apply the stored configuration of the selected candidate cell, and/or synchronize to the candidate cell. Based the synchronization, the wireless device may complete the handover procedure by sending an RRC reconfiguration complete message to the target base station via the candidate cell.

A conditional PSCell addition (CPA) may be defined as a PSCell addition that may be executed by a wireless device (such as the wireless device 2501), for example, if execution condition(s) are met. The wireless device may begin evaluating the execution condition(s) based on receiving a CPA configuration, and may stop evaluating the execution condition(s) based on a PSCell addition and/or a PCell change being triggered.

The following principles may apply to a CPA: The CPA configuration may comprise configuration(s) of CPA candidate PSCell(s), execution condition(s), and may further comprise a MCG configuration, that may be applied, for example, if a CPA execution is triggered. An execution condition may consist of one or two trigger condition(s) (e.g., CondEvents). Only a single RS type, and at most two different trigger quantities (e.g., RSRP and RSRQ, RSRP and SINR, etc.), may be able to be used for the evaluation of CPA execution condition of a single candidate PSCell. A wireless device may execute a PSCell addition procedure and/or a PCell change procedure (e.g., regardless of any previously received CPA configuration), for example, before any CPA execution condition is satisfied, upon reception of a PSCell addition command and/or a PCell change command. The wireless device may release the stored CPA configuration, for example, after the successful completion of a PSCell addition procedure and/or a PCell change procedure. The wireless device may not be required to continue evaluating the execution condition of other candidate PSCell(s), for example, if executing CPA. The wireless device may release all stored conditional reconfigurations (e.g., for CPA and for CHO), for example, based on the CPA procedure being executed successfully.

A SN addition procedure may be initiated by a MN and may be used to establish a wireless device context at the SN to provide resources from the SN to the wireless device. This procedure may be used to add at least an initial SCG serving cell of the SCG, for example, for bearers that may require SCG radio resources. This procedure may be used to configure an SN terminated MCG bearer (e.g., where no SCG configuration may be needed). A conditional secondary node addition procedure may be used for CPA configuration and/or CPA execution, for example, for the case of a CPA.

A MN may determine to configure CPA for a wireless device. The MN may request the candidate SN(s) to allocate resources for one or more specific PDU Sessions/QoS Flows, indicating QoS Flows characteristics (QoS Flow Level QoS parameters, PDU session level TNL address information, and PDU session level Network Slice info), indicating that the request may be for CPA and/or for providing an upper limit for the number of PSCells that may be prepared by the candidate SN. The MN may also indicate the requested SCG configuration information, including the entire wireless device capabilities and/or the wireless device capability coordination result, for example, for bearers requiring SCG radio resources. The MN may provide the candidate cells recommended by MN via the latest measurement results for the candidate SN to choose and/or configure the SCG cell(s), for bearers requiring SCG radio resources. The MN may request that the candidate SN allocate radio resources for split SRB operation. The MN may provide all the needed security information to the candidate SN (e.g., even if no SN terminated bearers are setup) to enable SRB3 to be setup, for example, based on SN decision, and in NR-DC.

A MN may provide Xn-U UL TNL address information for MN terminated bearer options that require Xn-U resources between the MN and a candidate SN, for example, in a conditional SN addition procedure. The MN may provide a list of available DRB IDs for SN terminated bearers. The candidate SN may store this information and/or may use it if establishing SN terminated bearers. The candidate SN may reject the addition request. The candidate SN may determine how to map QoS flows to DRB for SN terminated bearer options that require Xn-U resources between the MN and the candidate SN, for example, based on the MN providing a list of QoS flows per PDU sessions for which SCG resources may be requested to be setup. MCG and SCG resources may be requested of such an amount, that the QoS for the respective QoS Flow may be guaranteed by the exact sum of resources provided by the MCG and the SCG together, or even more, for split bearers. The MN decision may be reflected by the QoS Flow parameters signaled to the candidate SN, which may differ from QoS Flow parameters received over NG For MN terminated split bearers. The MN may request the direct establishment of SCG and/or split bearers (e.g., without first having to establish MCG bearers) for a specific QoS flow. All QoS flows may be allowed to be mapped to SN terminated bearers (e.g., there may be no QoS flow mapped to an MN terminated bearer).

A SN may allocate respective radio resources and/or, dependent on bearer type options, respective transport network resources and/or the SN may provide a prepared PSCell ID(s) to a MN, for example, in a conditional SN addition procedure, and if the RRM entity in the candidate SN may be able to admit the resource request. The candidate SN may configure random access, so that synchronization of the SN radio resource configuration may be performed at the CPA execution, for bearers requiring SCG radio resources. The candidate SN may determine the list of PSCell(s) to prepare (e.g., considering a maximum number that may be indicated by the MN), for example, among the list of cells as indicated in measurement results indicated by the MN, and the candidate SN may determine other SCG SCells and may provide new, corresponding SCG radio resource configuration(s) to the MN, for example, in an NR RRC reconfiguration message (e.g., by the SN) contained in the SN addition request acknowledge message, for each prepared PSCell. The candidate SN may be able to accept or alternatively, to reject each of the candidate cells listed within the measurement results indicated by the MN (e.g., the candidate SN may not be able to configure any alternative candidates). The candidate SN may provide Xn-U TNL address information (e.g., tunnel address) for a respective DRB, Xn-U UL TNL address information for SN terminated bearers, Xn-U DL TNL address information for MN terminated bearers, for example, for cases of bearer options that require Xn-U resources between the MN and the candidate SN. The candidate SN may provide the NG-U DL TNL address information for the respective PDU Session and security algorithm for SN terminated bearers. A SCG radio resource configuration may be provided, for example, if SCG radio resources have been requested. The MN may provide Xn-U DL TNL address information in the Xn-U address indication message for SN terminated bearers using MCG resources. the MN may send the early status transfer message to the candidate SN, for example, for a case of early data forwarding in CPA.

A MN may send to a wireless device 2505 a RRC reconfiguration message that may comprise a CPA configuration, (e.g., a list of RRC reconfiguration* messages and/or associated execution conditions), wherein each RRC reconfiguration message* may contain a SCG configuration, in the RRC reconfiguration** received from a candidate SN, and may possibly contain an MCG configuration, for example, in a conditional SN addition procedure. The RRC reconfiguration message may also include an updated MCG configuration (e.g., to configure the required conditional measurements).

A wireless device may apply the RRC reconfiguration message, may store the CPA configuration, and/or may reply to a MN with a RRC reconfiguration complete message, for example, in a conditional SN addition procedure. The wireless device may perform the reconfiguration failure procedure, for example, in case the wireless device may be unable to comply with a part of the configuration included in the RRC reconfiguration message. The wireless device may begin evaluating the execution conditions. The wireless device may apply a RRC reconfiguration message corresponding to the selected candidate PSCell, and may send an MN RRC reconfiguration complete message, that may comprise a RRC reconfiguration complete message for the selected candidate PSCell and information enabling the MN to identify the SN of the selected candidate PSCell, for example, if the execution condition of one candidate PSCell is satisfied. The MN may inform the SN of the selected candidate PSCell that the wireless device has completed the reconfiguration procedure successfully via SN reconfiguration complete message, including the RRC reconfiguration complete message. The MN may send the SN release request message(s) to cancel CPA in the other candidate SN(s), if configured. The other candidate SN(s) may acknowledge the release request.

A wireless device may perform synchronization towards a PSCell indicated in a RRC reconfiguration message applied, for example, in a conditional SN addition procedure. A successful RA procedure towards a SCG may not be required for a successful completion of a RRC connection reconfiguration procedure. A MN may send a SN status transfer message, for example, if PDCP termination point may be changed to the SN for bearers using RLC AM, and if RRC full configuration may not be used. The MN may take actions to minimize service interruption due to activation of MR-DC (e.g., Data forwarding), for example, for SN terminated bearers and/or QoS flows moved from the MN, and dependent on the characteristics of the respective bearer and/or QoS flow. The update of the UP path towards the 5GC may be performed via a PDU Session Path Update procedure, if applicable.

A Conditional PSCell Change (CPC) may be defined as a PSCell change that may be executed by a wireless device, for example, if execution condition(s) are met. The wireless device may begin evaluating the execution condition(s) based on receiving the CPC configuration, and may stop evaluating the execution condition(s) based on a PSCell change and/or PCell change being triggered. Intra-SN CPC without MN involvement, inter-SN CPC initiated either by MN and/or SN may be supported.

A CPC configuration may comprise a configuration of CPC candidate PSCell(s) and/or execution condition(s), and the CPRC configuration may comprise a MCG configuration for inter-SN CPC, that may be applied, for example, if CPC execution is triggered. An execution condition may consist of one or more trigger condition(s) (e.g., CondEvents). Only a single RS type and at most two different trigger quantities (e.g. RSRP and RSRQ, RSRP and SINR, etc.) may be able to be used for the evaluation of CPC execution condition of a single candidate PSCell. A wireless device may execute a PSCell change procedure and/or the PCell change procedure (e.g., regardless of any previously received CPC configuration), for example, before any CPC execution condition may be satisfied, and/or upon reception of a PSCell change command or a PCell change command. The wireless device may release all stored CPC configurations, for example, based on the successful completion of a PSCell change procedure and/or PCell change procedure. The wireless device may not be required to continue evaluating the execution condition of other candidate PSCell(s), for example, if executing CPC. The wireless device may release all stored conditional reconfigurations (e.g., for CPC and for CHO), for example, based on the CPC procedure being executed successfully. The wireless device may release the stored CPC configurations, for example, based on the release of SCG.

A secondary node change procedure may be initiated either by MN and/or SN and may be used to transfer a wireless device context from a source SN to a target SN and to change a SCG configuration in a wireless device from one SN to another. A conditional secondary code change procedure, that may be initiated either by the MN or SN, may be used for CPC configuration and/or CPC execution, for example, in case of CPC.

A MN may initiate a conditional SN change by requesting a candidate SN(s) allocate resources for a wireless device by means of a SN addition procedure, that may indicate that the request may be for a CPC. The MN may provide candidate cells recommended by MN, via the latest measurement results for the candidate SN(s) to choose and configure the SCG cell(s), upper limit for a number of PSCells that may be prepared by the candidate SN. The candidate SN may determine a list of PSCell(s) to prepare (e.g., by considering the maximum number indicated by the MN) and, for each prepared PSCell, a candidate SN may determine other SCG SCells and/or may provide the new corresponding SCG radio resource configuration to the MN in a RRC reconfiguration** message contained in the SN addition request acknowledge message with the prepared PSCell ID(s) among the list of cells as indicated within the measurement results indicated by the MN. The candidate SN may provide data forwarding addresses to the MN, for example, if data forwarding is needed. The candidate SN may include an indication of a full and/or a delta RRC configuration. The candidate SN may either accept or reject each of the candidate cells listed within the measurement results indicated by the MN (e.g., the candidate SN may be not able to configure any alternative candidates). The MN may trigger the MN-initiated SN modification procedure (e.g., to the source SN) to retrieve the current SCG configuration and to allow provision of data forwarding related information before initiating the conditional SN change.

A MN may send to the wireless device a RRC reconfiguration message including a CPC configuration, (e.g., a list of RRC reconfiguration* messages and associated execution conditions), in which each RRC reconfiguration* message may contain a SCG configuration in the RRC reconfiguration** message received from the candidate SN and possibly an MCG configuration, for example, if the MN initiated a conditional SN change. The RRC reconfiguration message may be able to include an updated MCG configuration (e.g., to configure the required conditional measurements). The wireless device may apply the RRC reconfiguration message received, store the CPC configuration and replies to the MN with a RRC reconfiguration complete message. The wireless device may perform a reconfiguration failure procedure, for example, if the wireless device is unable to comply with the configuration included in the RRC reconfiguration message.

A MN may inform a source SN that a CPC may not have been configured via Xn-U address indication procedure, the source SN, (e.g., if applicable, together with the early status transfer procedure), and may begin early data forwarding, for example, for the case of MN initiated conditional SN change, upon receiving the MN RRC reconfiguration complete message from a wireless device. The PDCP SDU forwarding may take place during early data forwarding. The wireless device may begin evaluating the execution conditions, for example, based on receiving a RRC reconfiguration message. The wireless device may apply a RRC reconfiguration* message corresponding to the selected candidate PSCell, and may send an MN RRC reconfiguration complete* message, that may comprise an NR RRC reconfiguration complete** message for the selected candidate PSCell and information enabling the MN to identify the SN of the selected candidate PSCell, for example, if the execution condition of one candidate PSCell is satisfied. The MN may trigger a MN initiated SN release procedure to inform the source SN to stop providing user data to the wireless device, and may trigger the Xn-U address indication procedure to inform the source SN the address of the SN of the selected candidate PSCell, to begin late data forwarding.

A MN may inform a target candidate SN via a SN reconfiguration complete message, including a SN RRC reconfiguration complete** message, for example, for the case of MN initiated conditional SN change, and if the RRC connection reconfiguration procedure was successful. The MN may send the SN release request message(s) to cancel CPC in other candidate SN(s), if configured. The other candidate SN(s) may acknowledge the release request. The wireless device may synchronize to a PSCell indicated in the RRC reconfiguration* message applied, for example, if configured with bearers requiring SCG radio resources. The source SN may send a message, that the MN may send to the SN of the selected candidate PSCell, for example, if a PDCP termination point is changed for bearers using RLC AM. Data forwarding from the source SN may take place. Data forwarding may be initiated as early as the source SN receives an early data forwarding address. The source SN may send a secondary RAT data usage report message to the MN and may include the data volumes delivered to and/or received from the wireless device. A PDU session path update procedure may be triggered by the MN. The source SN may release radio and/or C-plane related resources associated with the wireless device context based on receiving the wireless device context release message. Any ongoing data forwarding may continue.

A base station may send a conditional primary secondary cell group cell (e.g., a PSCell) configuration. A wireless device may begin evaluating the execution condition(s) for PSCell candidate cells based on receiving the conditional PSCell configuration. The wireless device may execute a PSCell addition and/or change (e.g., SCG addition), for example, based on the condition(s) being met for a PSCell candidate cell. The wireless device may stop evaluating the execution condition for other candidate cells during the PSCell addition and/or change execution. The conditional PSCell configuration may comprise the configuration of PSCell candidate cell(s) generated by candidate target base stations and/or execution condition(s) generated by a source base station. The execution condition for conditional PSCell change may consist of measurement event such as A3 and A5. The execution condition for conditional PSCell addition may consist of measurement event such as A4 and A1.

Figure 26:
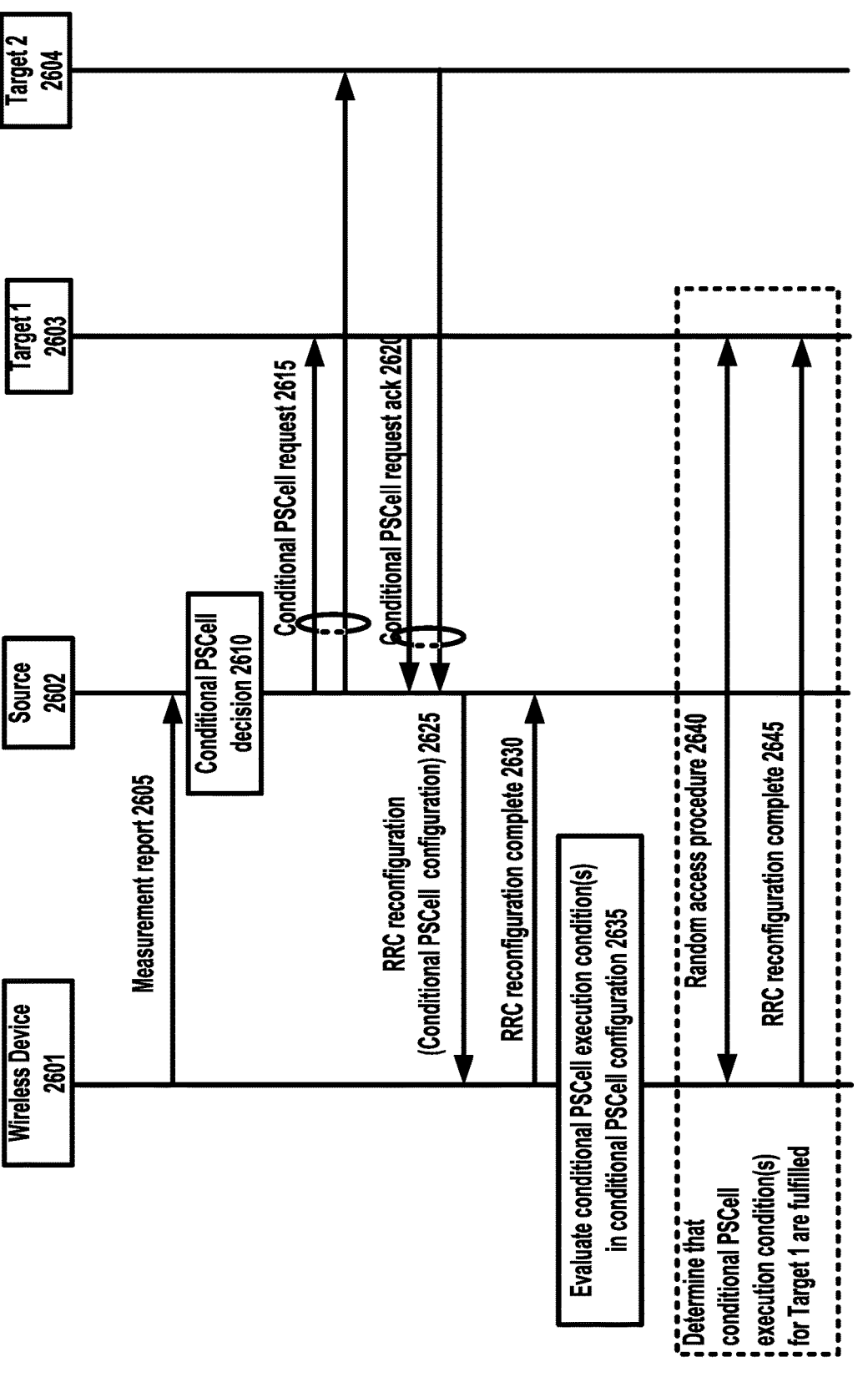
FIG. 26 shows an example of a conditional PSCell addition and/or change procedure.

FIG. 26 shows an example of a conditional PSCell addition and/or change procedure. A source base station 2602 (e.g., source) may determine a conditional PSCell addition and/or change (e.g., at step 2610) based on measurement report received from a wireless device 2601 (e.g., at step 2605). A source base station 2602 (e.g., source) may send a conditional PSCell addition and/or change request message (e.g., at step 2615) to target candidate cells (e.g., target 1 2603, target 2 2604, etc.) for the PSCell addition and/or change. The target cell (e.g., target 1 2602, target 2 2603, etc.) may send a conditional PSCell addition and/or change response message including a conditional PSCell addition and/or change configuration (e.g., at step 2620), for example, based on receiving the conditional PSCell addition and/or change request message. The source base station 22602 (e.g., source) may send a RRC reconfiguration message containing the conditional PSCell addition and/or change configuration of candidate cells to the wireless device 2601 (e.g., at step 2525), for example, based on receiving the conditional PSCell addition and/or change response message. The wireless device 2601 may send a RRC reconfiguration complete message to the source base station 2602 (e.g., source) (e.g., at step 2630), for example, based on receiving the RRC reconfiguration message. The wireless device 2601 may begin evaluating conditional PSCell addition and/or change execution conditions for candidate cells in the conditional PSCell addition and/or change configuration (e.g., at step 2635). The wireless device 2601 may apply the stored configuration of the selected candidate cell and synchronize to the candidate cell, for example, based on at least one conditional PSCell addition and/or change candidate cell satisfying the corresponding conditional PSCell addition and/or change execution condition. The wireless device 2601 may complete the conditional PSCell addition and/or change procedure, for example, based on synchronization (e.g., successfully completing the random access procedure). The wireless device 2601 may perform a RRC connection reestablishment procedure via random access procedure (e.g., step 2640). The wireless device 2601 may send, based on the random access procedure, a RRC reconfiguration complete message (e.g., at step 2645).

A wireless device may be configured with a MCG and a SCG. Neither MCG nor SCG transmission may be suspended in the wireless device. The wireless device may be configured with split SRB1 and/or SRB3. The wireless device may initiate an MCG failure information procedure, for example, based on detecting RLF of the MCG (e.g., PCell). The wireless device may send a MCG failure information message to the MCG (e.g., PCell) via the SCG (e.g., PSCell) using the split SRB1 and/or SRB3. The MCG failure information message may comprise a failure type and/or measurement results. The SCG (e.g., PSCell) may forward the MCG failure information message to the MCG, for example, based on receiving the MCG failure information message. The MCG may send a RRC reconfiguration message and/or a RRC release message to the wireless device via the SCG, for example, based on receiving the MCG failure information message. The wireless device may continue the RRC connection without re-establishment, for example, based on receiving the RRC reconfiguration message.

Figure 27:
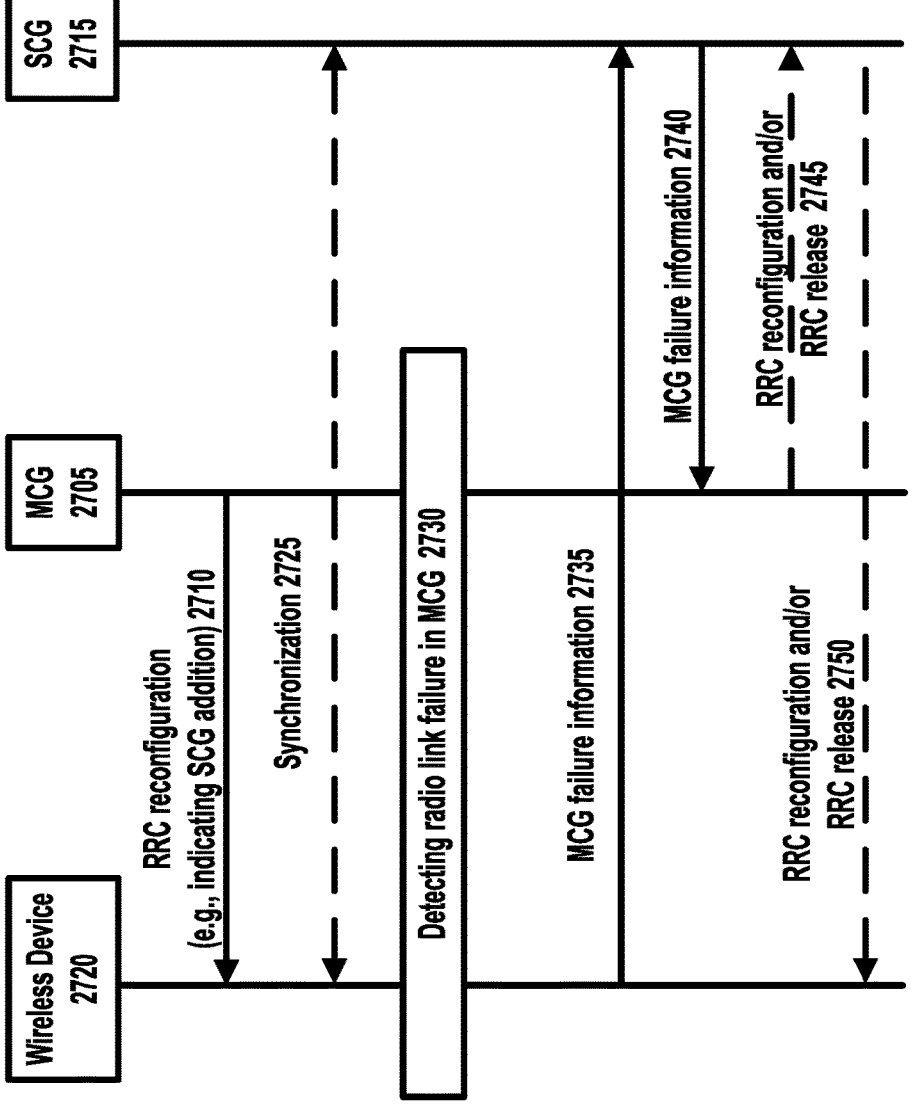
FIG. 27 shows an example of a master cell group (MCG) failure information procedure.

FIG. 27 shows an example of a MCG failure information procedure. A base station of MCG 2705 may send a RRC reconfiguration message (e.g., at step 2710) comprising a cell group configuration for a SCG 2715. A wireless device 2720 may perform the cell group configuration for the SCG 2715 and/or synchronization (e.g., at step 2725) to a PSCell of the SCG 2715 where the SCG 2715 may comprise one PSCell and optionally one or more secondary cells (SCells), for example, based on receiving the RRC reconfiguration message (e.g., step 2710). The wireless device 2720 may perform a random access procedure to the PSCell for the synchronization 2725. The wireless device 2720 may detect a RLF (e.g., at step 2730) in the MCG 2705 (e.g., PCell). The wireless device 2720 may configure split SRB1 and/or SRB3. The wireless device 2720 may initiate an MCG failure information procedure, for example, based on detecting the RLF. The wireless device 2720 may set primary path to a cell group identity of the SCG 2715, for example, based on the initiating the MCG failure information procedure, and the split SRB1 being configured and/or PDCP duplication not being configured for the split SRB1. The wireless device 2720 may send an MCG failure information 2735 message to the MCG 2705 via SCG 2715, using the split SRB1 and/or the SRB3. The MCG failure information (e.g., at step 2735) may comprise a failure type and measurement report. The SCG 2715 may send (e.g., forward) the MCG failure information (e.g., at step 2740) to the MCG 2705, for example, based on receiving the MCG failure information 2735. The MCG 2705 may send a RRC reconfiguration message or a RRC release message (e.g., st step 2745), for example, based on receiving the MCG failure information 2740. The SCG 2715 may send (e.g. forward) a RRC reconfiguration message or a RRC release message 2750, for example, based on receiving the RRC reconfiguration message or the RRC release message (e.g., at step 2745).

An L1/L2 triggered mobility (LTM) may refer to a handover or cell switch (e.g., from a current serving cell to a target cell) that a wireless device initiates, triggers, execute, performs (e.g., in response to receiving an L1 control signaling (e.g., DCI) and/or an L2 control signaling (e.g., MAC CE)). The LTM may refer to an L1 control signaling and/or an L2 control signaling that initiates and/or triggers a handover or cell switch (e.g., from a current serving cell to a target cell). The LTM may be referred to as one or more different names. For example, LTM may be referred to as and/or interchangeable with L1/L2 inter-cell mobility, L1/L2 signaling based handover, L1/L2 based handover, lower layer mobility (LLM) and/or the like. The L1/L2 signaling that triggers the L1/L2 triggered mobility may comprise at least one of layer 1 (e.g., Physical layer) signal (e.g., DCI and/or UCI) and/or a layer 2 (e.g., MAC layer) signal (e.g., MAC CE and/or MAC subheader). The LTM may refer to and/or comprise a procedure that the wireless device receives, from a network (e.g., a serving cell or a serving base station), at least two signals (e.g., at least two control signals/messages). The at least two signals may comprise an L3 signaling (e.g., an RRC message and/or SIB) comprising configuration parameters of the LTM. For example, the configuration parameters may be semi-statically (pre-)configured for the LTM. The at least two signals may comprise the L1/L2 signaling that triggers (e.g., performs and/or initiates) the LTM. Handover may be referred to as and/or interchangeable with cell switch, LTM and/or the like (e.g., if the handover is initiated and/or triggered by an L1 control signaling (e.g., DCI) and/or an L2 control signaling (e.g., MAC CE)).

A wireless device may receive, from a network (e.g., a serving cell, a serving base station, a serving DU, and/or a serving CU), one or more messages (e.g., RRC message and/or SIB) comprising parameters used for the L1/L2 triggered mobility. For example, the wireless device may receive, via a source cell (e.g., current serving cell) of the network, the one or more messages. The one or more messages may comprise one or more configurations for LTM. For example, the one or more configuration for LTM may comprise parameters used for the LTM. For example, each of the one or more configurations may be associated with a respective (candidate) target cell to which the wireless device initiates, executes, triggers, and/or performs an LTM. For example, a configuration (that is associated with a respective target cell) of the one or more configuration for LTM may comprise configuration parameters of LTM to the respective target cell. For example, each of the configuration parameters comprise: an identifier of the respective target cell; the configuration to be applied when the wireless device access the target cell; and/or an indication indicating that the corresponding to the configuration parameters is triggered (or initiated) by the L1/L2 signaling.

After or in response to receiving the one or more messages, the wireless device may monitor downlink transmission occasions (e.g., PDCCH and/or PDSCH) of the source cell. The wireless device may receive the L1/L2 signaling (e.g., cell switch command) via the downlink transmission occasions. For example, the L1/L2 signaling may comprise a DCI with a particular format that the wireless device detects/receives via the downlink transmission occasion (e.g., PDCCH). For example, the DCI may be addressed to a particular RNTI with which that the wireless device monitors a PDCCH (of a serving cell and/or source cell). For example, the L1/L2 signaling may comprise an MAC CE that the wireless device receives, decodes, and/or parses from a PDSCH that is scheduled by a DCI (or a PDCCH) that the wireless device receives via downlink transmission occasion(s). The L1/L2 signaling may comprise an indication indicating one of the one or more configurations for LTM that are configured and/or indicated by the one or more messages (e.g., RRC message and/or SIB) that the wireless device receives. For example, the indication indicating a first configuration of the one or more configurations for LTM. The indication may comprise an identifier of the first configuration. For example, the indication may be a configuration ID of the first configuration. The indication may comprise an identifier of a target cell respective to the first configuration. The wireless device may perform and/or execute, in response to receiving the L1/L2 signaling, the LTM (e.g., cell switch) to the target cell using configuration parameters of the first configuration.

The L1/L2 signaling (e.g., cell switch command) may comprise an indication indicating a first target cell that is one of (candidate) target cell(s) for LTM. For example, each of the one or more configurations for the LTM that the wireless device receives according to examples is associated with a respective target cell. For example, the first target cell may be a target cell of LTM that a first configuration of the one or more configurations indicates. The indication may comprise an identifier or an index of the first target cell. The L1/L2 signaling indicating the first target cell may indicate that the wireless device initiates, executes, triggers, and/or performs (e.g., in response to receiving the L1/L2 signaling) the LTM to the first target cell using configuration parameters associated with the first target cell. The indication indicating the first target cell may comprise an indication indicating a configuration associated with the first target cell. The indication may comprise an indication indicating a configuration ID of the configuration associated with the first target cell that the wireless device uses for the LTM to the first target cell.

A network (e.g., base station, DU, and/or CU) may determine to perform (e.g., trigger and/or initiate) LTM, for example, after or in response to transmitting the one or more LTM configurations (e.g., which may be referred to as one or more configurations for LTM) to the wireless device. The network may determine when to transmit, to the wireless device, the L1/L2 signaling to perform (e.g., trigger and/or initiate) LTM, for example, after or in response to transmitting the one or more LTM configurations to the wireless device. The wireless device may transmit, for the network to determine to perform the LTM, a report comprising one or more measurements (e.g., L1 measurement and/or L3 measurement) of radio channel(s) over which the wireless device receives one or more reference signals from the network. The network may determine to perform (e.g., trigger and/or initiate) the LTM based on the report comprising the one or more measurements. The network may determine, based on the one or more measurements, which cell, among one or more cells configured for the LTM (e.g., as potential target cells for L1/L2 triggered mobility), is a target cell of the LTM. The network may indicate the target cell by transmitting, to the wireless device, the L1/L2 signaling that comprises one or more indications indicating the target cell and/or a trigger (e.g., perform and/or initiate) the LTM to the target cell. The network may determine, based on the one or more measurements, when to transmit, to the wireless device, the indication of the L1/L2 signaling to trigger (e.g., perform and/or initiate) the LTM to the target cell. The LTM can be applied for a PCell change and/or for a PSCell change.

A report (e.g., a report that a wireless device may send/transmit to a network) may comprise a L1 measurement. The L1 measurement may refer to a measurement report generated by a layer 1 (physical layer) and/or sent (e.g., transmitted) via physical channel(s) (e.g., as described herein in FIG. 5B). The physical channel(s) may comprise a PUCCH and/or PUSCH. A wireless device may send (e.g., transmit) the L1 measurement via PUSCH by piggybacking the PUCCH (e.g., comprising the L1 measurement) onto the PUSCH. A report may comprise a L3 measurement. The L3 measurement may refer to a measurement report generated by a layer 3 (e.g., a RRC layer) and/or sent (e.g., transmitted) via logical channel(s) (e.g., as described herein in FIG. 5B). The logical channel(s) may comprise CCCH and/or DCCH. The wireless device may multiplex the L3 measurement into an MAC PDU and transmit the MAC PDU as a TB via the PUSCH.

A network may send (e.g., transmit) one or more LTM configurations for a L1/L2 triggered mobility for a L1 measurement. The one or more messages (e.g., a LTM configuration of the one or more LTM configurations) may comprise one or more resource configurations (e.g., CSI-ResourceConfig IE) of one or more reference signals and/or one or more report configurations (e.g., CSI-ReportConfig IE). The one or more resource configurations and/or the one or more report configurations may be for the L1 measurement of the L1/L2 triggered mobility. The one or more resource configurations may indicate radio resource configuration parameters based on a wireless device receiving the one or more reference signals. The one or more report configurations may indicate parameter(s) and/or value(s) that may be contained in a report comprising a L1 measurement. Each of the one or more report configurations may be associated with at least one (e.g., downlink) reference signal indicated by the one or more resource configurations. A first reporting configuration of the one or more report configurations may comprise an identifier of at least one reference signal indicated by the one or more resource configurations. The wireless device may send (e.g., transmit) a report comprising a measured quantity of the at least one reference signal, for example, if the report is generated based on the first reporting configuration and/or if the first reporting configuration comprises the identifier of at least one reference signal. Each of the one or more report configurations may be associated with a respective uplink resource (e.g., PUCCH and/or PUSCH). The wireless device may send (e.g., transmit) the report via the uplink resource associated with the first reporting configuration, for example, if the report is generated based on the first reporting configuration.

Each (e.g., CSI-ResourceConfig IE) of one or more resource configurations may be associated with one or more (e.g., downlink) reference signals. A first resource configuration of the one or more resource configurations may comprise radio resource configuration parameters of the one or more reference signals. The radio resource configuration parameters may indicate a set of downlink resources on which the wireless device may perform measurements (e.g., receives the set of reference signals) in order to determine the quantity or quantities to be reported. The radio resource configuration parameters may comprise an identifier of each of the one or more reference signals, a type (e.g., CSI-RS, SSB, DM-RS, and/or PT-RS) of each of the one or more reference signals, a transmission type (e.g., periodic, aperiodic, and/or semi-persistent) of each of the one or more reference signals, a sequence ID of each of the one or more reference signals, power control parameter(s) of each of the one or more reference signals, and/or time and frequency resource(s) via which the wireless device receives each of the one or more reference signals.

Each of one or more reference signals indicated by one or more resource configurations may be associated with a respective cell. The cell associated with (e.g., respective to) a reference signal of the one or more reference signals may be one of one or more cells configured by the network. The cell associated with (e.g., respective to) the reference signal may be a serving cell (e.g., PCell, PSCell, SCell, SPCell). The cell associated with (e.g., respective to) the reference signal may be a non-serving cell (e.g., referred to as one or more SSBs (e.g., or TRP) configured with a serving cell and/or configured with different PCI than PCI of the serving cell). The cell associated with (e.g., respective to) the reference signal may be a cell configured as one of target cell(s) of L1/L2 triggered mobility. The cell associated with (e.g., respective to) the reference signal may be a neighbor cell configured as measurement configurations for L3 measurement.

Each (e.g., CSI-ReportConfig IE) of one or more report configurations may indicate: a specific quantity or a set of quantities to be contained in a report; downlink resource(s) (e.g., from where the wireless device receives the one or more reference signals) on which the wireless device performs measurements (e.g., receives the set of reference signals) in order to determine the quantity or quantities to be reported; how actual reporting may be carried out (e.g., if the reporting is to be done and/or what uplink physical channel to use for the reporting).

A report configuration of one or more report configurations may indicate a set of (e.g., downlink) reference signals and/or a set of (e.g., downlink) resources on which the wireless device performs measurements (e.g., receives the set of reference signals) for the wireless device to determine the quantity or quantities to be reported. This may be done by associating the report configuration with one or more reference signals (e.g., NZP-CSI-RSResourceSet) to be used for the wireless device to measure channel characteristics. A report configuration may comprise an identifier (e.g., set ID) of a set of one or more reference signals. One or more resource configurations may comprise the identifier and a corresponding set of one or more reference signals. Each of the one or more reference signals may comprise one or more CSI-RSs, one or more SSBs, and/or one or more PT-RSs. The set of one or more reference signals may comprise any combination of one or more CSI-RSs, one or more SSBs, and/or one or more PT-RSs.

A report configuration of one or more report configurations may indicate a quantity and/or a set of quantities that a wireless device may report and/or contain in a report. A quantity and/or set of quantities may be referred to as channel-state information (CSI). The set of quantities may comprise at least one of any combination of channel-quality indicator (CQI), rank indicator (RI), and/or precoder-matrix indicator (PMI). The report configuration may indicate a reporting of received signal strength (e.g., reference-signal received power (RSRP)), received signal quality (e.g., reference-signal received quality (RSRQ)), and/or signal to interference and noise ratio (SINR). The RSRP and/or RSRQ for the L1 measurement may be referred to as L1-RSRP and/or L1-RSRQ, respectively (e.g., the reporting does not include the more long-term ("layer 3") filtering applied for the higher-layer RSRP reporting).

A report configuration of one or more report configurations may indicate if and/or how a wireless device may send (e.g., transmit) a report. The transmission of the report by the wireless device may be periodic (e.g., referred to as periodic reporting), semi-persistent (e.g., referred to as semi-persistent reporting), and/or aperiodic (e.g., referred to as aperiodic reporting). The report configuration may indicate a periodicity of the periodic reporting, for the periodic reporting. The wireless device may send (e.g., transmit) the report periodically (e.g., perform the periodic reporting) via PUCCH. The report configuration may comprise information about a periodically available PUCCH resource that may be used for the periodic reporting. The wireless device may be configured with periodically occurring reporting instances in the same way as for periodic reporting with activation and/or deactivation mechanism, for example, for semi-persistent reporting. The wireless device may activate (e.g., begin) and/or deactivate (e.g., stop or suspend) the semi-persistent reporting, for example, based on receiving a control signal (e.g., DCI and/or MAC CE) indicating the activation or deactivation. The wireless device may send (e.g., transmit) the report semi-persistently (e.g., perform the semi-persistent reporting). The report configuration may comprise information about a periodically available PUCCH resource to be used for the semi-persistent reporting. The wireless device may send (e.g., transmit) the report semi-persistently (e.g., perform the semi-persistent reporting) via semi-persistently allocated PUSCH resource(s).

A wireless device may receive, from a network (e.g., a serving cell, a service base station, a serving DU, and/or a serving CU), one or more messages (e.g., RRC message and/or SIB). The one or more messages may comprise one or more LTM configurations for the L1/L2 triggered mobility (e.g., L1/L2 triggered mobility). The one or more messages may comprise configuration parameters used for L1 measurement of the L1/L2 triggered mobility. The configuration parameters may comprise one or more resource configurations (e.g., CSI-ResourceConfig IE) and/or of one or more report configurations (e.g., CSI-ReportConfig IE) that are used for the L1 measurement. The wireless device may start, perform, or initiate the L1 measurement according to the configuration parameters of: one or more resource configurations (e.g., CSI-ResourceConfig IE); and/or of one or more report configurations (e.g., CSI-ReportConfig IE), e.g., after or in response to receiving the configuration parameters. The wireless device determines (or measures) CQI, RI, PMI, RSRP, RSRQ, and/or SINR of (or using) one or more reference signals (e.g., CSI-RSs, SSBs, PT-RSs) configured by the one or more resource configurations. The wireless device may generate a report comprising the L1 measurement. The wireless device may determine the contents and/or parameter value(s) contained in the report or the L1 measurement according to a report configuration, of the one or more report configurations, that triggers the transmission of the report. The wireless device may transmit the report to the network. The wireless device may receive, after or in response to transmitting the report, L1/L2 signaling that triggers (or initiates) the L1/L2 triggered mobility using one of the one or more LTM configurations.

Figure 28:
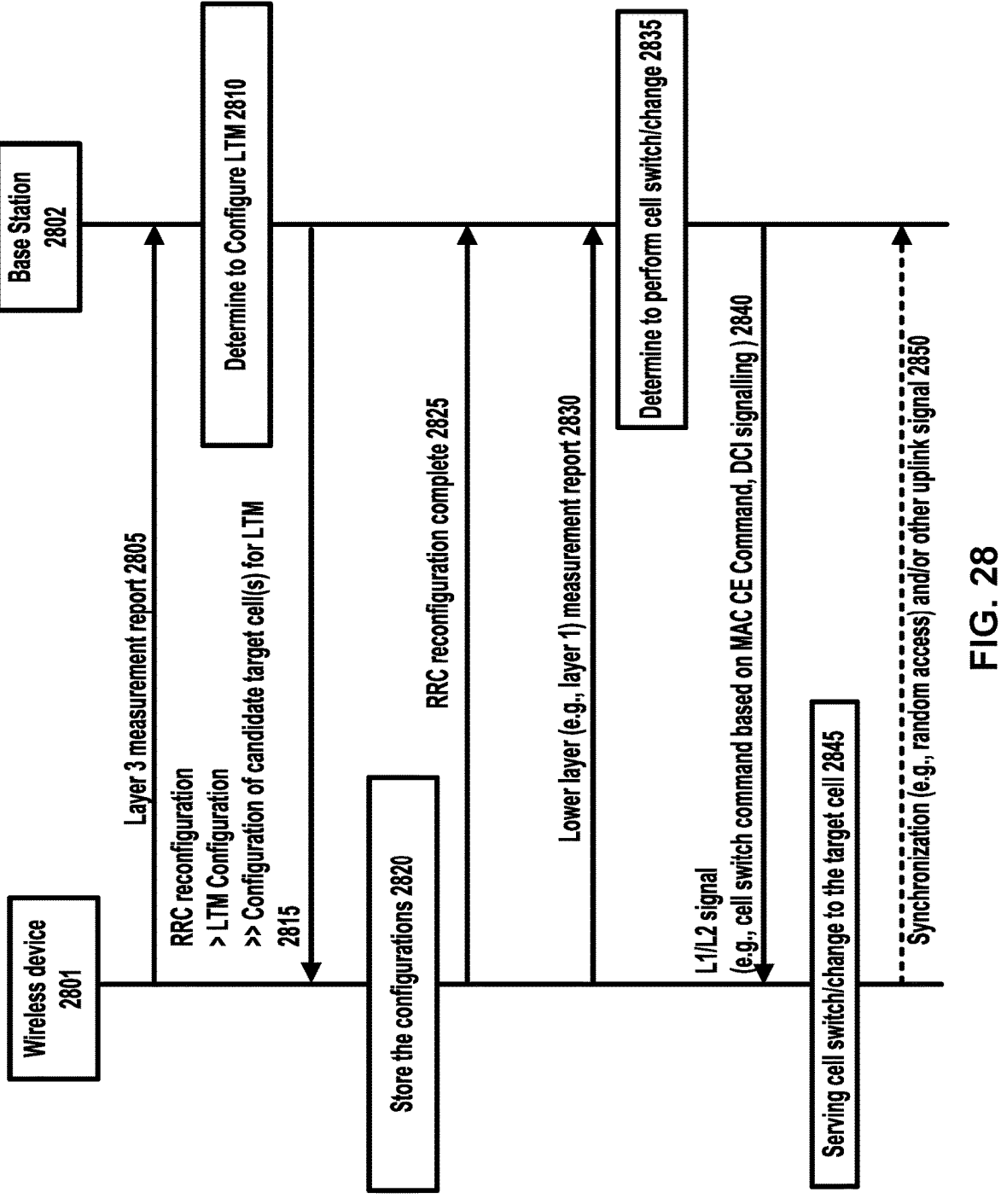
FIG. 28 shows an example of L1/L2 triggered mobility.

FIG. 28 shows an example of L1/L2 triggered mobility. A wireless device 2801 may transmit and/or send to a (serving) base station 2802 (and/or a network), a measurement report (e.g., L3 measurement report) comprising one or more measurements of one or more cells (e.g., at step 2805). The (serving) base station may determine at least one of the one or more cells as a candidate target cell for LTM (e.g., at step 2810). The (serving) base station upon receiving the measurement report may transmit to the wireless device an RRC reconfiguration message including the configuration of a candidate target cell for LTM (e.g., at step 2815). Based on receiving the RRC reconfiguration message, the wireless device may store the configuration of the candidate target cell for LTM (e.g., at step 2820) and/or send an RRC reconfiguration complete message to a DU of the (serving) base station (e.g., at step 2825).

A target cell may refer to a cell to which a wireless device may perform, initiate, trigger, execute a handover or a cell switch, wherein the handover or the cell switch may comprise any type of handover or cell switch referred in the present disclosure (e.g., L3 handover, CHO, LTM, an LTM based on an early TA procedure). A candidate target cell may refer to a cell indicated in a LTM configuration (e.g., as a (e.g., potential) target cell to which the wireless device performs the LTM or a cell switch in response to receiving the L1/L2 signal of the LTM). For example, a wireless device may receive a plurality of LTM configurations. Each of the plurality of LTM configurations may comprise an indication and/or identifier of a respective candidate target cell. A candidate target cell may remain as a candidate of the target cell of the LTM (e.g., may not be a target cell) until the L1/L2 signal of the LTM indicates the target cell. None of candidate target cells indicated by the plurality of the LTM configuration becomes a target cell (e.g., if the wireless device doesn't receive the L1/L2 signal of the LTM). A candidate target cell (e.g., only one of candidate target cells indicated by the plurality of the LTM configuration) may become a target cell, for example, if the wireless device receives the L1/L2 signal, of the LTM, that indicate the candidate target cell as a cell to which the wireless device performs the LTM or a cell switch in response to receiving the L1/L2 signal of the LTM.

In an example of FIG. 28, the wireless device 2801 may transmit L1 measurement report to the base station (e.g., at step 2830). Based on the L1 measurement report, the base station may determine cell switch using LTM (e.g., at step 2835). The base station may transmit to the wireless device a L1/L2 signaling (e.g., cell switch command) indicating the determining the cell switch using LTM (e.g., at step 2840). The L1/L2 signaling may indicate a target cell of the candidate target cell and/or a configuration, associated with the target cell, among the configuration(s) for LTM. Based on receiving the L1/L2 signaling, the wireless device may switch serving cell to the target cell (e.g., may indicate and/or determine the target cell as a (e.g., new) serving cell) (e.g., at step 2845). The wireless device may perform synchronization with the target cell (e.g., at step 2850). The synchronization may comprise uplink synchronization and/ or downlink synchronization. The wireless device may perform a random access procedure for (e.g., to acquire) the uplink synchronization. For example, the wireless device may determine a downlink timing advance value and/or an uplink timing advance value from the uplink synchronization and/or the downlink synchronization. The wireless device may use the downlink timing advance value to adjust reception timing of a downlink transmission from the target cell. The wireless device may use the uplink timing advance value to adjust transmission timing of an uplink transmission to the target cell.

L1/L2 based inter-cell mobility (e.g., LTM) may comprise at least one of three phases: preparation, execution, and completion. For the preparation phase, the base station central unit (CU) may take decision (e.g., based on L3 measurements from the wireless device (e.g., UE)) to configure mobility parameters to the wireless device and base station distributed unit(s) (DU(s)) for target candidate cell(s) in advance. For the execution phase, the base station distributed unit may receive L1 measurements from a wireless device and triggers change of cell directly to the wireless device. for the completion phase, path switch toward the new cell may take place.

Figure 29:
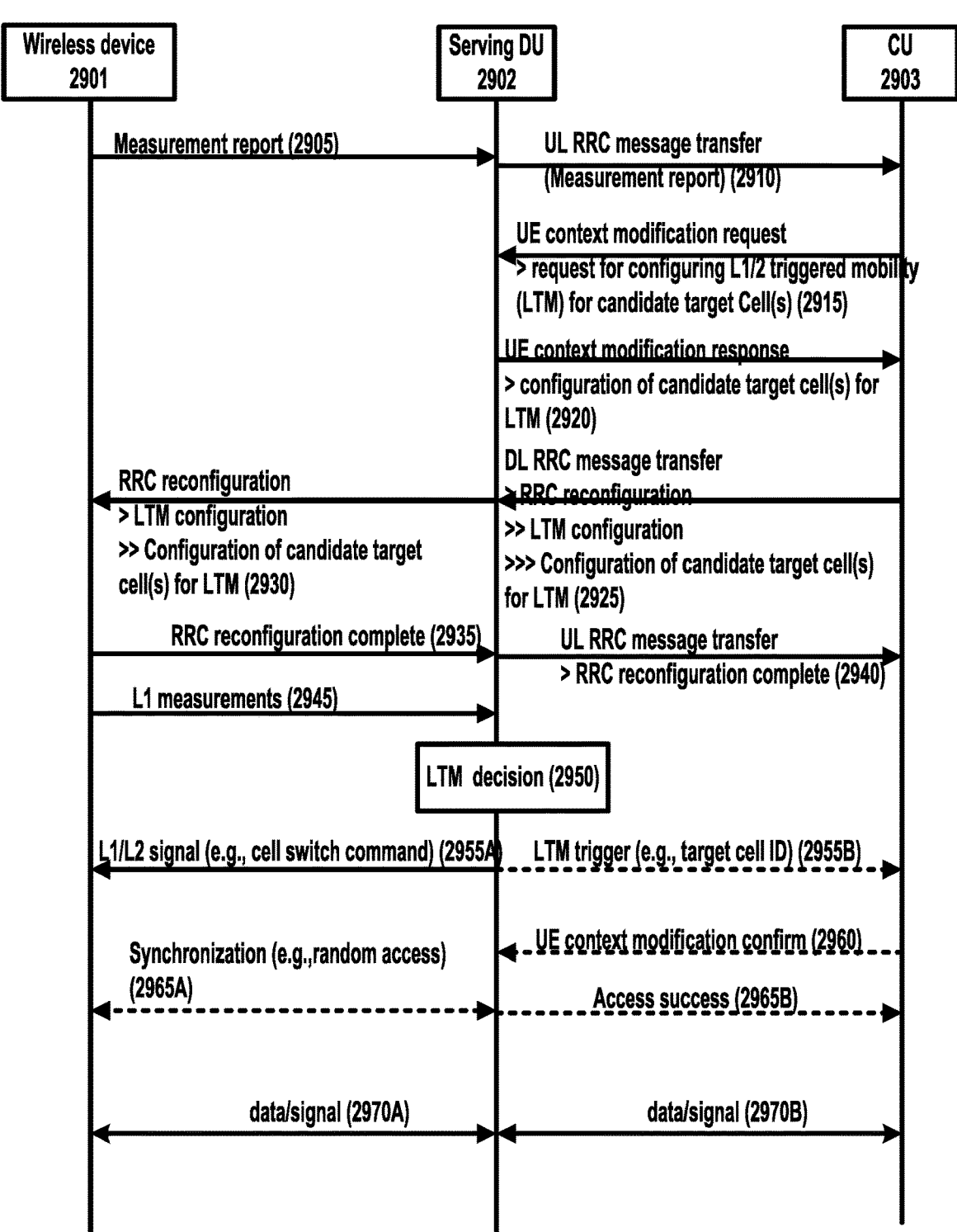
FIG. 29 shows an example of intra-DU L1/L2 triggered mobility.

FIG. 29 shows example of intra-DU LTM. The intra-DU LTM may refer to a handover or cell switch using LTM from a source cell of a DU to a target cell of the same DU. A serving DU (e.g., 2902) in FIG. 29 may comprise a source cell (e.g., current serving cell) of a wireless device (e.g., 2901) and/or a target cell of the LTM. The wireless device may send, to a CU (e.g., 2903) via a serving DU, a measurement report including one or more measurements of one or more cells (e.g., at steps 2905 and/or 2910), which may become candidate target cell(s) for LTM. A serving DU, of a serving base station, may receive, from the wireless device, the measurement report (e.g., at step 2905) and/or may include the received measurement report in an UL RRC message transfer message to a CU of the serving base station (e.g., at step 2910). The serving DU may send, to the CU, the UL RRC message transfer message comprising the measurement report (e.g., to convey the received measurement report). The CU may send a wireless device context request (e.g., UE context modification request in FIG. 29) message to the DU (e.g., at step 2915), indicating a request for the DU to configure the wireless device with the LTM. If the DU accepts the request for configuring LTM for the wireless device upon reception of the wireless device context request message (e.g., UE context modification request in FIG. 29), the DU may send a wireless device context response message (e.g., UE context modification response in FIG. 29), to the CU (e.g., at step 2920), including the configuration of the candidate target cell(s) for LTM.

In an example of FIG. 29, the DU may have identified one or more cells, as (e.g., preferred cell(s) of) candidate target cell(s) for the LTM and correspondingly may send the one or more cells (e.g., as a suggestion, to the CU). This may be realized by the DU initiating a wireless device context modification procedure. The CU may take the one or more cells under consideration to determine the target cell(s) of the LTM.

In an example of FIG. 29, upon reception of the wireless device context modification response message the CU may transmit to the DU a DL RRC message transfer message comprising an RRC reconfiguration (e.g., at step 2925) to be transmitted to the wireless device. The DU may transmit to the wireless device the RRC reconfiguration message for configuring the one or more candidate target cells for LTM (e.g., at step 2930). The wireless device may send an RRC reconfiguration complete message to the DU (e.g., at step 2935), for example, in repose to and/or as a response to the reception of the RRC reconfiguration message. The DU may encapsulate the RRC reconfiguration message in the UL RRC message transfer message. The DU may send the UL RRC message transfer message (e.g., comprising the RRC reconfiguration message) to the CU (e.g., at step 2940). The CU may receive, from the DU, the UL RRC message transfer message and may determine (e.g., consider) the wireless device to be configured with LTM, for example, based on the UL RRC message transfer message.

In an example of FIG. 29, the wireless device may transmit L1 measurement report (e.g., L1 measurements in FIG. 29) to the serving DU of the base station (e.g., at step 2945). For example, the LTM configuration in the RRC reconfiguration that the wireless device receives may comprise configuration parameters of the L1 measurement report. The configuration parameters may comprise one or more resource configurations (e.g., CSI-ResourceConfig IE) and/or one or more report configurations (e.g., CSI-Report- Config IE). The wireless device may perform and/or start the L1 measurement based on the configuration parameters of the L1 measurement report. Based on the L1 measurement report, the serving DU may determine (e.g., LTM decision at step 2950 in FIG. 29) a handover and/or a cell switch to a target cell using LTM. For example, the serving DU may comprise a (e.g., current) service cell and a target cell of the LTM. The serving DU of the base station may transmit to the wireless device a L1/L2 signaling (e.g., cell switch command) indicating the determining the handover and/or the cell switch to the target cell using the LTM (e.g., at step 2955A). The serving DU transmitting the L1/L2 signaling to the wireless device may transmit to the CU a message (e.g., LTM trigger at step 2955B in FIG. 29) that may indicate the transmitting the L1/L2 signaling to the wireless device. The message may indicate an identity or identifier (ID) of the target cell. The L1/L2 signaling may indicate a target cell and/or a configuration (e.g., and/or configuration parameters to be used by the wireless device for the LTM to the target cell), associated with the target cell, among the configuration for LTM. The serving DU may receive, from the CU, a response to the message (e.g., at step 2960). The response may be a wireless device context modification confirmation message (e.g., a UE context modification confirm in FIG. 29). Based on receiving the L1/L2 signaling, the wireless device may switch serving cell to the target cell. The wireless device may perform synchronization with the target cell (e.g., at step 2965A). The synchronization may comprise uplink synchronization and/or downlink synchronization. The wireless device may perform a random access procedure for the uplink synchronization. Access success may be communicated by the serving DU to the CU (e.g., at step 2965B). Based on the synchronization being successfully completed, the wireless device may transmit uplink data (e.g., packet(s)) via the target cell and/or receive downlink data (e.g., packet(s)) via the target cell (e.g., at step 2970A). The data may be communicated between (e.g., to/from and/or from/to) the serving DU and the CU (e.g., at step 2970B).

Figure 30:
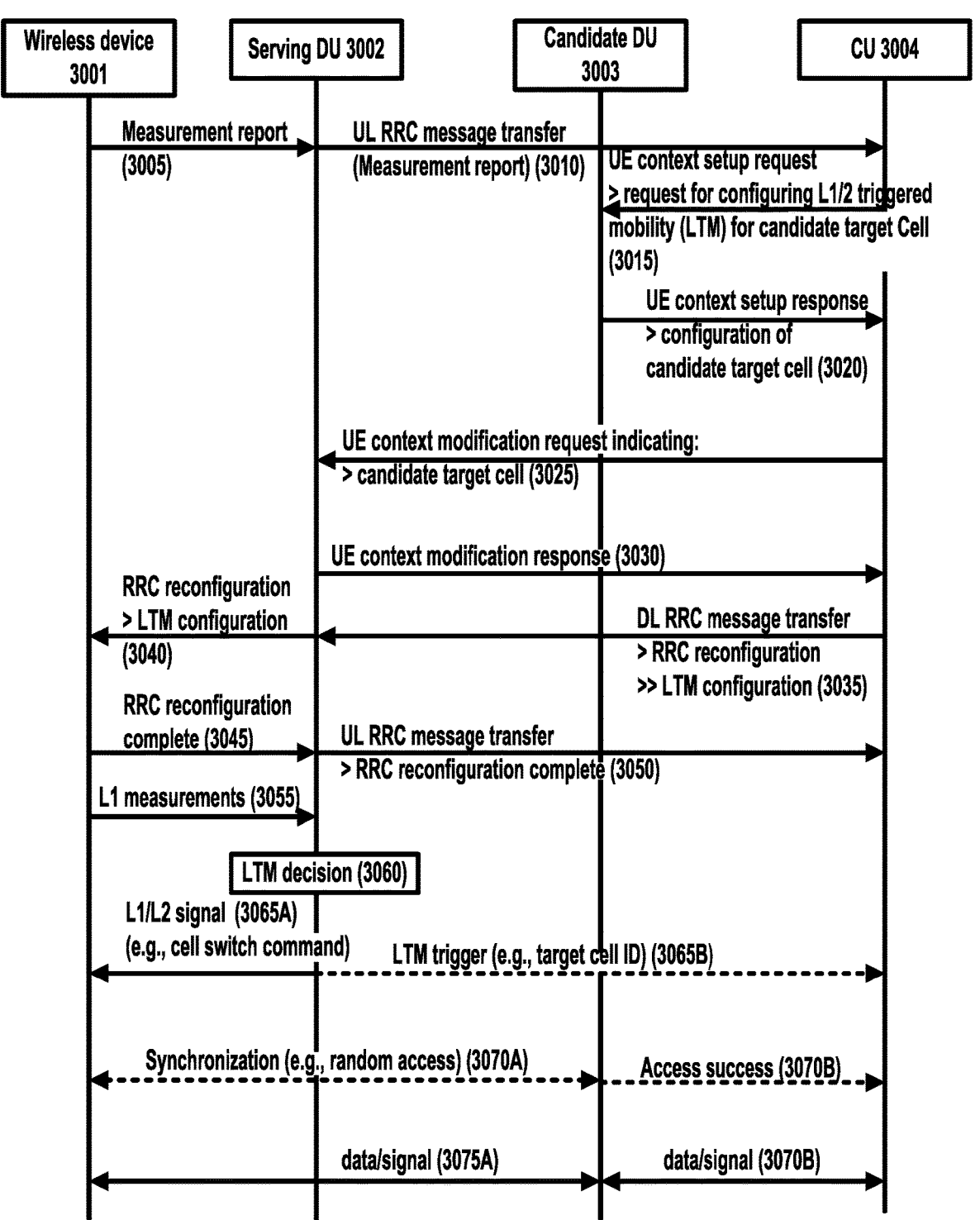
FIG. 30 shows an example of inter-DU L1/L2 triggered mobility.

FIG. 30 shows example of inter-DU L1/L2 triggered mobility. The inter-DU LTM may refer to a handover or cell switch using LTM from a source cell of a first DU to a target cell of a second DU (e.g., different from the first DU). For example, a serving DU (e.g., 3002) in FIG. 30 may comprise a source cell (e.g., current serving cell) of a wireless device. A candidate DU (e.g., 3003 in FIG. 30) may comprise a target cell of the wireless device for the LTM. For the inter-DU LTM, the serving DU and the candidate DU may communicate to each other, for example, via one or more CUs to coordinate (e.g., determine) an LTM for the wireless device. For example, if the serving DU and the candidate DU are associated with a same CU (e.g., 3004), the serving DU and the candidate DU may communicate to each other via the same CU. The serving DU and the candidate DU may be associated with different CUs. For example, the serving DU and the candidate DU may be respectively associated with a serving CU and a candidate CU. In this case, the serving DU and the candidate DU may communicate to their respective CUs. The CUs may communicate to each other, for example, to coordinate (e.g., determine) an LTM from the source cell of the serving DU to the target cell of the candidate DU for the wireless device.

A wireless device (e.g., 3001) may send a measurement report (e.g., L3 measurement report and/or L1 measurement report) including one or more measurements of one or more cells, which may become candidate target cells for LTM, for example at step 3005. A serving DU (e.g., 3002), of a serving base station, which receives the measurement report may include the measurement report in an UL RRC message transfer message to a CU of the serving base station. The serving DU may send the UL RRC message transfer message to the CU (e.g., at step 3010), for example, to convey the received measurement report to the CU. The CU may send a wireless device context setup request message to a candidate DU (e.g., at step 3015), for example, to create a wireless device context of the wireless device and/or indicate a request to the candidate DU to configure the wireless device with LTM. If the candidate DU accepts the request for configuring LTM for the wireless device upon reception of the wireless device context setup request message, the candidate DU may send a wireless device context setup response message, to the CU, comprising the configuration of a candidate target cell associated with the candidate DU for the LTM (e.g., at step 3020). The CU may send a wireless device context request message (e.g., UE context modification request at step 3025 in FIG. 30) to the serving DU, indicating the candidate target cells for LTM. Upon reception of a wireless device context response message (e.g., UE context modification response at step 3030 in FIG. 30), the CU may transmit to the serving DU a DL RRC message transfer message comprising an RRC reconfiguration to be transmitted to the wireless device (e.g., at step 3035). For example, the RRC reconfiguration may comprise one or more LTM configurations. Each LTM configuration of the one or more LTM configurations may be associated with a respective target cell (e.g., candidate cell) and/or may comprise a respective LTM configuration parameters used by the wireless device for (or during) an LTM to the respective target cell. The serving DU may transmit to the wireless device the RRC reconfiguration message for configuring the one or more LTM candidates (e.g., at step 3040). The wireless device may send an RRC reconfiguration complete message to the serving DU (e.g., at step 3045). The serving DU may encapsulate the RRC reconfiguration complete message in the UL RRC message transfer message and send the UL RRC message transfer message to the CU (e.g., at step 3050). The CU may receive the message and determine (e.g., consider) the wireless device configured with LTM.

In an example of FIG. 30, the wireless device may transmit L1 measurement report (e.g., L1 measurements in FIG. 30) to the serving DU of the base station (e.g., at step 3055). Based on the L1 measurement report, the serving DU may determine a handover and/or a cell switch using LTM (e.g., at step 3060). The serving DU of the base station may transmit to the wireless device a L1/L2 signaling (e.g., L/L2 signal in FIG. 30) indicating the determining (e.g., at step 3065A). The serving DU transmitting the L1/L2 signaling to the wireless device may transmit to the CU a message (e.g., LTM trigger in FIG. 30) indicating the transmitting the L1/L2 signaling to the wireless device (e.g., at step 3065B). The message may indicate an identity and/or identifier (ID) of the target cell. The L1/L2 signaling may indicate a target cell of the candidate target cell and/or a configuration, associated with the target cell, among the configuration for LTM. Based on receiving the L1/L2 signaling, the wireless device may switch serving cell to the target cell. The wireless device may perform synchronization with the target cell (e.g., at step 3070A). The synchronization may comprise uplink synchronization and/or downlink synchronization. The wireless device may perform a random access procedure for the uplink synchronization. Based on the synchronization being successfully completed, the wireless device may transmit uplink data (e.g., packet(s)) via the target cell and/or receive downlink data (e.g., packet(s)) via the target cell (e.g., at step 3075A). The candidate DU may receive a signal for uplink synchronization (e.g., preamble) and/or uplink data (e.g., packet(s)) via the target cell. Based on the receiving, the candidate DU may transmit to the CU a message indicating that the wireless device successfully accesses to the target cell of the candidate DU (e.g., at step 3070B). The data may be communicated between (e.g., to/from and/or from/to) the candidate DU and the CU (e.g., at step 3070B)

In an examples of FIG. 29 and/or FIG. 30, the serving DU may have identified some cells for the LTM and correspondingly may send them as a suggestion to the CU. The CU may take them under consideration. This may be realized by the DU initiating a wireless device context modification procedure.

A base station may configure, by one or more messages to a wireless device, RRC configuration parameters (SSBs, RACH resources, MAC parameters, PHY cell common and/or wireless device-specific parameters) of a target PCell for performing a HO and/or a CHO to the target PCell from a source PCell. If/when performing the HO and/or the CHO to the target PCell, the wireless device may apply the received/stored RRC configuration parameters. The wireless device may start to perform downlink synchronization towards the target PCell (e.g., time/frequency alignment by monitoring the SSBs configured on the target PCell). After the downlink synchronization is complete, the wireless device may start to perform uplink synchronization, for example, by initiating an RA procedure based on the RACH resources configured on the target PCell. The wireless device may receive a time alignment (TA) command in a RAR corresponding to a preamble transmitted by the wireless device.

For transmitting a preamble during the RA procedure, a wireless device may select an SSB. The wireless device may select, based on a RSRP value of a first SSB being greater than a RSRP threshold, a first SSB from a plurality of candidate SSBs configured in the RACH resources (e.g., based on the example described with respect to FIG. 26) on the target PCell. The RA procedure that the wireless device performs may be based on examples described herein (e.g., FIG. 13A, FIG. 13B, and/or FIG. 13C). The RA procedure may be a CBRA and/or CFRA that the wireless device performs based on example disclosure in the present disclosure (e.g., FIG. 13A, FIG. 13B, and/or FIG. 13C). A wireless device may determine the preamble with a preamble index associated with the selected first SSB according to RACH resource configuration parameters. After selecting the first SSB, the wireless device may determine a next available PRACH occasion from PRACH occasions corresponding to the selected first SSB permitted by the restrictions given by the ra-ssb-OccasionMaskIndex configured in the rach-ConfigDedicated IE. The wireless device may transmit the preamble via the determined PRACH occasion to the target PCell. The wireless device may monitor a PDCCH of the target PCell for receiving a RAR corresponding to the preamble. The wireless device may receive the RAR comprising the preamble index and/or a TA command. The wireless device may complete the CFRA procedure. The CFRA procedure may be implemented based on examples described above with respect to FIG. 13B. After completing the CFRA procedure, the wireless device may receive, from the target PCell, a beam indication (or a TCI state indication) used for PDCCH/PDSCH/CSI-RS reception and/or PUCCH/PUSCH/SRS transmission for the target PCell. The wireless device may apply the beam (or the TCI state) for PDCCH/PDSCH/CSI-RS reception and/or PUCCH/PUSCH/SRS transmission for the target PCell.

After receiving a HO command (e.g., RRC reconfiguration with a ReconfigurationWithSync IE), a wireless device may perform downlink synchronization and/or uplink synchronization, and/or beam alignment/management via a target PCell. Performing downlink synchronization, uplink synchronization, and/or beam alignment may be time consuming.

Figures 31A, 31B:
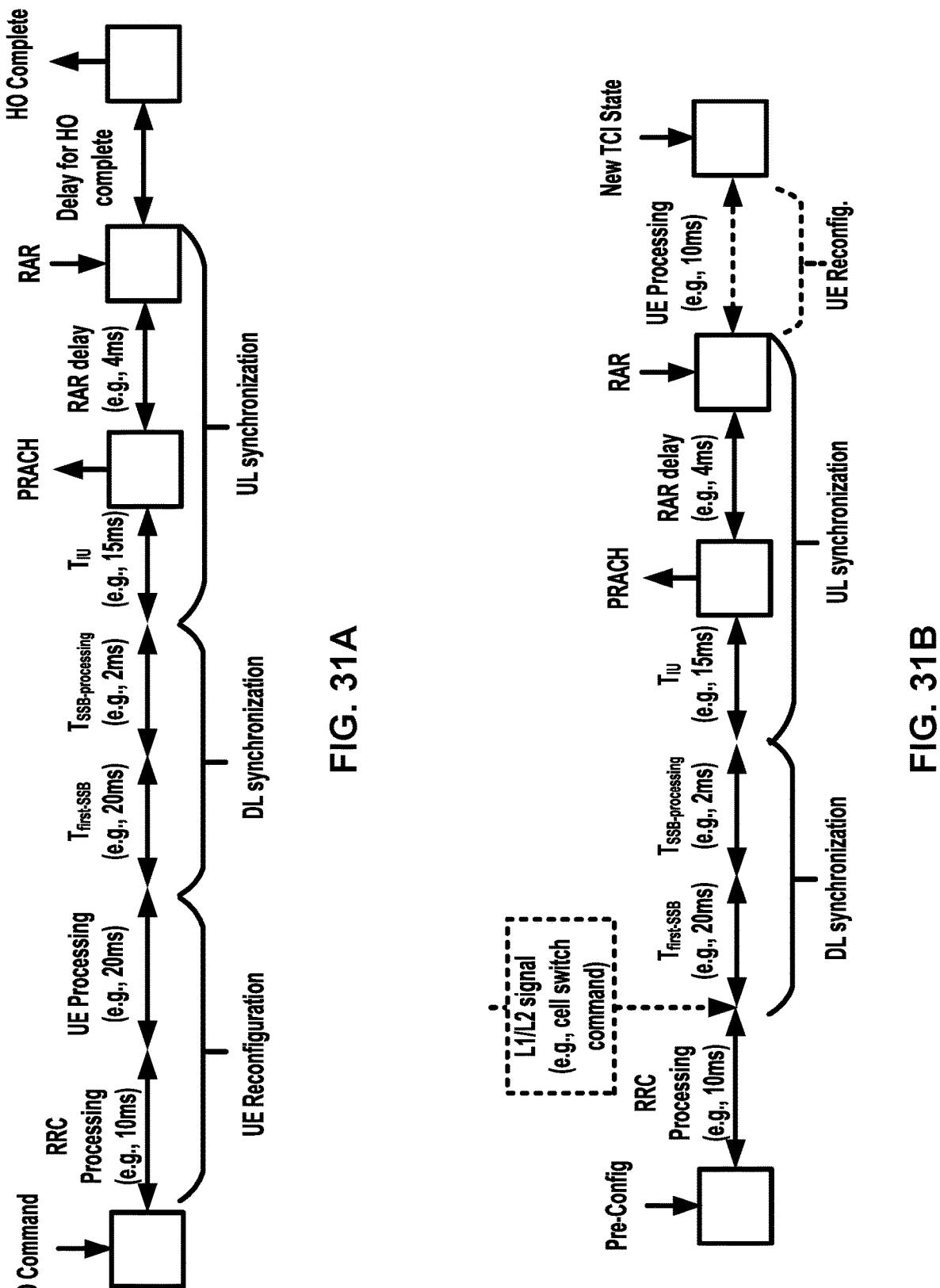
FIG. 31A and FIG. 31B shows examples of PCell switching.

FIG. 31A and FIG. 31B show examples of PCell switching. FIG. 31A shows an example of timeline of L3 handover in which the wireless device receives (from a base station) one or more messages (and/or signal) and/or transmits (to the base station) one or more message (and/or signal). In an example, if/when a wireless device receives a HO command (e.g., a RRC reconfiguration message based on examples described with respect to FIG. 20, FIG. 21 and/or FIG. 22), the wireless device may spend around 10 ms for RRC message processing (PDCCH/PDSCH decoding, ACK/NACK feedback etc.) and then spend 20 ms for wireless device processing (e.g., loading RRC/MAC/PHY related parameters to memory unit of the wireless device, etc.). This process of RRC message processing and wireless device processing may be referred to as wireless device reconfiguration. Then the wireless device may spend more than 20 ms for searching for a first SSB (Tfirst-SSB) and may need additional 2 ms for processing the SSB (TSSB-processing). The SSB searching and processing may be referred to as downlink (DL) synchronization. The wireless device may spend around 20 ms for uplink (UL) synchronization comprising a first time period of an interruption uncertainty (TIU) in acquiring a first available PRACH occasion for a preamble transmission in the target cell, a second time period used for PRACH transmission, a third time period (4 ms in FIG. 31A) for monitoring PDCCH for receiving a RAR corresponding to the preamble transmission, and/or receiving/decoding the RAR. TIU (15 ms) can be up to the summation of SSB to PRACH occasion association period and 10 ms. There may be additional time period for processing and coding a RRC message for a HO complete indication. Existing HO procedure may increase PCell switching latency.

FIG. 31B shows an example of timeline of LTM in which the wireless device may receive (from a base station) one or more messages (and/or signal) and/or transmits (to the base station) one or more message (and/or signal) for mobility management and/or network energy saving. Before a wireless device receives a HO command (e.g., a L1/L2 signal described in examples of the present disclosure), the wireless device may receive a RRC reconfiguration message (e.g., Pre-Config in FIG. 31B). The wireless device may spend 10 ms (or another time duration) for RRC processing.

In an example of FIG. 31B, the wireless device may receive an L1/L2 signal indicating cell switch (e.g., a PCell switching), for example, after receiving the RRC reconfiguration message. In response to receiving the layer 1/2 signal indicating the cell switch, the wireless device may perform DL synchronization and/or UL synchronization. After completing the DL/UL synchronization, the wireless device may receive a TCI state indication of the new PCell for PDCCH/PDSCH reception and/or PUCCH/PUSCH transmission via the new PCell. The wireless device may conduct (e.g., apply) wireless device reconfiguration after completing the DL/UL synchronization. If/when the wireless device supports the wireless device reconfiguration after receiving the RRC reconfiguration message, the wireless device reconfiguration may be conducted upon receiving the RRC reconfiguration message, rather than after completing the DL/UL synchronization. The latency for HO to the new PCell in this case comprises DL synchronization, UL synchronization, and TCI state indication and/or application.

After receiving the L1/L2 signal indicating cell switch (e.g., cell switching command), a wireless device may perform UL synchronization by conducting RACH procedure, for example, based on examples described above with respect to FIG. 13A, FIG. 13B and/or FIG. 13C. The performing UL synchronization may comprise transmitting a preamble via an active uplink BWP (e.g., a BWP configured as firstActiveUplinkBWP-id as shown in FIG. 21) of uplink BWPs of the target PCell, monitoring PDCCH on an active downlink BWP (e.g., a BWP configured as firstActiveDownlinkBWP-id as shown in FIG. 21) of the target PCell for receiving a RAR comprising a TA which is used for PUSCH/PUCCH transmission via the target PCell, receiving the RAR, and/or obtaining the TA. The wireless device may activate the uplink BWP configured with firstActiveUplinkBWP-id and the downlink BWP configured with firstActiveDownlinkBWP-id on the target PCell upon performing HO to the target PCell. After completing the UL synchronization, the wireless device obtains the TA to be used for PUSCH/PUCCH transmission via the target PCell. The wireless device may use the TA to adjust uplink transmission timing, and then transmit PUSCH/PUCCH via the target PCell based on the adjusted timing. The adjusting uplink transmission timing may comprise advancing or delaying the transmissions by an amount indicated by a value of the TA, for example, to help ensure the uplink signals received at the target PCell are aligned (in time domain) with uplink signals transmitted from other wireless devices.

To further reduce HO latency (e.g., especially the latency introduced for uplink synchronization), a network and/or a wireless device may perform an early TA acquisition (ETA) and/or early random access (early RACH) procedure. The ETA may refer to a procedure comprising a downlink transmission that a wireless device that is configured with an LTM receives a first indication of the ETA from the network (e.g., a serving base station and/or a serving cell). The first indication of the ETA may indicate a uplink reference signal (e.g., preamble, SRS, DM-RS, and/or PT-RS) to a candidate target cell that is one of the candidate target cells configured in the LTM configuration. The first indication may be DCI and/or MAC CE. The ETA may refer to a procedure comprising an uplink transmission that a wireless device transmits, to the candidate target cell, the uplink reference signal. The ETA may be for acquiring a TA value before triggering/initiating/executing the LTM. For example, the wireless device may receive a second indication (e.g., L1/L2 signal in FIG. 28, FIG. 29, FIG. 30, and/or FIG. 31B) indicating a cell switch to a target cell (e.g., the candidate target cell) that is one of candidate targets cell configured in the LTM configuration, e.g., after or in response to receiving the first indication and/or transmitting the uplink reference signal. For example, the wireless device that performs the ETA procedure may not perform an RA procedure to the target cell (e.g., after or in response to receiving the second indication), for example, if the target cell is the same as the candidate target cell to which the wireless device transmits the uplink reference signal based on the first indication.

A base station central unit of a base station determines a layer 3 (L3) handover (e.g., may be referred to as and/or comprise a normal handover or conditional handover) based on L3 measurement report received from a wireless device. For example, a wireless device may transmit to the base station the L3 measurement report via an RRC message (e.g., measurement report message). A base station distributed unit of the base station may receive the RRC message and forwards the RRC message to the base station central unit. Based on the determining the L3 handover, the base station central unit may transmit to the wireless device an RRC message (e.g., a handover command) for the L3 handover. The wireless device may require more time to obtain L3 measurement results for the L3 measurement report as compared to a L1 measurement results as shown in FIG. 18. The L3 measurement results may be an averaged value of one or more L1 measurement results.

A base station distributed unit may determine a LTM (e.g., a layer 1/2 handover) based on L1 measurement report received from a wireless device. For example, a wireless device may transmit L1 measurement report via a L1/L2 signal to the base station distributed unit. Based on determining the LTM, the base station distributed unit may transmit a L1/L2 signal triggering the LTM to the wireless device. The LTM decision by the base station distributed unit may not require signals between the base station distributed unit and the base station central unit. It may reduce a time for a handover decision and the signals. The LTM decision based on L1 measurement report may increase a chance to handover (e.g., switch a cell) as compared to a handover (e.g., L3 handover) decision based on the L3 measurement report.

From a base station, a wireless device may receive a RRC reconfiguration message triggering a layer 3 (L3) handover (e.g., normal handover). As shown in FIG. 31A, the wireless device receiving the RRC reconfiguration message triggering the L3 handover may spend around 10 ms for RRC message processing and then spend 20 ms for wireless device processing. the wireless device may delay the L3 handover until the RRC processing and wireless device processing are completed.

As shown in FIG. 31B, a wireless device may receive an RRC reconfiguration message comprising a pre-configuration for LTM (e.g., a LTM configuration). The wireless device may spend 10 ms for RRC processing the RRC reconfiguration. The wireless device may receive the L1/L2 signal for LTM after the RRC processing is completed. the wireless device receiving the L1/L2 signal for LTM may perform a handover and/or cell switch for the LTM without the delay due to the RRC processing time.

Figure 32:
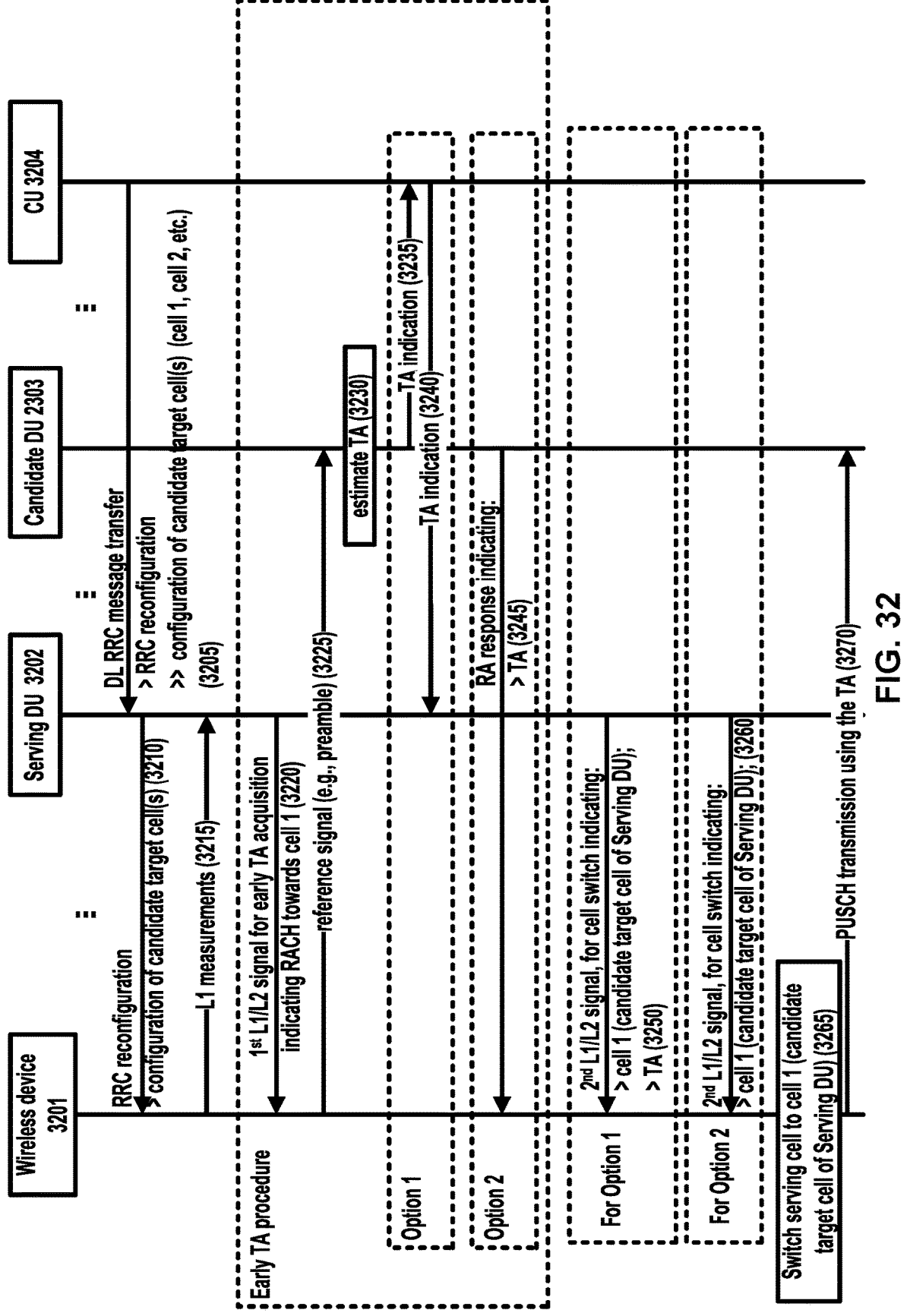
FIG. 32 shows an example of early TA acquisition for inter-DU L1/L2 triggered mobility.

FIG. 32 shows an example of early TA acquisition (or ETA) procedure for an LTM (e.g., inter-DU LTM). In FIG. 32, before the CU performing the transmission of the DL RRC message transfer to serving DU (e.g., at step 3205), a wireless device (e.g., 3201) and/or network (e.g., serving DU, candidate DU, and/or CU) may perform, among wireless device, serving DU, candidate DU, and CU, one or more transmission(s) and/or reception(s) described in FIG. 30. For example, before the CU performing the transmission of the DL RRC message transfer to serving DU in FIG. 32 (e.g., at step 3205), a wireless device and/or network (e.g., serving DU, candidate DU, and/or CU) may perform, among wireless device, serving DU, candidate DU, and CU, signaling (e.g., reception(s) and/or transmission(s)) from a transmission of measurement report (from wireless device to serving DU) to a reception of the RRC reconfiguration (from the serving DU to the Wireless device) described in FIG. 30. In an example, in FIG. 32, according to example disclosure in the present disclosure (e.g., in FIG. 32) and before the early TA (ETA) procedure, the network (e.g., a base station, a source base station) may configure the wireless device to perform measurement reporting (possibly including the configuration of measurement gaps) for a plurality of neighbor cells (e.g., Cell 1 from a candidate DU, Cell 2 from a serving DU, etc.). The measurement reporting may comprise a L3 measurement reporting, that may be different from L1 measurement reporting (e.g., L1 CSI reporting). The wireless device may transmit one or more measurement reports to the source base station (or source PCell, cell 0 in FIG. 32) (e.g., at step 3215).

In an example, in FIG. 32, according to example disclosure in the present disclosure (e.g., in FIG. 30) and before the early TA procedure, based on the one or more measurement reports from the wireless device, the base station (e.g., the CU) may determine a candidate target cell for LTM. The base station may include available measurement information for the candidate target cells provided in the list.

In an example, in FIG. 32, according to example disclosure in the present disclosure (e.g., in FIG. 30) and before the early TA procedure, the base station (e.g., serving DU 3202) may transmit to the wireless device (e.g., 3201) an RRC reconfiguration messages comprising one or more LTM configurations (e.g., at step 3210). For example, each of the one or more LTM configurations is associated with or indicate a respective candidate target cell for LTM. A LTM configuration, of the one or more LTM configurations, may comprise cell group configuration IE of the base station, and/or SpCell configuration IE of the candidate target cell (e.g., a candidate target PCell/SCells of the base station).

In an example, in FIG. 32, according to example disclosure in the present disclosure (e.g., in FIG. 30) and before the early TA procedure, the base station may configure to the wireless device an LTM (e.g., for PCell switching/changing, mobility, etc.) procedure different from a normal HO procedure (e.g., as shown in FIG. 20 and/or a CHO procedure (e.g., as shown in FIG. 23, by comprising a LTM configuration in a RRC reconfiguration message. In an example of FIG. 32, a LTM configuration, of the one or more LTM configurations, associated with a candidate target cell may comprise a list of cells (e.g., for a CA and/or DC operation for the case that a wireless device may perform a handover to the candidate target cell). For example, the LTM configuration may comprise one or more indications or parameters indicating, among the cell in the list, which cell becomes a PCell, PSCell, SpCell, and/or SCell for the CA and/or DC operation for the case that a wireless device may perform a handover to the candidate target cell. For example, if the wireless device successfully completes a handover based on the LTM to the candidate target cell, the wireless device may configure the CA and/or DC operation according the LTM configuration. A cell (e.g., the candidate target cell) indicated in the list as a PCell may become a PCell in response to the wireless device successfully completing the handover based on the LTM to the candidate target cell. A cell indicated in the list as a PSCell may become a PSCell in response to the wireless device successfully completing the handover based on the LTM to the candidate target cell. A cell indicated in the list as a SpCell may become a SpCell in response to the wireless device successfully completing the handover based on the LTM to the candidate target cell. A cell indicated in the list as a SCell may become a SCell in response to the wireless device successfully completing the handover based on the LTM to the candidate target cell.

In the example of FIG. 32, the wireless device, upon receiving a first L1/L2 signal (e.g., at step 3220), may transmit, PRACH occasion, the preamble (or SRS which is not shown in FIG. 32) to the candidate target cell of a candidate DU (e.g., at step 3225). The candidate DU may monitor the PRACH occasion for receiving the preamble, from the wireless device. The candidate DU may determine and/or estimate a TA to be used by the wireless device for future uplink transmission in the candidate target cell (e.g., at step 3230), for example, after the wireless device successfully completes a handover based on the LTM to the candidate target cell.

In an example of FIG. 32, as a first option (option 1 at steps 3235 and/or 3240 in FIG. 32) for early TA acquisition (or ETA), based on receiving the preamble from the wireless device, the candidate DU may not transmit to the wireless device a response (e.g., RA response, RAR) indicating an estimated TA value (e.g., associated with the candidate target cell of the candidate DU), in response to or after receiving the preamble from the wireless device. For example, the candidate DU may send and/or forward the estimated TA value for the candidate target cell to the serving DU (e.g., at step 3240) via the CU of the base station (e.g., at step 3235). In the first option, after or in response to transmitting the preamble to the candidate target cell, the wireless device may not monitor PDCCH on the candidate target cell. The serving DU may indicate the estimated TA together with a second L1/L2 signal (e.g., 2nd L1/L2 signal in FIG. 32) indicating/triggering LTM to the candidate target cell of the candidate DU.

In the second option of FIG. 32 (e.g., at step 3245), the candidate DU may transmit the estimated TA value to the wireless device, e.g., as an RAR, and/or as a TAC MAC CE, for example, after or in response to receiving the preamble from the wireless device. In the second option, the wireless device may (e.g., start to) monitor PDCCH of the candidate target cell of the candidate DU, for receiving the RAR to the preamble (e.g., based on examples described above with respect to FIG. 13A, FIG. 13B and/or FIG. 13C), for example, after or in response to transmitting the preamble to the candidate target cell of the candidate DU. The wireless device may maintain a TAT for a TAG associated with the candidate target cell. The wireless device may maintain the candidate target cell as a non-serving cell. The RAR and/or the TAC MAC CE may indicate (e.g., one or more bitfields of the MAC CE) whether the TA value in the RAR and/or the TAC MAC CE is for a serving cell (or a TAG associated the serving cell), e.g., of the serving DU, or for a non-serving cell (e.g., the candidate target cell) of the candidate DU.

In the second option of FIG. 32, the candidate DU may transmit the estimated TA value to the wireless device, for example, after or in response to receiving the preamble from the wireless device. In the second option, the wireless device may (e.g., start to) monitor PDCCH of the candidate target cell of the candidate DU, for receiving the estimated TA (e.g., based on examples described above with respect to FIG. 13A, FIG. 13B and/or FIG. 13C), for example, after or in response to transmitting the preamble to the candidate target cell of the candidate DU. The candidate target cell may send to the wireless device, a message (e.g. RAR) comprising the estimated TA based on the preamble received from the wireless device. The wireless device may maintain a TAT for a TAG associated with the candidate target cell. The wireless device may maintain the candidate target cell as a non-serving cell. The RAR and/or the TAC MAC CE may indicate (e.g., one or more bitfields of the MAC CE) whether the TA value in the RAR and/or the TAC MAC CE is for a serving cell (or a TAG associated the serving cell), e.g., of the serving DU, or for a non-serving cell (e.g., candidate target cell) of the candidate DU.

In the example of FIG. 32, the transmission of a preamble to a target candidate target cell, before receiving an L1/L2 signal (with or without comprising a TA estimated by the target base station for the candidate target cell) indicating to perform LTM and/or cell switch to the candidate target Cell, may be referred to as an early TA acquisition (ETA) procedure. By implementing the ETA, before the wireless device performs the HO, the target base station may obtain the TA to be used by the wireless device after performing the HO/LTM to the candidate target cell. The TA for the candidate target cell may be transmitted as a part of a RAR or combined together with the L1/L2 signal/command indicating the candidate target cell for switching. Compared with the timelines shown in FIG. 31A and/or FIG. 31B, the wireless device may skip the RA procedure after receiving the L1/L2 signal/command indicating the LTM and/or cell. The ETA procedure therefore reduces the interruption due to uplink synchronization with the candidate target cell upon performing HO procedure (or PCell switching procedure).

An ETA of a wireless device may be referred to as and/or interchangeable with acquiring, by a wireless device, a TA associated with a cell before performing, by the wireless device a handover to the cell and/or the like. Transmitting, by a wireless device, a reference signal to a cell before performing, by the wireless device a handover to the cell may be referred to as and/or interchangeable with ETA and/or the like. Transmitting, by a wireless device, a reference signal to a cell before performing, by the wireless device a handover to the cell may be for ETA. Before performing a handover (e.g., LTM) to a cell may be referred to as and/or interchangeable with before executing a handover (e.g., LTM) to a cell, before receiving a L1/L2 signal indicating cell switch (or LTM or handover) to a cell and/or the like.

An ETA may comprise a procedure to transmit, by a wireless device, a reference signal to a cell before receiving, by the wireless device, a L1/L2 signal, for LTM, indicating a cell switch (or a handover) to the cell. a reference signal for ETA may comprise preamble, sounding reference signal (SRS), demodulation reference signal (DM-RS), phase tracking reference signal (PT-RS) and/or the like. A resource for transmission of the reference signal may be time and frequency resources via which the wireless device transmits the reference signal for ETA. For example, the resource may be PRACH, SRS resource, DM-RS resource (e.g., one or more DM-RS symbol over one or more subcarriers), PT-RS resource (e.g., one or more PT-RS symbol over one or more subcarriers) and/or the like.

An ETA may be referred to as an early RACH (early RA procedure), e.g., if the reference signal is a preamble. The early RACH (early RA procedure) may comprise a procedure to transmit, by a wireless device, a preamble to a cell before receiving, by the wireless device a signal indicating a cell switch (or a handover) to the cell. A resource for transmission of the preamble may be time and frequency resources via which the wireless device transmits the preamble for early RACH. For example, the resource may be PRACH.

In the example of FIG. 32, (e.g., as the first option of ETA), the wireless device may receive a second L1/L2 signal/command (e.g., 2nd L1/L2 signal at step 3250 in FIG. 32) indicating to perform LTM and/or cell switch to the candidate target cell. The second L1/L2 signal/command may further indicate the TA (forwarded from the candidate DU of a target base station to the serving DU of a source base station and used for the target PCell in the future), for example, if the wireless device does not receive the TA before or until receiving the second L1/L2 signal/command. In response to receiving the second L1/L2 signal/command, the wireless device may switch a PCell from a serving cell of the serving DU to the candidate target cell of the candidate DU and transmit PUSCH/PUCCH via the candidate target cell (e.g., that becomes a PCell) of the candidate DU based on the TA. Switching the PCell from the serving cell in the serving DU to the candidate target cell may comprise at least one of: applying RRC configuration parameters of the candidate target cell that becomes the PCell, stopping applying RRC configuration parameters of the serving cell of the serving DU, resetting/reconfiguring MAC entity, receiving RRC messages/MIB/SSBs/SIBs/PDCCHs/PDSCHs from the candidate target cell that becomes the PCell and stopping receiving RRC messages/MIB/SSBs/SIBs/PDCCHs/PDSCHs from Cell 0.

In the example of FIG. 32, as a second option (option 2 at step 3260 in FIG. 32) for early TA acquisition (or ETA), based on receiving the preamble from the wireless device, the candidate DU may transmit to the wireless device a response (e.g., RA response, RAR) indicating a TA, associated with the candidate target cell of the candidate DU, for the wireless device. Based on transmitting the preamble to the candidate target cell of the candidate DU, the wireless device may monitor PDCCH on the candidate target cell of the candidate DU and receive the response (e.g., RA response, RAR) via the PDCCH. The wireless device may maintain a TAT for a TAG associated with the candidate target cell of the candidate DU. The wireless device may maintain the candidate target cell of the candidate DU as a non-serving cell, e.g., after or in response to receiving the response and/or before or until receiving a second L1/L2 signal/command. The response may indicate (e.g., one or more bitfields of the MAC CE) whether the TAC is for a serving cell (or a TAG associated the serving cell) or for a non-serving cell (e.g., the candidate target cell of the candidate DU). The wireless device may receive, via the serving cell of the serving DU, the second L1/L2 signal/command, for cell switch, indicating the candidate target cell of the candidate DU. Based on receiving the second L1/L2 signal/command, the wireless device may switch the PCell from the serving cell of the serving DU to the candidate target cell of the candidate DU (e.g., at step 3265) and/or transmit data and/or control information (e.g., PUSCH/PUCCH) via the candidate target cell of the candidate DU based on (e.g., using the TA) (e.g., at step 3270).

Figure 33:
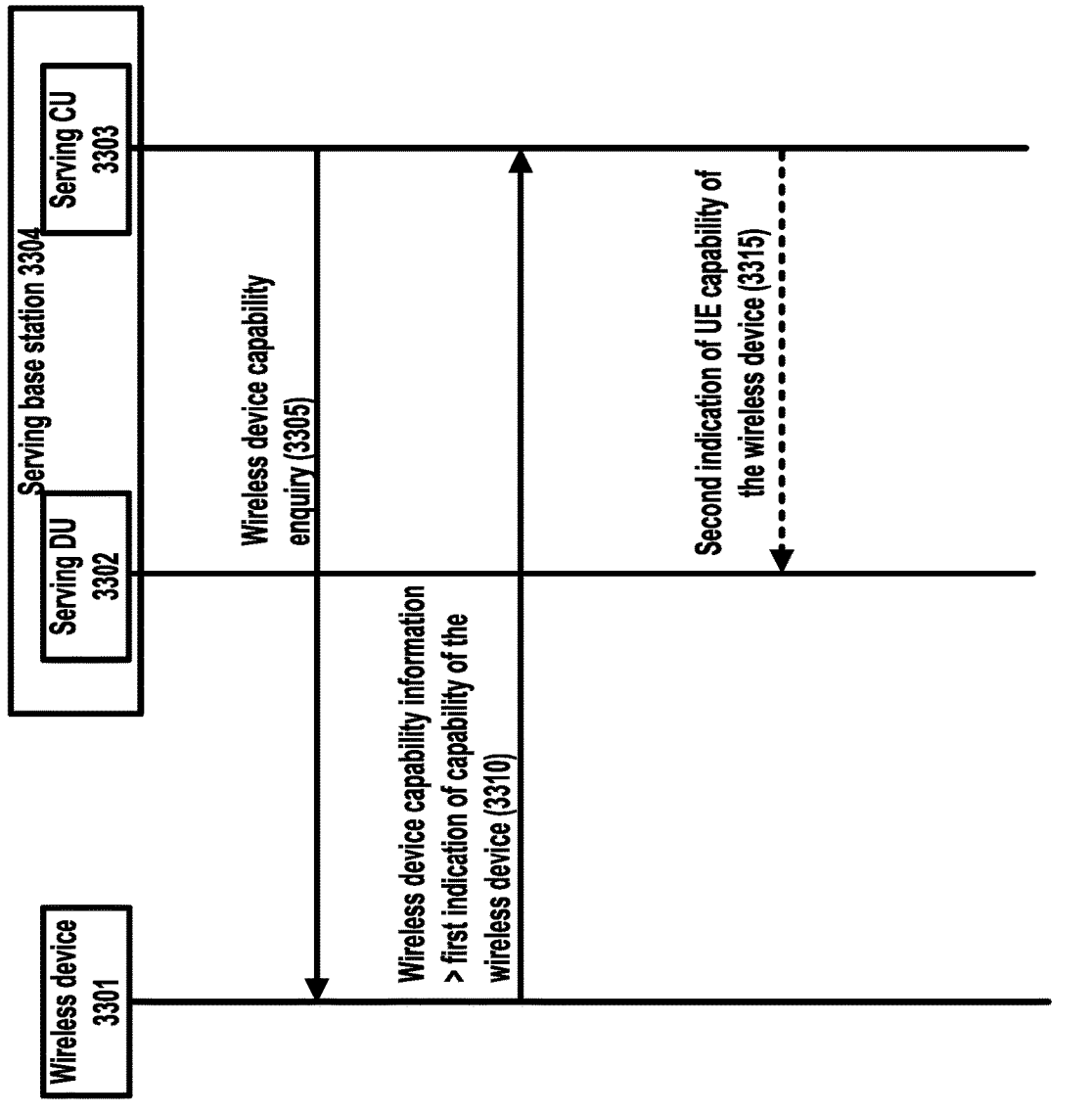
FIG. 33 shows an example of capability of a wireless device.

FIG. 33 shows example of capability of a wireless device. A wireless device 3301 may receive, from a serving CU 3303, an RRC message comprising a wireless device capability enquiry (e.g., UE capability enquiry) (e.g., at step 3305). The wireless device may transmit to a serving base station 3304 a first indication of one or more capability of the wireless device (e.g., at step 3310), for example, in response to receiving the wireless device capability enquiry. For example, the wireless device may transmit to a serving base station an RRC message (e.g., UE capacity information message) comprising a first indication of one or more capability of the wireless device. A wireless device may transmit to a serving CU of a serving base station, via a serving DU of the serving base station, an RRC message (e.g., UE capacity information message) comprising a first indication of one or more capability of the wireless device.

In an example of FIG. 33, the wireless device may transmit to the serving base station (and/or to the CU) the first indication in response to and/or after receiving a downlink RRC message (e.g., UE capacity enquiry message) from the serving base station (or the CU). For example, the downlink RRC message may indicate one or more types of capability of the wireless device. Based on receiving the downlink RRC message, the wireless device may transmit the first indication of one or more capability associated with the one or more types.

In an example of FIG. 33, a CU of a serving base station receiving the first indication from a wireless device may transmit the second indication to a DU (e.g., serving DU) (e.g., at step 3315). The second indication may indicate at least one of the one or more capability, of the wireless device, indicated by the first indication. For example, the CU may transmit to the DU the second indication via wireless device associated signaling (e.g., UE context setup/modification request and/or UE context setup/modification response). Based on receiving the second indication, the DU may take into account the second indication (e.g., if/when allocating resource to the wireless device or configuring one or more configuration to the wireless device).

The LTM configuration in the present disclosure, e.g., in FIG. 28, FIG. 29, FIG. 30, and/or FIG. 32, may use an RRC reconfiguration message structure of an RRC reconfiguration message, as shown in FIG. 21 and/or FIG. 22. For example, an RRC reconfiguration message transmitted by a base station may comprise one or more RRC reconfiguration messages. Each RRC reconfiguration message of the one or more RRC reconfiguration messages may be associated with a respective LTM configuration. For example, each RRC reconfiguration message of the one or more RRC reconfiguration messages comprises a respective LTM configuration.

The LTM configuration in the present disclosure, for example, in FIG. 28, FIG. 29, FIG. 30, and/or FIG. 32, may use a cell group configuration IE structure, as shown in FIG. 21 and/or FIG. 22. For example, an RRC reconfiguration message transmitted by a base station may comprise one or more cell group configuration IEs. Each cell group configuration IE of the one or more cell group configuration IEs may be associated with a respective LTM configuration. For example, each cell group configuration IE of the one or more cell group configuration IEs comprises a respective LTM configuration.

The LTM configuration in the present disclosure, for example, in FIG. 28, FIG. 29, FIG. 30, and/or FIG. 32, may use the SpCell configuration IE structure, as shown in FIG. 21 and/or FIG. 22. For example, an RRC reconfiguration message transmitted by a base station may comprise one or more SpCell configuration IE. Each SpCell configuration IE of the one or more SpCell configuration IE may be associated with a respective LTM configuration. For example, the each SpCell configuration IE may comprise a candidate target cell configuration as a respective LTM configuration.

In FIG. 28, FIG. 29, FIG. 30, and/or FIG. 32, for each candidate target cell, a source base station may indicate cell common parameter(s) and/or wireless device specific parameter(s) (e.g., SSBs/CSI-RSs, BWPs, RACH resources, PDCCH/PDSCH/PUCCH/PUSCH resources etc.). In the example of FIG. 32, the wireless device, according to the received RRC reconfiguration message comprising a LTM configuration of a list of candidate target cell(s), may perform L1/L2 measurement report (CSI/beam) for the list of candidate target cell(s) (e.g., PCell) and/or the current serving PCell. The L1/L2 measurement report may comprise layer 1 RSRP, layer 1 RSRQ, PMI, RI, layer 1 SINR, CQI, etc.

A wireless device may trigger the L1/L2 measurement report when the measurement of the CSI/beam of a candidate target cell is greater than a threshold, or (amount of offset) larger than measurement of the CSI/beam of the current serving PCell. A wireless device may transmit the L1/L2 measurement report with a periodicity configured by the base station. In an example, a UCI via PUCCH/PUSCH, or a MAC CE (e.g., event-triggered, associated with a configured SR for the transmission of the MAC CE) may comprise and/or carry the L1/L2 measurement report. A master base station may be referred to as and/or interchangeable with a master node (MN), a base station and/or like. In the present disclosure, a secondary base station may be referred to as and/or interchangeable with a secondary node (SN) and/or like a master node (SN) may be interchangeable with master cell group (MCG) and/or like. A secondary node (SN) may be interchangeable with secondary cell group (SCG) and/or like. Configuration may be referred to as and/or interchangeable with configuration parameter and/or the like. Keeping may be referred to as and/or interchangeable with retaining, maintaining, suspending, storing and/or the like.

A wireless device may receive one or more conditional configurations from a base station (e.g., a master base station). The one or more conditional configurations may comprise one or more conditional configuration for one or more candidate SCGs (e.g., CPC/CPA configurations). Each conditional configuration for SCGs among the one or more conditional configurations is associated with respective candidate SCG (or PSCell) of the one or more candidate SCGs (or PSCells). Based on receiving the one or more conditional configurations, the wireless device may store the one or more conditional configuration and start evaluation of execution conditions of the one or more conditional configurations. In existing technologies, based on performing reconfiguration with synchronization (reconfiguration with sync), the wireless device may release the one or more conditional configurations stored in the wireless device. It may cause for the wireless and the base station additional signals and delay to configure SCG(s). For example, the wireless device may transmit measurement report for cells of the SCG(s). The base station receiving the measurement may transmit a request of configuration parameter for SCG to a secondary base station of the SCG and receive the response comprising the configuration parameter from the secondary base station. The base station may transmit the configuration for the SCG to the wireless device.

A base station may transmit to a wireless device reconfiguration with sync (information element (IE)). A cell group configuration of MCG or SCG may comprise SPCell configuration of PCell or PSCell. The SPCell configuration may comprise the reconfiguration with sync. Based on receiving the reconfiguration with sync, the wireless device may perform an RRC reconfiguration to perform reconfiguration sync. The performing the reconfiguration with sync may comprise performing reconfiguration of the configuration parameter (e.g., of SPCell) and synchronization with SPCell indicated by the reconfiguration with sync. The synchronization may comprise random access procedure. For example, the reconfiguration with sync may be used for changing SPCell. Changing PCell may be handover. Changing PSCell may be SN addition/change (or PSCell addition/change). For example, a base station may transmit to a wireless device an RRC reconfiguration message comprising the reconfiguration with sync. The RRC reconfiguration message may comprise a cell group configuration of MCG or SCG. The cell group configuration may comprise the reconfiguration with sync.

RRC reconfiguration to perform reconfiguration with sync may comprise the following: reconfiguration with sync and security key refresh, involving random access (RA) to the PCell/PSCell, MAC reset, refresh of security and reestablishment of RLC and PDCP triggered by explicit L2 indicators; reconfiguration with sync but without security key refresh, involving RA to the PCell/PSCell, MAC reset and RLC re-establishment and PDCP data recovery (for AM DRB or AM MRB) triggered by explicit L2 indicators; reconfiguration with sync for dual active protocol stacks (DAPS) and security key refresh, involving RA to the target PCell, establishment of target MAC; reconfiguration with sync for DAPS but without security key refresh, involving RA to the target PCell, establishment of target MAC; reconfiguration with sync for direct-to-indirect path switch, not involving RA at target side, involving re-establishment of PDCP/PDCP data recovery (for AM DRB) triggered by explicit L2 indicators.

Reconfiguration with sync for DAPS and security key refresh, for non-DAPS bearer, may comprise: refresh of security and re-establishment of RLC and PDCP triggered by explicit L2 indicators; for DAPS bearer establishment of RLC for the target PCell, refresh of security and reconfiguration of PDCP to add the ciphering function, the integrity protection function and ROHC function of the target PCell; for SRB: refresh of security and establishment of RLC and PDCP for the target PCell. Reconfiguration with sync for DAPS but without security key refresh, for non-DAPS bearer, may comprise: RLC re-establishment and PDCP data recovery (for AM DRB or AM MRB) triggered by explicit L2 indicators. for DAPS bearer establishment of RLC for target PCell, reconfiguration of PDCP to add the ciphering function, the integrity protection function and ROHC function of the target PCell; for SRB: establishment of RLC and PDCP for the target PCell.

Reconfiguration with sync (IE) may comprise at least one of: SPCell configuration, of SPCell, comprising a configuration parameter of the SPCell; an identity, of the wireless device, configured/assigned for the SPCell; a value of T304 timer (HO timer); dedicated RACH configuration comprising a parameter for RACH (or random access procedure); RACH skip configuration comprising a parameter for skipping RACH (or random access procedure). Based on receiving the reconfiguration with sync, the wireless device may (re)configure the SPCell configuration for the SPCell and synchronizes with the SPCell using the dedicated RACH configuration and/or the RACH skip configuration. Based on initiating the reconfiguration with sync or initiating synchronization, the wireless device may start T304 timer with the value of T305 timer. Based on the reconfiguration with sync or the synchronization being successfully completed, the wireless device may strop the T304 timer. Based on T304 timer being expired, the wireless device may determine a failure of the reconfiguration with sync or the synchronization (e.g., handover failure).

Figure 34:
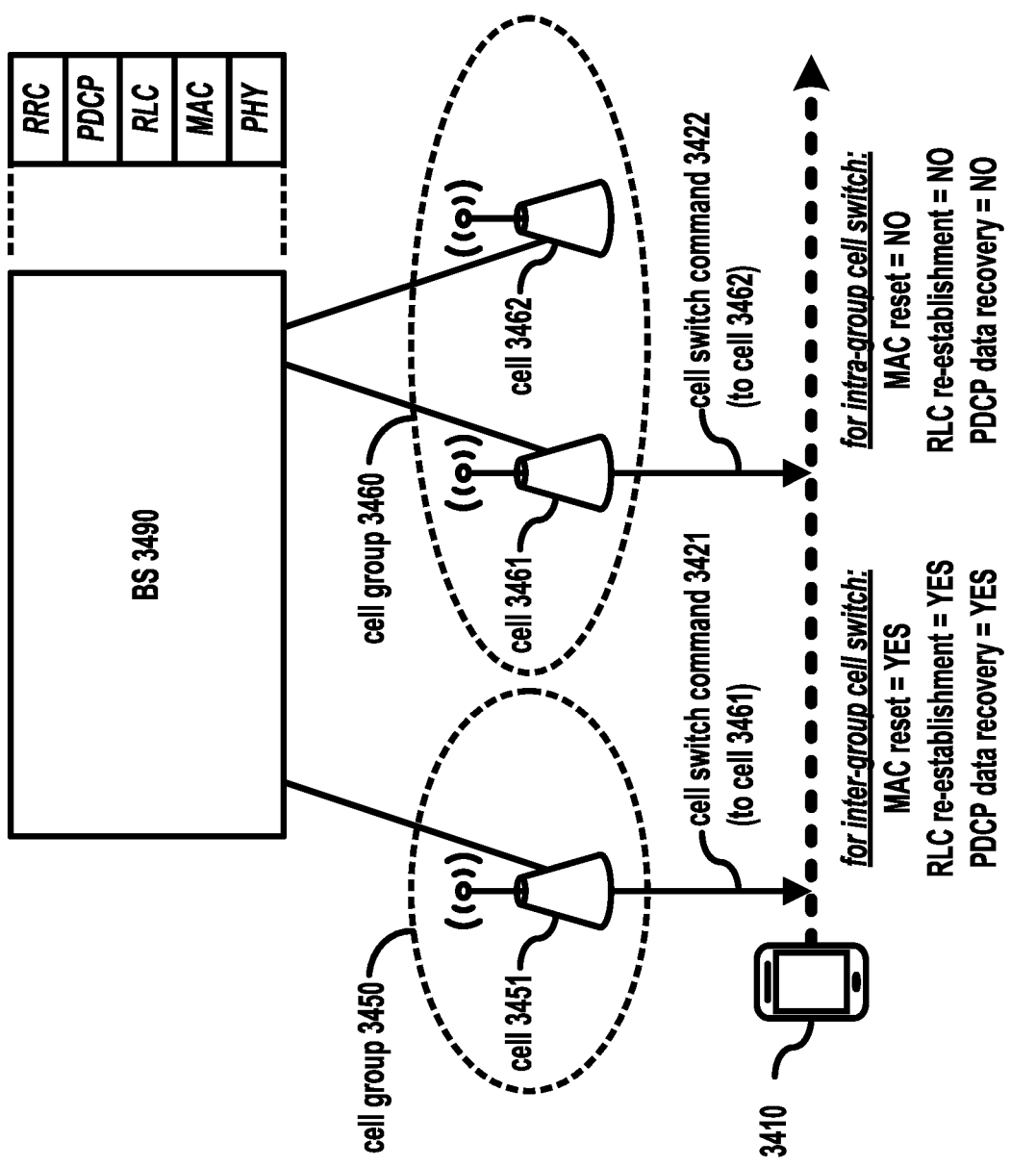
FIG. 34 shows an example of cell switching.

FIG. 34 shows an example of cell switching. The cell switching may comprise inter-group cell switching and/or intra-group cell switching. The figure shows a wireless device 3410 (wireless device 3410) and a base station 3490 (BS 3490). The BS 3490 has one or more cell groups of one or more cells. In the present example, BS 3490 has a cell group 3450 comprising cell 3451, and a cell group 3460 comprising cell 3461 and cell 3462.

The BS 3490 may implement one or more layers. In the present example, BS 3490 five layers, in particular, from highest layer to lowest, a radio resource control (RRC) layer, a packet data convergence protocol (PDCP) layer, a radio link control (RLC) layer, a medium access control (MAC) layer, and a physical (PHY) layer. The PHY layer may be referred to as layer 1. The RRC layer may be referred to as layer 3. The intervening layers MAC, RLC, and/or PDCP may be referred to as layer 2.

The BS 3490 may implement layer 3 mobility. Layer 3 mobility may be based on RRC configuration and/or reconfiguration. Layer 3 mobility may comprise handover, conditional handover, etc. (e.g., as shown in FIG. 23, FIG. 25, and/or FIG. 26). During L3 triggered mobility, lower layer configurations (e.g., L1/2 configurations) may be reset.

The BS 3490 may implement layer 1 and/or layer 2 triggered mobility (LTM). LTM may comprise switching, by wireless device 3410, from one cell to another (e.g., from cell 3451 to cell 3461, from cell 3461 to cell 3462, etc.). LTM switching may be performed without a reconfiguration associated with the RRC layer (e.g., without a layer 3 reconfiguration, e.g., as in FIGS. 30-32). By avoiding RRC reconfiguration associated with L3 mobility, L1/2 mobility may be performed more quickly and/or more efficiently than L3 triggered mobility. Moreover, L3 mobility may require a reset of lower layer configurations (e.g., L1/2 configurations). In L1/2 mobility, there is a potential opportunity to avoid reset of the lower layer configurations (which may be required in the case of L3 mobility). Accordingly, in some scenarios, L1/2 mobility may provide even greater improvements in the areas of speed and/or efficiency.

The aforementioned L1/2 configurations (which may, for example, be required upon L3 triggered mobility such as handover execution) may relate to the PHY layer, MAC layer, RLC layer, and/or PDCP layer. For example, a partial MAC reset may reset PHY measurements associated with the target cell. For example, a full MAC reset may involve other factors. For example, L1/2 reconfiguration may comprise RLC re-establishment, PDCP data recovery, or other actions. When defining cell groups, a network (e.g., BS 3490) may consider the advantages and disadvantages of performing these actions (e.g., on a case-by-case basis). For some cell pairs, it may be possible to perform a successful switching without perform L1/2 reconfiguration. For other cell pairs, L1/2 reconfiguration may improve performance. Network operators may define cell groups such that L1/2 reconfiguration, or particular actions associated with L1/2 reconfiguration, are avoided for cells in the same cell group. Cell group definition may be based on design, deployment, data collection relating to mobility results, or any combination thereof.

PDCP data recovery relates to generation and/or regeneration of packets. Packet data units which are not successfully transmitted and/or received via the source cell may be discarded. The packet data units may be generated and/or regenerated, and after successful cell switch, the packet data units may be transmitted and/or received via the target cell. An advantage (e.g., beneficial effect) of performing PDCP data recovery is that a complete communication may be performed, even as the wireless device undergoes mobility. A disadvantage (e.g., cost) of performing PDCP data recovery is the delay, power, and resource consumption associated with regenerating and/or retransmitting packet data units. If/when defining cell groups, a network (e.g., BS 3490) may consider the advantages and disadvantages of performing PDCP data recovery. For some cell pairs, it may be possible to perform a successful switching without performing packet discard and/or PDCP data recovery. For other cell pairs, packet discard and/or PDCP data recovery may be preferred.

The BS 3490 (and/or a network thereof) may determine the cell groups in any suitable manner. For example, BS 3490 may determine to reset a MAC layer (e.g., that the wireless device 3410 should reset the MAC layer) when switching between cell 3451 and cell 3461 or cell 3462; the BS 3490 may determine not to reset the MAC layer when switching between cell 3461 and cell 3462. Accordingly, BS 3490 may define, assign, and/or configure a first cell group (e.g., cell group 3450) associated with cell 3451 and a second cell group (e.g., cell group 3460) associated with cell 3461 and cell 3462. The BS 3490 may determine to reset the MAC layer when switching between groups (e.g., inter-group switching from a cell in cell group 3450 to a cell in cell group 3460 or vice-versa). The BS 3490 may determine not to reset the MAC layer when switching within a group (e.g., intra-group switching from a cell in cell group 3460 to another cell in cell group 3460).

In the grouping described in the foregoing example, BS 3490 defines cell group 3450 and cell group 3460 based on whether to reset MAC. It will be understood that BS 3490 may define cell groups based on whether to reset MAC, whether to re-establish RLC, whether to perform PDCP data recovery, or any combination thereof.

MAC reset, RLC re-establishment, and PDCP data recovery may be either all performed (for inter-group switching) or all not performed (for intra-group switching). However, it will be understood that group definition may concern a single behavior (e.g., MAC reset only), or may concern other behaviors not listed (e.g., other MAC-related behaviors, other RLC-related behaviors, other PDCP-related behaviors, other behaviors relating to layer 2 generally, other behaviors relating to layer 1, etc.).

Cell switching (e.g., LTM cell switching) is performed by wireless device 3410. In particular, wireless device 3410 is served by cell 3451. Wireless device 3410 receives a cell switch command 3421. The cell switch command 3421 may be received via cell 3451. The cell switch command 3421 indicates to switch to cell 3461. The switch from cell 3451 to cell 3461 is an inter-group switch from cell group 3450 to cell group 3460. Accordingly, wireless device 3410 may reset MAC, re-establish RLC, and/or perform PDCP data recovery.

The wireless device 3410 may switch to cell 3461. The switching may be based on the receiving of the cell switch command 3421. The wireless device 3410 may be served by 3461. The wireless device 3410 receives a cell switch command 3422. The cell switch command 3422 may be received via cell 3461. The cell switch command 3422 indicates to switch to cell 3462. The switch from cell 3461 to cell 3462 is an intra-group switch within cell group 3460. Accordingly, wireless device 3410 may not reset MAC, not re-establish RLC, and/or not perform PDCP data recovery.

It will be understood that BS 3490 may define cell groups based on any suitable considerations. As an example, all the cells of the BS 3490 may be added to a single cell group (in which case, switching may be performed without resetting MAC, without re-establishing RLC, and/or without performing PDCP data recovery. As another example, all the cells of the BS 3490 may be added to different cell groups (in which case, MAC may be reset, RLC may be re-established, and/or PDCP data recovery may be performed for every cell switch).

Figure 35B:
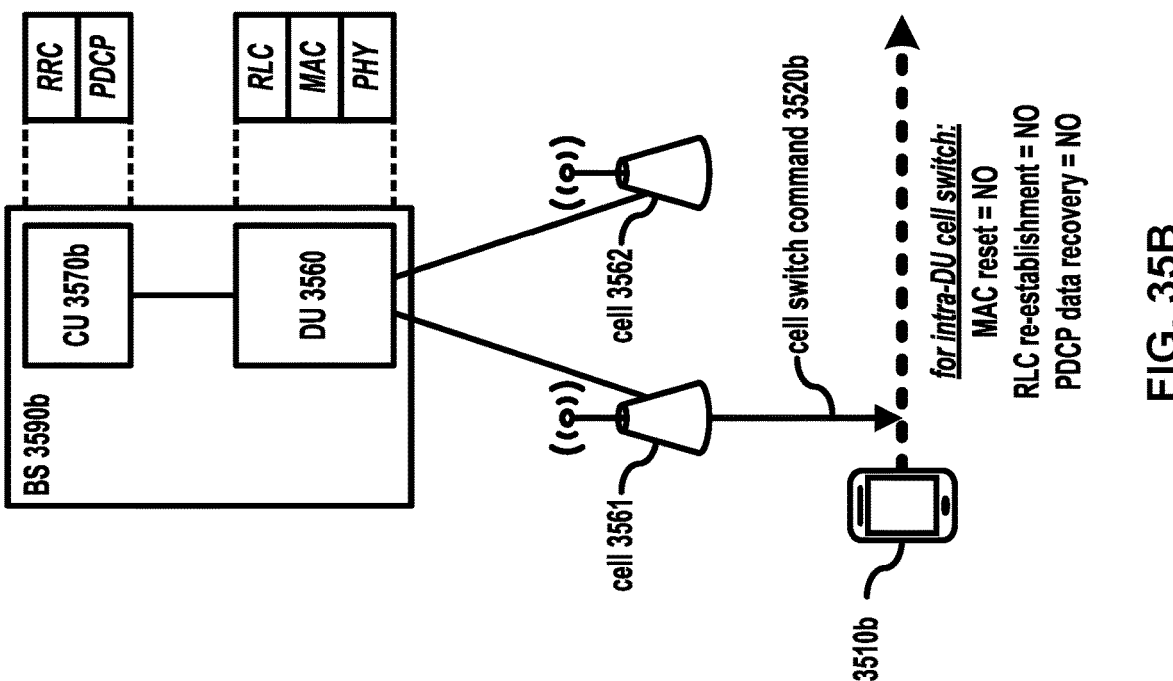
FIG. 35A and FIG. 35B shows an example in accordance with aspects of the disclosure.
Figure 35A:
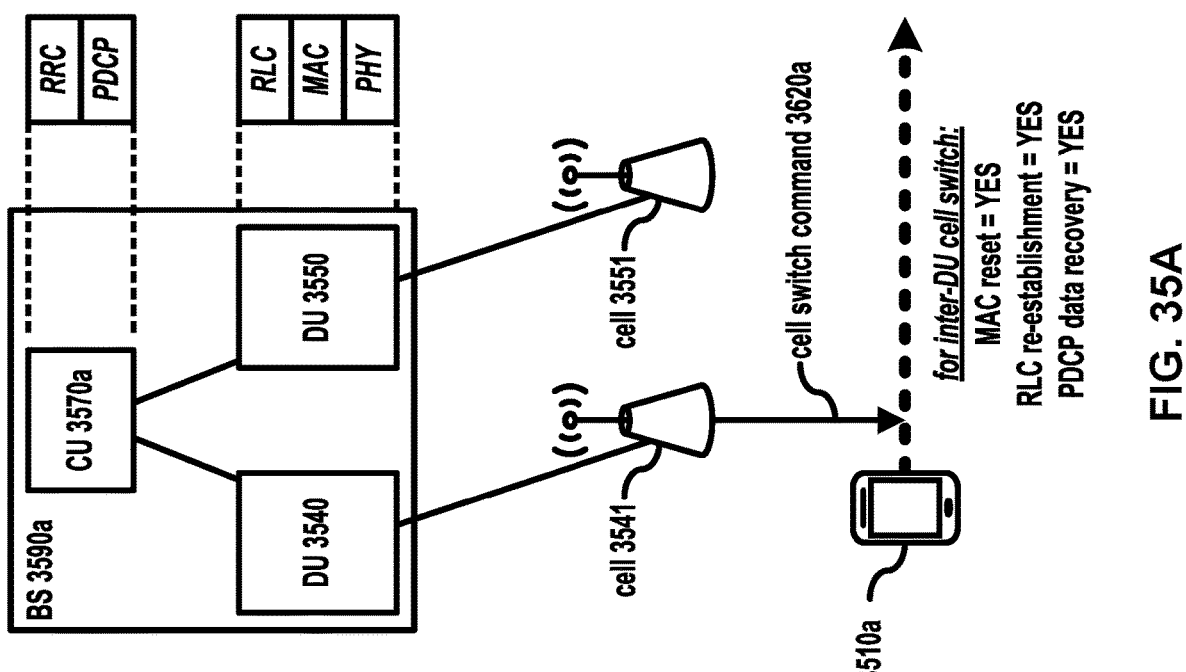

FIG. 35A and FIG. 35B show examples of cell switching. The cell switching may comprise inter-group cell switching (FIG. 35A) and intra-group cell switching (FIG. 35B), with different groups corresponding to different base station distributed units (DUs).

FIG. 35A shows a wireless device 3510*a* (wireless device 3510*a*) and a base station 3590*a* (BS 3590*a*). The BS 3590*a* has one or more base station distributed units comprising one or more cells. BS 3590*a* may have a DU 3540 comprising cell 3541 and a DU 3560 comprising cell 3551.

FIG. 35B shows a wireless device 3510*b* (wireless device 3510*b*) and a base station 3590*b* (BS 3590*b*). The BS 3590*b* may have one or more base station distributed units comprising one or more cells. BS 3590*b* may have a DU 3560 comprising cell 3561 and cell 3562.

Base stations such as BS 3590*a* and BS 3590*b* may define cell groups based on any suitable considerations. BS 3590*a* and BS 3590*b* may define cell groups based on association with a particular DU. Cell 3541 may be included in a cell group associated with DU 3540; cell 3551 may be included in a cell group associated with DU 3550; and/or cell 3561 and cell 3562 may be included in a cell group associated with DU 3560. Similar to the cell grouping described in the previous figure, the cell groupings in the present figure may influence the behavior of wireless devices (e.g., wireless device 3510*a* and/or wireless device 3510*b*).

In FIG. 35A, cell switching (e.g., LTM cell switching) may be performed by wireless device 3510*a*. In particular, wireless device 3510*a* is served by cell 3541. The wireless device 3510*a* may receive a cell switch command 3520*a*. The cell switch command 3520*a* may be received via cell 3541. The cell switch command 3520*a* may indicate to switch to cell 3551. The switch from cell 3541 to cell 3551 is an inter-group (e.g., inter-DU) switch from DU 3540 to DU 3550. Accordingly, wireless device 3510 may reset MAC, re-establish RLC, and/or perform PDCP data recovery.

In FIG. 35B, cell switching (e.g., LTM cell switching) may be performed by wireless device 3510*b*. In particular, wireless device 3510*b* is served by cell 3561. The wireless device 3510*b* may receive a cell switch command 3520*b*. The cell switch command 3520*b* may be received via cell 3561. The cell switch command 3520*b* may indicate to switch to cell 3562. The switch from cell 3561 to cell 3562 is an intra-group (e.g., intra-DU) switch between cells of DU 3560. Accordingly, wireless device 3510 may not reset MAC, not re-establish RLC, and/or not perform PDCP data recovery.

Figure 36:
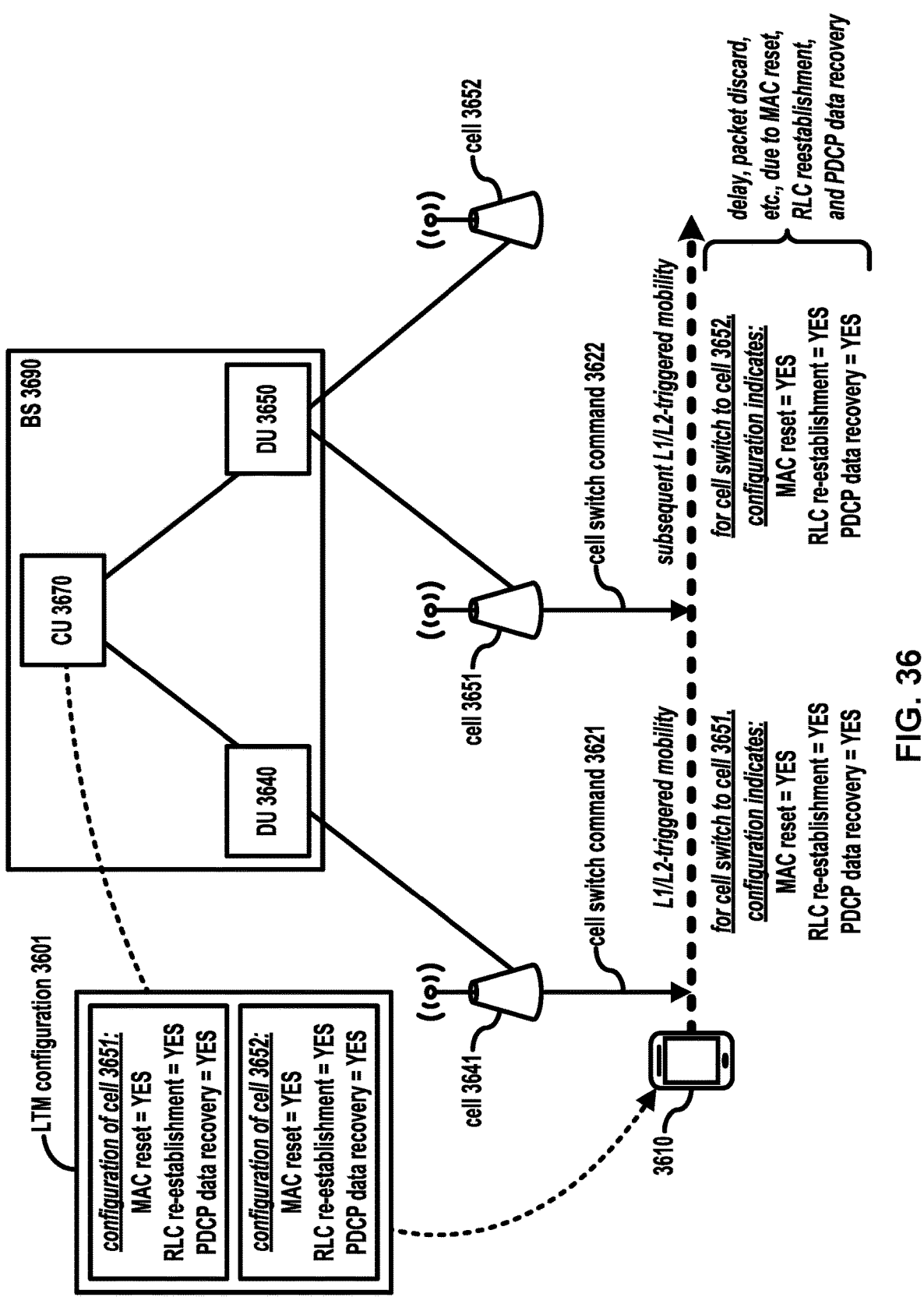
FIG. 36 shows an example cell switching.

FIG. 36 shows an example of cell switching. The cell switching may comprise wireless device configuration and/or wireless device behavior in the context of layer 1 and/or layer 2 triggered mobility (LTM). The figure shows a wireless device 3610 (wireless device 3610). The wireless device 3610 may receive an LTM configuration 3601 from a base station 3690 (BS 3690). BS 3690 may comprise a base station central unit 3670 (CU 3670). The CU 3670 may be associated with one or more base station distributed units (DUs). In the example, CU 3670 is associated with a DU 3640 having a cell 3641; and a DU 3650 having a cell 3651 and a cell 3652.

Wireless device 3610 may be initially served by DU 3640 via cell 3641. The wireless device 3610 may receive the LTM configuration 3601 from the CU 3670. The receiving of the LTM configuration 3601 may be via cell 3641 of DU 3640, or via any other suitable path.

The LTM configuration 3601 may be for L1/2 triggered mobility from a cell (e.g., a serving cell) of the wireless device 3610 (cell 3641) to one or more other cells (e.g., one or more candidate target cells; e.g., one or more cells associated with the BS 3690/CU 3670, one or more cells other than the serving cell, one or more cells associated with a different DU from the serving cell, etc.). The CU 3670 may determine the LTM configuration 3601 for L1/2 triggered mobility from the serving cell of the wireless device 3610 (cell 3641) to two other cells, in particular, cell 3651 and cell 3652 of DU 3650.

The cell 3641 may be in a different cell group from cell 3651 and cell 3652. The cell 3651 and the cell 3652 may be in a same cell group. A first cell group (comprising cell 3641) may correspond to DU 3640 and a second cell group (comprising cell 3651 and cell 3652) corresponds to DU 3650.

The LTM configuration 3601 may comprise one or more configurations of one or more cells. The one or more cells indicated by the LTM configuration 3601 may be referred to as target cells, candidate cells, etc. The LTM configuration 3601 may comprise a configuration of cell 3651. The CU 3670 may determine that cell 3651 is in a different cell group from cell 3641 (e.g., the serving cell of wireless device 3610). Accordingly, based on the LTM configuration 3601, wireless device 3610 may be configured to perform one or more actions associated with inter-group (e.g., inter-DU) cell switching. In the example, based on inter-group switching from cell 3641 to cell 3651, wireless device 3610 is configured to reset MAC, re-establish RLC, and/or perform PDCP data recovery.

The LTM configuration 3601 may comprise a configuration of cell 3652. The CU 3670 may determine that cell 3652 is in a different cell group from cell 3641 (e.g., the serving cell of wireless device 3610). Accordingly, based on the LTM configuration 3601, wireless device 3610 may be configured to perform one or more actions associated with inter-group (e.g., inter-DU) cell switching. Based on inter-group switching from cell 3641 to cell 3652, wireless device 3610 may be configured to reset MAC, re-establish RLC, and/or perform PDCP data recovery.

The wireless device 3610 may be capable of subsequent LTM. For example, wireless device 3610 may be capable of a plurality of consecutive cell switches based on L1/2 triggering. For example, wireless device 3610 may be capable of cell switching without RRC reconfiguration.

The wireless device 3610 may perform LTM based on receiving a cell switch command 3621 from DU 3640 via cell 3641. The cell switch command 3621 may command the wireless device 3610 to switch to cell 3651. The switching from cell 3641 to cell 3651 may be based on the LTM configuration 3601 The LTM configuration 3601 may indicate that if wireless device 3610 switches to cell 3651, wireless device 3610 should reset MAC, re-establish RLC, and/or perform PDCP data recovery.

The wireless device 3610 may perform LTM based on receiving a cell switch command 3622 from DU 3650 via cell 3651. The cell switch command 3622 may command wireless device 3610 to switch to cell 3652. In the example, the LTM toward cell 3652 (based on cell switch command 3622) may be subsequent to the LTM toward cell 3651 (based on cell switch command 3621). The LTM toward cell 3651 may be referred to as a prior, previous, and/or initial LTM. The LTM toward cell 3652 may be referred to as a subsequent LTM.

The switching from cell 3651 to cell 3652 may be based on the LTM configuration 3601. LTM configuration 3601 indicates that if wireless device 3610 switches to cell 3652, wireless device 3610 should reset MAC, re-establish RLC, and/or perform PDCP data recovery.

In at least some technologies, a wireless device may perform layer 1 and/or layer 2 triggered mobility (LTM). By contrast to mobility associated with layer 3 (e.g., handover, conditional handover, etc.), LTM may be faster and more efficient (e.g., require less signaling overhead). To configure a wireless device for LTM, a base station may send, to the wireless device, an LTM configuration. According to such techniques, the LTM configuration may identify one or more target cells, and prescribe particular behavior (e.g., MAC reset, RLC re-establishment, and/or PDCP data recovery). The LTM configuration may prescribe behavior on a per-target basis. For example, if the target cell is in a different cell group from a current (e.g., serving) cell, then the LTM configuration may indicate for the wireless device to perform MAC reset (etc.) upon switching to the target (e.g., to obtain the benefits of MAC reset). On the other hand, if the target cell is in the same cell group as the current (e.g., serving) cell, then the LTM configuration may indicate for the wireless device not to perform MAC reset (etc.) upon switching to the target (e.g., to avoid the costs of MAC reset, if the costs are likely to outweigh the benefits).

Some wireless devices may be capable of subsequent LTM. For example, as shown in FIG. 36, a wireless device may receive an LTM configuration from a base station central unit, perform a first LTM to a first (initial) target cell based on the LTM configuration, and perform a second (subsequent) LTM to a second target cell based on the LTM configuration. At least some wireless communication techniques fail to account for the complexities that arise in such a scenario. For example, at least some LTM configurations may assume that the current (e.g., serving) cell is the source cell for LTM. Accordingly, such LTM configurations may prescribe wireless device behavior (e.g., whether or not to perform MAC reset, etc.) on a per-target basis (e.g., based on whether or not the target is in a same or different cell group from the current cell). For the initial LTM, it may be safe to assume that the current (e.g., serving) cell is the source cell. However, after the initial cell switch, the assumption fails.

FIG. 36 demonstrates the waste that may result from this faulty assumption. For example, if/when wireless device 3610 receives the LTM configuration 3601, a current cell (cell 3641) is assumed to be the source cell for the initial LTM. Based on this (correct) assumption, wireless device 3610 determines (correctly) that the initial cell switch to cell 3651 is an inter-group cell switch (e.g., to a cell associated with a different DU). The assumption may hold for the initial LTM, but may not hold thereafter. In particular, after switching to cell 3651, the wireless device 3610 may perform a subsequent LTM. For the subsequent LTM (to cell 3652), a DU 3640 continues to rely on the LTM configuration 3601, which assumes (incorrectly) that cell 3641 is the source cell. Based on the (incorrect) assumption that cell 3641 is the source cell for the subsequent LTM, the wireless device may behave as if another inter-group cell switch has occurred. Accordingly, wireless device 3610 may reset MAC and perform other actions associated with inter-group cell switching. But in the example, an inter-group cell switch has not occurred. On the contrary, for the subsequent LTM, the source cell (cell 3651) and the target cell (cell 3652) are in a same cell group (i.e., associated with DU 3650). Accordingly, the subsequent LTM is an intra-group cell switch. It may be wasteful and/or unnecessary for wireless device 3610 to perform inter-group behavior (MAC reset, etc.) in the case of intra-group cell switching. Accordingly, the introduction of subsequent LTM may cause a problem of delay and/or inefficiency.

To solve this problem of delay and/or inefficiency, a base station (e.g., a base station CU and/or DU) may send, to a wireless device, an indication of one or more cell groups associated with an LTM configuration. In an example, each cell group of the one or more cell groups may comprise one or more cells. A first cell of a first cell group may be associated with the wireless device (e.g., a current cell of the wireless device, a serving cell of the wireless device, a cell via which LTM is configured, a cell via which an LTM configuration is received, a cell via which the indication of the one or more cell groups is received, etc.). The indication of the one or more cell groups may indicate one or more cells associated with LTM (e.g., one or more target cells of the wireless device, one or more candidate cells of the wireless device, etc.). The one or more target cells may be in the first cell group and/or a second cell group. By providing the indication of the one or more cell groups associated with an LTM configuration, the base station may enable the wireless device to determine whether to perform one or more actions associated with cell switching (e.g., MAC reset, RLC re-establishment, PDCP data recovery, etc.). By providing the indication of the one or more cell groups associated with an LTM configuration, the base station may enable the wireless device to improve the speed and/or efficiency of subsequent LTM.

To solve this problem of delay and/or inefficiency, a wireless device may receive, from a base station (e.g., a base station CU and/or DU), an indication of one or more cell groups associated with an LTM configuration. In an example, each cell group of the one or more cell groups may comprise one or more cells. A first cell of a first cell group may be associated with the wireless device (e.g., a current cell of the wireless device, a serving cell of the wireless device, a cell via which LTM is configured, a cell via which an LTM configuration is received, a cell via which the indication of the one or more cell groups is received, etc.). The indication of the one or more cell groups may indicate one or more cells associated with LTM (e.g., one or more target cells of the wireless device, one or more candidate cells of the wireless device, etc.). The one or more target cells may be in the first cell group and/or a second cell group. The wireless device may receive a cell switch command for LTM and/or subsequent LTM. The wireless device may determine to perform one or more actions associated with cell switching (e.g., MAC reset, RLC re-establishment, PDCP data recovery, etc.) based on whether a source cell of the cell switch and a target cell of the cell switch are in a same cell group or different cell groups. For example, the wireless device may perform the one or more actions if the target cell and source cell are in different cell groups. The wireless device may not perform the one or more actions if the target cell and source cell are in the same cell group. By performing or not performing the one or more actions based on the indication of the one or more cell groups associated with an LTM configuration, the wireless device may improve the speed and/or efficiency of subsequent LTM.

In a particular example, a layer 2 reset may involve re-establishing a radio link control (RLC) entity and/or performing PDCP data recovery. An L2 reset may be required for a handover from one DU to another DU, but using L1/L2 triggered mobility (LTM) may involve either intra-DU LTM or inter-DU LTM such that it may be unclear whether a wireless device should perform an L2 reset. Each cell may be associated with a parameter that may be compared relative to another parameter of a cell for determining whether a wireless device must perform an L2 reset, such as by re-establishing a radio link control (RLC) entity and/or performing PDCP data recovery. The parameters (e.g., in an LTM configuration) may be used to indicate whether the wireless device may perform an L2 reset. Based on the parameters of a serving/source cell and a candidate/target cell being different, the wireless device may determine to perform an L2 reset. Based on the parameters of a serving/source cell and a candidate/target cell being the same, the wireless device may determine not to perform an L2 reset. A cell group ID and/or a parameter comparison may be used to indicate (e.g., in an LTM configuration) whether a wireless device must perform an L2 reset: if the source cell and a target cell are in different cell groups then the wireless device may perform an L2 reset, and if the source cell and a target cell are in the same cell group then an L2 reset is not required.

Figure 37:
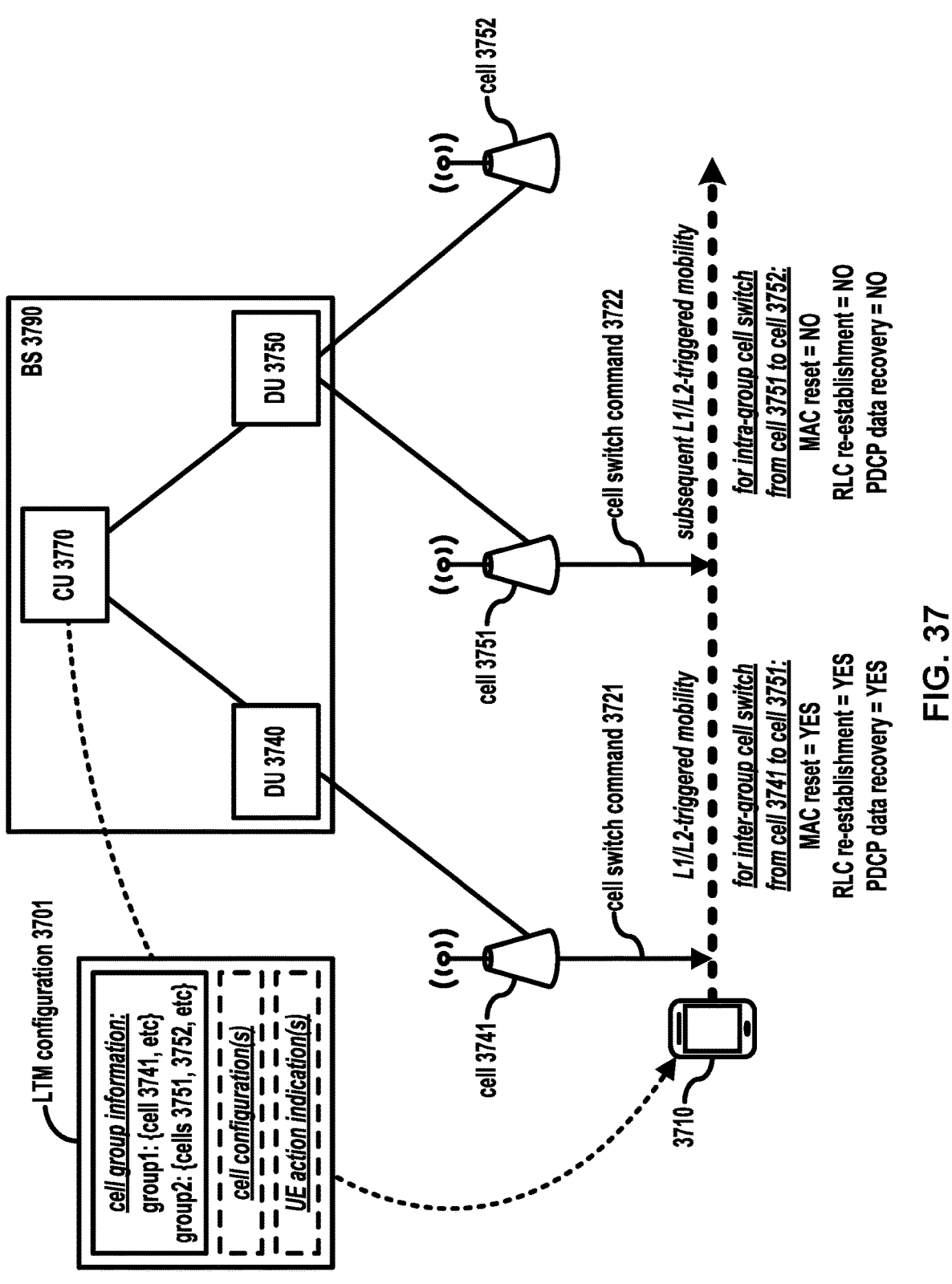
FIG. 37 shows an example of cell switching.

FIG. 37 shows an example of cell switching. The cell switching may be subsequent to LTM. The figure shows a wireless device 3710 (wireless device 3710). The wireless device 3710 may receive an LTM configuration 3701 from a base station 3790 (BS 3790). The BS 3790 may comprise a base station central unit 3770 (CU 3770). The CU 3770 may be associated with one or more base station distributed units (DUs). CU 3770 may be associated with a DU 3740 having a cell 3741; and a DU 3750 having a cell 3751 and a cell 3752.

BS 3790 may be implemented as a split architecture (i.e., as a CU and one or more DUs). However, it will be understood that BS 3790 may be a non-split and/or monolithic base station. Each cell group may correspond exactly to a particular DU (such as shown in FIG. 37), but it will be understood that cell groups may be defined based on any suitable considerations.

The wireless device 3710 may be initially served by DU 3740 via cell 3741. The wireless device 3710 may receive the LTM configuration 3701 from the CU 3770. The receiving of the LTM configuration 3701 may be via cell 3741 of DU 3740, or via any other suitable path. The cell 3741 may be a current cell and/or serving cell of the wireless device 3710.

The LTM configuration 3701 may be for L1/2 triggered mobility (e.g., to one or more candidate target cells; e.g., to one or more cells associated with the BS 3790/CU 3770, to one or more cells other than the serving cell, to one or more cells associated with a different DU from cell 3741, etc.). The LTM configuration 3701 may comprise cell group information. In an example, LTM configuration 3701 may indicate one or more cell groups. For example, LTM configuration 3701 may comprise a cell group indicator, identifier, and/or index for each cell group. In an example, for each cell group of the one or more cell groups, LTM configuration 3701 may indicate one or more cells. For example, LTM configuration 3701 may comprise a cell indicator, identifier, and/or index for each cell.

The cell group information may indicate a first cell group (group1) and a second cell group (group2). Group1 may comprise a first cell (e.g., cell 3741). Group2 comprises one or more other cells (e.g., cell 3751, cell 3752). The first cell (cell 3741) may be associated with the wireless device 3710. the first cell may be a current cell of the wireless device 3710. The first cell may be a serving cell of the wireless device 3710. For example, the LTM configuration 3701 may be sent via the first cell. The first cell group may optionally comprise one or more cells other than the first cell.

The LTM configuration 3701 may optionally indicate one or more cell configurations. For example, LTM configuration 3701 may comprise a first cell configuration for the first cell, one or more other cell configurations for the one or more other cells, etc. The LTM configuration 3701 may optionally indicate one or more wireless device actions for the wireless device 3710 and/or one or more conditions for performing the one or more wireless device actions. For example, the LTM configuration 3701 may indicate one or more of MAC reset (full and/or partial), RLC re-establishment, PDCP data recovery, etc. For example, the LTM configuration 3701 may indicate that the one or more wireless device actions are performed by wireless device

3710 upon inter-group LTM and/or inter-group cell switching (e.g., switching from a cell in the first cell group to a cell in the second cell group). For example, the LTM configuration 3701 may indicate that the one or more wireless device actions are not performed by wireless device 3710 upon intra-group LTM and/or intra-group cell switching (e.g., switching from a cell in the second cell group to another cell in the second cell group).

The cell 3741 may be in a different cell group from cell 3751 and cell 3752. The cell 3751 and the cell 3752 may be in a same cell group. In the example, a first cell group (comprising cell 3741) corresponds to DU 3740 and a second cell group (comprising cell 3751 and cell 3752) corresponds to DU 3750.

The wireless device 3710 may be capable of subsequent LTM. For example, wireless device 3710 may be capable of a plurality of consecutive cell switches based on L1/2 triggering. For example, wireless device 3710 may be capable of cell switching without RRC reconfiguration.

The wireless device 3710 may perform LTM based on receiving a cell switch command 3721 via cell 3741 (e.g., from DU 3740). The cell switch command 3721 may command the wireless device 3710 to switch to cell 3751. The switching from cell 3741 to cell 3751 may be based on the LTM configuration 3701. The LTM configuration 3701 may indicate that if wireless device 3710 performs an inter-group cell switch (e.g., with source cell and target cell in different cell groups), wireless device 3710 should perform one or more actions (e.g., reset MAC, re-establish RLC, and/or perform PDCP data recovery). In the example, the source cell is cell 3741 of group1, and the target cell is cell 3751 of group2. Accordingly, wireless device 3710 may determine that the cell switch is an inter-group cell switch (e.g., inter-DU cell switch). Accordingly, wireless device 3710 may perform the one or more actions.

The wireless device 3710 may perform LTM (e.g., subsequent LTM) based on receiving a cell switch command 3722 via cell 3751 (e.g., from DU 3750). The cell switch command 3722 may command the wireless device 3710 to switch to cell 3752. The LTM configuration 3701 may indicate that if wireless device 3710 performs an intra-group cell switch (e.g., with source cell and target cell in the same cell group), wireless device 3710 should not perform one or more actions (e.g., not reset MAC, not re-establish RLC, and/or not perform PDCP data recovery). In the example, the source cell is cell 3751 of group2, and the target cell is cell 3752 of group2. Accordingly, wireless device 3710 may determine that the cell switch is an intra-group cell switch (e.g., intra-DU cell switch). Accordingly, wireless device 3710 may not perform the one or more actions.

Figure 38:
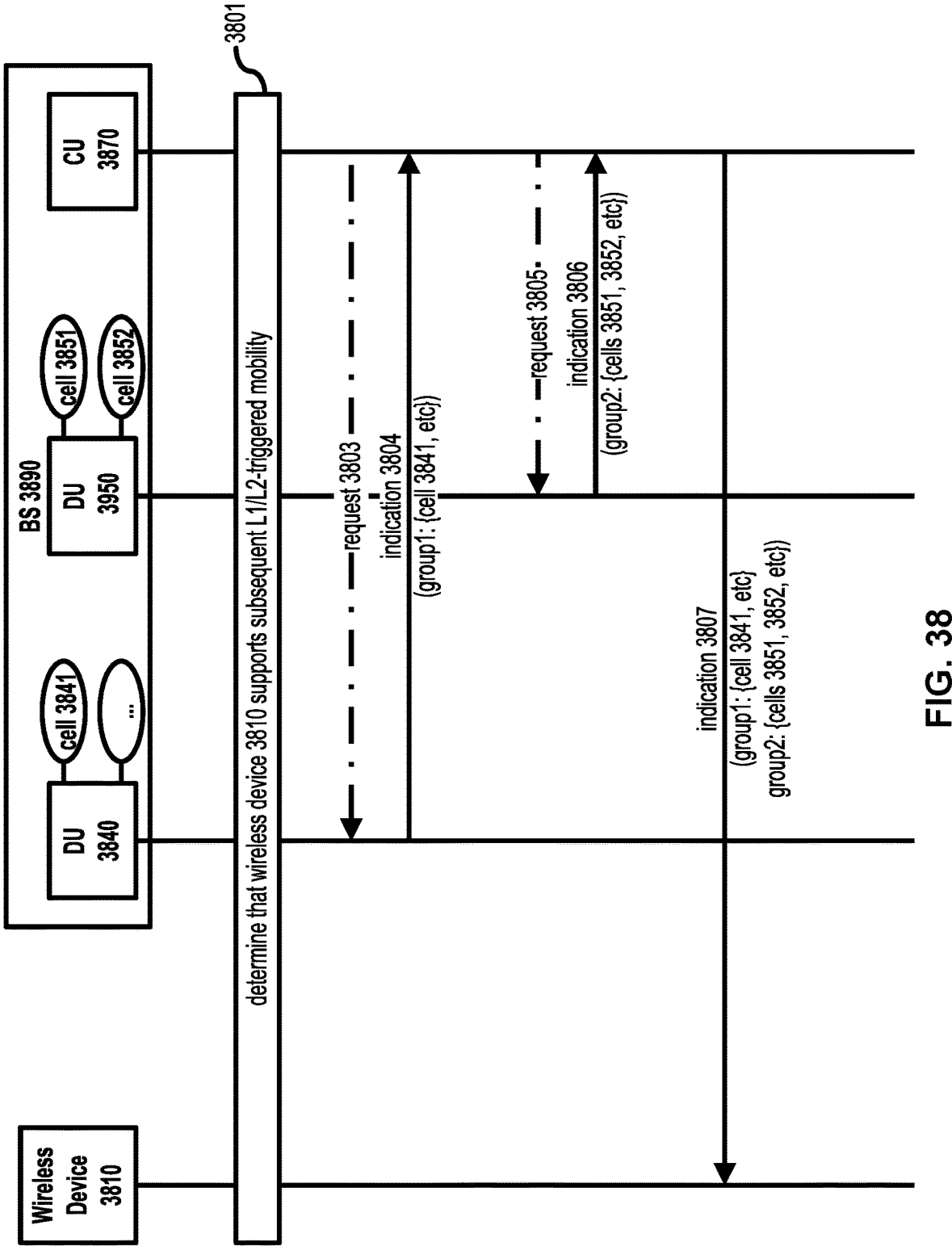
FIG. 38 shows an example of cell group determination, definition, and/or configuration.

FIG. 38 shows an example of cell group determination, definition, and/or configuration. The figure shows a wireless device 3810 and a base station (BS 3890). The BS 3890 comprises a base station central unit (CU 3870) and one or more base station distributed units (DU 3840 and DU 3850). Each base station distributed unit may be associated with one or more cells. The DU 3840 may be associated with at least cell 3841. The DU 3850 may be associated with at least cell 3851 and cell 3852.

At 3801, the CU 3870 may determine that the wireless device 3810 supports subsequent L1/2 triggered mobility (LTM). The CU 3870 may assume that wireless device 3810 supports subsequent LTM (e.g., a default setting). The CU 3870 may receive, from wireless device 3810, a wireless device capability indication indicating that wireless device 3810 supports subsequent LTM. The indication may be received, by CU 3870, via a cell associated with wireless device 3810 (e.g., a current cell of wireless device 3810, a serving cell of wireless device 3810, etc.). the indication may be received, by CU 3870, via a DU associated with the cell.

The operations that follow may be based on a determination, by 3870, that at least one wireless device (e.g., at least one wireless device served by the 3870; e.g., wireless device 3810) supports subsequent LTM. At 3803, CU 3870 may send a request to DU 3840. The request 3803 may indicate a request for cell group information. The request 3803 may indicate a request for cell group information associated with the DU 3840. The request 3803 may indicate a request for cell group information associated with one or more cells of the DU 3840. At 3804, DU 3840 may send an indication to CU 3870. The sending of the indication may be based on receiving of the request 3803. Alternatively, the request 3803 may not be sent or received. In an example, DU 3840 may be preconfigured to send the indication. In an example, DU 3840 may determine that wireless device 3810 supports subsequent LTM (e.g., based on receiving, from wireless device 3810, a wireless device capability indication indicating that wireless device 3810 supports subsequent LTM); and DU 3840 may send the indication 3804 to CU 3870 based on determining that wireless device 3810 supports subsequent LTM.

The indication 3804 may comprise an indication, identifier, and/or index of a cell group (e.g., group1 in the example). The cell group may comprise every cell associated with DU 3840. Additionally or alternatively, DU 3840 may define multiple cell groups. In an example, every cell may be assigned to at least one of the multiple cell groups. For each cell group indicated by the indication 3804, the indication 3804 may comprise an indication, identifier, and/or index of a cell (e.g., cell 3841 in the example).

At 3805, the CU 3870 may send a request to DU 3850. At 3806, DU 3850 may send an indication to CU 3870. The sending and receiving of request 3805 and indication 3806 may be analogous to the sending and receiving of request 3803 and indication 3804; for brevity, further description will be omitted.

At 3807, the CU 3870 may send an indication to wireless device 3810. In an example, the indication 3807 may be (or may be included in) an LTM configuration (e.g., similar to LTM configuration 3701 described above). The sending of the indication to wireless device 3810 may be based on the determining 3801, by CU 3870, that wireless device 3810 supports subsequent LTM. Also at 3807, DU 3840 may receive the indication 3807 from CU 3870 and/or send the indication 3807 to wireless device 3810 (e.g., relay the indication 3807 from CU 3870 to wireless device 3810). The sending of the indication 3807 to wireless device 3810 may be based on the determining 3801, by DU 3840, that wireless device 3810 supports subsequent LTM. The indication 3807 may comprise one or more indications, identifiers, and/or indices of one or more cell groups (e.g., group1 and group2 in the example). In an example, the respective cell groups may comprise every cell associated with the respective DUs (DU 3840 and DU 3850). Alternatively, the cell groups may not correspond to respective DUs.

Figure 39:
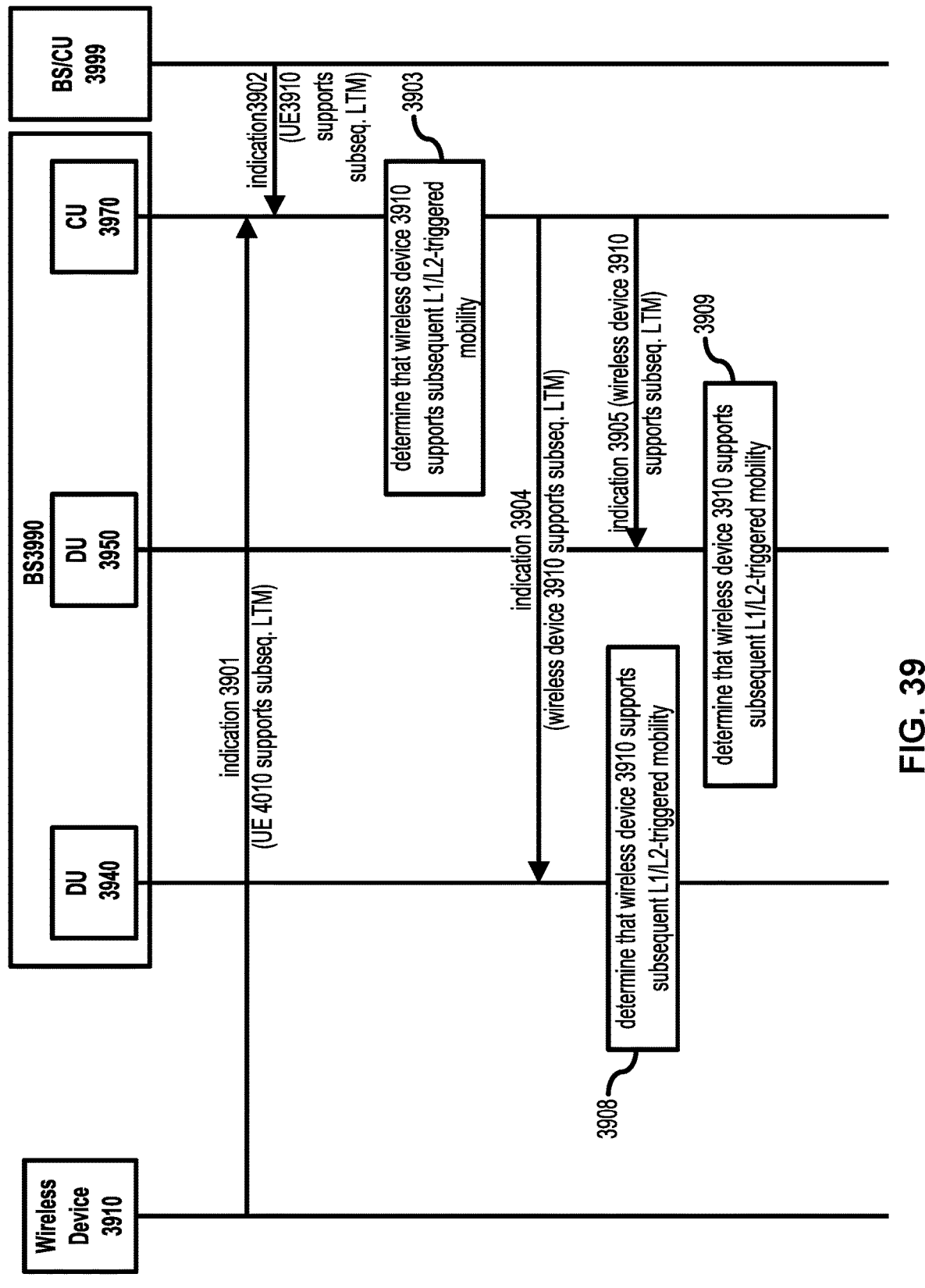
FIG. 39 shows an example method associated with LTM.

FIG. 39 shows an example method associated with LTM. The method may be subsequent to an LTM capability determination. The figure shows a wireless device 3910, a base station (BS 3990), and a base station and/or base station central unit (BS/CU 3999). The BS 3990 may comprise a base station central unit (CU 3970) and/or one or more base station distributed units (DU 3940 and DU 3950). The determining in FIG. 39 may be an example of the determining at 3801 in FIG. 38.

At step 3901, the wireless device 3910 may send, and/or the CU 3970 may receive, an indication that the wireless device 3910 supports subsequent LTM. In an example, the DU 3940 and/or the DU 3950 receives the indication 3901 from the wireless device 3910 and sends the indication 3901 to the CU 3970 (e.g., relays the indication 3901 from wireless device 3910 to CU 3970).

At step 3902, the BS/CU 3999 may send, and/or the CU 3970 may receive, an indication that wireless device 3910 supports subsequent LTM. The BS/CU 3999 may be associated with a previous base station of the wireless device 3910. The BS/CU 3999 may receive, from the wireless device 3910, an indication analogous to the indication 3901. Based on receiving the indication analogous to the indication 3901, the BS/CU 3999 may relay and/or forward, to the BS 3990, the indication 3902.

The indication 3901 and/or indication 3902 may comprise, for example, an indicator, identifier, and/or index of the wireless device 3910. The indication 3901 and/or the indication 3902 may comprise, for example, a field, bit, and/or flag indicating that wireless device 3910 supports subsequent LTM.

At step 3903, the CU 3970 may determine that the wireless device 3910 supports subsequent LTM. The determining at step 3903 may be based on the indication 3901 and/or the indication 3902. At step 3904 and/or step 3905, CU 3970 may send, to DU 3940 and/or DU 3950 respectively, an indication that wireless device 3910 supports subsequent LTM. The indication 3904 and/or indication 3905 may comprise, for example, an indicator, identifier, and/or index of the wireless device 3910. The indication 3904 and/or indication 3905 may comprise, for example, a field, bit, and/or flag indicating that wireless device 3910 supports subsequent LTM. At step 3908 and/or at step 3909, the DU 3940 and/or the DU 3950 respectively may determine that the wireless device 3910 supports subsequent LTM. The determining 3908 and/or determining 3909 may be based on indication 3904 and indication 3905, respectively.

A wireless device may perform a method comprising multiple operations. The wireless device may receive, from a base station, a radio resource control (RRC) message comprising a configuration for layer 1 or layer 2 triggered mobility (LTM). The configuration for LTM may indicate: a configuration of one or more candidate cells for LTM; a first parameter associated with a serving cell; and a second parameter associated with the one or more candidate cells for LTM. The wireless device may receive a medium access control (MAC) control element (CE) indicating to switch the serving cell to a candidate cell of the one or more candidate cells. The wireless device may, based on receiving the MAC CE and based on the first parameter being different from the second parameter, perform at least one of: re-establishing a radio link control (RLC) entity of the wireless device; or performing a packet data convergence protocol (PDCP) data recovery. The RRC message may comprise LTM configuration information indicating that the serving cell and the candidate cell are in different cell groups of a plurality of cell groups. The wireless device may perform, based on the serving cell and the candidate cell being in different cell groups of a plurality of cell groups, packet data convergence protocol (PDCP) data recovery. The wireless device may re-establish, based on the serving cell and the candidate cell being in different cell groups of a plurality of cell groups, the RLC entity of the wireless device. The RRC message may indicate that: each of the plurality of cell groups comprises at least one of the plurality of the cells; or one or more identifiers of the plurality of cell groups is associated with at least one of the plurality of the cells. The wireless device may establish the RLC entity by at least one of: discarding one or more RLC service data units (SDU); discarding one or more RLC SDU segments; discarding one or more RLC packet data units (PDU); resetting a timer associated with the RLC entity; or resetting one or more state variables of the RLC entity to initial values. The RLC entity may be configured to perform at least one of: segmentation; retransmission through automatic repeat request (ARQ); or removal of duplicate data units received from a MAC entity. The LTM may comprise a special cell (SpCell) switch procedure based on at least one layer 1 measurement. A wireless device may comprise: one or more processors; and memory storing instructions that, when executed by the one or more processors, cause the wireless device to perform the described method, additional operations and/or include the additional elements. A system may comprise: a wireless device configured to perform the described method, additional operations and/or include the additional elements; and a base station configured to send the RRC message. A computer-readable medium storing instructions that, when executed, cause performance of the described method, additional operations and/or include the additional elements.

A base station may perform a method comprising multiple operations. The base station may transmit, to a wireless device, a radio resource control (RRC) message comprising a configuration for layer 1 or layer 2 triggered mobility (LTM). The configuration for LTM may indicate a configuration of one or more candidate cells for LTM; a first parameter associated with a serving cell; and a second parameter associated with the one or more candidate cells for LTM. The base station may transmit a medium access control (MAC) control element (CE) indicating to switch the primary cell to a candidate cell of the one or more candidate cells. The base station may receive, based on transmitting the MAC CE and based on the first parameter being different from the second parameter, an indication that the wireless device has performed at least one of: re-established a radio link control (RLC) entity; or packet data convergence protocol (PDCP) data recovery. The RRC message may comprise LTM configuration information indicating that the primary cell and the candidate cell are in different cell groups of the plurality of cell groups. The RRC message may indicate that: each of the plurality of cell groups comprises at least one of the plurality of the cells; or one or more identifiers of the plurality of cell groups is associated with at least one of the plurality of the cells. The LTM may comprise a special cell (SpCell) switch procedure based on at least one layer 1 measurement. A base station may comprise: one or more processors; and memory storing instructions that, when executed by the one or more processors, cause the base station to perform the described method, additional operations and/or include the additional elements. A system may comprise: a base station configured to perform the described method, additional operations and/or include the additional elements; and a wireless device to send the indication that the wireless device has established a radio link control (RLC) entity. A computer-readable medium storing instructions that, when executed, cause performance of the described method, additional operations and/or include the additional elements.

A wireless device may perform a method comprising multiple operations. The wireless device may receive, from a base station, layer 1 or layer 2 triggered mobility (LTM) configuration information for a candidate cell. The LTM configuration information may indicate a first parameter associated with a serving cell; and a second parameter associated with the candidate cell. The wireless device may receive a medium access control (MAC) control element (CE) indicating to switch from the serving cell to the candidate cell. The wireless device may re-establish, based on receiving the MAC CE and based on the first parameter being different from the second parameter, a radio link control (RLC) entity of the wireless device. The LTM configuration information may be in a radio resource control (RRC) message. The RRC message may indicate a plurality of cells comprising: the serving cell; and the candidate cell among one or more candidate cells for LTM. The LTM configuration information may indicate that the serving cell is in a second cell group of a plurality of cell groups. The wireless device may perform, based on the candidate cell and the serving cell being in different cell groups of a plurality of cell groups, packet data convergence protocol (PDCP) data recovery. The wireless device may re-establish the RLC entity by at least one of: discarding one or more RLC service data units (SDU); discarding one or more RLC SDU segments; discarding one or more RLC packet data units (PDU); resetting a timer associated with the RLC entity; or resetting one or more state variables of the RLC entity to initial values. The RLC entity may be configured to perform at least one of: segmentation; retransmission through automatic repeat request (ARQ); or removal of duplicate data units received from a MAC entity. The LTM may comprise a special cell (SpCell) switch procedure based on at least one layer 1 measurement. A wireless device may comprise: one or more processors; and memory storing instructions that, when executed by the one or more processors, cause the wireless device to perform the described method, additional operations and/or include the additional elements. A system may comprise: a wireless device configured to perform the described method, additional operations and/or include the additional elements; and a base station configured to send the LTM configuration information. A computer-readable medium storing instructions that, when executed, cause performance of the described method, additional operations and/or include the additional elements.

A wireless device may perform a method comprising multiple operations. The wireless device may receive, from a base station, layer 1 or layer 2 triggered mobility (LTM) configuration information for a candidate cell. The LTM configuration information may indicate: a first parameter associated with a serving cell; and a second parameter associated with the candidate cell. The wireless device may receive a medium access control (MAC) control element (CE) indicating to switch from the serving cell to the candidate cell. The wireless device may perform, based on receiving the MAC CE and based on the first parameter being different from the second parameter, a packet data convergence protocol (PDCP) data recovery. The wireless device may re-establish, based on the serving cell and the candidate cell being in different cell groups of a plurality of cell groups, a radio link control (RLC) entity of the wireless device. The wireless device may perform the PDCP data recovery by at least one of: discarding one or more packet data units (PDU) that are not successfully transmitted or received via the serving cell; generating the one or more PDU; transmitting, via the candidate cell, the PDU; or receiving, via the candidate cell, the PDU. A PDCP entity, associated with PDCP data recovery, may be configured to perform at least one of: header compression; header decompression; ciphering; deciphering; integrity protection; retransmission of undelivered one or more packets; in-sequence delivery; reordering of one or more packet; removal of one or more duplicate packets; or packet dupli-cation. The MAC CE may indicate: the candidate cell; and a timing advance (TA) associated with the candidate cell. The LTM may comprise a special cell (SpCell) switch procedure based on at least one layer 1 measurement. A wireless device may comprise: one or more processors; and memory storing instructions that, when executed by the one or more processors, cause the wireless device to perform the described method, additional operations and/or include the additional elements. A system may comprise: a wireless device configured to perform the described method, addi-tional operations and/or include the additional elements; and a base station configured to send the RRC message. A computer-readable medium storing instructions that, when executed, cause performance of the described method, addi-tional operations and/or include the additional elements.

A wireless device may perform a method comprising multiple operations. The wireless device may receive, from a base station, a radio resource control (RRC) message indicating: a plurality of cells; and the plurality of the cells being grouped in a plurality of cell groups. The plurality of cells indicated may comprise: a primary cell; and one or more candidate cells for a layer 1 or layer 2 triggered mobility (LTM). The wireless device may receive a medium access control (MAC) control element (CE) indicating to switch the primary cell to a cell of the one or more candidate cell. The wireless device may re-establish, based on the primary cell and the cell being in different cell groups, a radio link control (RLC) entity of the wireless device. The RRC message indicating the plurality of cells and the plurality of the cells being grouped in the plurality of cell groups may comprise at least one of: an RRC message indicating that each of the plurality of cell groups comprises at least one of the plurality of the cells; or an RRC message indicating that one or more identifiers of the plurality of cell groups is associated with at least one of the plurality of the cells. The one or more identifiers may comprise at least one of: a cell group identifier, or a base station distributed unit (DU) identifier. The RRC message indicating the plurality of cells and the plurality of the cells being grouped in the plurality of cell groups may comprise the RRC message indicating, via a LTM configuration, the plurality of cells and the plurality of the cells being grouped in the plurality of cell groups. The LTM configuration may comprise at least one of: a configuration of the one or more candidate cells for the LTM; an identifier of the one or more candidate cells; or a parameter of a layer 1 (L1) measurement report for the LTM. The wireless device may receive the MAC CE after transmitting, to the base station, the L1 measurement report. The wireless device may re-establish the RLC entity by at least one of: discarding RLC service data unit (SDU)(s); discarding RLC SDU segments; discarding RLC packet data unit (PDU); stopping and resetting timer(s) of the RLC entity; or resetting all state variables of the RLC entity to their initial values. The RLC entity may comprise an entity for performing at least one of: segmentation; retransmission through Automatic Repeat Request (ARQ); or removal of duplicate data units received from a medium access control (MAC) entity. The RLC entity may support: transparent mode (TM); unacknowledged mode (UM); and acknowl-edged mode (AM). The MAC CE indicating to switch the primary cell to the cell may comprise a MAC CE indicating the cell. The MAC CE may indicate a timing advance (TA) associated with the cell. The LTM may comprise a special cell (SpCell) switch procedure that the base station triggers, via the MAC CE, based on a layer 1 (L1) measurements. The SpCell may comprise: the PCell; and a primary secondary cell group (SCG) cell (PSCell). A wireless device may comprise: one or more processors; and memory storing instructions that, when executed by the one or more processors, cause the wireless device to perform the described method, additional operations and/or include the additional elements. A system may comprise: a wireless device configured to perform the described method, additional operations and/or include the additional elements; and base station configured to send the RRC message. A computer-readable medium storing instructions that, when executed, cause performance of the described method, additional operations and/or include the additional elements.

A wireless device may perform a method comprising multiple operations. The wireless device may receive, from a base station, a radio resource control (RRC) message indicating: a plurality of cells; and the plurality of the cells being grouped in a plurality of cell groups. The plurality of indicated cells may comprise: a primary cell; and one or more candidate cells for a layer 1 or layer 2 triggered mobility (LTM). The wireless device may receive a medium access control (MAC) control element (CE) indicating to switch the primary cell to a cell of the one or more candidate cells. The wireless device may perform, based on the primary cell and the cell being in different cell groups, a packet data convergence protocol (PDCP) data recovery. The RRC message indicating the plurality of cells and the plurality of the cells being grouped in the plurality of cell groups may comprise at least one of: an RRC message indicating that each of the plurality of cell groups comprises at least one of the plurality of the cells; or an RRC message indicating that one or more identifiers of the plurality of cell groups is associated with at least one of the plurality of the cells. The one or more identifiers may comprise at least one of: a cell group identifier, or a base station distributed unit (DU) identifier. The RRC message indicating the plurality of cells and the plurality of the cells being grouped in the plurality of cell groups may comprise the RRC message indicating, via a LTM configuration, the plurality of cells and the plurality of the cells being grouped in the plurality of cell groups. The LTM configuration may comprise at least one of: a configuration of the one or more candidate cells for the LTM; an identifier of the one or more candidate cells; or a parameter of a layer 1 (L1) measurement report for the LTM. The wireless device may receive the MAC CE after transmitting, to the base station, the L1 measurement report. The wireless device may perform the PDCP data recovery by at least one of: discarding packet data unit(s) which are not successfully transmitted and/or received via the primary cell; generating and/or regenerating the packet data unit(s); or transmitting and/or receiving the packet data unit(s) via the cell. The PDCP entity may comprise an entity for performing at least one of: header compression; header decompression; ciphering; deciphering; integrity protection; retransmission of undelivered packets; in-sequence delivery; reordering of packet(s); removal of packet(s) received in duplicate; or packet duplication. The MAC CE indicating to switch the primary cell to the cell may comprise a MAC CE indicating the cell. The MAC CE may indicate a timing advance (TA) associated with the cell. The LTM may comprise a special cell (SpCell) switch procedure that the base station triggers, via the MAC CE, based on a layer 1 (L1) measurements. The SpCell may comprise: the PCell; and a primary secondary cell group (SCG) cell (PSCell). A wireless device may comprise: one or more processors; and memory storing instructions that, when executed by the one or more processors, cause the wireless device to perform the described method, additional operations and/or include the additional elements. A system may comprise: a wireless device configured to perform the described method, additional operations and/or include the additional elements; and a base station configured to send the RRC message. A computer-readable medium storing instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, 6G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, 6G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEW MathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    receiving, by a wireless device and from a base station, a radio resource control (RRC) message comprising a configuration for layer 1 or layer 2 triggered mobility (LTM), wherein the configuration for LTM indicates:
        a configuration of one or more candidate cells for LTM;
        a first parameter associated with a serving cell; and
        a second parameter associated with the one or more candidate cells for LTM;
    receiving a medium access control (MAC) control element (CE) indicating to switch the serving cell to a candidate cell of the one or more candidate cells; and
    based on receiving the MAC CE and based on the first parameter being different from the second parameter, performing at least one of:
        re-establishing a radio link control (RLC) entity of the wireless device; or
        performing a packet data convergence protocol (PDCP) data recovery.

2. The method of claim 1, wherein the RRC message comprises LTM configuration information indicating that the serving cell and the candidate cell are in different cell groups of a plurality of cell groups.

3. The method of claim 1, further comprising:
    performing, based on the serving cell and the candidate cell being in different cell groups of a plurality of cell groups, packet data convergence protocol (PDCP) data recovery.

4. The method of claim 1, further comprising:
    re-establishing, based on the serving cell and the candidate cell being in different cell groups of a plurality of cell groups, the RLC entity of the wireless device.

5. The method of claim 1, wherein the re-establishing the RLC entity comprises at least one of:
    discarding one or more RLC service data units (SDUs);
    discarding one or more RLC SDU segments;
    discarding one or more RLC packet data units (PDUs);
    resetting a timer associated with the RLC entity; or
    resetting one or more state variables of the RLC entity to initial values.

6. The method of claim 1, where the RLC entity is configured to perform at least one of:
    segmentation;
    retransmission through automatic repeat request (ARQ); or
    removal of duplicate data units received from a MAC entity.

7. The method of claim 1, wherein the LTM comprises a special cell (SpCell) switch procedure based on at least one layer 1 measurement.

8. A method comprising:
    receiving, by a wireless device and from a base station, layer 1 or layer 2 triggered mobility (LTM) configuration information for a candidate cell, wherein the LTM configuration information indicates:

a first parameter associated with a serving cell; and a second parameter associated with the candidate cell;

receiving a medium access control (MAC) control element (CE) indicating to switch from the serving cell to the candidate cell; and re-establishing, based on receiving the MAC CE and based on the first parameter being different from the second parameter, a radio link control (RLC) entity of the wireless device.

9. The method of claim 8, wherein the LTM configuration information is in a radio resource control (RRC) message, and wherein the RRC message indicates:

a plurality of cells comprising:

the serving cell; and the candidate cell among one or more candidate cells for LTM.

10. The method of claim 8, wherein the LTM configuration information indicates that the serving cell is in a second cell group of a plurality of cell groups.

11. The method of claim 8, further comprising:

performing, based on the candidate cell and the serving cell being in different cell groups of a plurality of cell groups, packet data convergence protocol (PDCP) data recovery.

12. The method of claim 8, wherein the re-establishing the RLC entity comprises at least one of:

discarding one or more RLC service data units (SDUs);

discarding one or more RLC SDU segments;

discarding one or more RLC packet data units (PDUs);

resetting a timer associated with the RLC entity; or resetting one or more state variables of the RLC entity to initial values.

13. The method of claim 8, wherein the RLC entity is configured to perform at least one of:

segmentation;

retransmission through automatic repeat request (ARQ); or removal of duplicate data units received from a MAC entity.

14. The method of claim 8, wherein the LTM comprises a special cell (SpCell) switch procedure based on at least one layer 1 measurement.

15. A method comprising:

receiving, by a wireless device and from a base station, layer 1 or layer 2 triggered mobility (LTM) configuration information for a candidate cell, wherein the LTM configuration information indicates:

a first parameter associated with a serving cell; and a second parameter associated with the candidate cell;

receiving a medium access control (MAC) control element (CE) indicating to switch from the serving cell to the candidate cell; and performing, based on receiving the MAC CE and based on the first parameter being different from the second parameter, a packet data convergence protocol (PDCP) data recovery.

16. The method of claim 15, further comprising:

re-establishing, based on the serving cell and the candidate cell being in different cell groups of a plurality of cell groups, a radio link control (RLC) entity of the wireless device.

17. The method of claim 15, wherein the performing the PDCP data recovery comprises at least one of:

discarding one or more packet data units (PDUs) that are not successfully transmitted or received via the serving cell;

generating the one or more PDUs;

transmitting, via the candidate cell, the one or more PDUs; or receiving, via the candidate cell, the one or more PDUs.

18. The method of claim 15, wherein a PDCP entity, associated with PDCP data recovery, is configured to perform at least one of:

header compression;

header decompression;

ciphering;

deciphering;

integrity protection;

retransmission of undelivered one or more packets;

in-sequence delivery;

reordering of one or more packet;

removal of one or more duplicate packets; or packet duplication.

19. The method of claim 15, wherein the MAC CE indicates:

the candidate cell; and a timing advance (TA) associated with the candidate cell.

20. The method of claim 15, wherein the LTM comprises a special cell (SpCell) switch procedure based on at least one layer 1 measurement.

* * * * *